US012768577B1

(12) United States Patent
Green et al.

(10) Patent No.: US 12,768,577 B1
(45) Date of Patent: Oct. 20, 2026

(54) SEGMENTED REFRIGERANT LEAK ISOLATION SYSTEM AND METHOD

(71) Applicants: Kenneth Ray Green, Cross Roads, TX (US); Kevin Mark Klughart, Denton, TX (US); Mitchell Wade Butler, Burleson, TX (US)

(72) Inventors: Kenneth Ray Green, Cross Roads, TX (US); Kevin Mark Klughart, Denton, TX (US); Mitchell Wade Butler, Burleson, TX (US)

( * ) Notice: Subject to any disclaimer, the term of this patent is extended or adjusted under 35 U.S.C. 154(b) by 0 days.

(21) Appl. No.: 19/396,303

(22) Filed: Nov. 20, 2025

(51) Int. Cl.
*F25B 41/40* (2021.01)
*G01M 3/28* (2006.01)

(52) U.S. Cl.
CPC ........... *F25B 41/40* (2021.01); *G01M 3/2815* (2013.01); *F25B 2500/222* (2013.01)

(58) Field of Classification Search
CPC ................ F25B 2500/222; F25B 45/00; F25B 2345/006; F25B 41/40; F24F 11/36; F16L 19/025; F16L 19/0286; F16L 29/04; F16L 29/02
See application file for complete search history.

(56) References Cited

U.S. PATENT DOCUMENTS 2,881,011 A * 4/1959 Coughlin ................ F16L 29/02 137/557
3,218,096 A * 11/1965 Press ..................... F16L 19/025 285/332.1
3,935,713 A * 2/1976 Olson ..................... B25B 27/24 62/77
4,025,092 A * 5/1977 Wakefield ........... F16L 19/0225 285/332.1
4,338,793 A * 7/1982 O'Hern, Jr. ............. F25B 45/00 285/133.11
5,010,743 A * 4/1991 Hale ....................... F25B 45/00 62/149
5,080,132 A * 1/1992 Manz .................. F16L 37/1215 251/149.6
5,139,049 A * 8/1992 Jensen .................... F16L 37/36 137/614.05
5,167,140 A * 12/1992 Cooper ................... G01M 3/20 73/40.7
5,487,573 A * 1/1996 Panek ................... B23P 11/005 29/523

(Continued)

*Primary Examiner* — David Colon-Morales
(74) *Attorney, Agent, or Firm* — Kevin Mark Klughart

(57) ABSTRACT

A segmented refrigerant leak isolation system/method for use in heating, ventilation, and air conditioning (HVAC) systems is disclosed that allows accurate isolation of a HVAC component exhibiting a refrigerant leak, including but not limited to evaporator coils, condenser coils, and/or refrigerant lines in the HVAC system. The system uses a set of modified refrigerant line flare fittings (RFF) incorporating refrigerant Schrader valves (RSV) to isolate a HVAC component under test (CUT) from the remainder of the HVAC system and individually pressurize the CUT to detect a potential leak in the CUT. The system/method provides for retrofit of existing HVAC components with male/female flare fittings (MFF/FFF) and/or refrigerant shutoff valves (RSV) in situations where the existing HVAC system does not incorporate refrigerant line fittings (RLF).

20 Claims, 128 Drawing Sheets

(56) References Cited

U.S. PATENT DOCUMENTS

| | | | | | |
|---|---|---|---|---|---|
| 5,540,254 | A * | 7/1996 | McGowan | F17C 13/04 62/149 |
| 6,041,818 | A * | 3/2000 | Schadewald | F16L 37/28 137/614.19 |
| 6,170,541 | B1 * | 1/2001 | Sanhaji | B60H 1/00585 141/38 |
| 6,901,947 | B2 * | 6/2005 | Danielson | F16L 37/23 29/221.6 |
| 9,803,903 | B2 * | 10/2017 | Higami | F25B 45/00 |
| 10,113,657 | B2 * | 10/2018 | Prescott | F16K 15/1823 |
| 10,302,521 | B2 * | 5/2019 | Hoffman | G01M 3/04 |
| 10,960,416 | B2 * | 3/2021 | Matlack | B05B 1/3006 |
| 11,002,470 | B2 * | 5/2021 | Ronga | G01M 3/226 |
| 11,428,448 | B2 * | 8/2022 | Green | F25B 41/24 |
| 11,460,366 | B2 * | 10/2022 | Pistone | G01L 19/0015 |
| 11,480,486 | B2 * | 10/2022 | Cruz | G01L 19/0023 |
| 11,713,910 | B2 * | 8/2023 | DeCandia | F25B 41/20 62/77 |
| 11,906,220 | B2 * | 2/2024 | Benack | F25B 47/00 |
| 12,117,117 | B2 * | 10/2024 | Petrosino | F25B 45/00 |
| 12,247,673 | B2 * | 3/2025 | Kuo | F25B 45/00 |
| 12,540,689 | B2 * | 2/2026 | Kraft | F16K 43/003 |
| 2004/0168463 | A1 * | 9/2004 | Dudley | F25B 45/00 62/77 |
| 2016/0290694 | A1 * | 10/2016 | Pearl | B60H 1/00585 |

* cited by examiner

Prior Art

FIG. 5

0500

CONNECTION SUMMARY

| | |
|---|---|
| Indoor Units: | 18 with 2 branch controllers |
| Total Pipe Length: | 3066.8ft + 56 elbows |
| Furthese Actual: | 541ft |
| Furthest Equivalent: | 623ft |
| Refrigerant: | R410A |
| Additional Field-Charge: | 85.23lb |
| Total System Charge: | 132.85lb |

CONDITIONS

| Cooling | | Heating | |
|---|---|---|---|
| Indoor Dry Bulb | 80.0F | Indoor Dry Bulb | 70.0F |
| Indoor Wet Bulb | 67.0F | | |
| Indoor Humidity | 51.8% | Outdoor Dry Bulb | 17.0F |
| | | Outdoor Wet Bulb | 15.6F |
| Outdoor Dry Bulb | 101.0F | Outdoor Humidity | 76.1% |

Prior Art

1500

3500

3600

3800

4000

4500

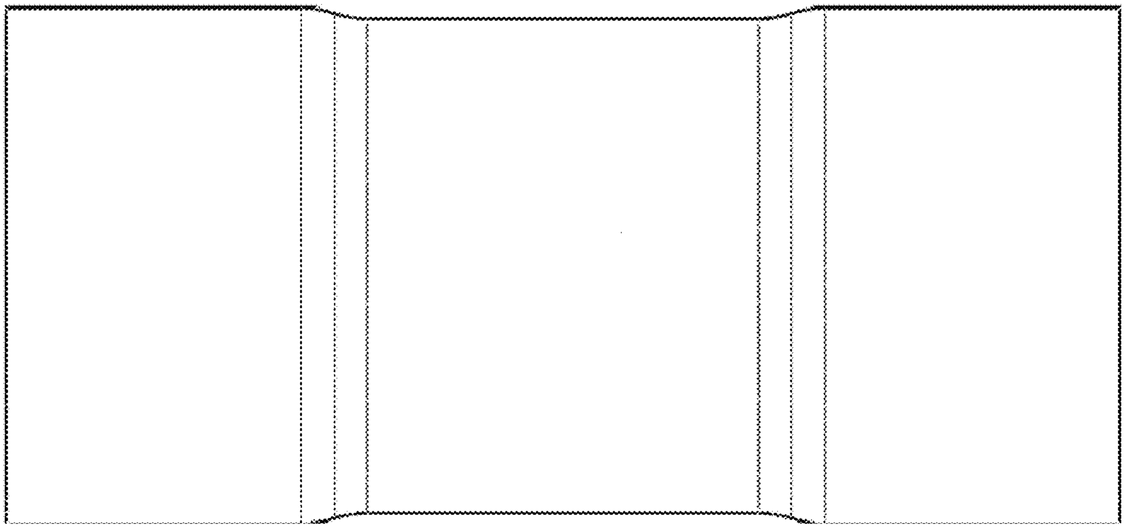
FIG. 46
4600
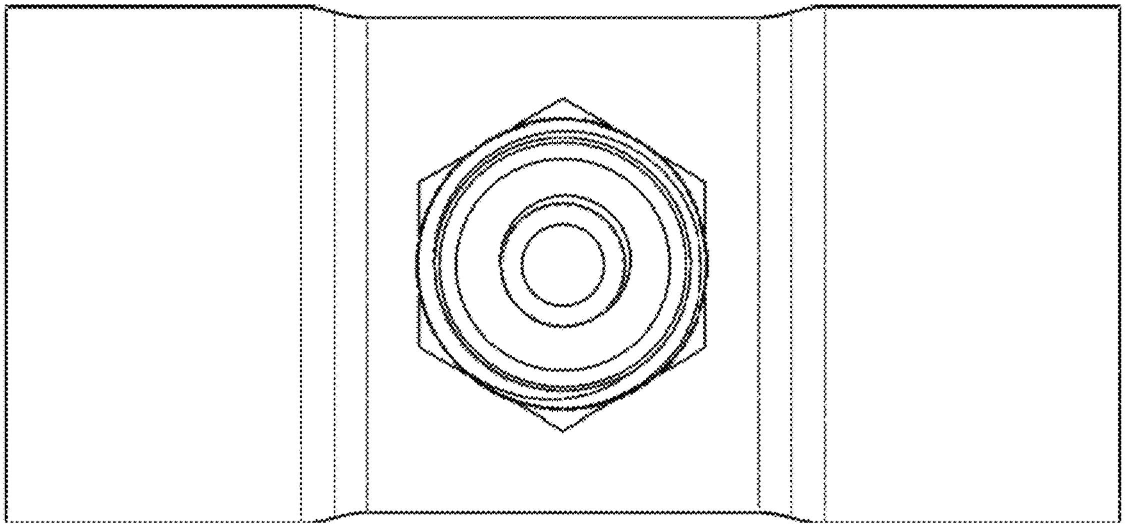

4700

5300

5500

7600

7700

7800

8000

8600

9300

9800

10100

10300

10600

10800

10900

11200

11500

11600

11900

12000

12300

12400

12500

12600

12800

SEGMENTED REFRIGERANT LEAK ISOLATION SYSTEM AND METHOD

CROSS REFERENCE TO RELATED APPLICATIONS

Not Applicable

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention relates to heating, ventilation, and air conditioning (HVAC) systems, and specifically the identification and isolation of refrigerant leaks within specific HVAC components under test (CUT) within these HVAC systems. Without limitation, the present invention system and method allow refrigerant leaks within HVAC systems to be isolated to individual HVAC component segments such as the evaporator coil, indoor air handler, condenser coil, compressor, and/or refrigerant lines connecting these components.

BACKGROUND AND PRIOR ART

HVAC VRF Overview

Many of the HVAC systems in use today utilize what is called Variable Refrigerant Flow (VRF). VRF is a type of HVAC (Heating, Ventilation, and Air Conditioning) system known for its energy efficiency and ability to control temperature in multiple zones independently. VRF systems use refrigerant to heat or cool individual zones, offering customized comfort and potentially lower energy consumption compared to traditional HVAC systems. VRF systems allow different zones s or rooms in a building to be heated or cooled to different temperatures simultaneously, unlike traditional systems that often heat or cool the entire building at once. By only conditioning the spaces that need it, VRF systems can significantly reduce energy consumption and costs. VRF systems use refrigerant as the heating and cooling medium, eliminating the need for water-based systems and potentially reducing the size and complexity of the system. VRF systems are commonly used in commercial buildings (offices, hotels, retail spaces), residential complexes, educational institutions, and healthcare facilities.

As generally depicted in FIG. 1 (0100)-FIG. 4 (0400), conventional and VRF HVAC systems incorporate a number of components such as evaporator coils (0111, 0211, 0311, 0411), compressors (0113, 0213, 0313, 0413), condenser coils (0115, 0215, 0315, 0415), and refrigerant lines (0121, 0122, 0123, 0124, 0125, 0126, 0127, 0221, 0222, 0223, 0224, 0225, 0226, 0227, 0321, 0322, 0323, 0324, 0325, 0326, 0327, 0421, 0422, 0423, 0424, 0425, 0426, 0427). Other components may be included within the overall HVAC system and contained within the refrigerant flows depicted in FIG. 1 (0100)-FIG. 4 (0400). Each of these components as depicted in these system block diagrams may be replicated within a VRF system and thus the detection of an individual leak within this combined component structure may be difficult if not impossible to isolate.

With respect to variations in connecting the HVAC system components, FIG. 1 (0100) describes a generic connection methodology incorporating soldered/brazed copper tubing of any type, FIG. 2 (0200) depicts the use of swaged copper fittings that are soldered in place, FIG. 3 (0300) depicts the use of brass flare fittings to make refrigerant connections, and FIG. 4 (0400) depicts the use of ball valves to make the refrigerant connections. Each of these connection types may be present in a prior-art HVAC system, complicating the systems and methods traditionally used to detect and isolate refrigerant leaks within a HVAC system.

Traditional refrigerant leak detection within HVAC systems has utilized ultraviolet (UV) phosphorescent dye refrigerant oil that is introduced into the refrigerant lines in conjunction with an ultraviolet (UV) light source swept across every HVAC system component, refrigerant line, and pipe fitting in the system. This technique is both time consuming and prone to error as any UV refrigerant dye that contaminates the HVAC system can produce false positive leak indications. The use of soapy water and other visual indicators may also be used in this context but is not effective in areas that are not amenable to visual inspection or physically accessible.

An alternative to the above leak detection method is the use of solid-state refrigerant gas sensors in hand-held electronic leak detectors that are capable of detecting a variety of refrigerant types. However, these hand-held leak detectors are generally not sensitive enough to detect a variety of small leaks that may occur at a particular location in the HVAC system or localized enough to detect a variety of large leaks that may occur within a HVAC system.

From the above it can be observed that when the location of a refrigerant leak is unknown, the above leak detection methodologies are ineffective in locating the actual source of the HVAC leak. What is needed is a methodology to isolate the HVAC system into manageable subsections that can be individually tested for refrigerant leaks. It should be noted from the above leak detection methodologies that none of these are useful in situations where there are multiple refrigerant leaks within a HVAC system, as detection of one leak may be obscured by the presence of another unlocated refrigerant leak.

Refrigerant Leak Sources

Within the context of a conventional HVAC system, the location of a refrigerant leak can be problematic given the wide variety of sources that constitute the refrigerant leak. These sources include but are not limited to: condenser coils, evaporator coils, refrigerant compressors, refrigerant solenoid valves, heat recovery boxes (HRB), refrigerant pressure sensors, refrigerant temperature sensors, interconnecting refrigerant lines, refrigerant line elbows, service valves, Schrader port valves, rubber seals and O-rings, and soldered/brazed connections between the above-listed components.

Oftentimes a refrigerant leak caused by one of the above-listed HVAC components will either be (a) too small to identify using a solid-state refrigerant gas detector, or (b) too large to locate using a solid-state refrigerant gas detector because the leak operates in a widespread area that defies accurate location using a conventional solid-state refrigerant leak gas detector.

HVAC System Complexity

While a simplified refrigerant flow and HVAC system configuration is depicted in FIG. 1 (0100)-FIG. 4 (0400), typical real-world HVAC systems can be quite complex, as generally depicted in the typical prior art system specifications in FIG. 5 (0500) and the associated HVAC system/plumbing diagrams depicted in FIG. 6 (0600). As can be seen in this practical HVAC system implementation, the depicted system includes multiple system units (0611, 0612, 0613), 18 air handlers/evaporators (0621, 0622, 0623), and is connected with over 3000 feet of equivalent refrigerant line (RFL).

Oftentimes within the context of HVAC systems as generally depicted in FIG. 1 (0100)-FIG. 6 (0600), a minor refrigerant leak may occur such that the location of the refrigerant leak is difficult or impossible to locate to a specific HVAC component. For example, an evaporator leak may be severe enough to completely drain all refrigerant from the HVAC system but there no evidence to indicate which component in the system has failed. Oftentimes the repair/maintenance process in these situations is hit-or-miss, with replacement of an evaporator coil (0111, 0211, 0311, 0411) and/or condenser coil (0113, 0213, 0313, 0413) taking place on the "chance" that they are leaking when in fact there is no direct evidence of a failure in either component.

This hit-or-miss methodology is prevalent in the current state of the art because there is currently no alternative testing system or method that is guaranteed to isolate a refrigerant leak to a single HVAC component. While the prior art does include the use of refrigerant leak detectors/sensors, often the refrigerant leaks are too small to detect with these leak detection devices. Furthermore, the leaks may occur only under situations when refrigerant line temperatures are hot or cold or when the refrigerant line pressures are elevated, such as during HVAC operation or under situations where environmental operating temperatures, pressures, and/or vibration deviate from nominal operating conditions.

Economic Losses

It should be noted that once a refrigerant leak occurs, it will often drain the entire HVAC of all refrigerant. The economic and environmental impact of this is significant, as it is common for many commercial HVAC systems to contain 100-200 pounds of refrigerant, costing USD$40-USD$100 per pound, so the loss of all refrigerant in a VRF system results in a USD$4000-USD$20000 economic loss associated with the refrigerant replacement. The total loss of refrigerant also has a significant environmental impact, as this lost refrigerant is expelled into the atmosphere. Since many modern refrigerant formulations are combustible/flammable, the loss of all refrigerant in a HVAC system can also present a significant fire danger to the environment in which the HVAC system is installed.

Apart from the economic loss due to refrigerant leaks, the prior art hit-or-miss refrigerant component replacement (condenser coil, evaporator coil, etc.) leak fault isolation technique has serious economic ramifications in the HVAC industry. For example, a commercial condenser coil may have a USD$14000-USD$24000 replacement cost and a commercial evaporator coil may have a USD$8000-USD$12000 replacement cost. Labor for these installations will typically run USD$3000-USD$10000 per coil, and if a crane is necessary to perform the installation the installation cost may run as high as USD$20000. If the installation is on a taller building that requires a helicopter installation, the helicopter alone may run an additional USD$1500/hour-USD$5000/hour (USD$12000/day-USD$40000/day) for the installation. As can be seen from repair costs, the economic downside of the hit-or-miss component failure diagnosis currently used in the industry can be economically catastrophic to the bottom line of both the HVAC equipment manufacturer as as the HVAC technician. Notably during the HVAC component replacement, the building serviced by the HVAC will lack all climate control, making at least a portion of the serviced building uninhabitable during extreme weather conditions.

The economic losses indicated above must be viewed in light of some HVAC systems servicing large building structures that may include dozens of indoor air handlers, evaporators, and condensers. In these scenarios the economic losses may be multiplied by a factor of 10 or more, resulting in refrigerant economic losses of >USD$100000, because failures in one component may cause cascading losses of refrigerant in the entire HVAC system, resulting in hit-or-miss HVAC component replacement and associated refrigerant losses over the entire refrigerant loop. As more buildings in the northern part of the United States are configured for after-market HVAC systems, these multiplied losses due to non-located refrigerant leaks will only increase in number and result in multiplied economic and environmental damage.

All current original equipment manufacturers (OEMs) of HVAC equipment incur significant losses on warranty replacements for indoor evaporator coils (0111, 0211, 0311, 0411) and outdoor condenser coils (0113, 0213, 0313, 0413) that are not actually leaking. According to at least one manufacturer, they face over a 90% logged replacement failure rate on some evaporator/condenser coils, and upon inspection of these replaced components, most of the coils replaced are found NOT TO HAVE A LEAK OR ANY OTHER FAULT. However, the costs associated with contractor payouts for these warranty replacements are still incurred by the manufacturers, contractors, and end user customers.

Regulatory Intervention and Maintenance Challenges

The issue of refrigerant leaks within VRF systems has become so significant that state regulatory authorities are discouraging the use of VRF systems due to the potential for refrigerant leaks in these systems, even though VRF systems are more efficient than conventional HVAC systems. As stated by the New York City Housing Preservation and Development memo "A2L Heat Pump Design Considerations (Rev1) (2025 May 9)" (https://www.nyc.gov/hpd):

This memo outlines notable NYC code requirements for managing A2L refrigerants like R32 & R454b.

These refrigerants comply with phase 1 of the NYS HFC Law Part 494.1.4 (2) which have a lower Global Warming Potential [GWP] than R410A but are slightly flammable.

VRF systems with >50 lbs of refrigerant are discouraged (typically >100 ft line length and >5 apartment/system):

Require Annual Refrigerant Management reporting to NY State (Part 494.2) starting June 2028 due to high potential refrigerant leakage;

May require a crew of 5 on-site Refrigeration System Operating Engineers (FC606.1.1 A2L update pending the below FDNY rule); and TR1 verification of refrigerant pressure tests required over 55 lbs (1108.4).

Design teams are strongly encouraged to reconsider whether VRF is the optimal heating strategy, due to the complexity of managing refrigerant leaks which are still significant even with lower GWP refrigerants. Teams may wish to consider alternative systems, including packaged equipment where all refrigerants are contained within the systems and field leaks are minimized. Some additional context may be found in our VRF Convening Report.

The issue of refrigerant leaks in VRF systems has become so significant that in some cases buildings are abandoned due to the inability to isolate refrigerant leaks in these systems. This was indicated in the report "Large Split VRF Systems in Multifamily Buildings" by Ian Shapiro, PE Taitem Engineering, DPC (2024 Dec. 20) which states:

Research also shows that large split VRF systems are more leak-prone, result in challenges for owners wishing to bill tenants for cooling, are harder and more costly to maintain, raise loss-of heating/cooling risks for more dwelling units when equipment goes down, and cost as much or more to install than other equipment types.

Environmental Impact

Refrigerant usage: Large split VRF systems use a significantly higher amount of refrigerant: 60% more refrigerant per rated ton of heating/cooling than split systems, and over 100% more refrigerant per rated ton of heating/cooling than packaged room heat pumps. This will contribute to higher greenhouse gas emissions if leaked.

Leak risks: The complex network of hidden pipes and fittings in large split VRF systems increases the risk of refrigerant leaks, and presents challenges to finding and fixing these leaks, further exacerbating leak concerns.

Alternative refrigerants: In 2020, Congress passed the American Innovation and Manufacturing (AIM) Act that will require the phase-out of R-410A, which has been the industry standard most heat pumps. On Jan. 1, 2025, new standards for manufacturing with refrigerants will go into effect. Designers will need to seek equipment with newer, low GWP refrigerants, which tend to be more flammable, which may be very challenging, especially for large split VRF systems due to long refrigerant runs.

Maintenance Challenges [include]:

Complex systems: Large split VRF systems are intricate, invasive, and require specialized knowledge for installation and maintenance.

Difficult troubleshooting: Identifying and resolving issues can be time-consuming and costly, especially for leaks in hard-to-reach areas.

Of particular concern is the case of a large split VRF installation in a low-income, multifamily complex that was entirely abandoned due to refrigerant leaks that could not be found or repaired.

High maintenance costs: The complexity of large split VRF systems presents a risk of higher maintenance costs over the long term.

Thus, the HVAC industry, HVAC OEMs, and government agencies have a long-felt need for a system and methodology to accurately and positively identify HVAC leaks to the individual HVAC CUT component replacement level. To date, the prior art does not teach any system or methodology to address this long-felt need in the HVAC industry, or this issue would have been addressed within the industry to alleviate the unnecessary replacement of condenser/evaporator coils and the related profit loss by HVAC equipment manufacturers. Given the environmental impact of a refrigerant leak in a typical VRF system dumping >100 pounds f refrigerant into the atmosphere, the current methodology of leak detection and component isolation fails to address the detrimental impact that leaking HVAC systems have on the environment.

Prior Art Testing and Remediation Methodology (TRM)

The HVAC VRF industry has been around for over 45 years and continues to grow as technology advances and energy efficiency becomes a more critical concern in HVAC design. However, the testing and remediation methodology (TRM) for refrigerant leaks has not changed during this time period. This prior-art TRM will now be discussed in detail with inventor comments regarding drawbacks in these procedures.

The previously listed drawbacks of refrigerant leaks in modern HVAC systems have been traditionally addressed using the TRM detailed below. [INVENTOR COMMENTS REGARDING THIS PRIOR-ART PROCEDURE AND ITS POTENTIAL DEFICIENCIES ARE INDICATED IN BOLD BRACKETS]. This TRM does not provide for any way to isolate any indoor equipment, evaporators, copper line sets, or outdoor condenser elements in the HVAC system. The procedure listed below pressure tests the whole HVAC system, but it does not allow for isolation of air handlers, heat recovery boxes, outdoor condensers, compressors, copper line sets, or other HVAC equipment tied to the refrigerant loop.

Required Equipment

The following prior art TRM addresses a step-by-step guide for testing large HVAC VRF systems and requires the following equipment:

Nitrogen gas cylinder with a regulator

Pressure gauge (capable of reading high pressure)

Hose and fittings compatible with the system

Safety goggles and gloves

Leak detection soap or dye

Digital pressure logger (optional)

A manifold gauge set (for monitoring multiple zones)

Step 1: Preparation

Safety: Ensure all technicians wear appropriate PPE, including safety goggles and gloves.

System Isolation: Shut down the VRF system and isolate all the indoor and outdoor units. Ensure all service valves on outdoor condenser units are closed.

Step 2: Connect Nitrogen to the System

Identify Connection Points: Choose a convenient service port on one of the indoor units or at the outdoor condenser for the nitrogen connection.

Attach the Regulator: Connect the nitrogen cylinder to the regulator, and then connect the regulator to the service port using appropriate hoses and fittings.

Step 3: Pressurizing the System

Introduce Nitrogen: Slowly open the nitrogen cylinder valve and allow nitrogen to fill the system. Monitor the pressure gauge as the nitrogen is introduced.

Set Desired Pressure: Pressurize the system to the recommended pressure level, typically around 150-300 PSI (check manufacturer guidelines). [It is important to note that this procedure does not isolate any equipment within the HVAC system. The entire HVAC refrigerant loop is being tested from the service port on the outdoor condenser.]

Step 4: Monitor Pressure and Stabilization

Allow Stabilization: After reaching the desired pressure, let the system stabilize for about 15-30 minutes. This allows the nitrogen to distribute evenly throughout the line sets.

Record Initial Pressure: Note the initial pressure reading on the gauge. [This manifold gauge is connected to the outdoor condenser.]

Step 5: Wait and Observe

Time Period: Maintain the pressure for a specified duration (usually 30-60 minutes). This helps identify any pressure drops.

Monitor Pressure: Periodically check the pressure gauge. A drop in pressure indicates a potential leak. [This step is correct when testing the ENTIRE HVAC refrigerant loop, but does not permit isolation of the leaking/defective HVAC component or pinpoint where the refrigerant leak is occurring.]

Step 6: Leak Verification

Use Leak Detection Soap: Apply leak detection soap at all joints, connections, and suspected leak points throughout the system, including:

Indoor unit connections

Outdoor unit connections

Joints in the copper line sets

Service valves

Look for bubbles forming, which would indicate a leak. [This is a time-consuming process in large VRF systems that may have hundreds of connections and thousands of feet of refrigerant piping. Additionally, some of these connections may not be accessible to perform leak testing using this technique. As a result, this TRM is not practical in many HVAC VRF application contexts.]

Systematic Check: Walk along the entire length of the copper line sets, applying the soap solution at each joint and connection. [As mentioned above, this technique is very time consuming and not practical in many HVAC VRF application contexts.]

Inspect Each Indoor Unit: Check each indoor air handler for leaks, especially around any service valves and connection points that may be present. [A critical problem with this prior-art inspection step is that service valves are never installed at indoor air handlers or evaporator units, but generally only installed on outdoor compressor 1 condenser units. Furthermore, checking for leaks at indoor air handlers is generally only possible at the point refrigerant lines enter/exit the air handler, as much of the internal portions of the air handler may be inaccessible without dismantling the indoor air handler unit. This makes it very difficult or impossible to visually determine if there is a leak in the indoor air handler/evaporator using this technique.]

Step 7: Document Findings

Record Results: Document the initial and final pressure readings, as well as any identified leaks.

Plan Repairs: If leaks are detected, note the locations and plan necessary repairs before proceeding. [The prior-art TRM attempts to determine if there is a leak in the entire HVAC system and then perform detailed leak analysis on every individual HVAC component in the entire system. For a HVAC system having (N) components (indoor air handlers, compressors, evaporators, condensers, pipe connections, refrigerant pipe sections, etc.), this requires (N) individual tests to completely determine if all the HVAC system components are leak-free. In contrast, the present invention (as described herein) allows segments of the HVAC system to be isolated and tested individually, allowing a binary search to be performed to locate and isolate the failing HVAC component. This binary search reduces the TRM inspection count from the prior-art value of (N) to an upper limit of $\log_2$ (N). For example, a HVAC system having 128 individual components would require 128 individual TRM tests using the prior-art methodology but 7 tests or less using the binary search approach of the present invention to identify the faulty HVAC component. This results in a return-to-service time for the HVAC system using the present invention system/method in less than 8 hours, and typically from 4 to 6 hours.]

Step 8: Depressurizing the System

Release Nitrogen Safely: Once testing is complete, safely release the nitrogen from the system by opening the service valve. Ensure proper ventilation.

Step 9: Final Checks and Repairs

Make Repairs: Address any leaks identified during the pressure test.

Recheck the System: After repairs, re-pressurize and conduct another leak check to ensure all issues are resolved.

Document Repairs: Record all repairs made and any changes to the system.

Prior Art TRM Deficiencies

The major drawback to prior-art TRM methodologies is the dramatic rise in complexity as the TRM model is applied to modern HVAC VRF systems that have literally thousands of feet of refrigerant line, associated refrigerant line connections, and dozens of individual system components that are spatially diverse throughout a building structure and in many cases are not easily accessible for visual inspection. As indicated above, a HVAC VRF system having (N) components requires inspection and leak testing of all (N) components in order to locate and isolate a refrigerant leak. While this TRM may be suitable for HVAC systems have a small number (N) of components, this TRM quickly becomes unmanageable as (N)) increases and a daunting task for typical HVAC VRF systems as generally depicted in FIG. 5 (0500)-FIG. 6 (0600).

Based on this observation, a major objective of the present invention is to reduce the number of TRM tests required to isolate and locate a refrigerant leak in a HVAC system. It is another objective of the present invention to reduce the number of TRM tests from the prior-art value of (N) to an upper limit of $\log_2$ (N).

Prior Art Ball Valve Deficiencies

It should be noted that some HVAC systems incorporate ball valves to isolate HVAC components in the refrigerant loop. However, the prior art does not teach the use of Schrader ports on BOTH sides of ball valves installed in these configurations to allow isolated and separate pressure testing of HVAC components on BOTH sides of the ball valve when it is closed.

BRIEF SUMMARY OF THE INVENTION

The present invention addresses this long-felt need in the HVAC industry to positively identify and isolate refrigerant leaks in HVAC components. Rather than attempting troubleshooting refrigerant leaks on the entire HVAC system as a whole, the present invention segments the HVAC system into manageable zones and with the aid of specialized Schrader port and/or ball valves and/or other hardware isolates these zones such that pressure testing can be individually performed on each zone. This zonal division of the HVAC system is repeated as necessary until the leaking component(s) of the HVAC system are identified and proven to be defective. Given that HVAC systems may be constructed in many different configurations in the field, the present invention provides a flowchart methodology to address these individual configurations and allow adaptation of the testing methodology to each HVAC system configuration.

The present invention accomplishes leak testing and isolation via the use of a set of modified refrigerant line flare fittings (RFF) incorporating refrigerant Schrader valves (RSV) and refrigerant diversion valves (RDV) to isolate a HVAC component under test (CUT) from the remainder of the HVAC system and allow individual pressurization of the CUT to detect a potential leak in the CUT. Once installed, the RFF isolates a CUT from the remainder of the HVAC system and permits it to be individually pressurized to determine if the CUT contains a leak or is otherwise defective.

Since the typical fault isolation scenario involves a HVAC system in which the refrigerant has been completely lost, the RFF may be retrofit installed in this full-evacuation scenario by inserting the RFF in line with inlet/outlet fittings of a condenser or evaporator without incurring any significant HVAC system modifications. Once installed, the RDV in the RFF may be configured to isolate the CUT (evaporator, condenser, etc.) from the remainder of the HVAC refrigerant loop by closing the inlet/outlet ports of the CUT. The RSV may then be used to pressure test the CUT. This pressure testing once initiated elevates the internal gas pressure in the CUT and looks for a decrease in gas pressure, indicating a leak in the CUT.

Once pressure testing confirms the CUT is defective, it may then be replaced. If the pressure testing indicates the CUT is leak-free, the RSV may be used to evacuate the CUT by drawing a vacuum and then refrigerant may be added to the CUT via the RSV to properly charge the CUT with refrigerant.

The RFF may be configured such that the RDV allows normal HVAC operation when the testing is complete without the need for evacuation of refrigerant from the HVAC system. The RFF may also be removed from the CUT and used to test other CUT within the HVAC system until the failing CUT is positively determined in situations where this diagnostic capability is not required to be permanently installed in the HVAC system. In this manner, the HVAC may be segmented into individual components, each of which may be tested for leaks, and thus the leaking component isolated to a particular CUT.

The RFF described herein may take many forms, and in some circumstances may be permanently retrofit to an existing HVAC system so that once the failing CUT is determined, the HVAC system may be replumbed to permanently incorporate the RFF so as to make troubleshooting for the HVAC system straightforward in the future. Thus, one advantage of the present invention is that it may be permanently installed as a result of this fault isolation technique so that CUT failures in the future may be quickly identified and corrected. The present invention anticipates that the RFF described herein may be integrated with one or more refrigerant flow valves (RFV) to aid in isolating the CUT from the remainder of the HVAC system under test.

BRIEF DESCRIPTION OF THE DRAWINGS

For a fuller understanding of the advantages provided by the invention, reference should be made to the following detailed description together with the accompanying drawings wherein:

FIG. 5 illustrates a typical prior art HVAC system design specification;

FIG. 46 illustrates top and bottom views of preferred exemplary Schrader-Copper-T (SCT) fitting useful in some preferred invention embodiments;

FIG. 120 illustrates front top left-side perspective section and front top right-side perspective section views of a preferred exemplary Schrader-Tube-End (STE) fitting useful in some preferred invention embodiments;

FIG. 121 illustrates an assembly view of a preferred exemplary Schrader-Tube-Plug (STP) fitting mated with various refrigerant copper line (RCL) sizes;

FIG. 122 illustrates perspective views of a preferred exemplary Schrader-Tube-Plug (STP) fitting mated with a refrigerant copper line (RCL);

FIG. 123 illustrates perspective section views of a preferred exemplary Schrader-Tube-Plug (STP) fitting mated with a refrigerant copper line (RCL);

FIG. 124 illustrates front and rear views of a preferred exemplary Schrader-Tube-Plug (STP) fitting useful in some preferred invention embodiments;

FIG. 125 illustrates left-side and right-side views of a preferred exemplary Schrader-Tube-Plug (STP) fitting useful in some preferred invention embodiments;

FIG. 126 illustrates and bottom views of a preferred exemplary Schrader-Tube-Plug (STP) fitting useful in some preferred invention embodiments;

Figure 127:
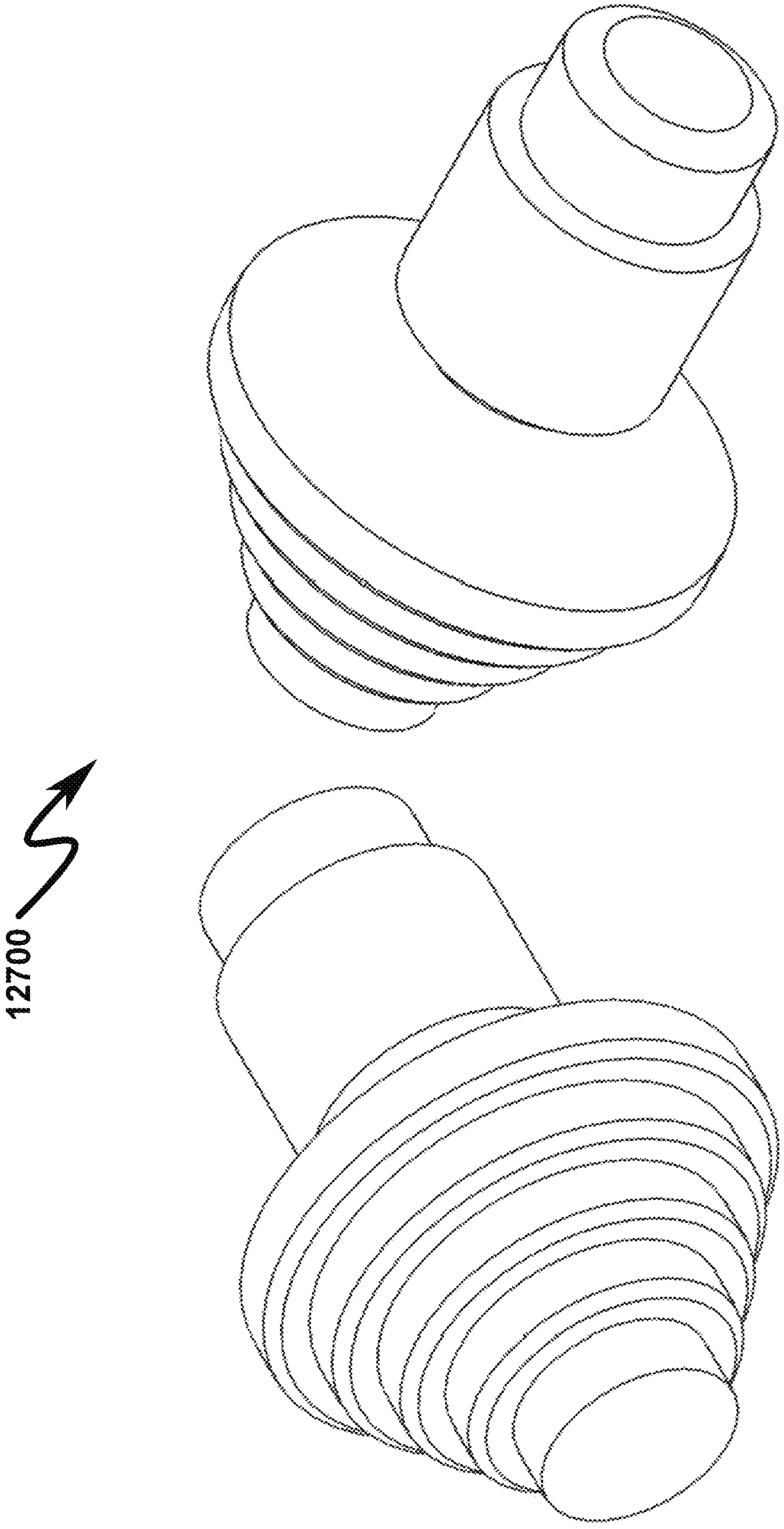
Figure 128:
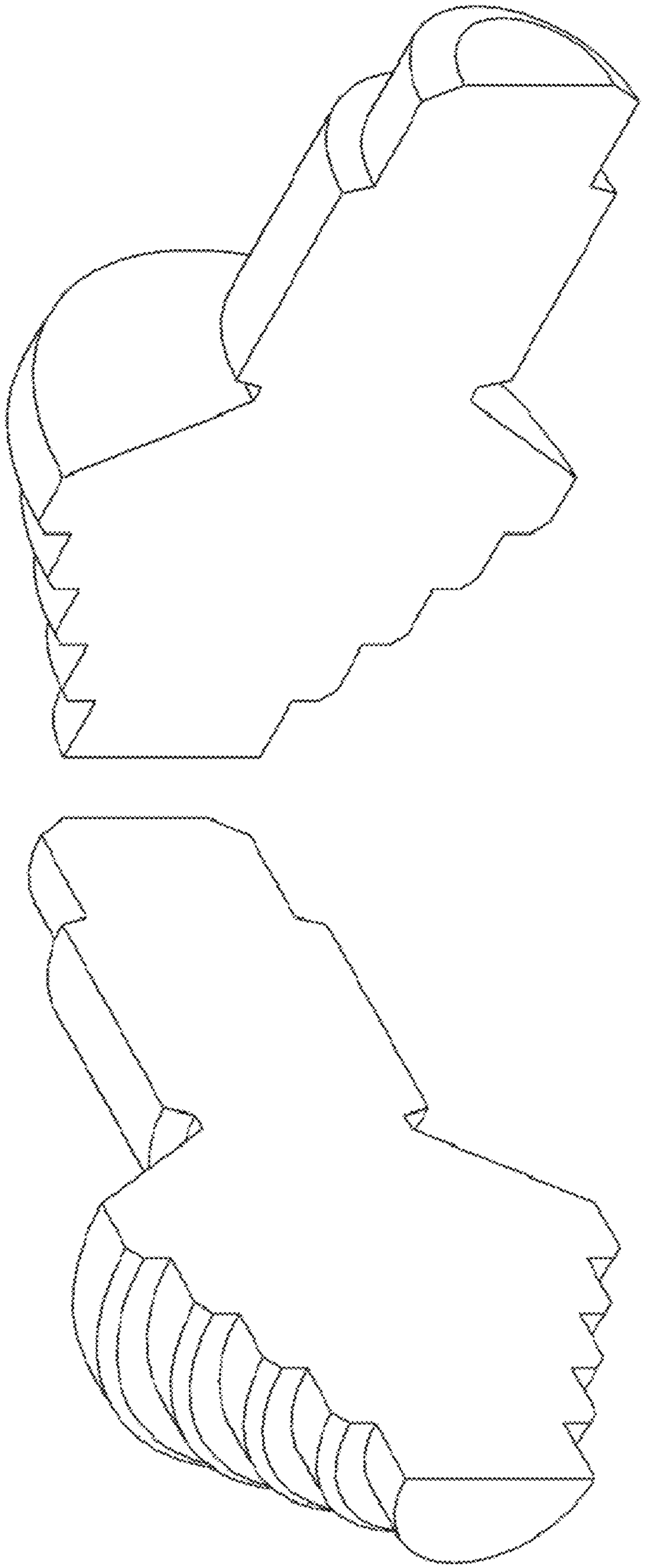

FIG. 127 illustrates front top left-side perspective and front top right-side perspective views of a preferred exemplary Schrader-Tube-Plug (STP) fitting useful in some preferred invention embodiments; and FIG. 128 illustrates front top left-side perspective section and front top right-side perspective section views of a preferred exemplary Schrader-Tube-Plug (STP) fitting useful in some preferred invention embodiments.

DESCRIPTION OF THE PRESENTLY PREFERRED EXEMPLARY EMBODIMENTS

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a SEGMENTED REFRIGERANT LEAK ISOLATION SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Drawings Not to Scale

The drawings presented herein have been scaled in some respects to depict entire system components and their connections in a single page. As a result, the components shown may have relative sizes that differ from that depicted in the exemplary drawings. One skilled in the art will recognize that piping sizes, thread selections, and other component values will be application specific and have no bearing on the scope of the claimed invention.

Ball Valve Assembly (BVA) Depictions Exemplary

The drawings presented herein include depictions of ball valve assemblies (BVA). These BVAs may have many forms known to those skilled in the art. As such, the depictions of BVA within this document represent only a portion of those that may be used within the context of the present invention.

Simplex Schrader Ball Valve (SSV)

The drawings presented herein in some circumstances depict a unitized refrigerant diversion valve (RDV) identified as a simplex Schrader ball valve (SSV) having a first refrigerant port (FRP), a second refrigerant port (SRP), and a Schrader valve port (SVP) in which flow between the FRP, SRP and SVP is controlled by a ball valve assembly (BVA). The FRP, SRP, and SVP are configured within the SSV such that the BVA control flow between the FRP, SRP, and SVP in three to five distinct operational modes as follows:

- [1] A first operational mode in which flow is allowed only between the first refrigerant port (FRP) and the Schrader valve port (SVP).
- [2] A second operational mode in which flow is allowed only between the second refrigerant port (SRP) and the Schrader valve port (SVP).
- [3] A third operational mode in which flow is allowed only between the first refrigerant port (FRP) and the second refrigerant port (SRP).
- [4] A fourth operational mode in which flow is allowed between the first refrigerant port (FRP), the second refrigerant port (SRP), and the Schrader valve port (SVP). This mode may not be present in some preferred embodiments.
- [5] A fifth operational mode in which flow is inhibited between the first refrigerant port (FRP), the second refrigerant port (SRP), and the Schrader valve port (SVP). This mode may not be present in some preferred embodiments.

The SSV operates differently than conventional prior art tri-port ball valves in that the conventional tri-port ball valves having a L-diversion configuration only support modes [1] and [2] above and T-diversion configurations only support modes [1], [2], and [4]. This corollary between the modes listed above and a conventional prior art tri-port valve is only by illustration, as no commercially available tri-port valve is configured with the diversion port configured as a Schrader valve port.

In some preferred embodiments the SSV may be configured to operate only in modes [1], [2], and [3], thus preventing any leakage from the Schrader valve port (SVP) when the SSV is configured for normal HVAC operation in a non-leak-testing refrigerant pass-thru mode. Thus, this specific construction and associated operational modes enables the Schrader valve port (SVP) to be positively sealed by the BVA during pass-thru mode [3], thus preventing any inadvertent refrigerant leakage from the Schrader valve contained within the SVP.

It should be noted that SSV as described above is not contained within the prior art and is not available in the commercial marketplace. However, one skilled in the mechanical arts given the description above will be able to construct such a device. In many preferred embodiments this SSV is constructed by fabricating a metallic casting and machining this casting to include the necessary ball valve, input/output ports, and Schrader valve port. The Schrader valve port typically includes an internally threaded portion for the insertion of a Schrader valve assembly. One skilled in the art will recognize that there are a variety of construction method possible to fabricate a working DSV as described above.

Duplex Schrader Ball Valve (DSV)

The drawings presented herein in some circumstances depict a unitized refrigerant diversion valve (RDV) identified as a duplex Schrader ball valve (DSV) having a first refrigerant port (FRP), a second refrigerant port (SRP), a first Schrader valve port (FSP), and a second Schrader valve port (SSP) in which flow between the FRP/FSP and SRP/SSP is controlled by a ball valve assembly (BVA). The FRP and SRP are configured within the DSV such that the BVA controls flow between the FRP, SRP, FSP, and SSP in three to five distinct operational modes as follows:

- [1] A first operational mode in which flow is inhibited between the first refrigerant port (FRP) and the second refrigerant port (SRP) while flow is enabled between the first refrigerant port (FRP) and first Schrader port (FSP), and flow is enabled between the second refrigerant port (SRP) and second Schrader port (SSP).
- [2] A second operational mode in which flow is allowed between the first refrigerant port (FRP), the second refrigerant port (SRP), the first Schrader port (FSP), and the second Schrader port (SSP).
- [3] A third operational mode in which flow is allowed between the first refrigerant port (FRP), the second refrigerant port (SRP), and the Schrader valve port (SVP). This mode may not be present in some preferred embodiments.
- [4] A fourth operational mode in which flow is 0 allowed only between the first refrigerant port (FRP) and the second refrigerant port (SRP).

A DSV configured to operate only in modes [1] and [2] may be constructed using a ball valve assembly (BVA), first three-port T-coupling (FTC), and second three-port T-coupling (STC) as follows:

The FTC comprises a first output port (FOP), a first input port (FIP), and a first Schrader port valve (FPV).

The STC comprises a second output port (SOP), a second input port (SIP), and a second Schrader port valve (SPV).

The BVA input port (BIP) is coupled to the FOP.

The BVA output port (BOP) is coupled to the SIP.

The FIP corresponds to the DSV FRP.

The SOP corresponds to the DSV SRP.

The FPV corresponds to the DSV FSP.

The SPV corresponds to the DSV SSP.

In this configuration, the FIP allows flow to the FSP and the SOP allows flow to the SSP at all times. However, the BVA in this configuration may be used to isolate the FIP from the SOP and thus provide refrigerant pressure isolation across the BVA. In this manner each side of the BVA may be pressure tested independently to isolate a refrigerant leak to a specific component in the HVAC system.

It should be noted that DSV as described above is not contained within the prior art and is not available in the commercial marketplace. However, one skilled in the mechanical arts given the description above will be able to construct such a device. In many preferred embodiments this DSV is constructed by fabricating a metallic casting and machining this casting to include the necessary ball valve, input/output ports, and Schrader valve ports. The Schrader valve ports typically include an internally threaded portion for the insertion of a Schrader valve assembly. One skilled in the art will recognize that there are a variety of construction method possible to fabricate a working DSV as described above.

Flare Fitting Dimensions

While the present invention anticipates that a wide variety of flare fittings may be utilized in implementing the present invention embodiments, many preferred embodiments utilize standard flare fittings corresponding to the SAE standard J512 (revised April 1997) and SAE standard J513 (stabilized June 2025). As an aid in manufacturing the present invention, the following table presents various dimensions associated with standardized flare fittings utilized in the HVAC industry.

| Inch size | Dash Size | Thread Size | Male Thread OD | Female Thread OD |
|---|---|---|---|---|
| 1/8 (0.125) | 2 | 5/16-24 | 5/16 (0.31) | 9/32 (0.27) |
| 3/16 (0.188) | 3 | 3/8-24 | 3/8 (0.38) | 11/32 (0.34) |
| 1/4 (0.250) | 4 | 7/16-20 | 7/16 (0.44) | 13/32 (0.39) |
| 5/16 (0.313) | 5 | 1/2-20 | 1/2 (0.50) | 15/32 (0.45) |
| 3/8 (0.375) | 6 | 5/8-18 | 5/8 (0.63) | 9/16 (0.57) |
| 1/2 (0.500) | 8 | 3/4-16 | 3/4 (0.75) | 11/16 (0.69) |
| 5/8 (0.625) | 10 | 7/8-14 | 7/8 (0.88) | 13/16 (0.81) |
| 3/4 (0.750) | 12 | 17/16-14 | 17/16 (1.06) | 1 (0.99) |
| 7/8 | 14 | 5/4-12 | 5/4 | 37/32 |

-continued

| Inch size | Dash Size | Thread Size | Male Thread OD | Female Thread OD |
|---|---|---|---|---|
| (0.875) | | | (1.25) | (1.16) |
| 1 (1.000) | 16 | 11/8-12 | 11/8 (1.38) | 41/32 (1.29) |

Flare Fittings May Vary in Size

The present invention is designed to operate with a wide variety of flare fittings commonly used in HVAC systems. Within the drawings depicted herein, the flare fittings may be depicted as having a uniform size for a given CUT when in fact the CUT may utilize different input and output flare fitting sizes. For clarity in the presentation of the present invention, a single size flare fitting has been used in the drawings. One skilled in the art will recognize that the flare fitting size may be adjusted as needed based on the application context of the present invention.

Schrader Valve Specifications

The present invention incorporates Schrader ports that are threaded for Schrader valve assemblies to allow sealing of the various isolated CUTs within HVAC system. While a wide variety of Schrader valve configurations are known in the industry, the present invention anticipates that the following Schrader valve specifications will be optimal in most HVAC applications:

Identification: A31999

Nominal Size: 14 inch

Length: 7/8 inch

Material: nickel-plated brass

Seal: PTFE barrel gasket and neoprene cup washer

Operating pressure: 0 to 800 PSIG

Continuous Operating temperature: −20° F. (−28° C.) to 220° F. (104° C.)

Medium opening pressure: 40 PSI after 10 cycles

Installation torque: 3 to 5 in/lbs required to engage positive stop feature

Standards compliance: compatible with ISO Standard 7442, T&R Standard Bore Chamber No. 1, and AHRI (A.R.I.) Standard 720

Threading: 0.206-inch×36 TPI thread typically using a tap drill of a #12 (0.189 inches or 4.80 mm in diameter) drill bit (this size is most commonly used for standard automotive tire valve stems).

Figure 14:
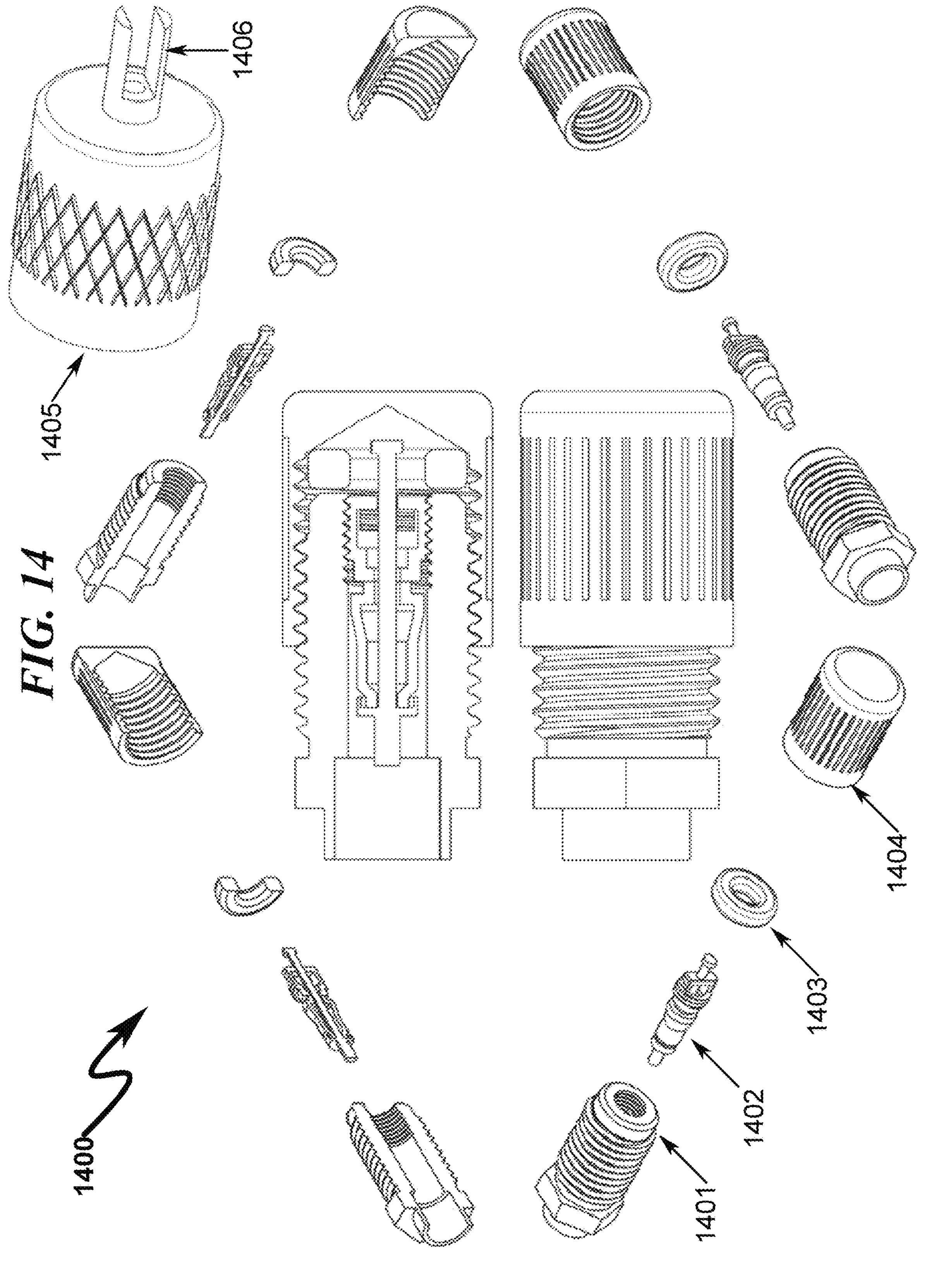
FIG. 14 illustrates perspective and section views of a Schrader port assembly (SPA) useful in many preferred invention embodiments.
Figure 15:
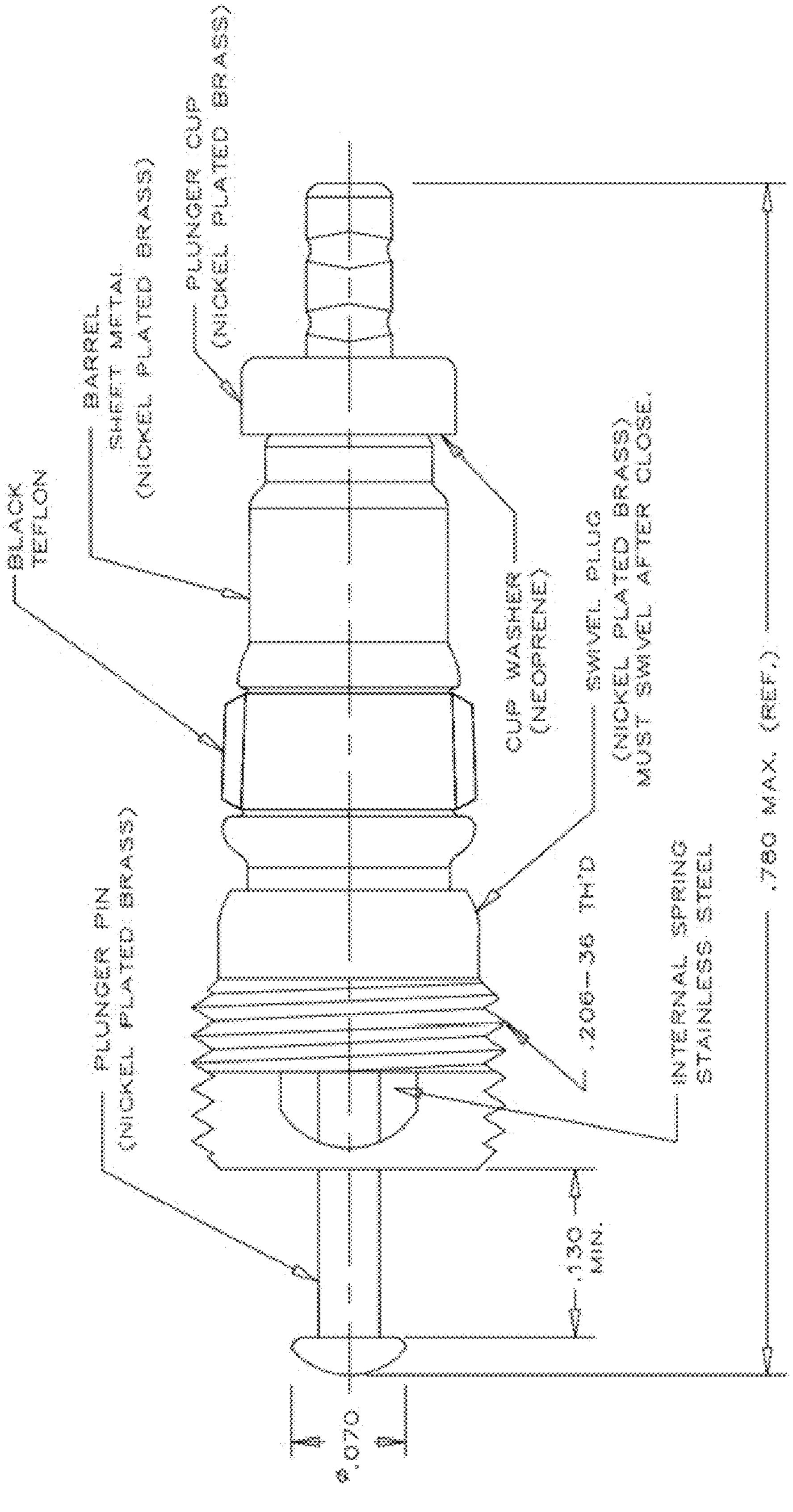
FIG. 15 illustrates a detailed section drawing of a Schrader valve assembly (SVA) useful in many preferred invention embodiments.

A mechanical drawing depicting a Schrader valve having the above characteristics is depicted in FIG. 14 (1400)-FIG. 15 (1500). One skilled in the art will recognize that a wide variety of Schrader valve configurations are possible. However, the present invention anticipates that this mechanical configuration will be optimal in most HVAC application contexts.

Drawings Generally Omit Schrader Port Valves

The drawings presented herein depict a variety of Schrader port fittings (SPF). For clarity of presentation, the Schrader port valves (SPV) that screw into these SPF are generally omitted from the drawings. Detailed drawings of the SPV are provided herein for the most commonly used SPV in the HVAC industry and as depicted represent the best mode known at the time of filing of this patent application. One skilled in the art will readily be able to determine from the drawings where SPV should be installed.

Drawings Generally Omit Schrader Port Caps

The drawings presented herein depict a variety of Schrader port fittings (SPF) (FIG. 14 (1400)). In most operational circumstances, these SPF will be fitted with a Schrader port cap (SPC) (FIG. 14 (1400, 1404, 1405)) that includes a sealing O-ring (FIG. 14 (1400, 1403)) to ensure that there is no refrigerant leakage from the Schrader port valve (SPV) (FIG. 14 (1400, 1402)) inserted into the SPV. For clarity of presentation, the SPC are generally omitted from the drawings presented herein. Detailed drawings of a typical SPC are provided herein for the most commonly used SPC in the HVAC industry and as depicted represent the best mode known at the time of filing of this patent application. One skilled in the art will readily be able to determine from the drawings where SPC should be installed.

Refrigerant Recovery Optional

In many scenarios where a HVAC system is leaking refrigerant the refrigerant loss per unit time is small but the overall refrigerant loss in the system over time is large. This may occur with pinhole leaks or leaks that increase in volume when the HVAC system is stressed outside normal operating conditions. In these scenarios the proper procedure is to evacuate and recover the HVAC refrigerant from the system prior to performing leak testing. Since refrigerant recovery is a common practice in the industry, it is not discussed in this document and assumed to be implemented as needed based on the specific invention application context.

However, it should be noted that it is common for HVAC refrigerant leaks to be significant enough in volume that the HVAC system is completely evacuated prior to the arrival of HVAC maintenance personnel. In these scenarios it is not necessary to evacuate and recover the HVAC refrigerant, as the refrigerant loop is completely devoid of refrigerant. It is noteworthy that these scenarios are particularly difficult to diagnose and troubleshoot using prior art leak detection methodologies as solid-state refrigerant leak detectors cannot be used in this case because there is no refrigerant being emitted from the HVAC refrigerant lines and the requirement to charge the system with refrigerant in order to detect the leak would in fact waste refrigerant and pose a hazard if the refrigerant is flammable. In these scenarios the prior art was typically reduced to hit-or-miss HVAC component replacement in an attempt to isolate the failing/leaking HVAC component.

In contrast, the present invention allows an evacuated HVAC system to be isolated to discrete sections and then individually tested to determine if there is a refrigerant leak. This testing can occur after initial installation of the HVAC system and/or while the HVAC system is being installed to ensure that each individual HVAC system component is leak-proof. This incremental HVAC system installation method allows HVAC system components that are defective on initial installation to be quickly identified and the leak remedied so as to prevent a scenario in which a very complex HVAC system having thousands of feet of refrigerant line and dozens of HVAC components to be found leaking and in need of repair after initial installation.

Pressure Testing Methodology

Figure 13:
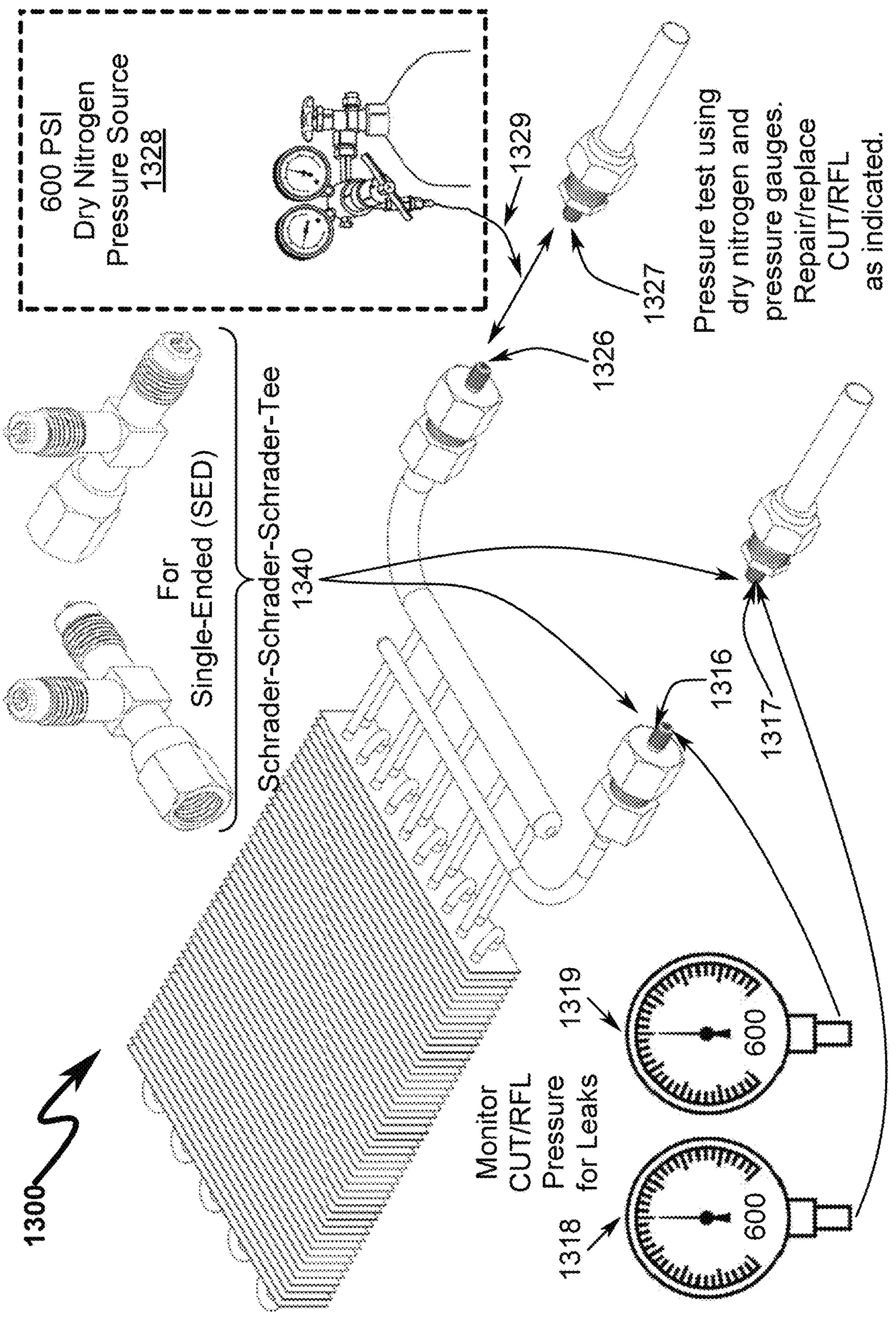
FIG. 13 illustrates a physical application of FIG. 9 depicting a HVAC evaporator coil component under test (CUT) separated from associated refrigerant lines (RFL) and depicting installation of flare fittings on the CUT and RFL with the flare fittings capped with male and female Schrader port fittings (SPF) that are connected to refrigerant pressure gauges (RPG) and a dry nitrogen source (DNS) to perform leak testing on the CUT and RFL.

The present invention incorporates pressure testing to determine whether a HVAC component under test (CUT) leaks refrigerant. Within this context, the present invention anticipates that the methodology to perform this pressure testing will incorporate a dry inert gas (DIG) at high pressure to accomplish this testing. The present invention anticipates that a dry nitrogen source (DNS) will be the optimal DIG used in this situation as it is available in 120 cubic-foot to 330 cubic-foot capacity cylinders having a nominal working pressure of 1500 PSI to 3000 PSI or higher. Within the context the present invention, pressure testing at a nominal pressure of 600 PSI requires the use of any industry-standard pressure regulator on the gas cylinder. FIG. 13 (1300) generally depicts a typical DNS configuration (1328) useful in these leak testing scenarios.

The use of dry nitrogen gas (DNG) within the context of pressure testing with the present invention ensures that no moisture is introduced into the HVAC refrigeration loop, thus reducing the possibility of contamination of the refrigeration loop during refrigerant leak testing. Once pressure testing is completed, the HVAC refrigerant loop may be evacuated using an industry-standard vacuum pump to remove both the dry nitrogen gas (DNG) from the refrigerant loop as well as any residual moisture contained within the refrigeration loop.

Zoning the VRF System

Within the context of the present invention, the segmentation and isolation of particular portions of the HVAC system may be referred to as ZONING THE VRF SYSTEM. This includes sometimes adding Schrader ports to the outdoor condenser upstream of the service valves, which is termed the FIRST ZONE.

The service valves on the condenser may be front seated, and they may also have Schrader valves that allow pressure testing the copper line sets. This is the SECOND ZONE.

The THIRD ZONE consists of all the indoor evaporator coils.

When pressure testing the entire system, it is possible to shut off these valves and monitor each section. By monitoring these sections, it is possible to identify which zone to check for refrigerant leaks, due to drop in pressures in each individual zone.

Exemplary Refrigerant Leak Scenario (0700)-(0800)

Figure 1:
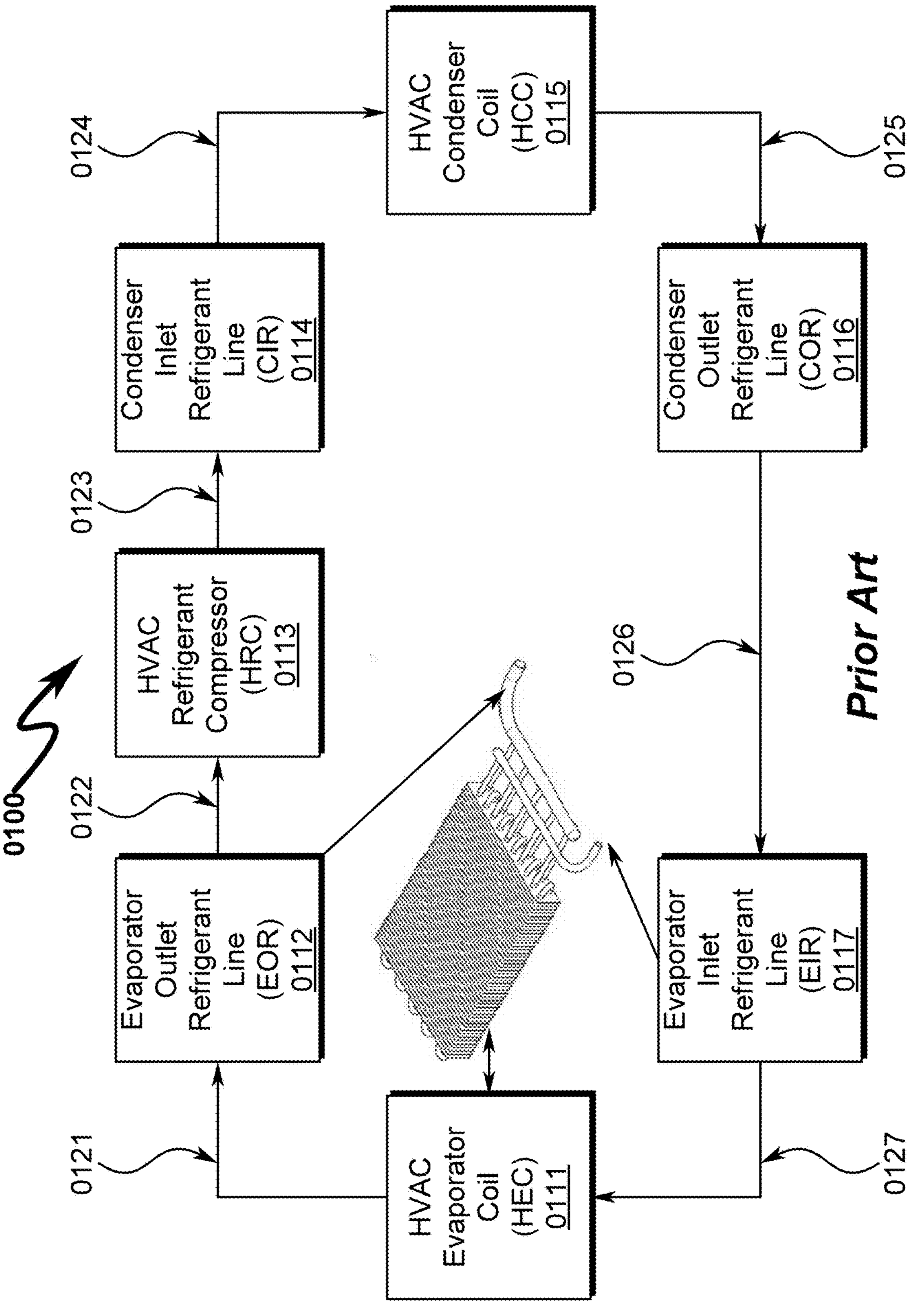
FIG. 1 illustrates a prior art HVAC system depicting major HVAC system components having input/output lines, conventional refrigerant flow, and identifying various CUT within the HVAC system that may fail causing a refrigerant leak.
Figure 2:
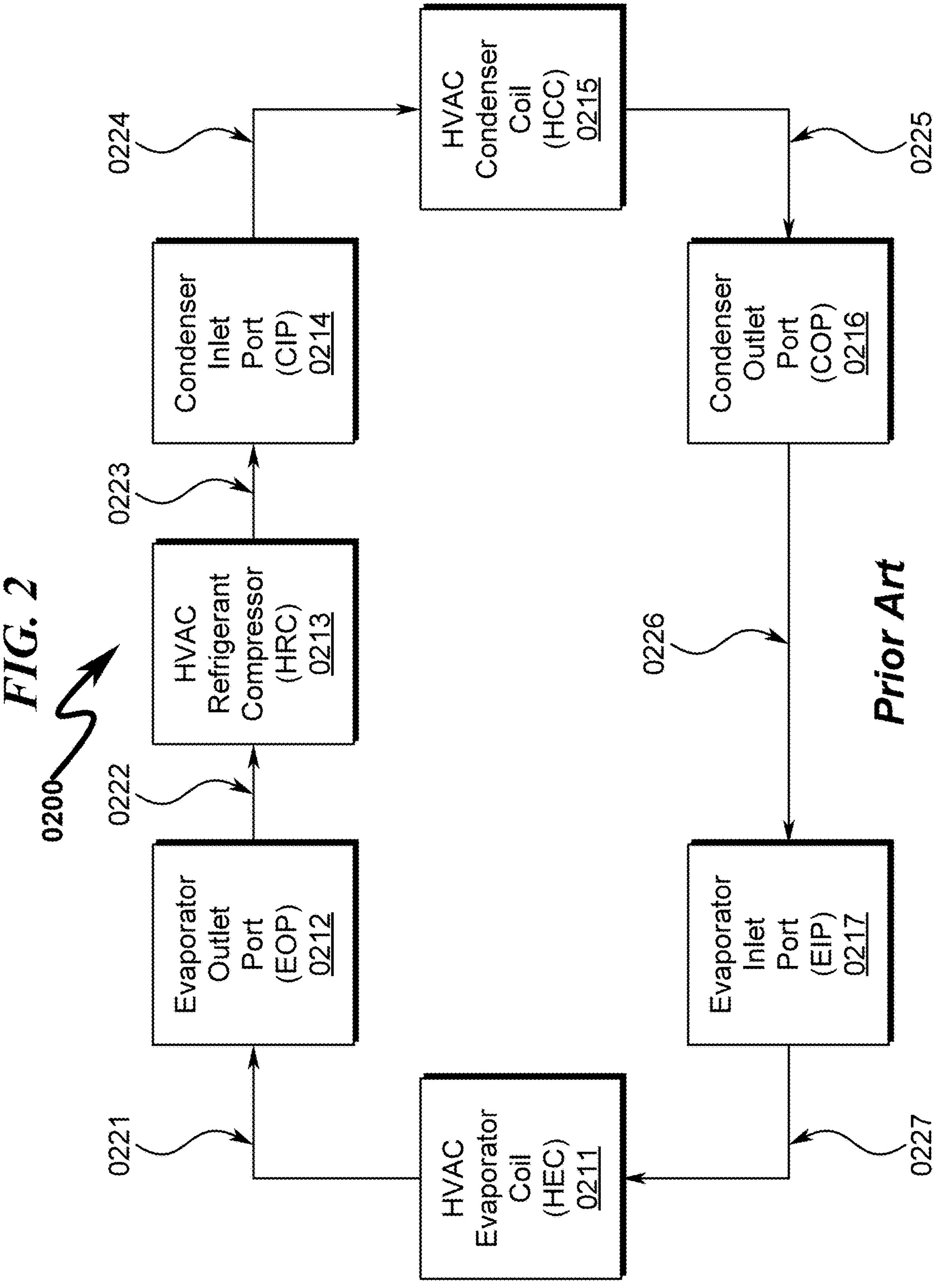
FIG. 2 illustrates a prior art HVAC system depicting major HVAC system components having input/output ports, conventional refrigerant flow, and identifying various CUT within the HVAC system that may fail causing a refrigerant leak.
Figure 3:
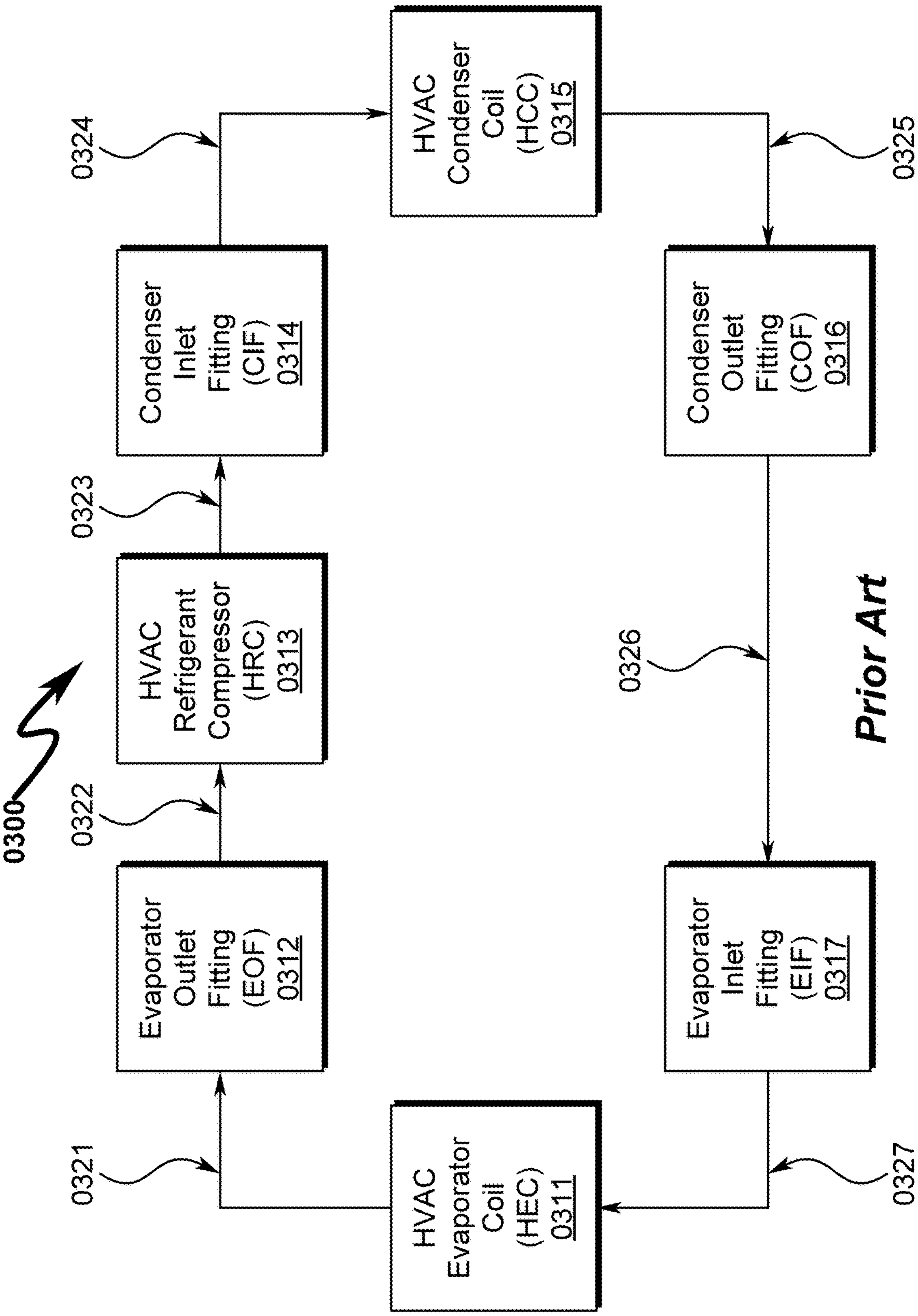
FIG. 3 illustrates a prior art HVAC system depicting major HVAC system components having input/output fittings, conventional refrigerant flow, and identifying various CUT within the HVAC system that may fail causing a refrigerant leak.
Figure 4:
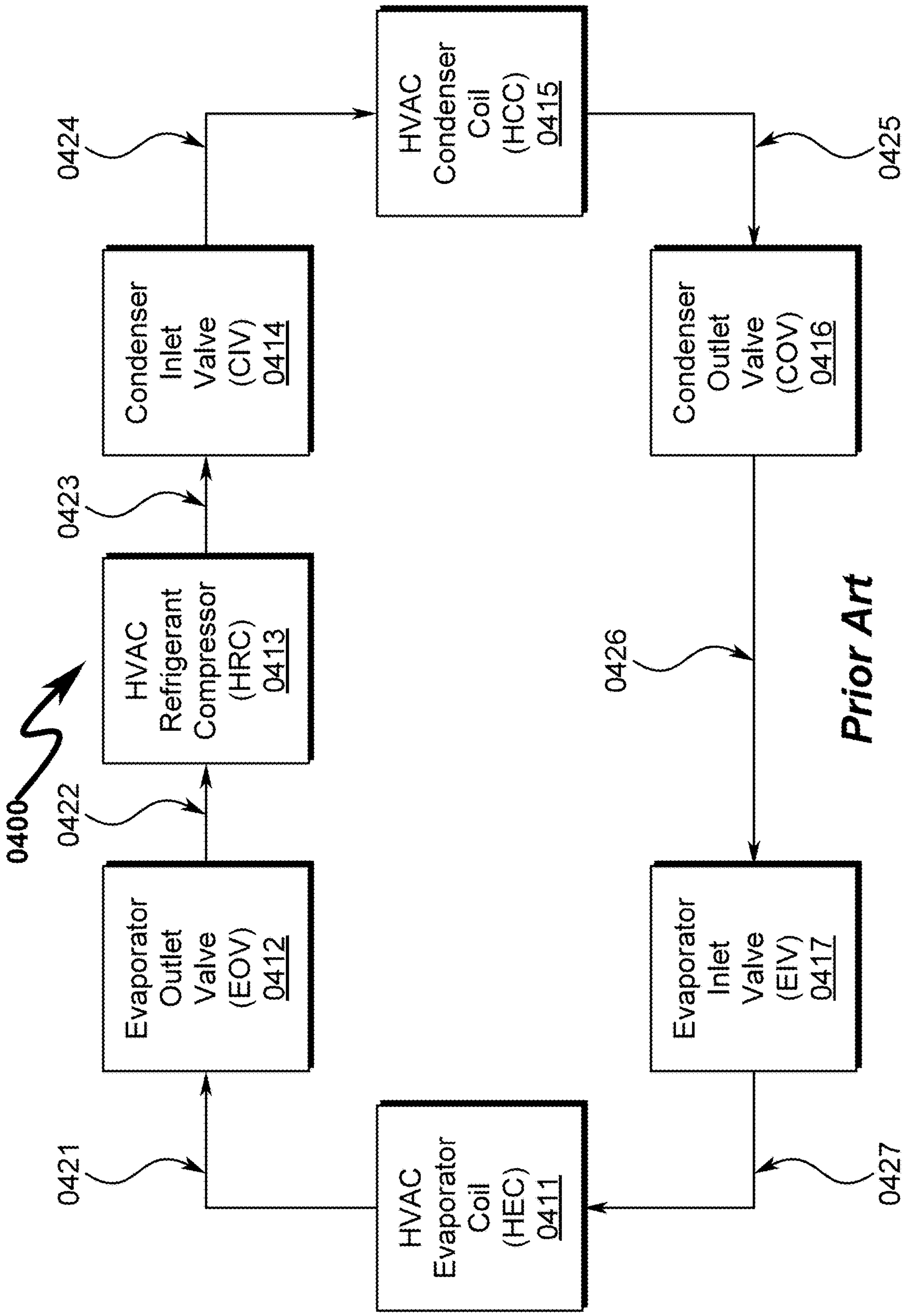
FIG. 4 illustrates a prior art HVAC system depicting major HVAC system components having input/output valves, conventional refrigerant flow, and identifying various CUT within the HVAC system that may fail causing a refrigerant leak.
Figure 6:
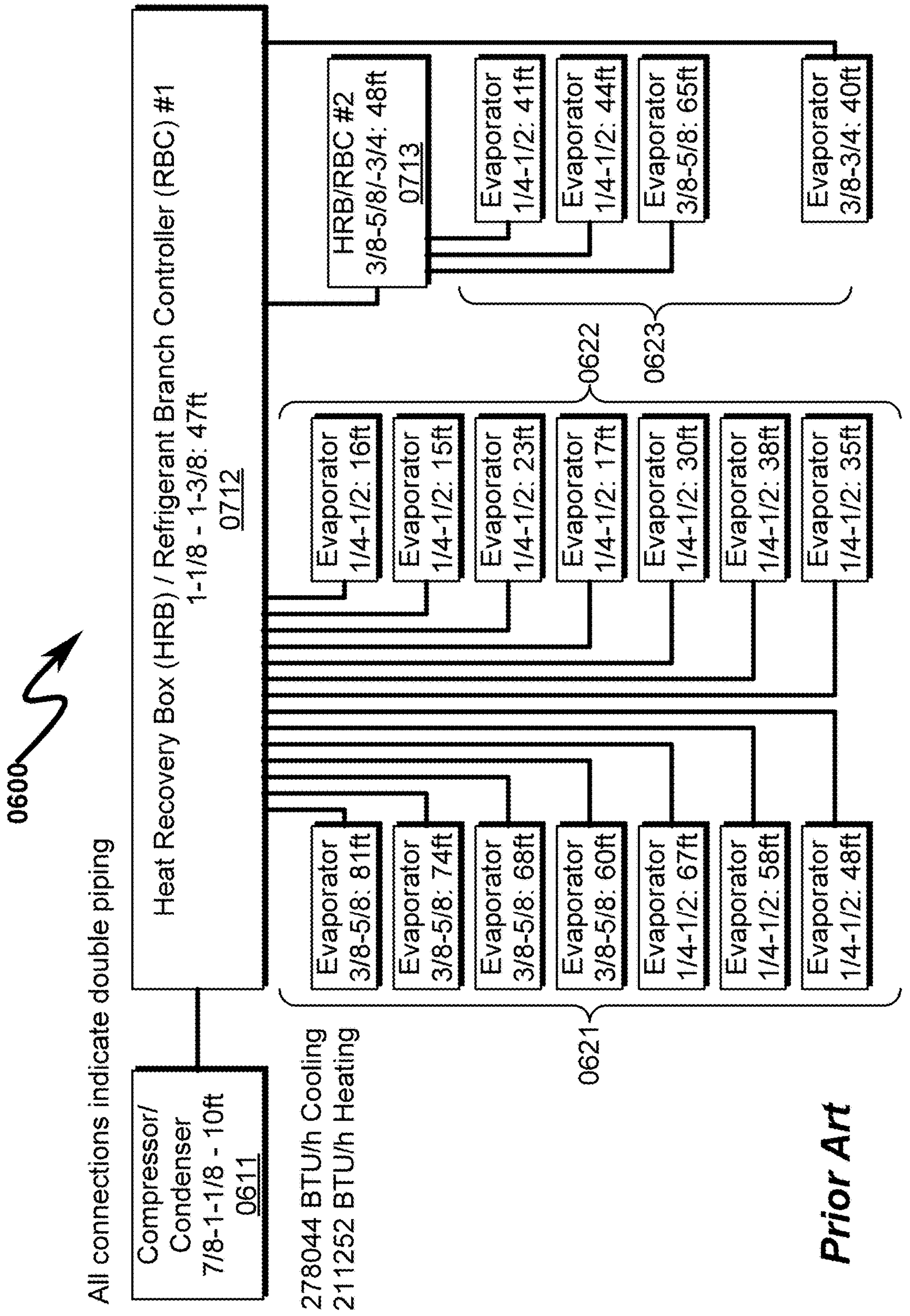
FIG. 6 illustrates a typical prior art HVAC component and plumbing layout associated with the design specification of FIG. 5.

Modern HVAC systems may be functionally depicted graphically as quite simple as generally illustrated in FIG. 1 (0100)-FIG. 4 (0400). However, as illustrated in FIG. 5 (0500)-FIG. 6 (0600), the actual implementation of these systems may be quite complex, involving large numbers of evaporators, condensers, compressors, refrigerant branch controllers (RBC) (also known as heat recovery boxes (HRB) that direct refrigerant flow from one or more condensers to one or more evaporators), as well as potentially thousands of feet of copper pipe that carry refrigerant within the HVAC system.

Figure 7:
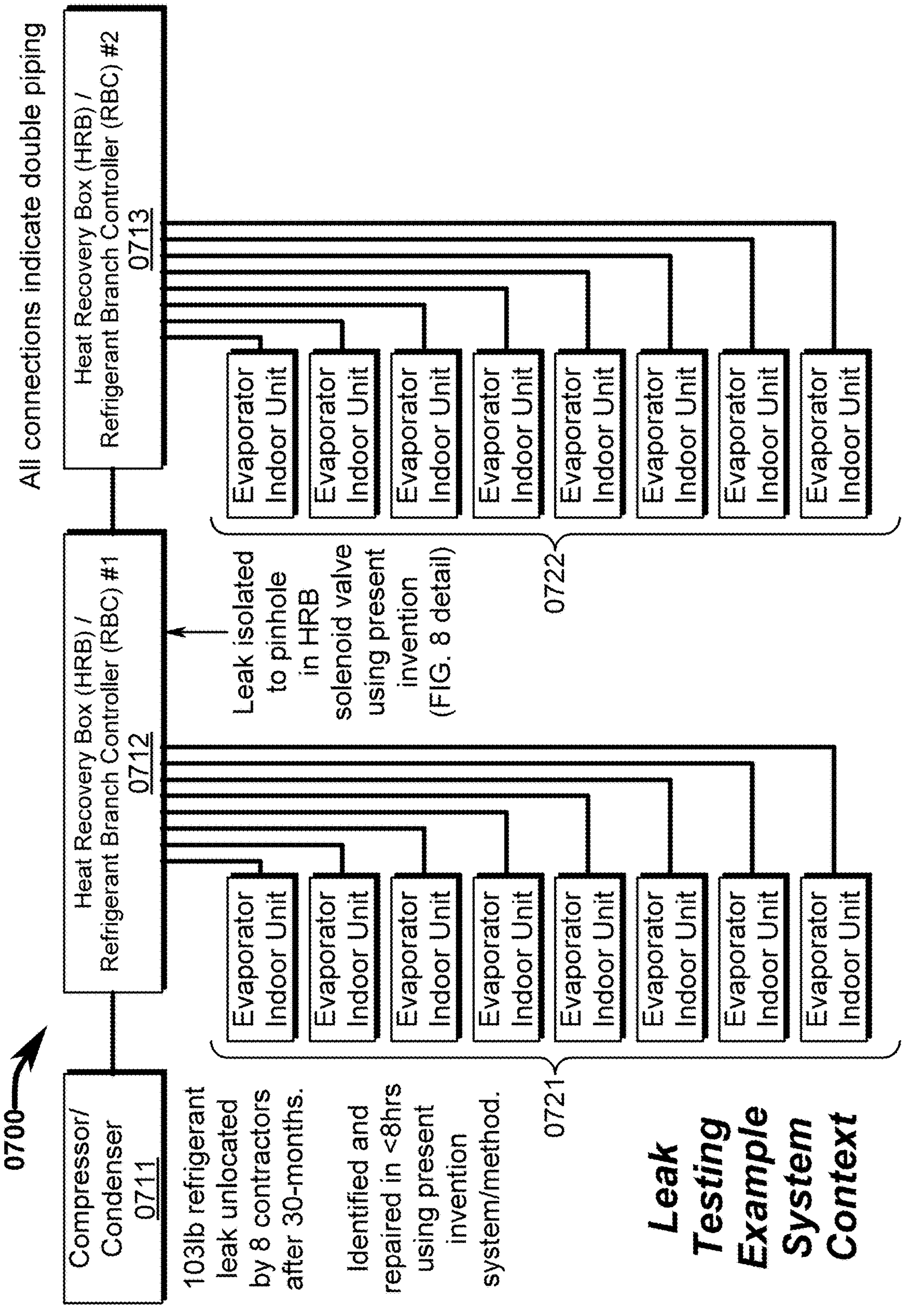
FIG. 7 illustrates an actual HVAC customer system configuration experiencing a refrigerant leak in which eight (8) HVAC contractors were unable to isolate the refrigerant leak over the course of 30 months and which the present invention was applied to correct the refrigerant leak in less than 4 hours.
Figure 8:
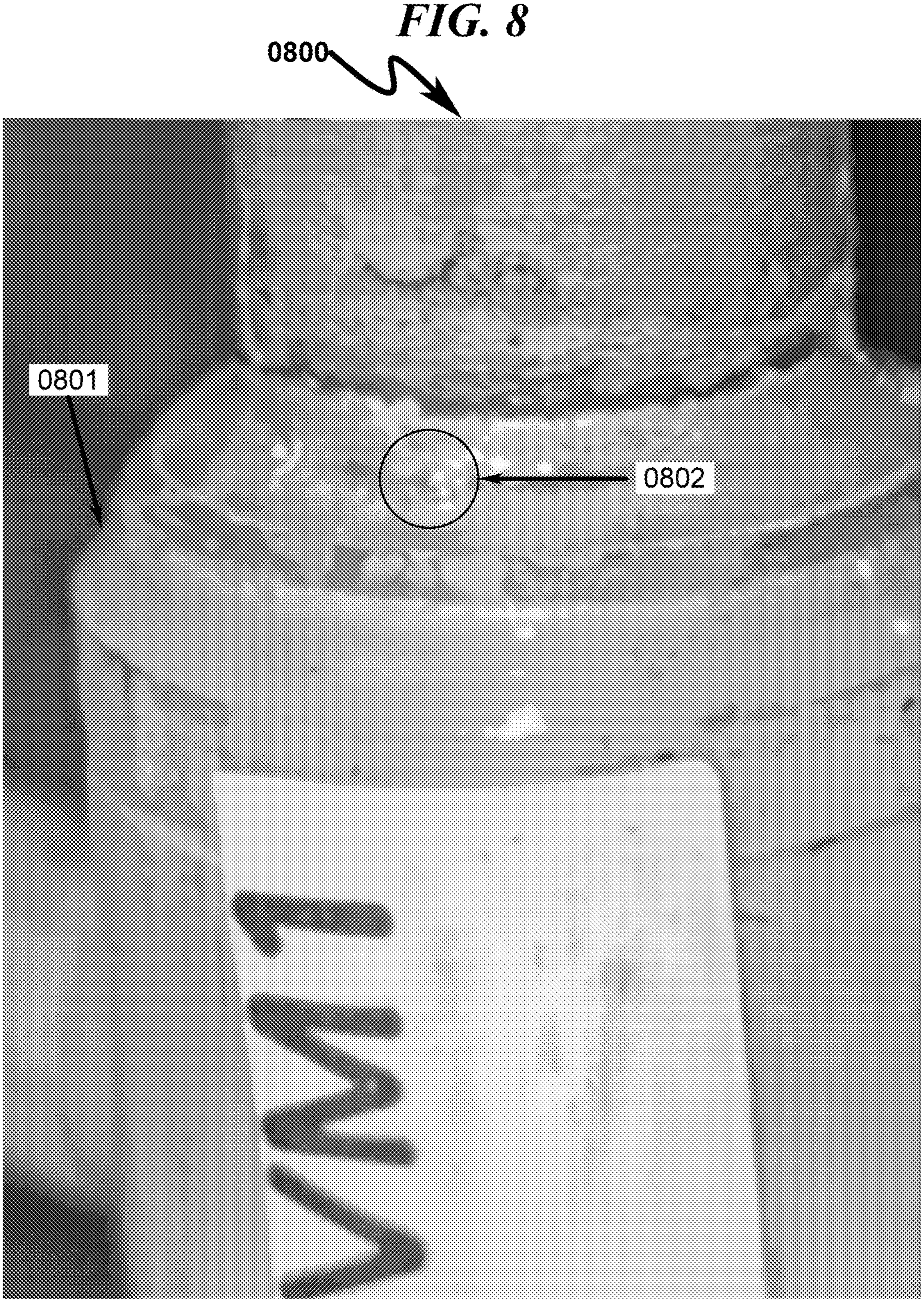
FIG. 8 illustrates a HRB refrigerant pinhole leak associated with the HVAC configuration of FIG. 7.

As an example of a complex HVAC system configuration in which a refrigerant leak is known to be present, the following actual refrigerant leak scenario depicted in FIG. 7 (0700)-FIG. 8 (0800) is a good example of a practical application of the present invention. In this actual repair scenario, a customer HVAC system having a known (but unlocated) refrigerant leak in the HVAC system depicted in FIG. 7 (0700) that was leaking for 30 months (2.5 years) was found using the present invention system and method. In this real-life scenario, the customer building maintenance team had previously utilized eight (8) different HVAC contractors in an attempt to isolate and correct the refrigerant leak with no success. Utilizing the present invention system/method of refrigerant leak isolation, the refrigerant leak was identified in under four (4) hours as located to a faulty solenoid valve (having a pinhole leak) contained in heat recovery box (HRB) #1 (also known as a refrigerant branch controller (RBC)) (0712). FIG. 8 (0800) illustrates the leaking HRB component (0801) and identifies the pinhole refrigerant leak (0802). It is noteworthy that this refrigerant leak was not detectable using conventional leak detection strategies, and only after isolating the leak to the HRB was the leak found using conventional bubble testing. The key issue in this and many leak location investigations is isolating the leak to a manageable section of the HVAC system that can then be manually checked for a failing component.

A significant reason that the previous eight (8) contractors were unable to locate the refrigerant leak is the fact that this HVAC system comprises a compressor/condenser unit (0711) two enclosed heat recovery boxes (0712, 0713), 16 indoor air handler units (0721, 0722), and thousands of feet of interconnecting refrigerant line, significantly increasing the overall system complexity and making the isolation of a leak in this context very difficult due to the inability to reduce the scope of testing to an: individual component under test (CUT).

The fact that the pinhole refrigerant leak was located within a heat recovery box (HRB) (0712) further complicates any prior-art testing methodology as these leaks are not pronounced enough to be detectable using conventional UV-phosphorescent refrigerant dye or using conventional solid-state refrigerant gas leak sensors/alarms. In both cases, the refrigerant loss is very small at a given time (but large over time) and generally undetectable using these conventional prior-art detection methods. A detailed depiction of the HRB (0801) pinhole leak (0802) is provided in FIG. 8 (0800) and was verified using fluid bubble testing methodology after it was isolated to the HRB using the present invention system/method. The HRB (0801) pinhole leak (0802) is only perceptible in FIG. 8 (0800) after bubble testing is applied to the leaking HVAC component once the HRB (0801) is determined to be failing.

In this particular example, the HVAC system contained 103 pounds of refrigerant, highlighting the high cost (refrigerant is normally priced at USD$40-USD$130/pound), customer discomfort, environmental harm, and safety risks (refrigerant in this HVAC system was not flammable but nonetheless harmful to humans in large quantities) associated with a long-term refrigerant leak in a typical commercial system of this size. It is important to note that over the 30 months in which this particular HVAC system was leaking refrigerant, the recharge cost ranged from USD$4000-USD$14000, not including the cost of labor associated with the service calls and the customer inconvenience associated with the loss of HVAC climate control during this period. Furthermore, during this time period the occupants of the building were exposed to leaking refrigerant due to the persistent and unlocatable refrigerant leak.

It is significant to note that refrigerant leaks associated with these commercial HVAC systems may occur anywhere in the HVAC system, and as in this case may be pinhole-sized leaks that are not detectable using conventional prior art handheld refrigerant leak detectors having solid-state gas sensor/detectors and/or the use of prior art phosphorescent-impregnated refrigerant oil that will identify a leak using ultraviolet light when injected into the refrigerant lines of the HVAC system. In many of these cases the leak will only occur during HVAC operating conditions that are at the extremes of HVAC operation involving elevated/depressed refrigerant gas pressures and/or elevated/depressed refrigerant gas temperatures and/or elevated/depressed ambient operational temperatures and/or mechanical vibrations within the HVAC system. The fact that all of these conditions may be intermittent in nature makes conventional identification of a refrigerant leak in these systems extremely difficult. The present invention provides the ability to individually stress the HVAC system components under test (CUT) and interconnecting refrigerant copper lines (RCL) so as to isolate and pinpoint refrigerant leaks that would not normally be observable in the HVAC system when operating in nominal (non-stressed) operating conditions.

As mentioned previously in this document, these difficulties can be so great that the entire building structure must be condemned because a refrigerant leak cannot be identified and corrected. The flammable nature of many modern refrigerants dictates this extreme action in scenarios where the refrigerant leak cannot be identified and corrected. It should be noted that all VFR systems must utilize flammable refrigerants starting Jan. 1, 2026, so the presence of a refrigerant leak in late-model HVAC systems presents a particularly dangerous condition in habitable building structures.

Zone-Based Leak Isolation Overview Methodology

As a guide to the leak isolation methodology the following discussion will address steps necessary to isolate and repair leaks in a typical HVAC system. The first step is to conduct a site visit. In this step, an inspection is directed to find any ball valves in the refrigerant lines. If these ball valves are not installed, it will be more challenging to determine where the leak is located, which will also increase labor costs and the time needed to find the leak.

During the site visit, during the summer months inspection of the outdoor fans on the condenser is performed. These fans should be moving quickly. If one fan is rotating slowly while all the other condensers on are running fast, this could indicate a refrigerant leak. At this point, gauges are connected to the refrigerant lines in the HVAC. If a computer and appropriate HVAC operational software is available, it may be possible to make these connections without using gauge sets.

Various HVAC manufacturers have reported issues with some of their pipes cracking inside the condenser. If that is the case, oil will be present underneath the condenser. It is still suggested that the contractor pressure test the entire HVAC system to ensure it holds pressure.

The next step is to check the flare nuts on indoor air handlers, heat recovery boxes, and any other equipment that may be installed, such as another slave heat recovery box.

If the HVAC system is soldered and lacks ball valves or flare nuts, at this time adding ball valves to the system should be proposed to the end-customer. Ball valves are the best system design for pressure testing as they allow a HVAC system to be divided into three zones:

- the first zone is the outdoor condenser;
- the second zone consists of all copper pipes and heat recovery boxes; and
- the third zone includes all evaporator coils.

Next, high-pressure gauges are installed upstream of the service valve on the outdoor condenser using a refrigerant hose with a shutoff valve. If there is no Schrader port upstream of the service valves on the outdoor condenser, two Schrader ports (one on the liquid line and the other on the suction line) are installed so that a high-pressure gauge can be attached the with a refrigerant hose. Two or three high-pressure gauges are then installed on the service valves of the outdoor condenser. This setup allows pressure testing all the copper line sets and heat recovery boxes, after which high-pressure gauges are installed on both the liquid and suction copper line sets on the indoor evaporator coils.

The next step is to pressure test the entire system to 500 to 600 PSI using dry nitrogen gas (DNG). Most large HVAC VRF systems require the use of a 255 $ft^3$ tank filled with dry nitrogen gas (DNG). It may in some cases require two of these tanks on-site to complete HVAC leak testing checks. At this point all high-pressure gauges verified to ensure proper pressure readings for the nitrogen placed into the HVAC system. The valve on the refrigerant hose is then shut off and the service valves are front-seated on the outdoor condenser.

The next step is very important. When inspecting evaporator coils, the ball valve is opened, typically located at the heat recovery box. This ball valve has a Schrader port, and a high-pressure gauge is connected to the Schrader port of the ball valve. Note that sometimes these ball valves are installed incorrectly, so this step should be checked during the initial site visit. The pressure is then monitored to ensure it flows in through one side of the evaporator and out the other side. The high-pressure gauges are then checked to verify this important step, as this indicates there is no restriction, such as a faulty metering device on the evaporator. The shutoff valve is closed on the refrigerant hose and the ball valve connected to the heat recovery box. The evaporator coil is verified to read 600 PSI on both the liquid and suction lines. After that, both valves are closed.

At this point, a visual inspection on all the high-pressure gauges that have been installed is performed after a nominal waiting period of 40 minutes. The outdoor condenser coil gauges are then inspected as well as the high-pressure gauges located on the service valves and copper line sets. The evaporator coil pressure gauges are then checked. If all the high-pressure gauges on the evaporator coils read between 500 and 600 PSI, when the shutoff valve on the refrigerant hose is opened, and if the pressure immediately drops, a leak in the indoor evaporator coil is indicated.

It should be noted that HVAC OEMs have for many years advocated performing leak testing by starting at one end of the HVAC system and working towards the other. This prior art approach involves significant waste of time and cost to the end-customer and typically leaves HVAC contractors guessing where the refrigerant leak is actually located.

To aid in the segmentation and leak isolation methodology described above, the present invention may incorporate a variety of newly developed Schrader port fittings (SPF) as described below.

Schrader Port Adapter With Solder Lock and Schrader Core

Figure 81:
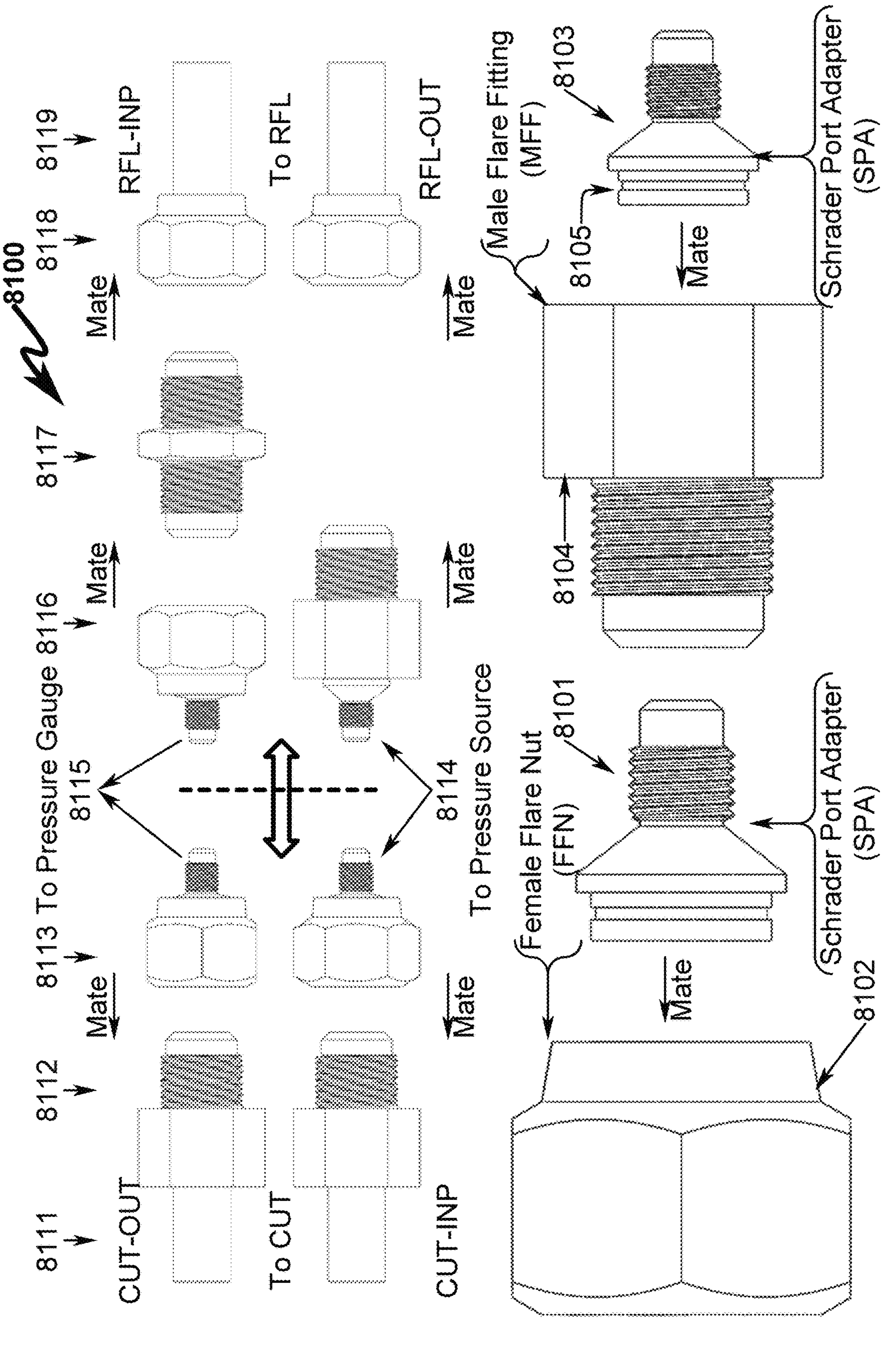
FIG. 81 illustrates an assembly view of a typical HVAC component under test (CUT) and refrigerant line (RFL) segmentation testing configuration utilizing a preferred exemplary Schrader-Port-Adapter (SPA) fitting in conjunction with a female flare nut (FFN) and male flare fitting (MFF) as well as front assembly views of a SPA and FFN and SPA and MFF.

This component allows the contractor to solder the Schrader port adapter into the flare nut, creating a leak-free and stronger connection between the flare nut and the Schrader port adapter. The solder-lock-inset (SLI) is present on both the Schrader port adapter and the flare nut. This is generally depicted in FIG. 81 (8100)-FIG. 88 (8800).

Schrader Port Adapter Without Solder Lock and With Schrader Core

Figure 84:
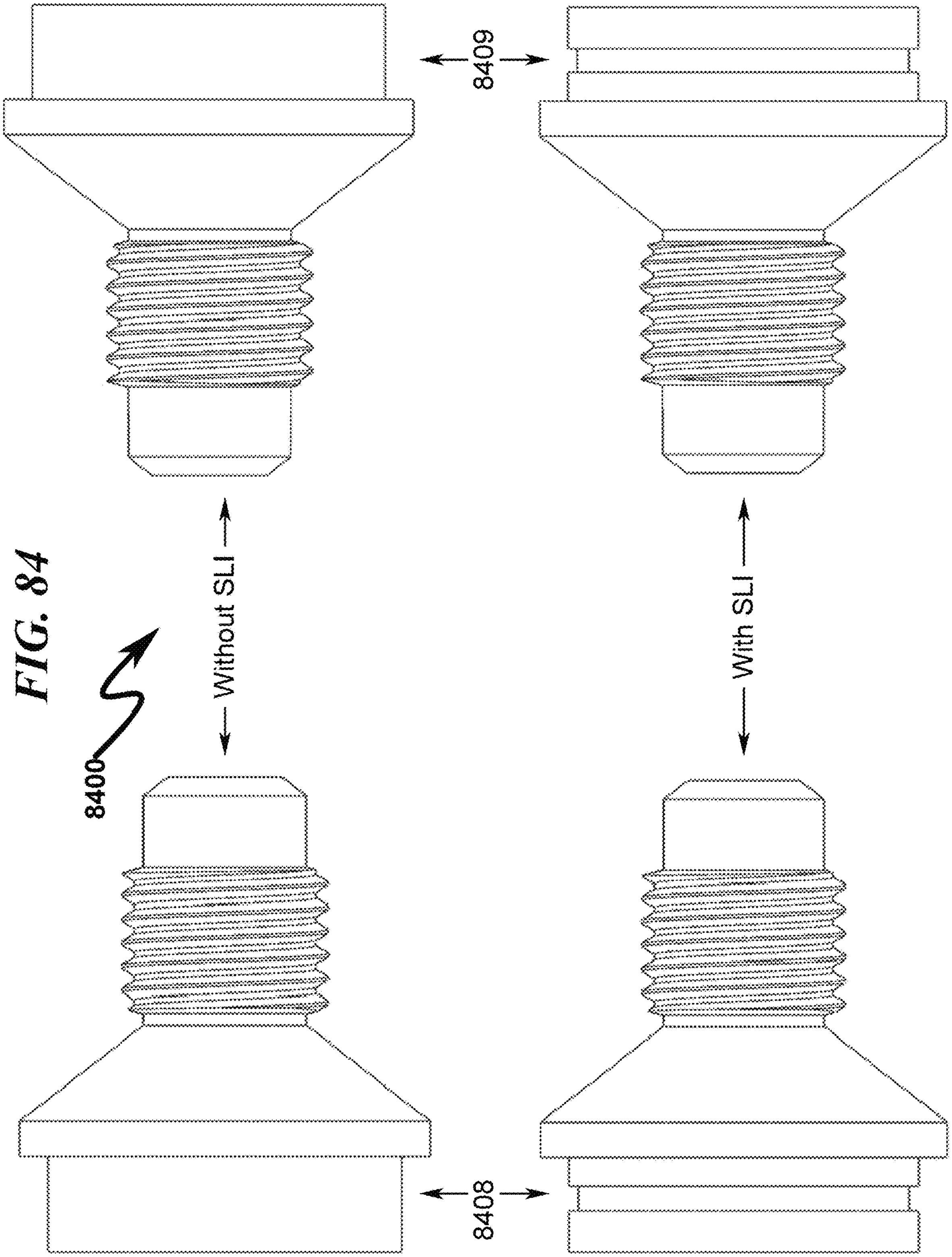
FIG. 84 illustrates front and rear views of preferred exemplary Schrader-Port-Adapter (SPA) fitting with and without a solder-lock-inset (SLI) that is useful in some preferred invention embodiments.
Figure 85:
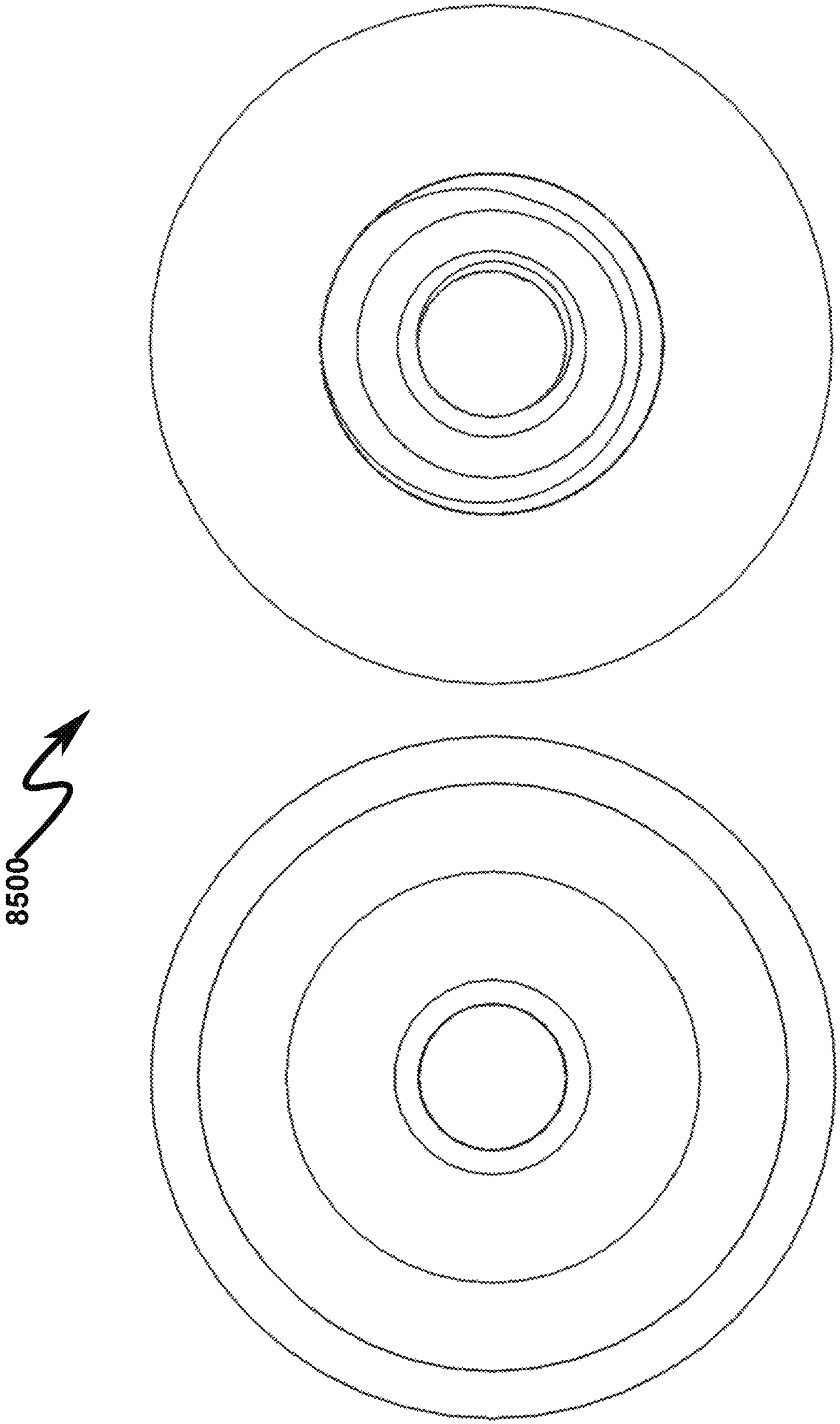
FIG. 85 illustrates left-side and right-side views of a preferred exemplary Schrader-Port-Adapter (SPA) fitting useful in some preferred invention embodiments.
Figure 86:
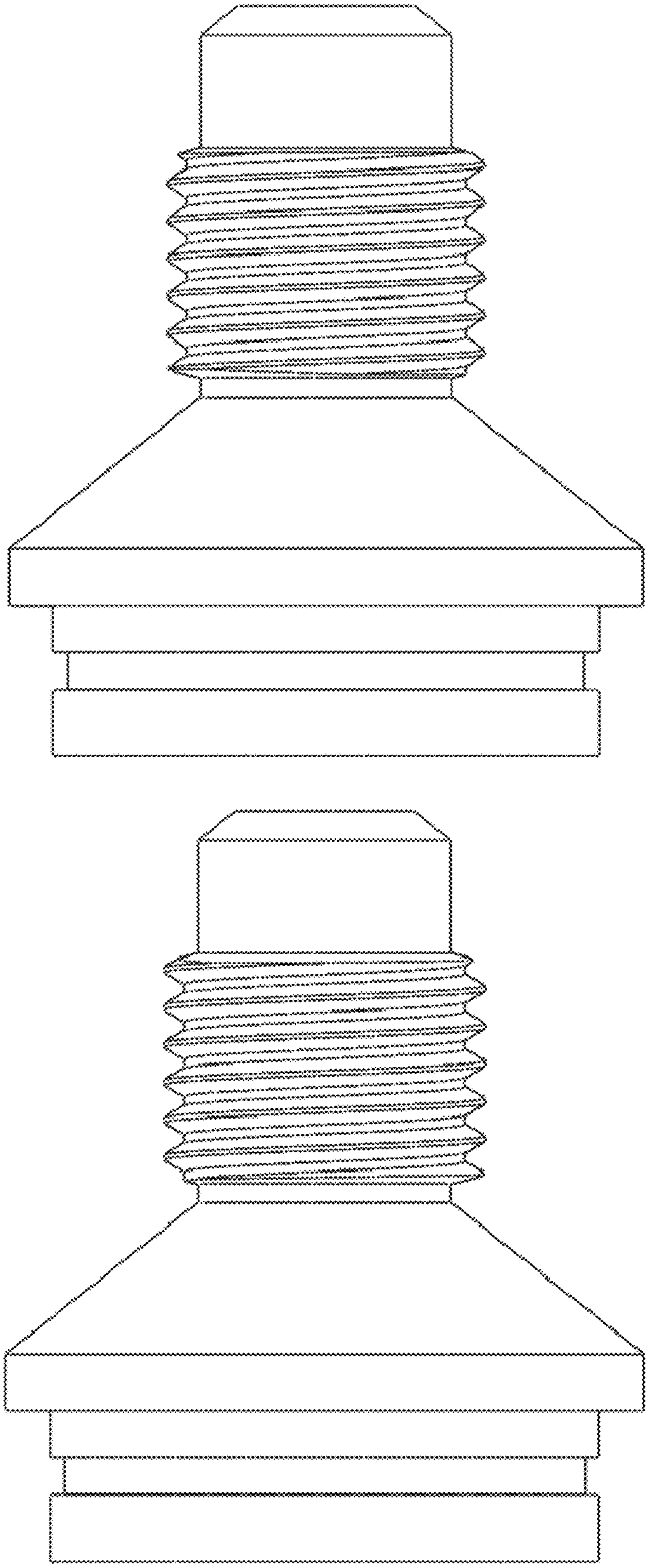
FIG. 86 illustrates top and bottom views of a preferred exemplary Schrader-Port-Adapter (SPA) fitting useful in some preferred invention embodiments.
Figure 87:
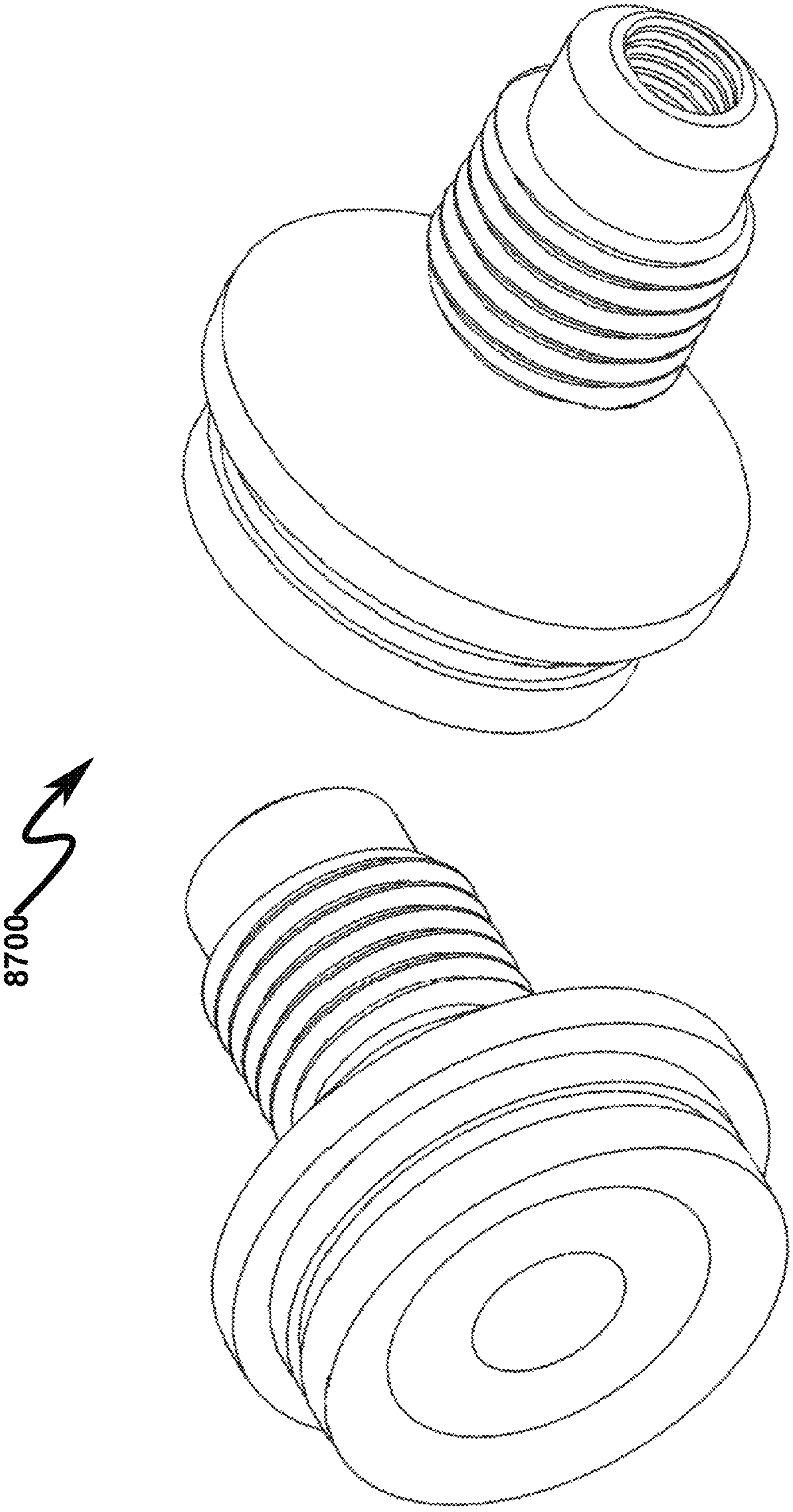
FIG. 87 illustrates front top left-side perspective and front top right-side perspective views of a preferred exemplary Schrader-Port-Adapter (SPA) fitting useful in some preferred invention embodiments.

This adapter sets directly onto the flare nut and is soldered, but it does not have a solder-lock-inset (SLI) that mates with the flare nut. This is generally depicted in FIG. 84 (8400).

Schrader Port Adapter Cap Without Schrader Core

Figure 89:
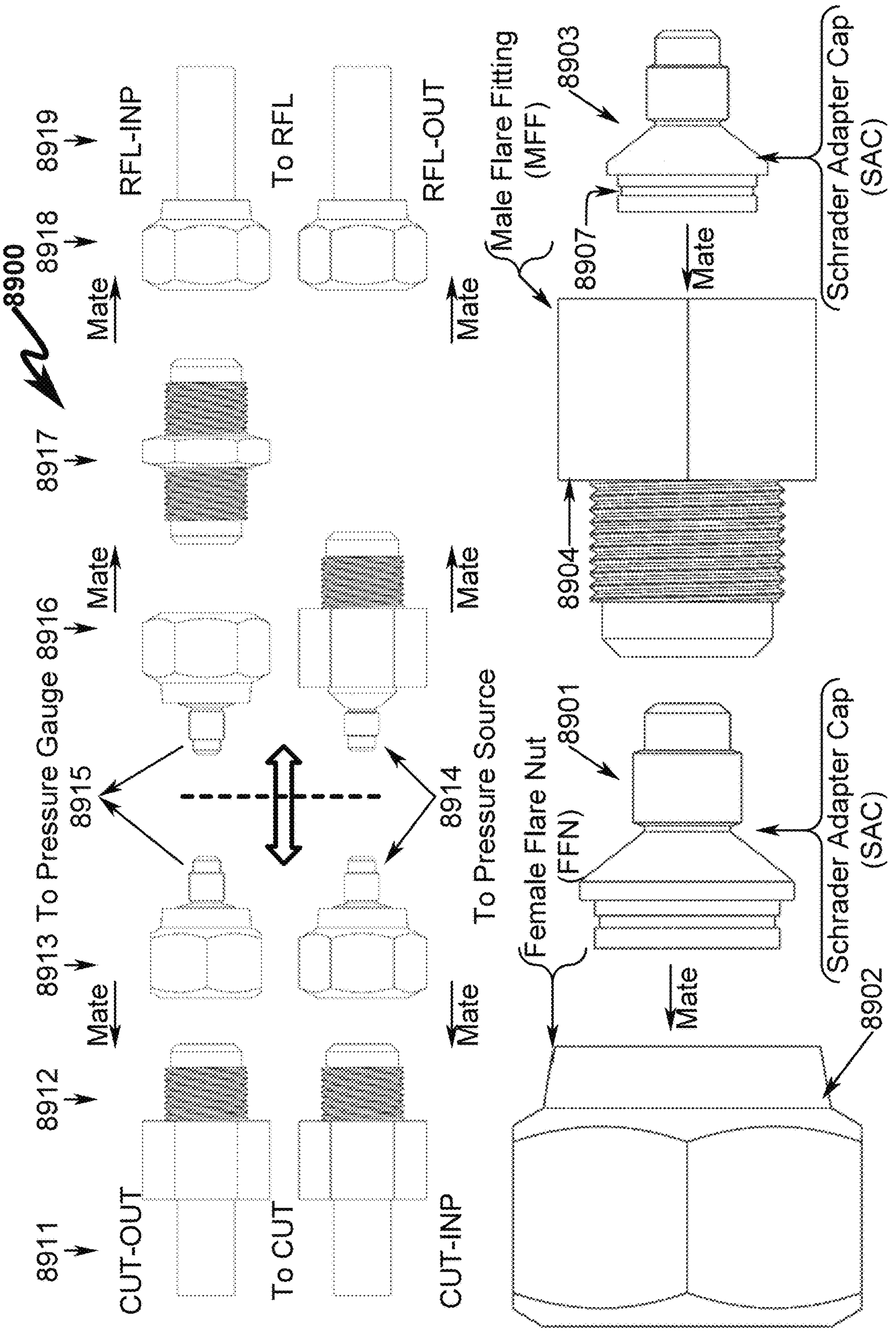
FIG. 89 illustrates an assembly view of a typical HVAC component under test (CUT) and refrigerant line (RFL) segmentation testing configuration utilizing a preferred exemplary Schrader-Adapter-Cap (SAC) fitting in conjunction with a female flare nut (FFN) and male flare fitting (MFF) as well as front assembly views of a SAC and FFN and SAC and MFF.
Figure 90:
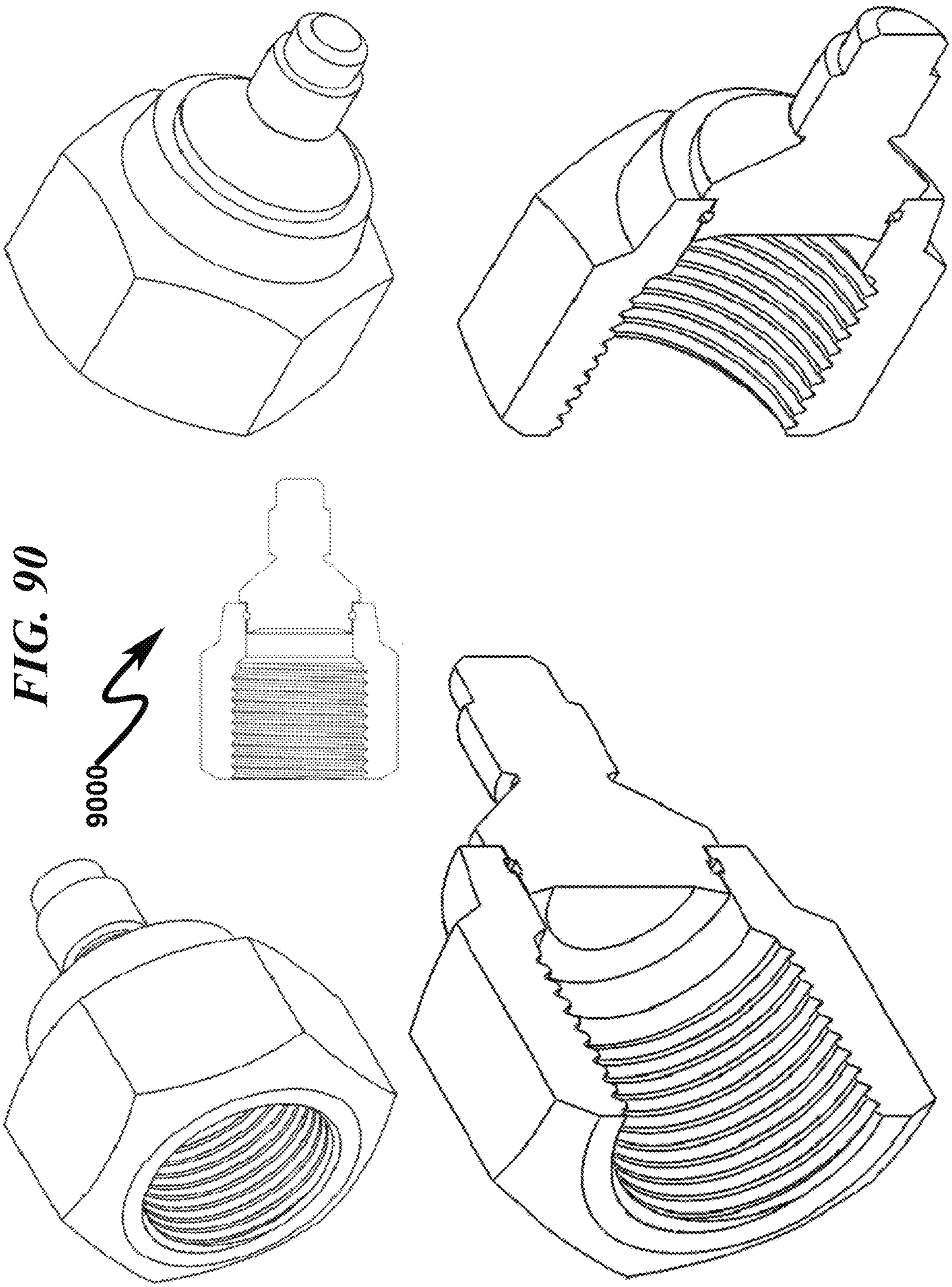
FIG. 90 illustrates perspective and section views of a preferred exemplary Schrader-Adapter-Cap (SAC) and female flare nut (FFN) assembly useful in some invention embodiments.
Figure 91:
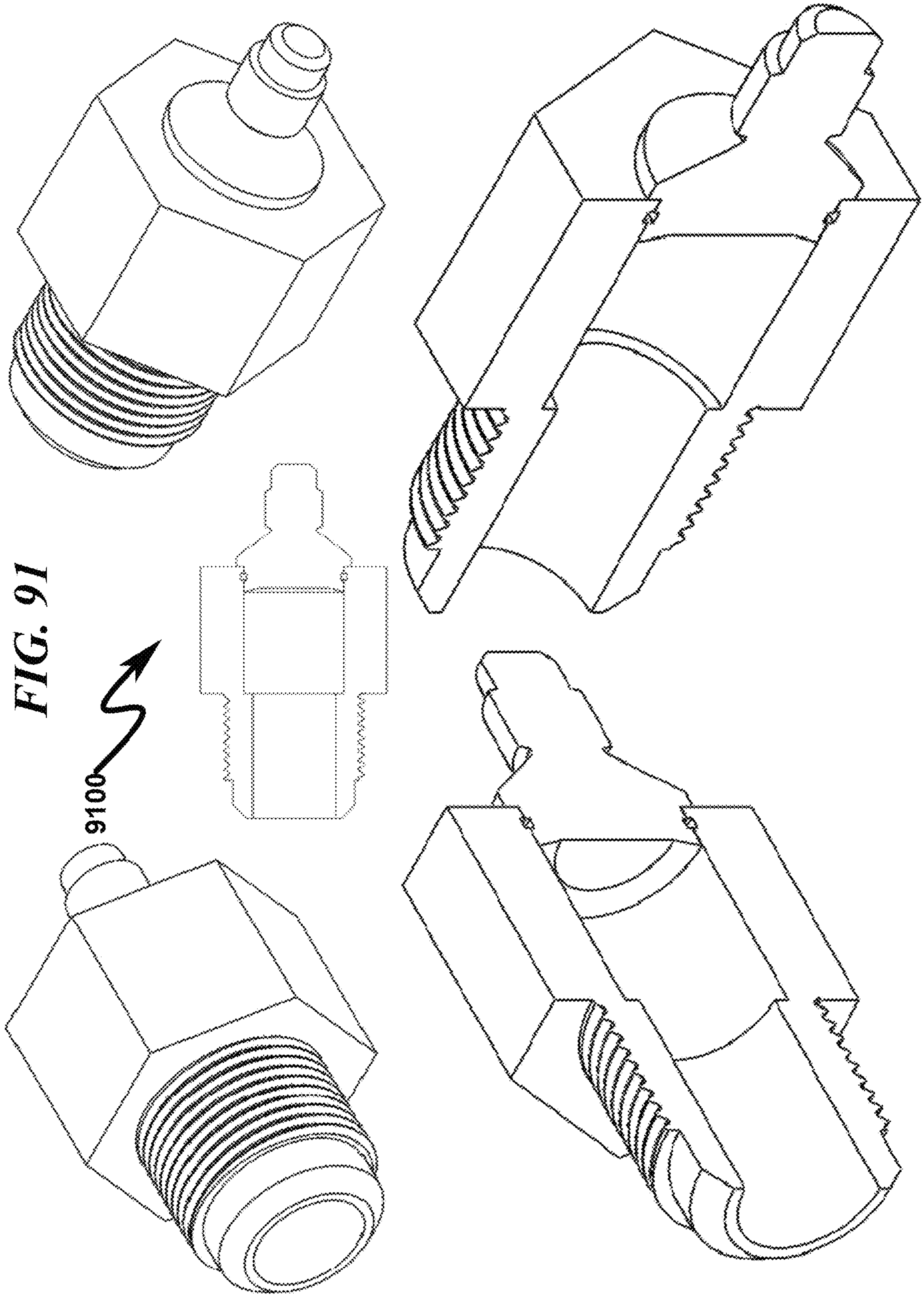
FIG. 91 illustrates perspective and section views of a preferred exemplary Schrader-Adapter-Cap (SAC) and male flare fitting (MFF) assembly useful in some invention embodiments.

This Schrader adapter cap (SAC) does not have a core; it is simply a plug to seal one side of the evaporator coil or multiple sides of the copper line sets. Note that Schrader ports are typically present on the service valves located at the outdoor condenser, but it does not hurt to place a Schrader port adapter in different locations throughout the system, particularly on the copper line sets. This is generally depicted in FIG. 89 (8900)-FIG. 96 (9600).

Schrader Port Insert With Schrader Core Solderless

Figure 97:
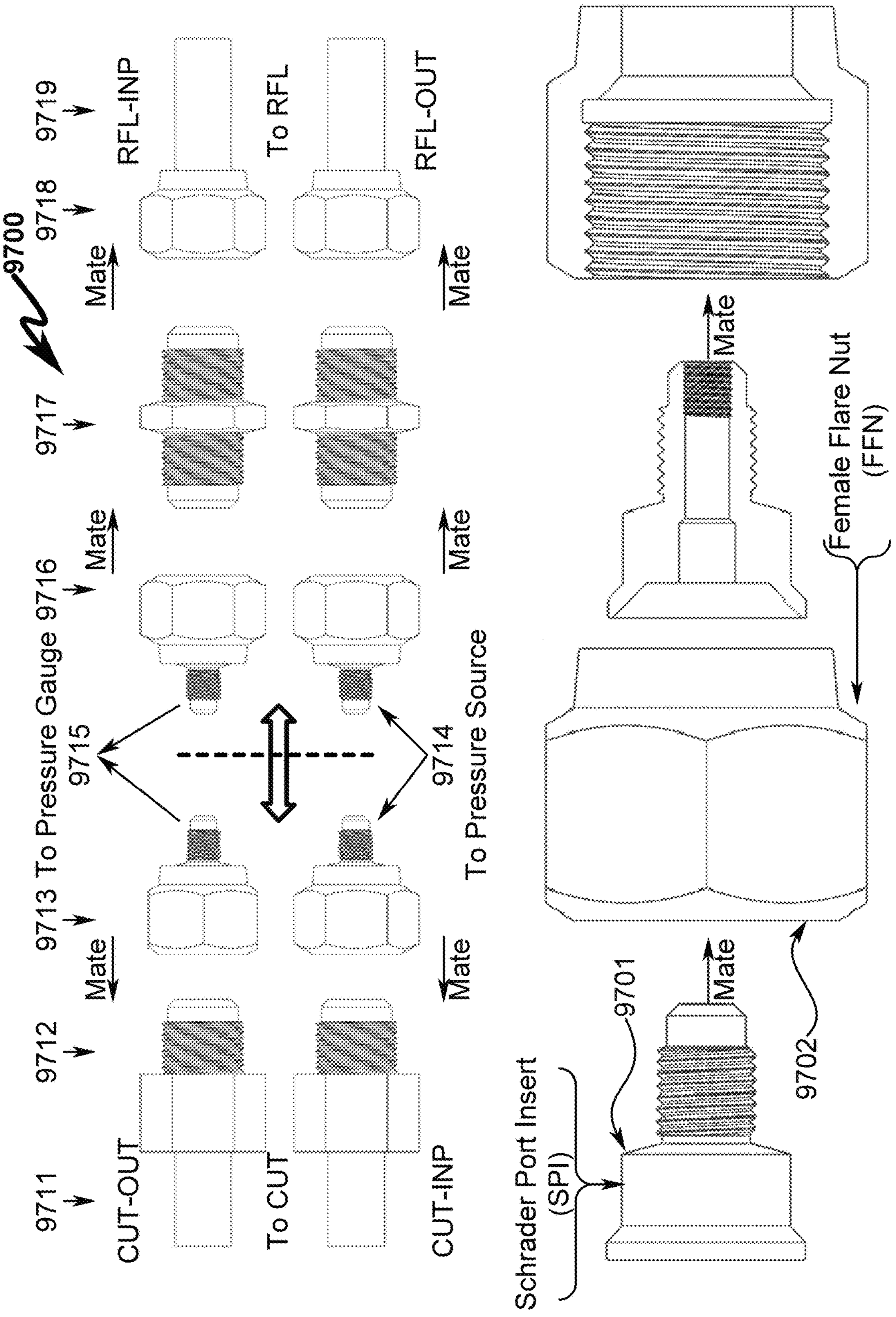
FIG. 97 illustrates an assembly view of a typical HVAC component under test (CUT) and refrigerant line (RFL) segmentation testing configuration utilizing a preferred exemplary Schrader-Port-Insert (SPI) fitting and female flare nut (FFN) as well as front assembly and section views of a SPI and FFN.
Figure 98:
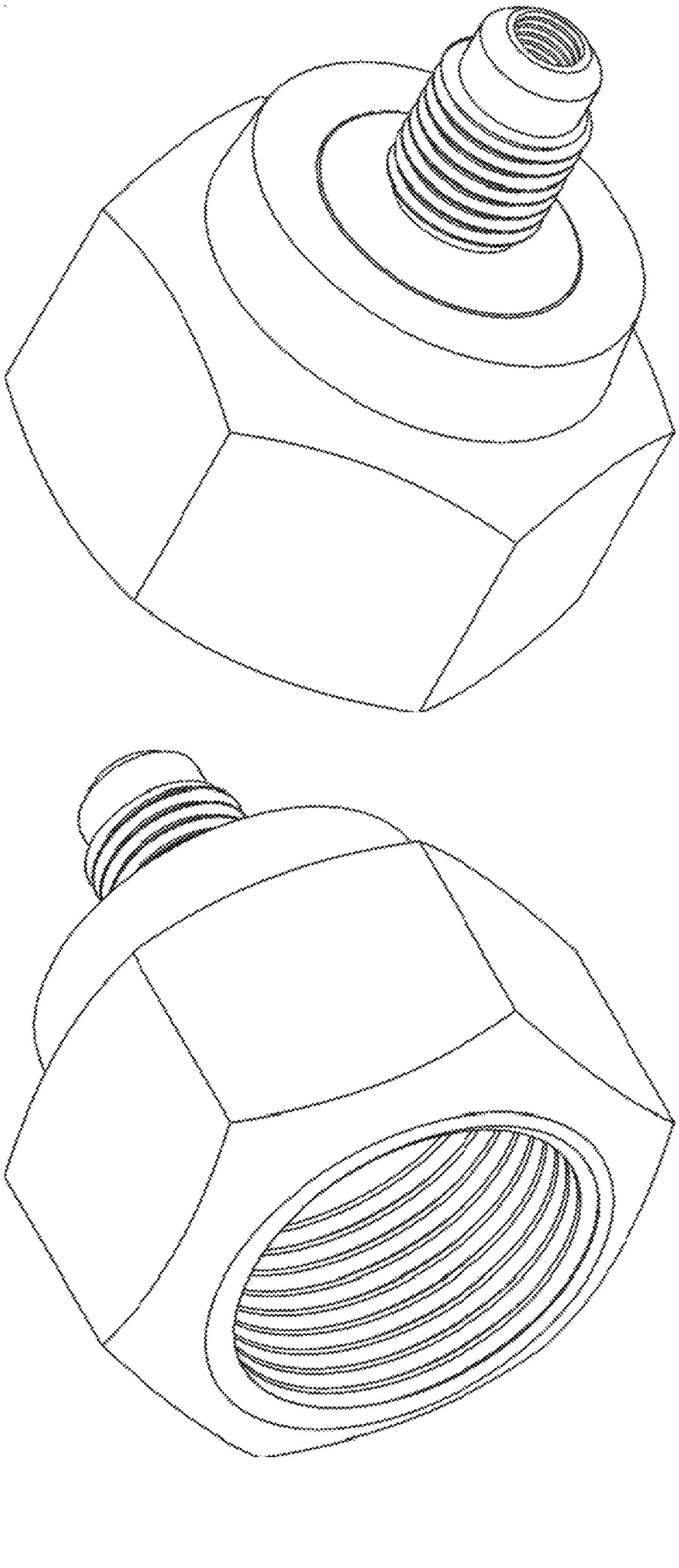
FIG. 98 illustrates perspective views of a preferred exemplary Schrader-Port-Insert (SPI) fitting and female flare nut (FFN) assembly.
Figure 99:
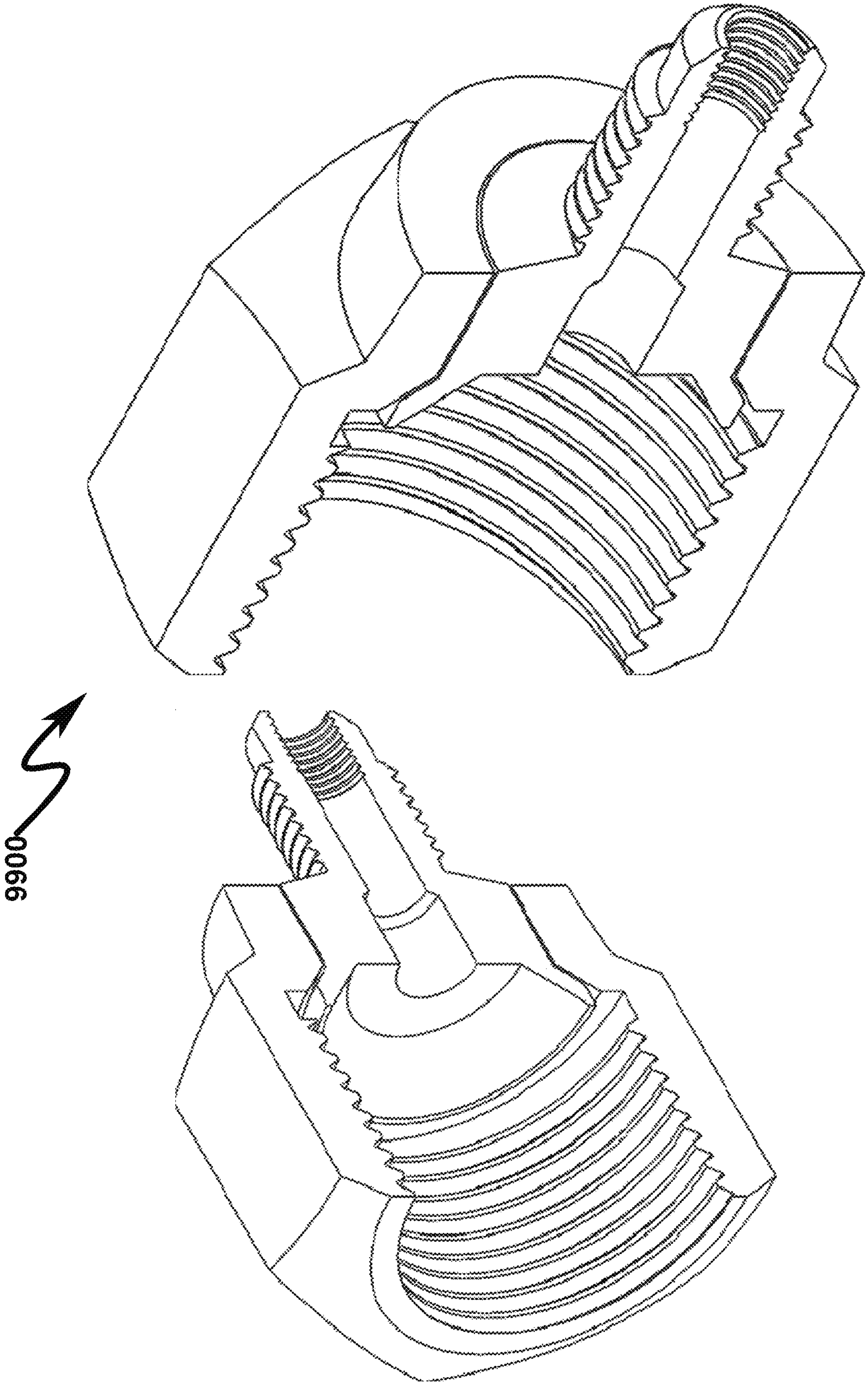
FIG. 99 illustrates perspective section views of a preferred exemplary Schrader-Port-Insert (SPI) fitting and female flare nut (FFN) assembly.
Figure 100:
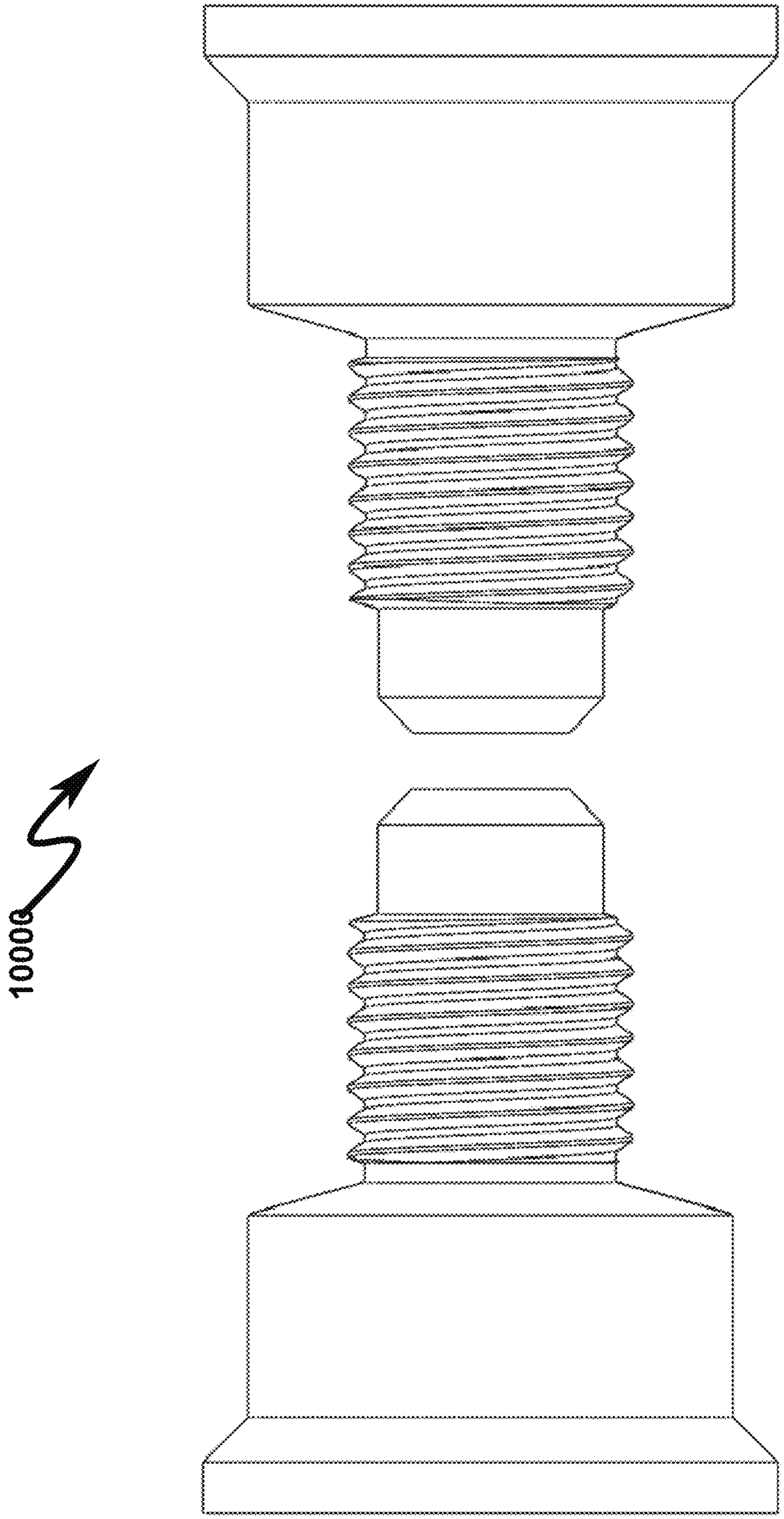
FIG. 100 illustrates front and rear views of a preferred exemplary Schrader-Port-Insert (SPI) fitting useful in some preferred invention embodiments.
Figure 101:
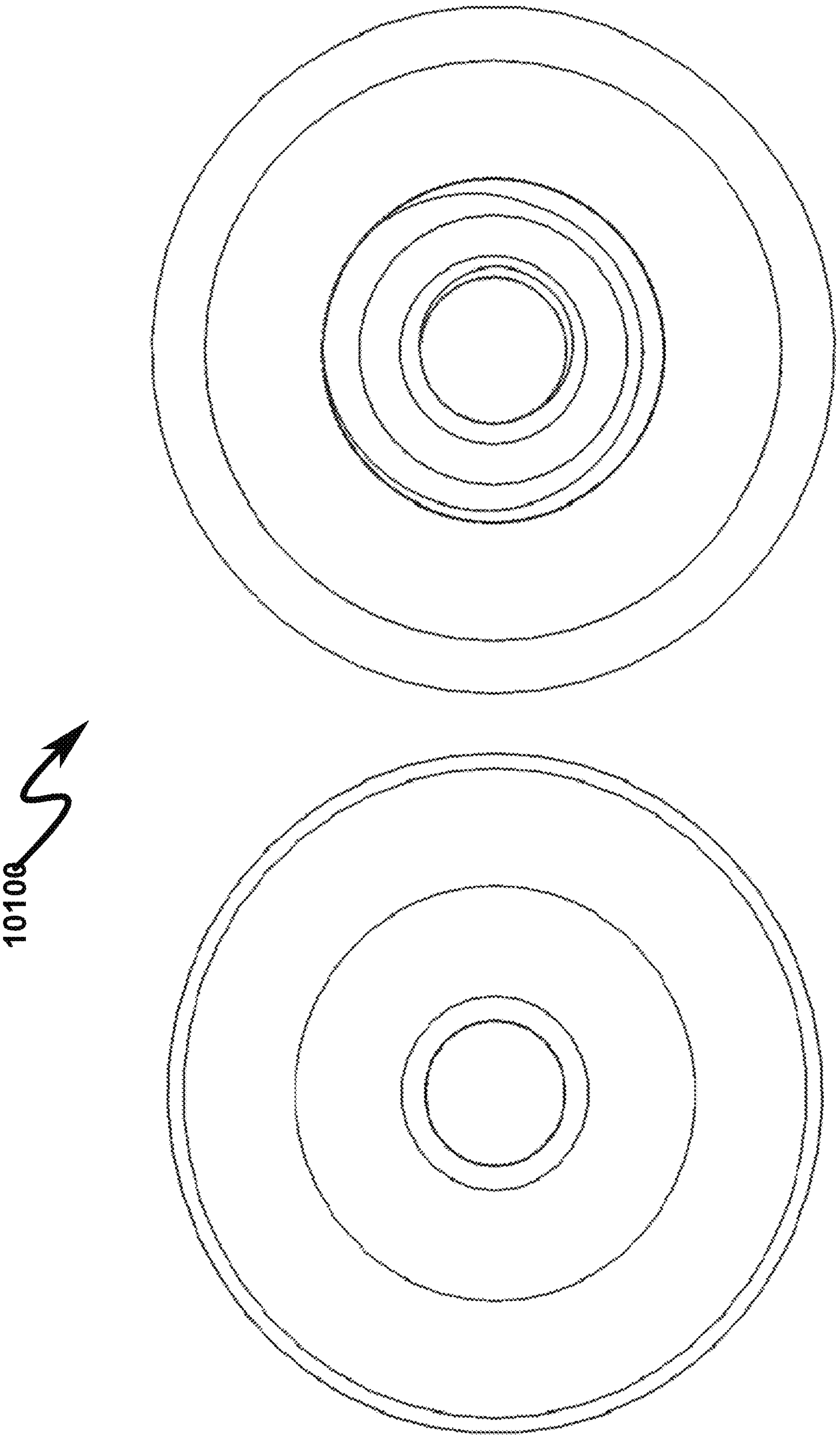
FIG. 101 illustrates left-side and right-side views of a preferred exemplary Schrader-Port-Insert (SPI) fitting useful in some preferred invention embodiments.
Figure 102:
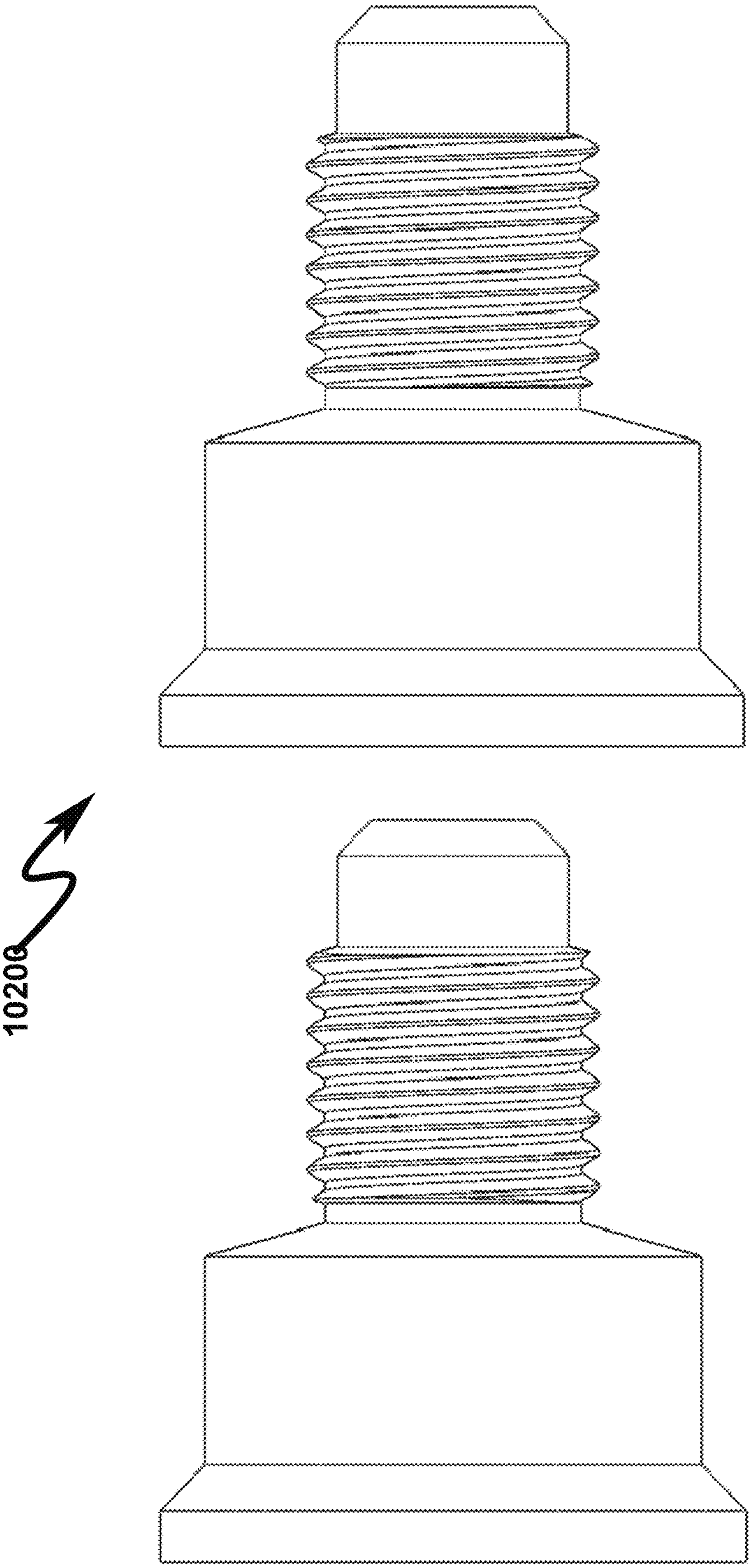
FIG. 102 illustrates top and bottom views of a preferred exemplary Schrader-Port-Insert (SPI) fitting useful in some preferred invention embodiments.
Figure 103:
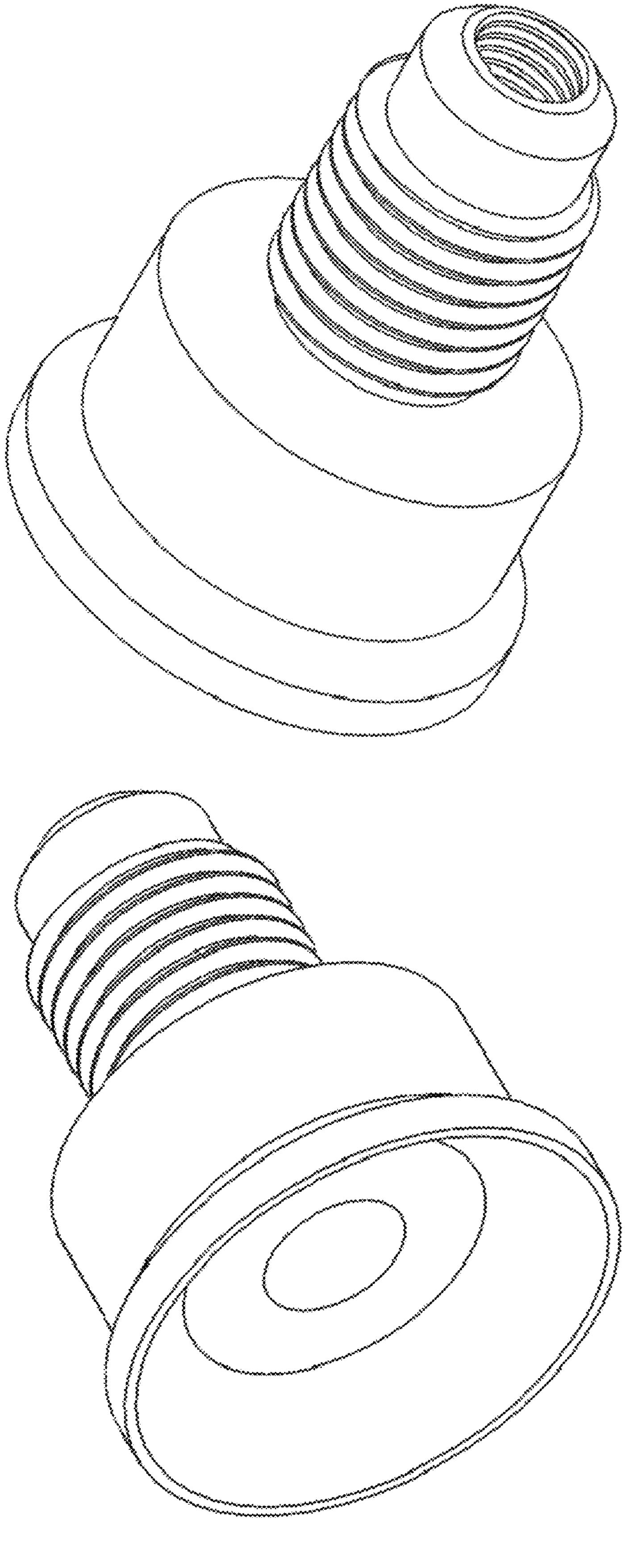
FIG. 103 illustrates front top left-side perspective and front top right-side perspective views of a preferred exemplary Schrader-Port-Insert (SPI) fitting useful in some preferred invention embodiments.

This Schrader port insert (SPI) works in combination with flare nut fittings and allows a no-solder connection, similar to flaring a piece of copper and connecting it to a flare nut, facilitating a connection to the evaporator coil. This process is then reversed to test both the evaporator coil and copper line set, demonstrating the procedure as discussed above with high-pressure gauges and a refrigerant hose with a shutoff valve. This is generally depicted in FIG. 97 (9700)-FIG. 104 (10400).

Schrader Port Insert Without Schrader Core Solderless

Figure 105:
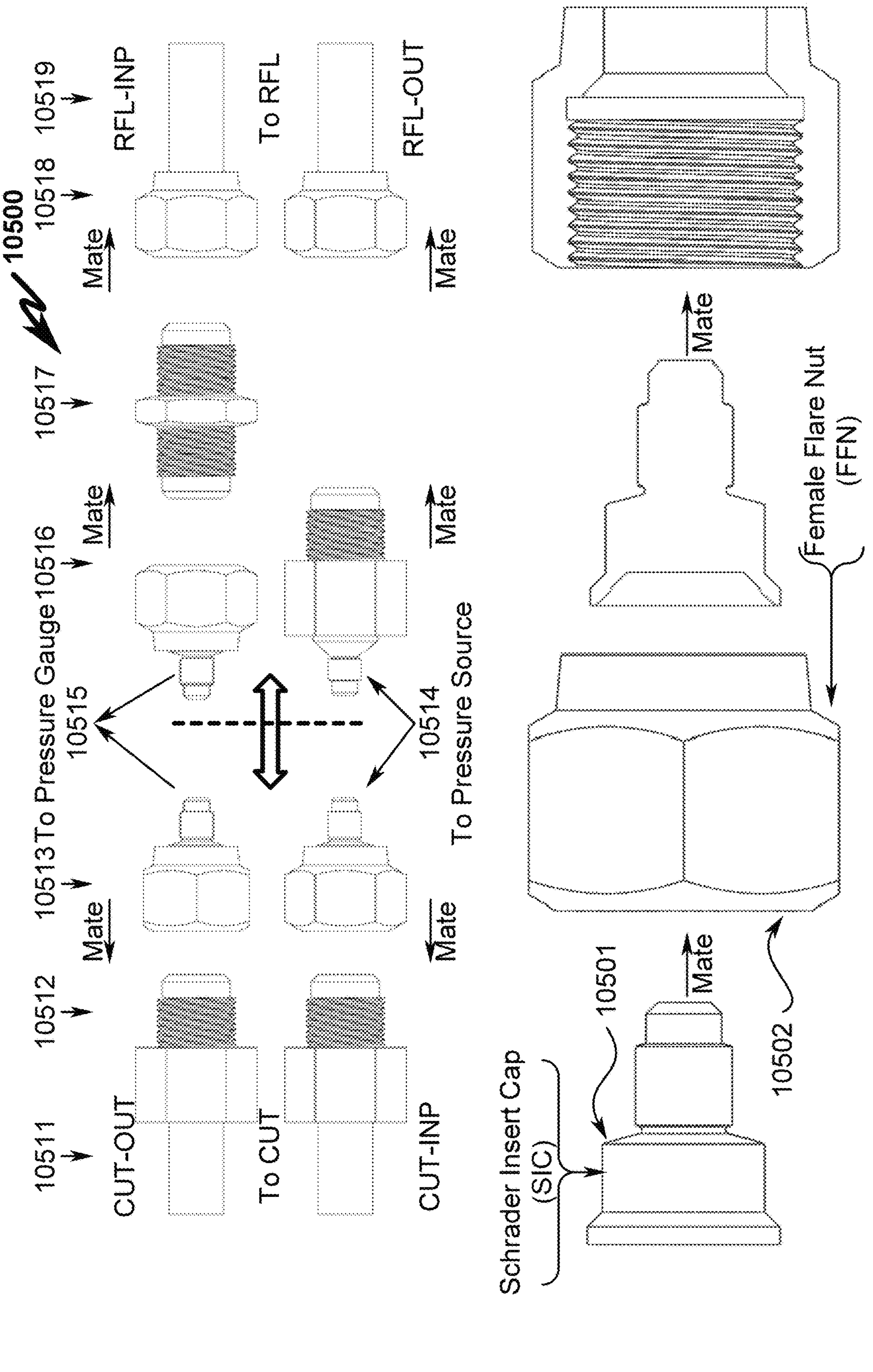
FIG. 105 illustrates an assembly view of a typical HVAC component under test (CUT) and refrigerant line (RFL) segmentation testing configuration utilizing a preferred exemplary Schrader-Insert-Cap (SIC) fitting and female flare nut (FFN) as well as front assembly and section views of a SPI and FFN.
Figure 106:
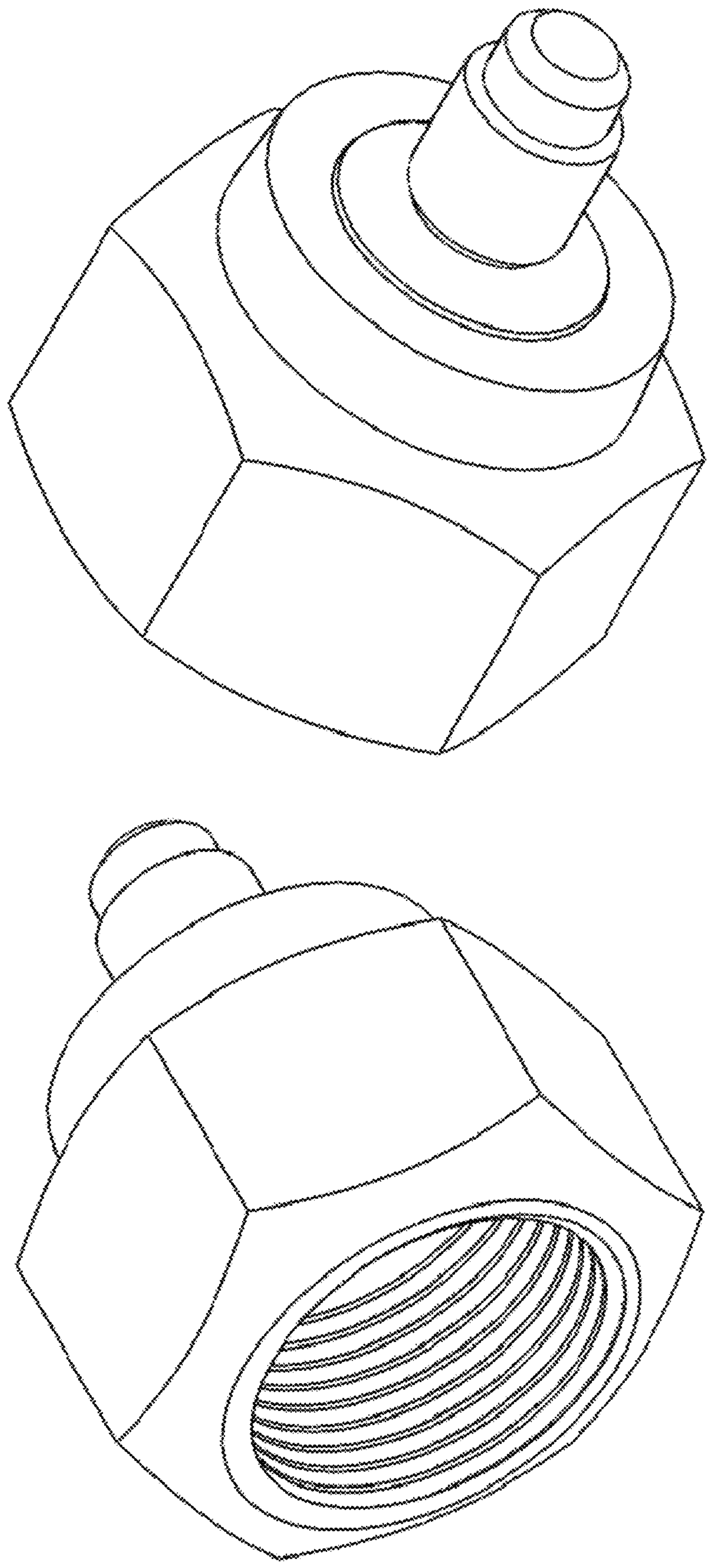
FIG. 106 illustrates perspective views of a preferred exemplary Schrader-Insert-Cap (SIC) fitting and female flare nut (FFN) assembly.
Figure 107:
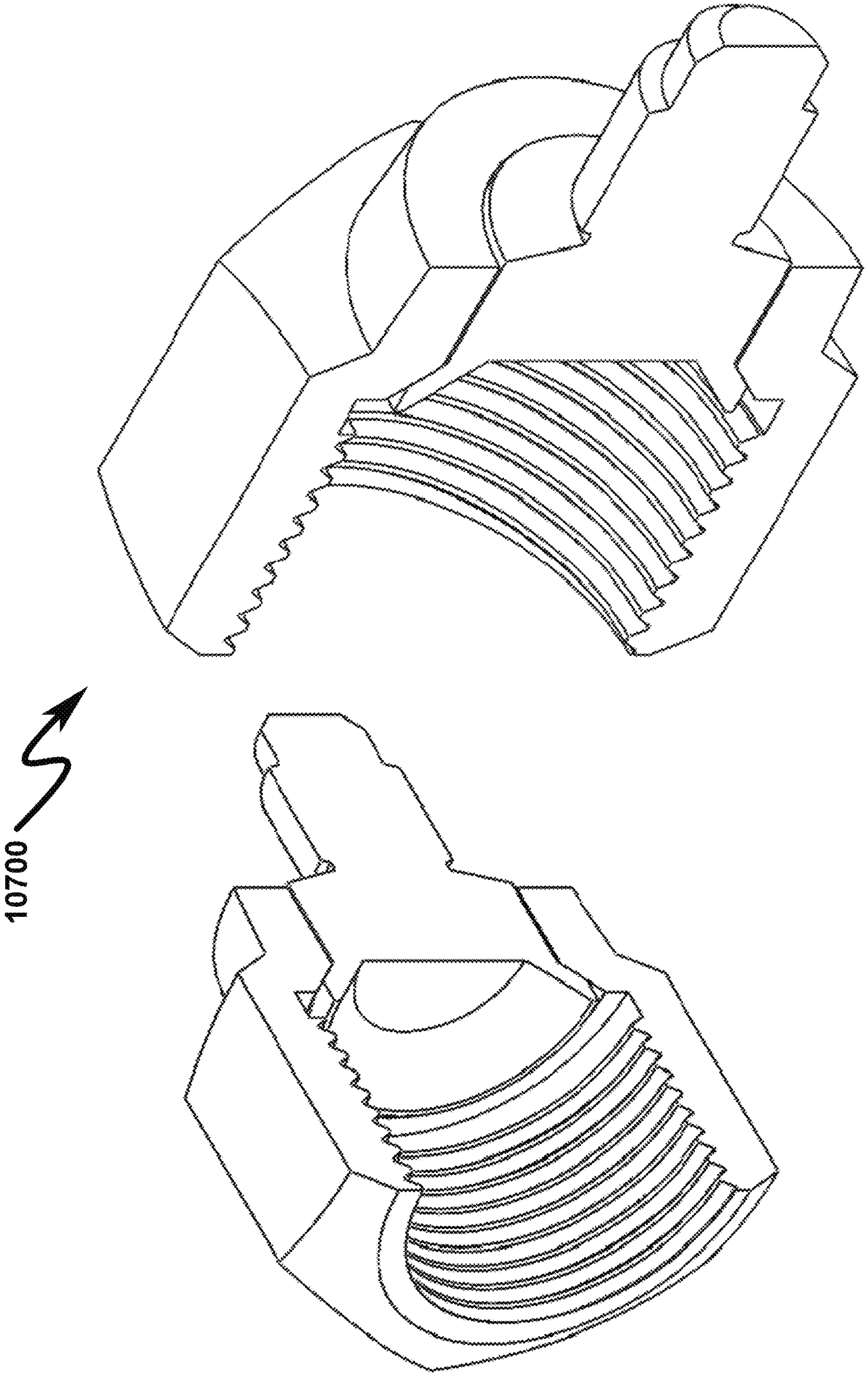
FIG. 107 illustrates perspective section views of a preferred exemplary Schrader-Insert-Cap (SIC) fitting and female flare nut (FFN) assembly.
Figure 108:
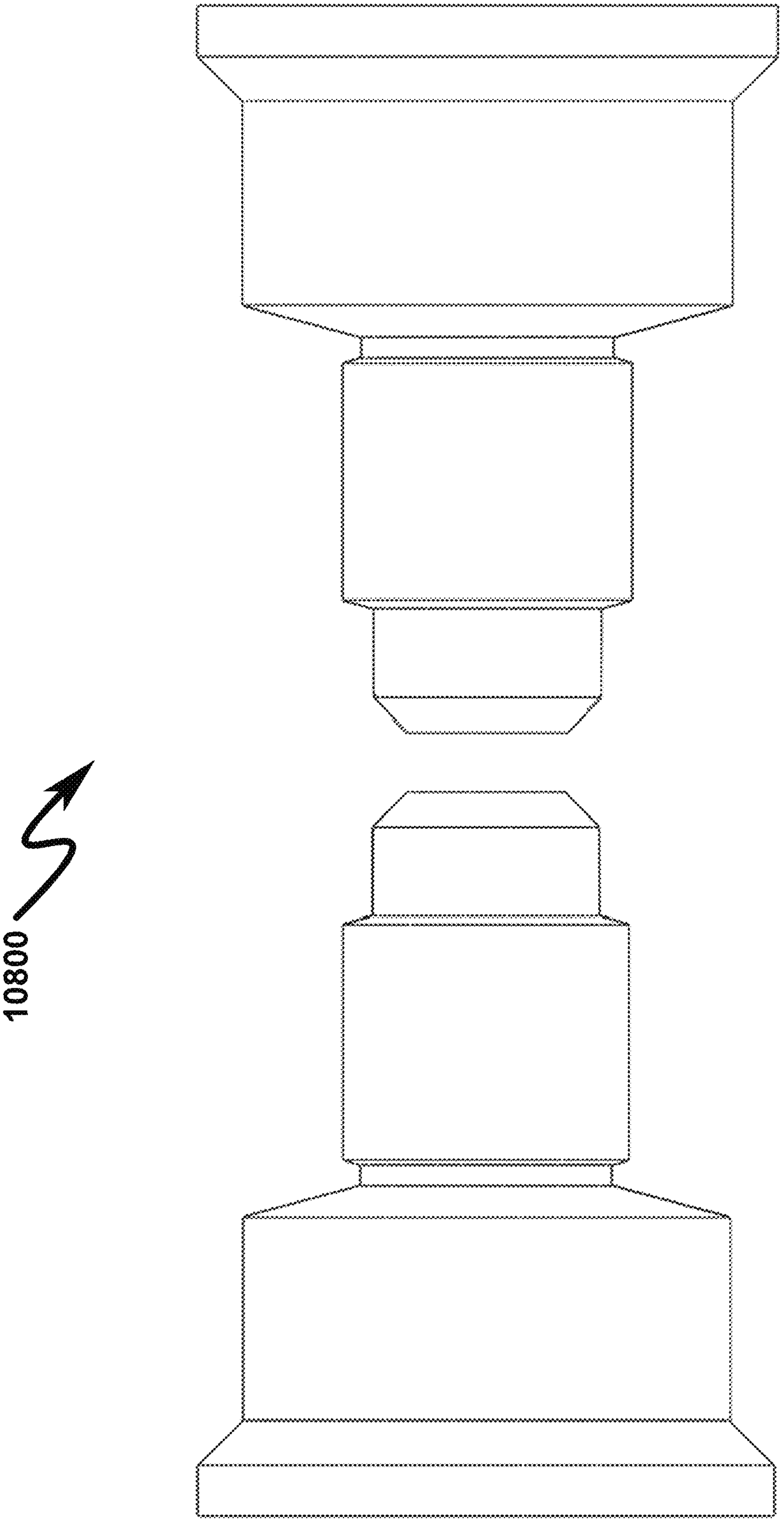
FIG. 108 illustrates front and rear views of a preferred exemplary Schrader-Insert-Cap (SIC) fitting useful in some preferred invention embodiments.
Figure 109:
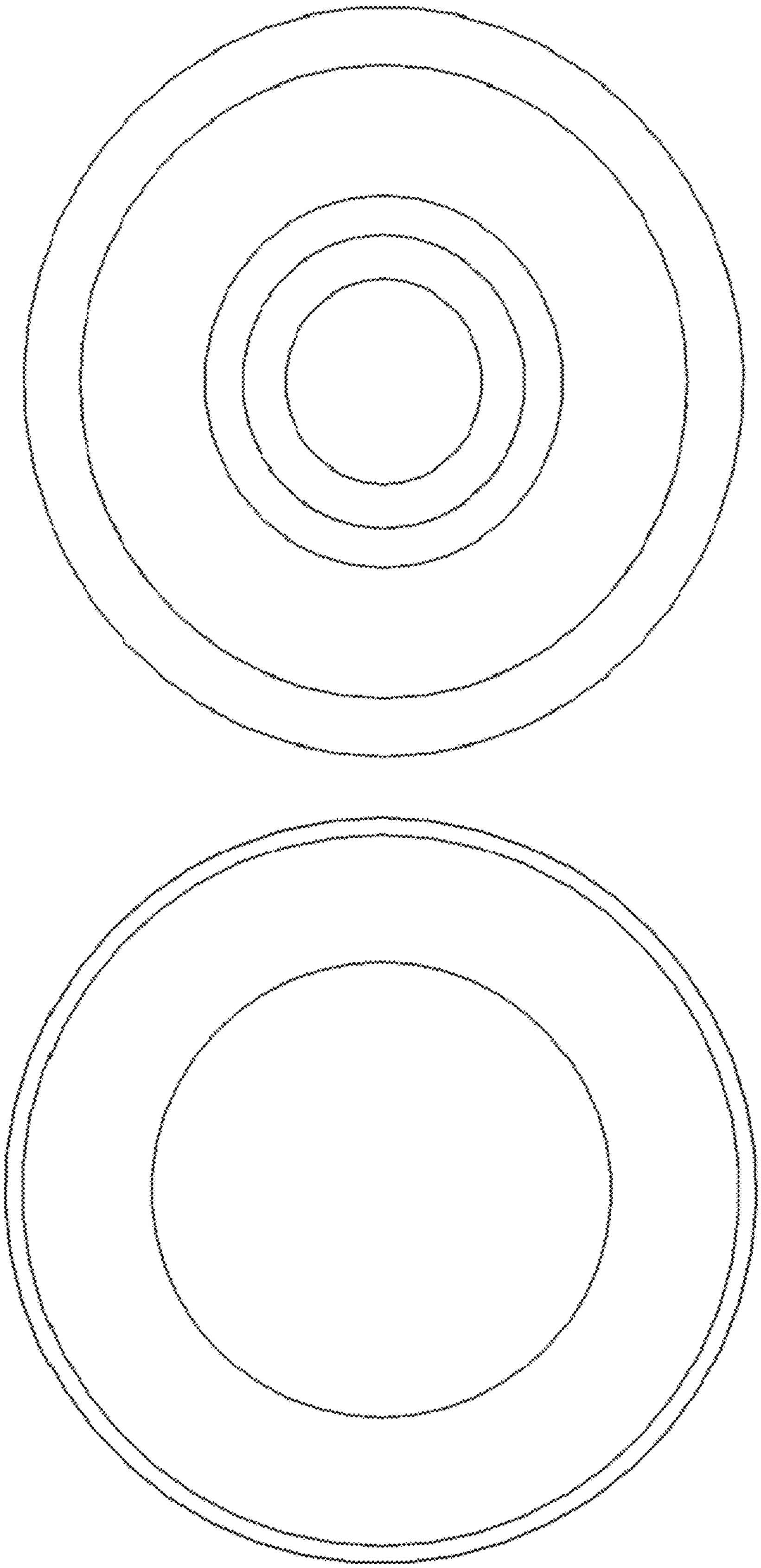
FIG. 109 illustrates left-side and right-side views of a preferred exemplary Schrader-Insert-Cap (SIC) fitting useful in some preferred invention embodiments.
Figure 110:
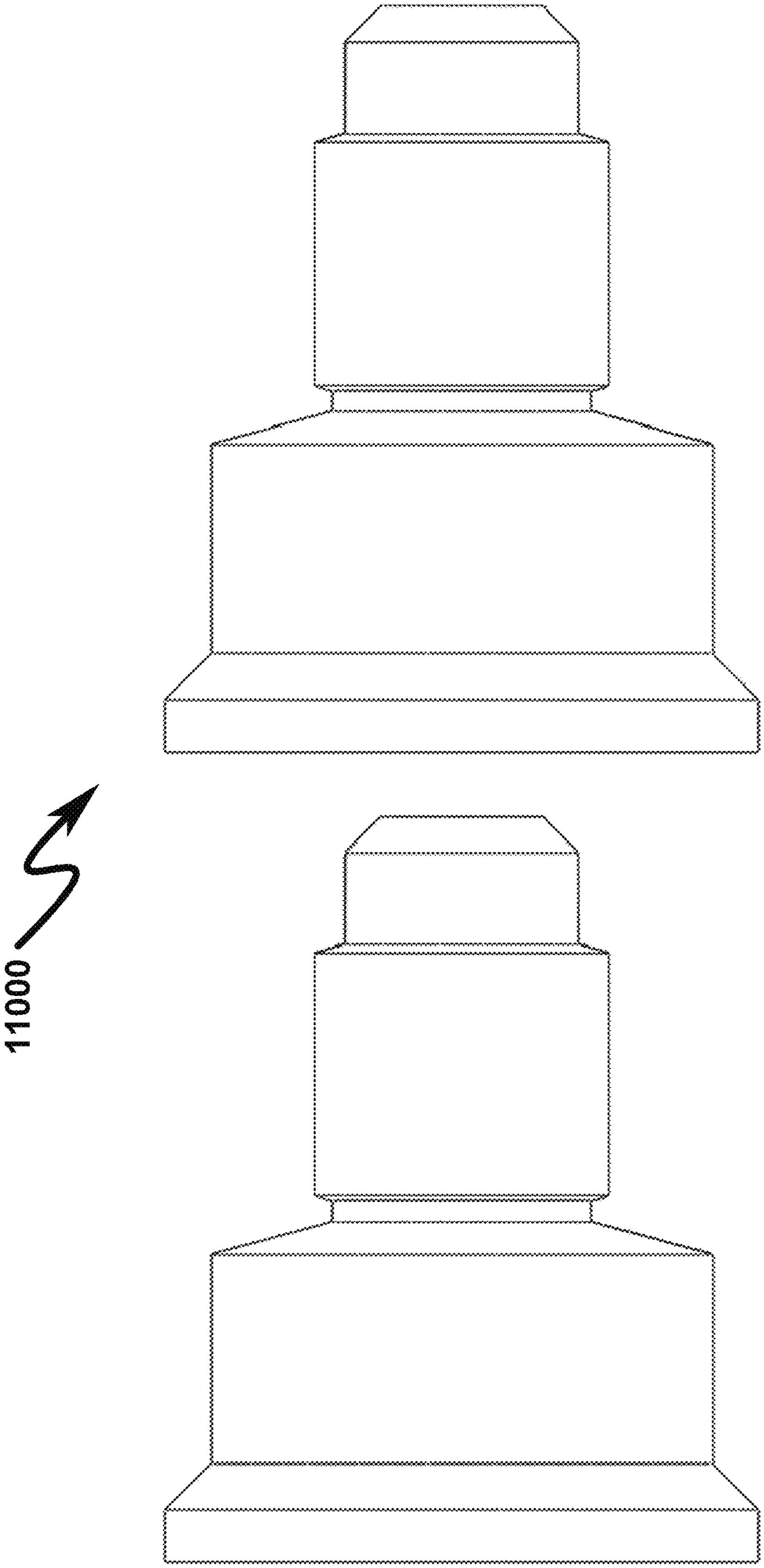
FIG. 110 illustrates top and bottom views of a preferred exemplary Schrader-Insert-Cap (SIC) fitting useful in some preferred invention embodiments.
Figure 111:
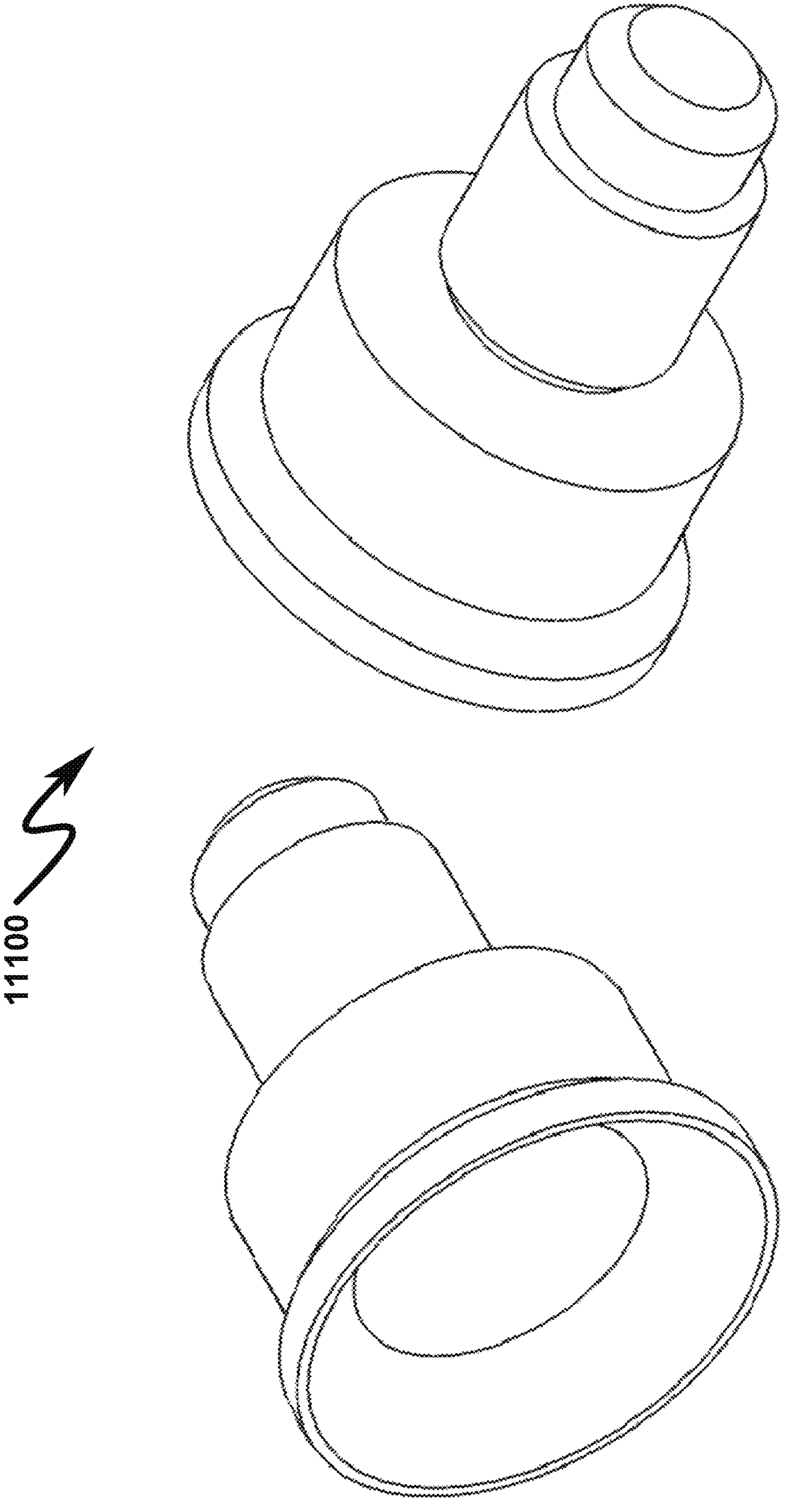
FIG. 111 illustrates front top left-side perspective and front top right-side perspective views of a preferred exemplary Schrader-Insert-Cap (SIC) fitting useful in some preferred invention embodiments.

This Schrader insert cap (SIC) does not have a core; it is simply a plug to seal one side of the evaporator coil or multiple sides of the copper line sets. This is generally depicted in FIG. 105 (10500)-FIG. 112 (11200).

Schrader Tube End With Schrader Core

Figure 113:
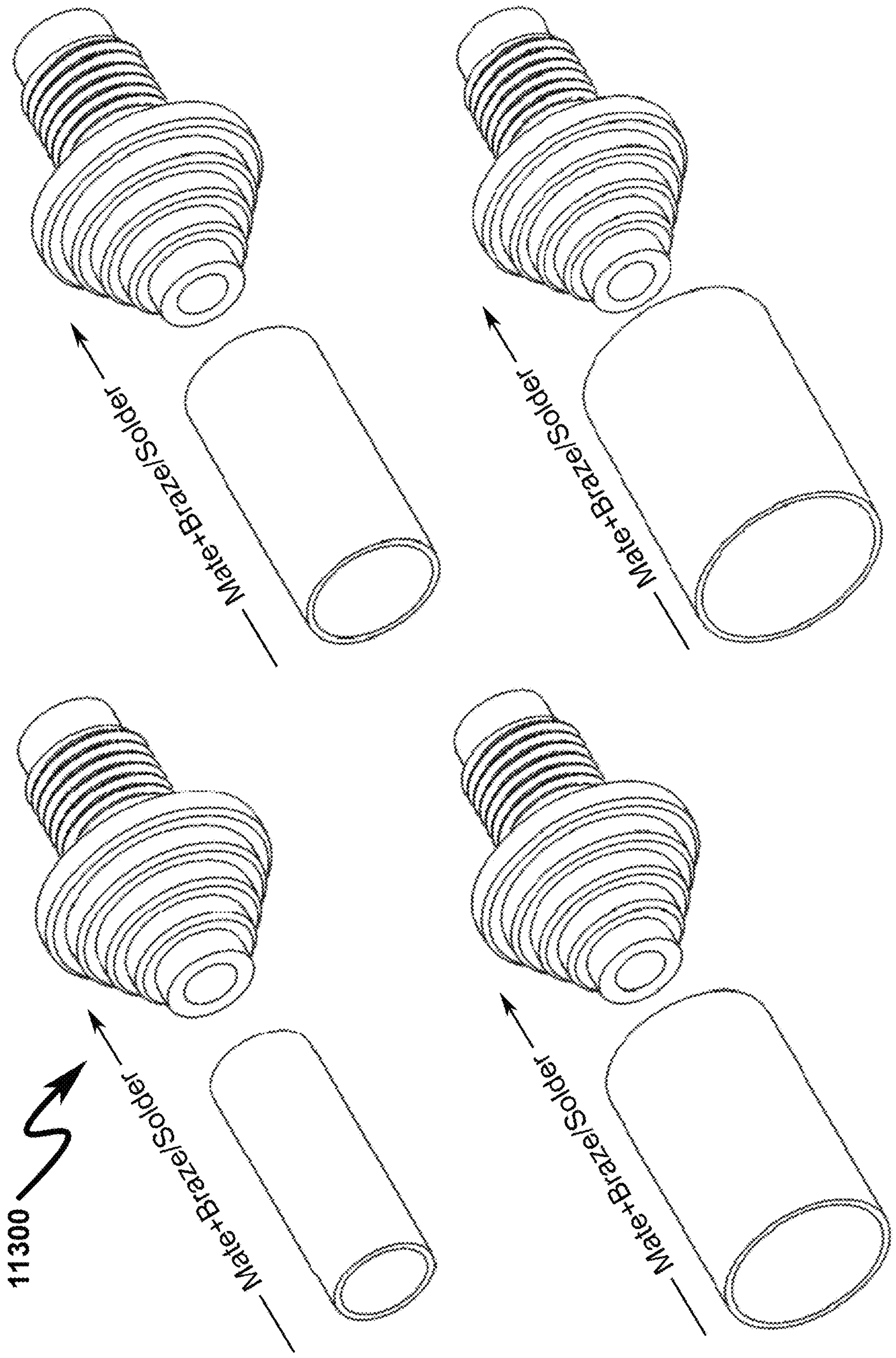
FIG. 113 illustrates an assembly view of a preferred exemplary Schrader-Tube-End (STE) fitting mated with various refrigerant copper line (RCL) sizes.
Figure 114:
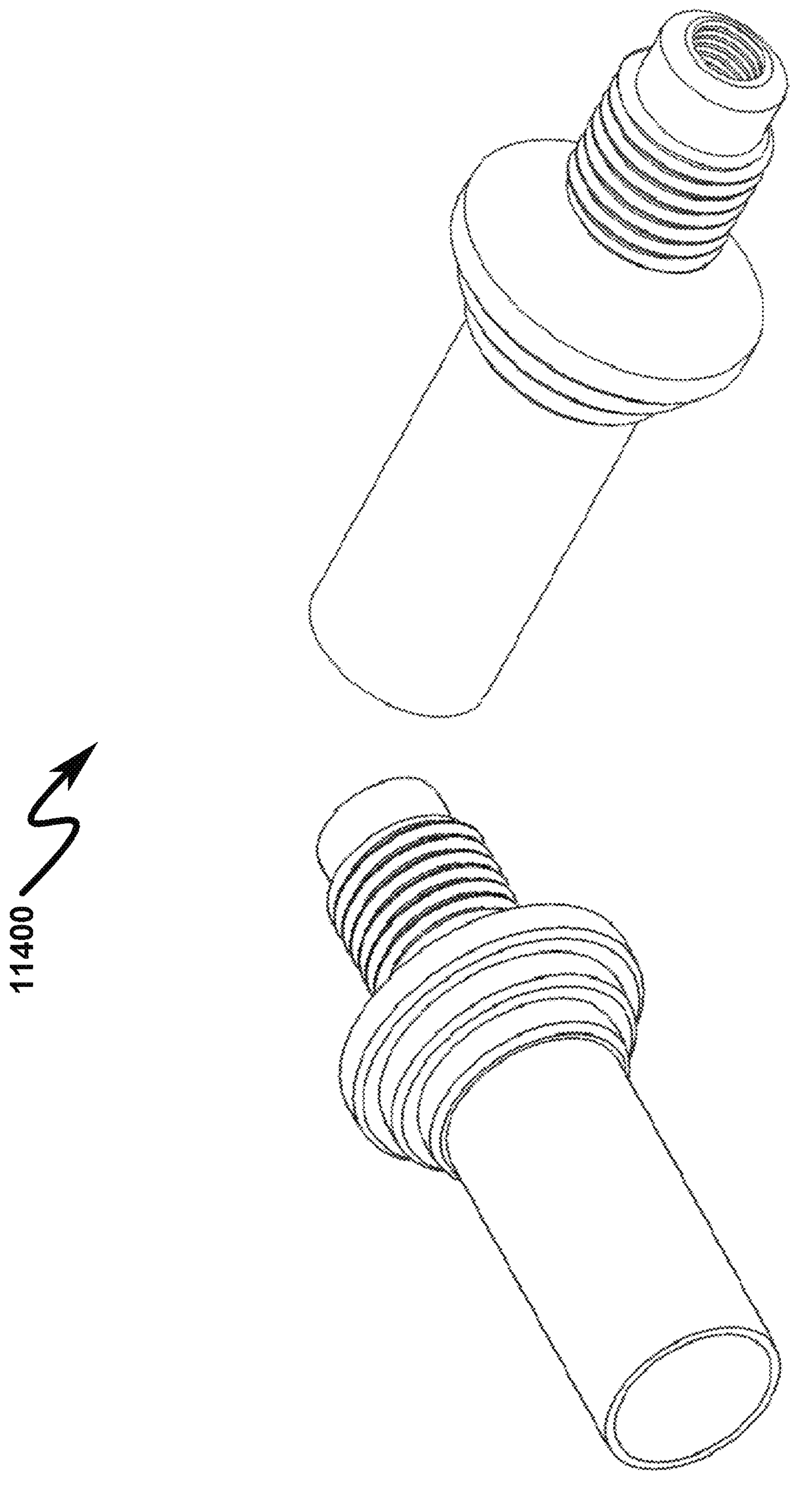
FIG. 114 illustrates perspective views of a preferred exemplary Schrader-Tube-End (STE) fitting mated with a refrigerant copper line (RCL)
Figure 115:
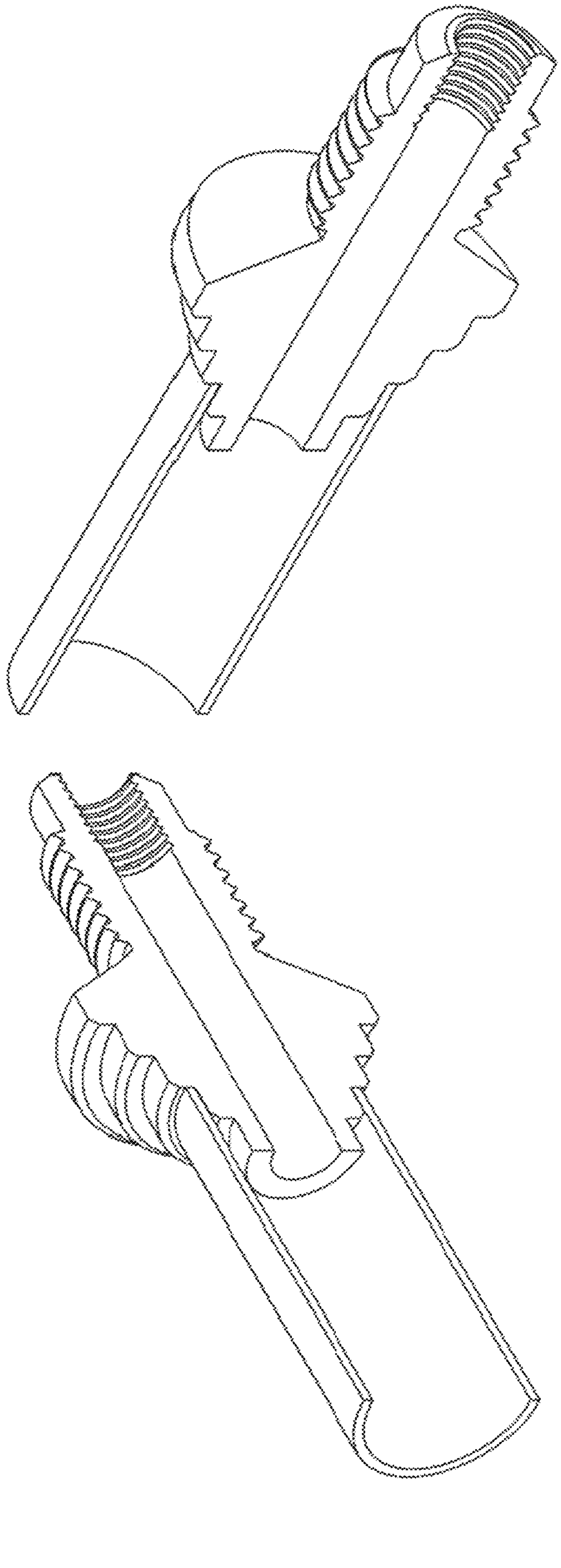
FIG. 115 illustrates perspective section views of a preferred exemplary Schrader-Tube-End (STE) fitting mated with a refrigerant copper line (RCL)
Figure 116:
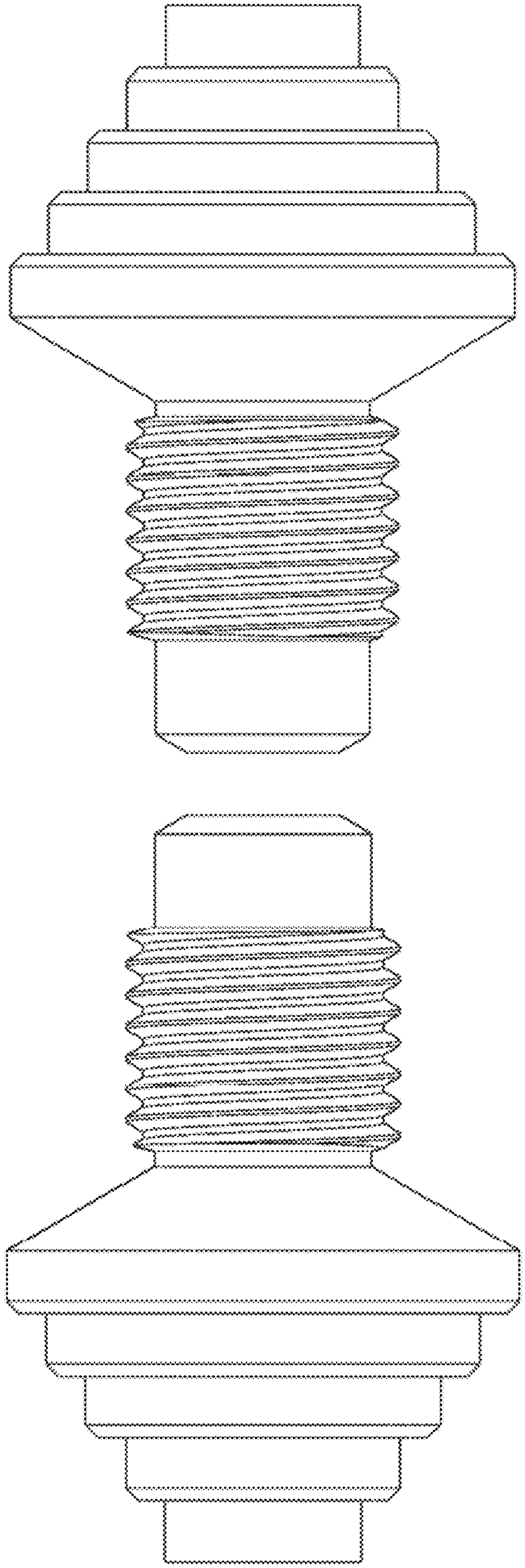
FIG. 116 illustrates front and rear views of a preferred exemplary Schrader-Tube-End (STE) fitting useful in some preferred invention embodiments.
Figure 117:
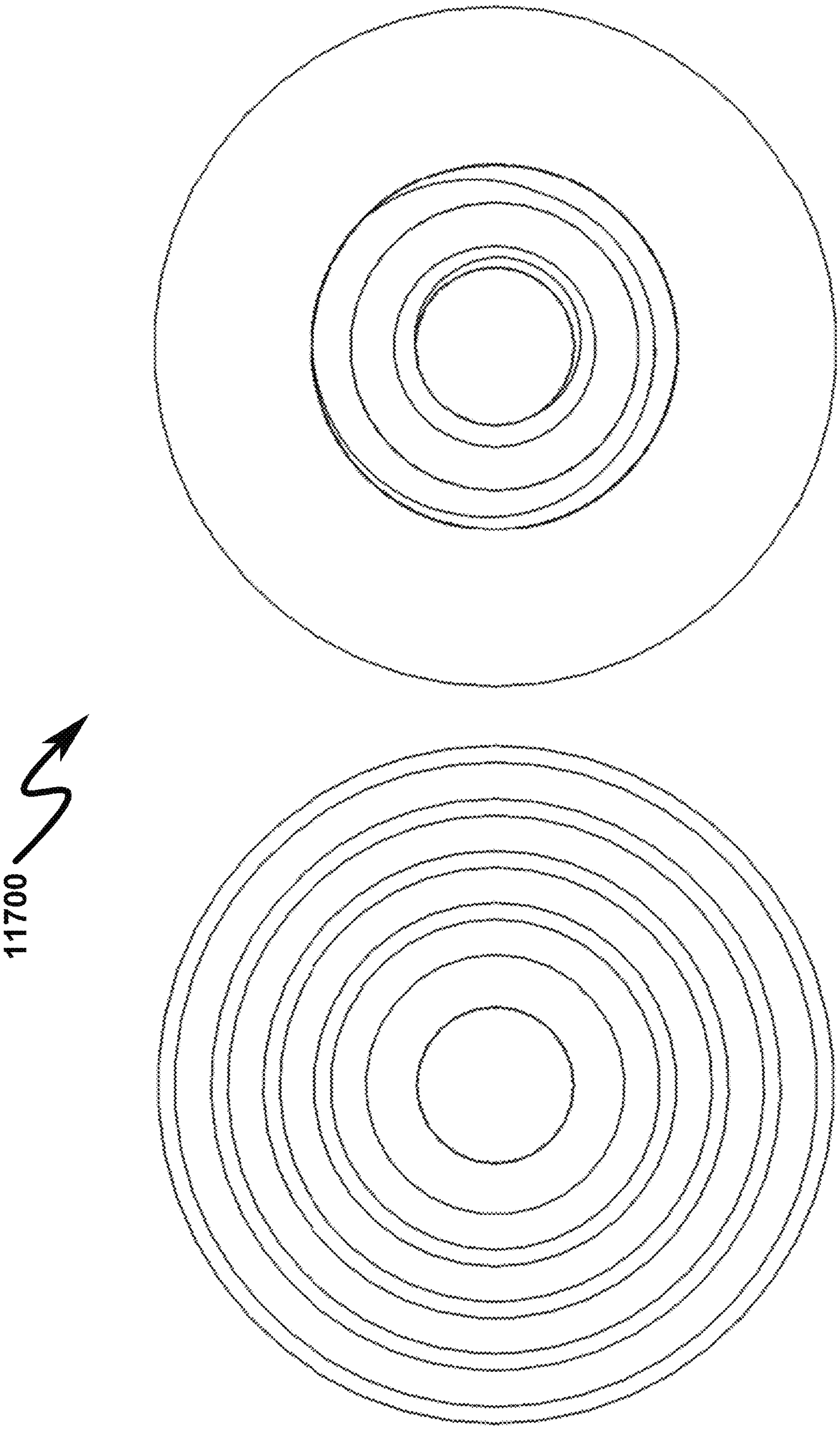
FIG. 117 illustrates left-side and right-side views of a preferred exemplary Schrader-Tube-End (STE) fitting useful in some preferred invention embodiments.
Figure 118:
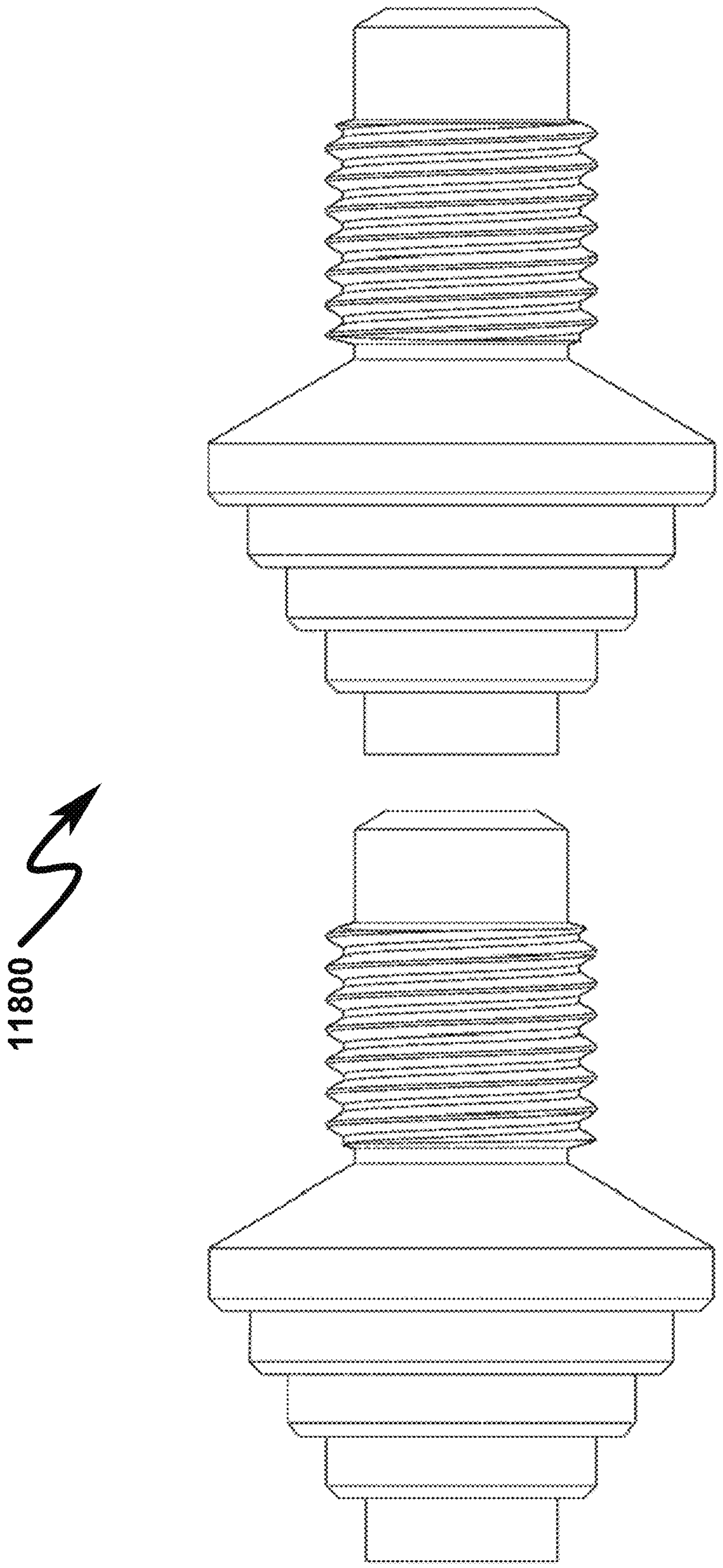
FIG. 118 illustrates top and bottom views of a preferred exemplary Schrader-Tube-End (STE) fitting useful in some preferred invention embodiments.
Figure 119:
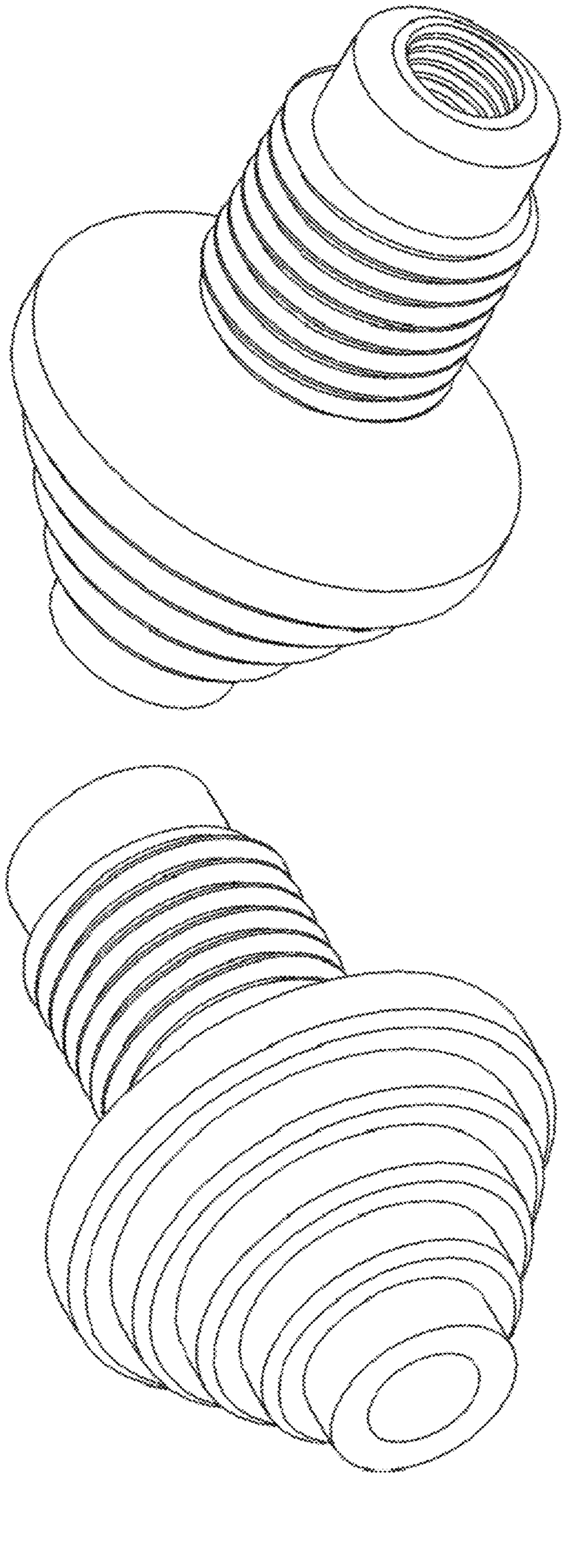
FIG. 119 illustrates front top left-side perspective and front top right-side perspective views of a preferred exemplary Schrader-Tube-End (STE) fitting useful in some preferred invention embodiments.

This Schrader tube end (STE) mates directly to a variety of copper tube ends and is brazed/soldered in place to provide a terminating Schrader port at the refrigerant copper line (RCL). This is generally depicted in FIG. 113 (11300)-FIG. 120 (12000).

Schrader Tube Plug Without Schrader Core

Figure 121:
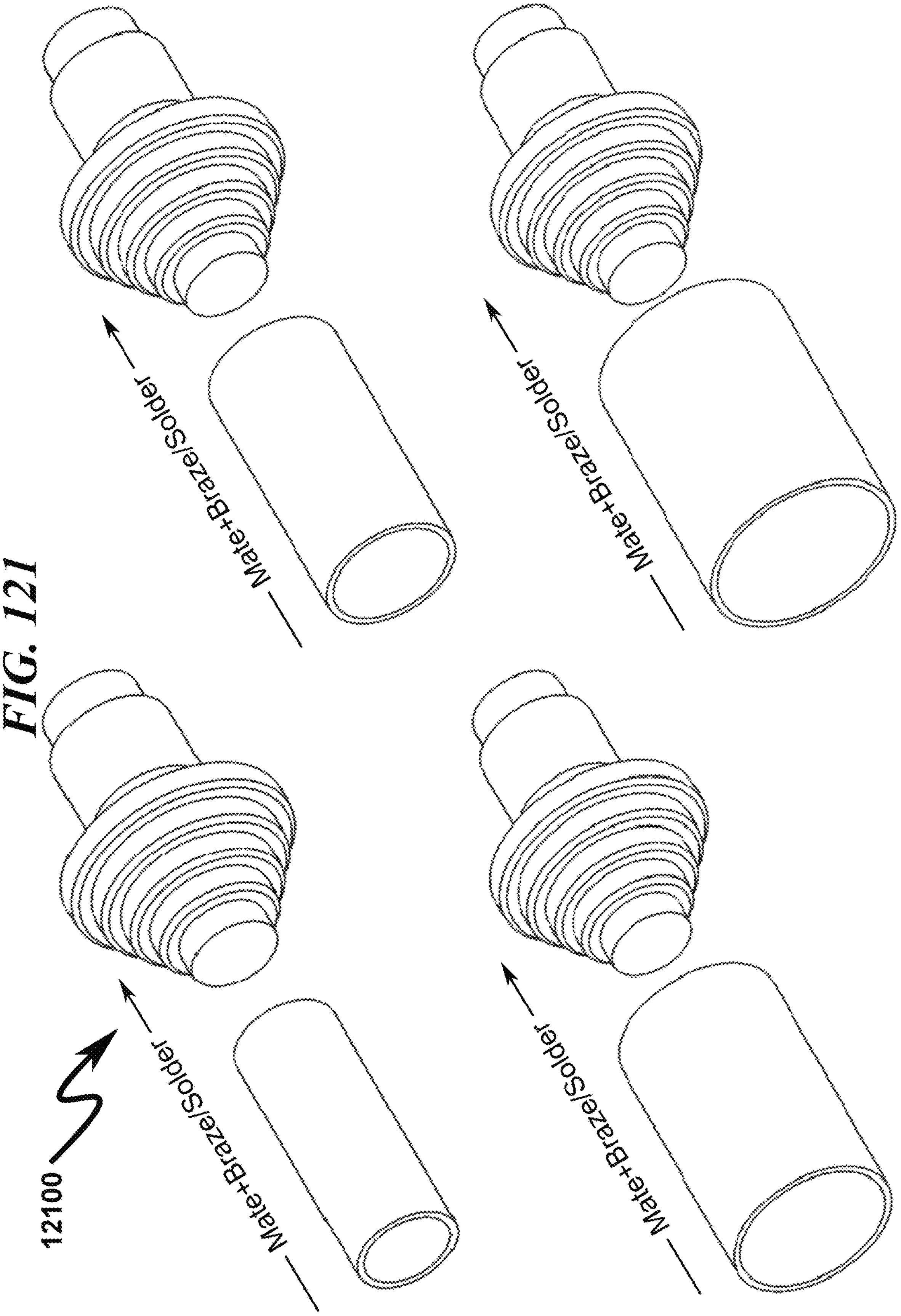
Figure 122:
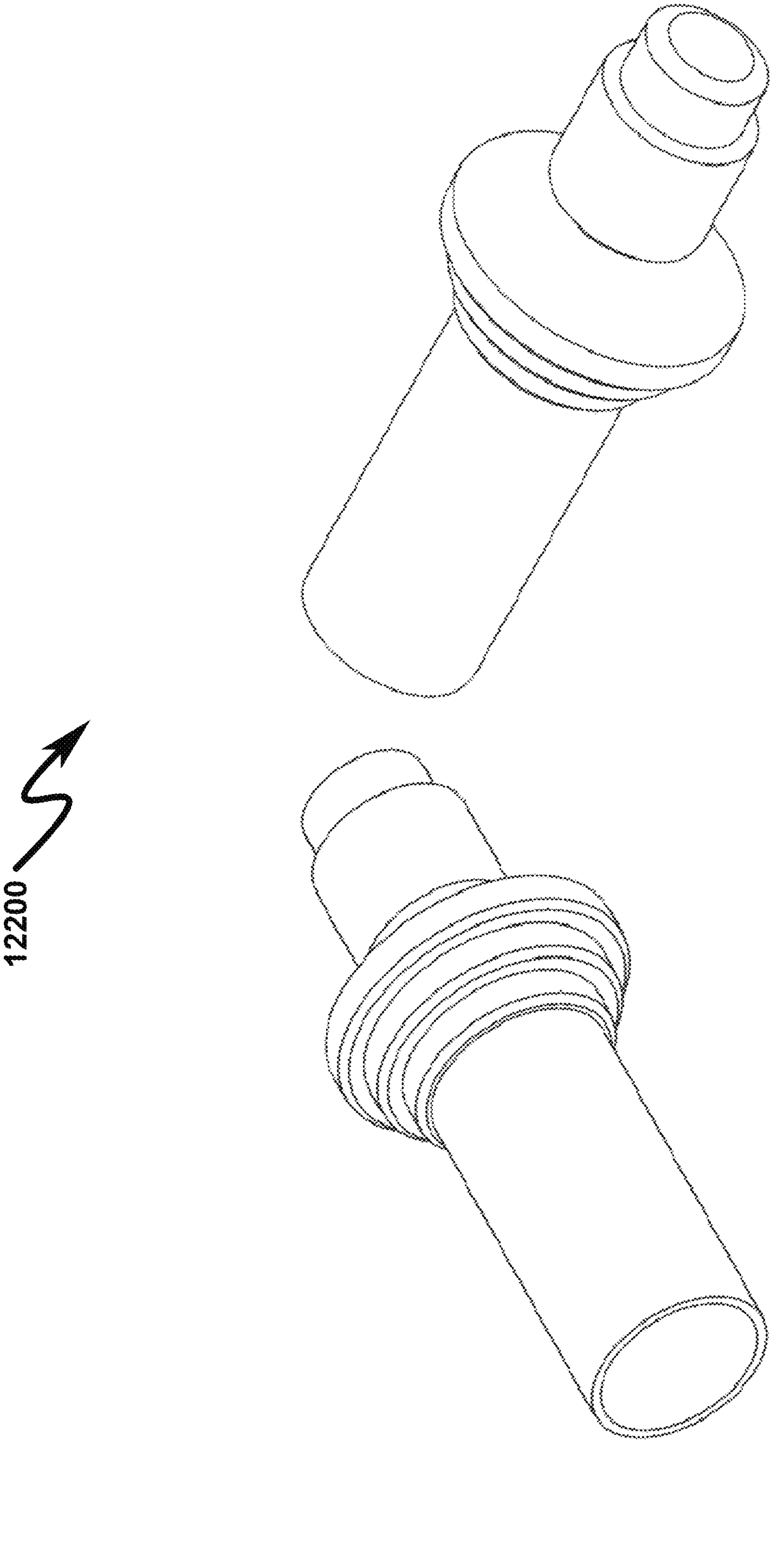
Figure 123:
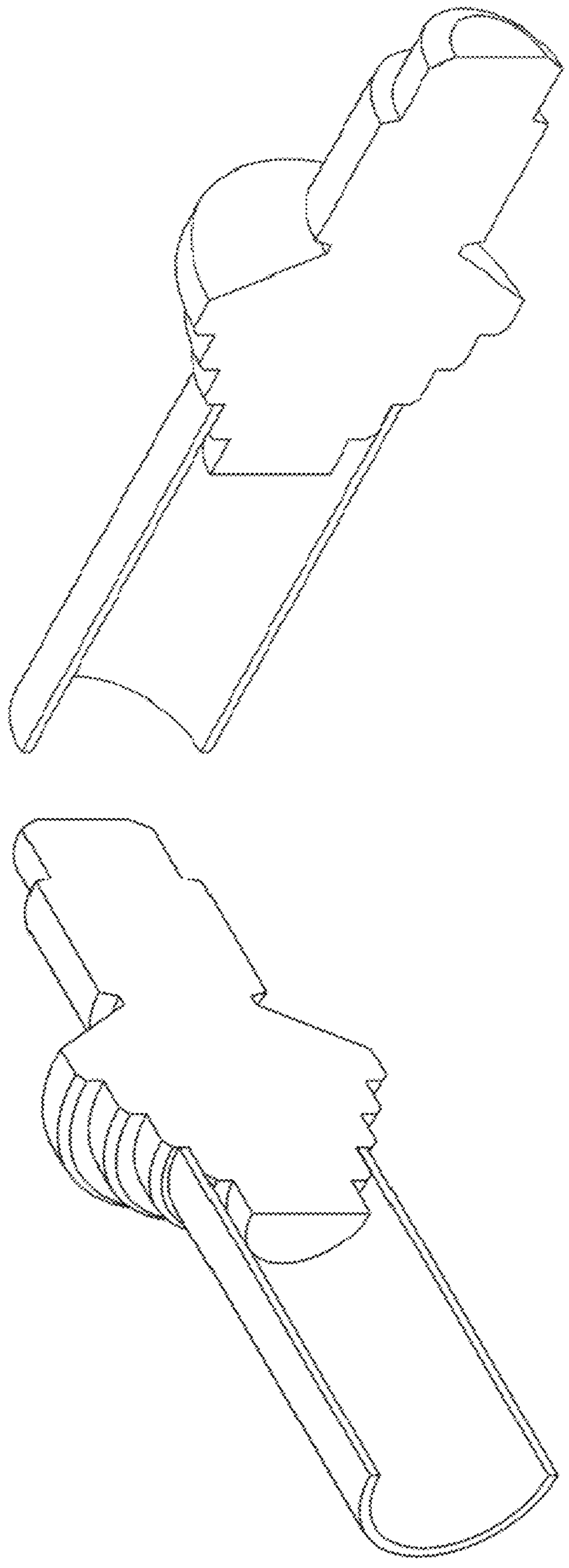
Figure 124:
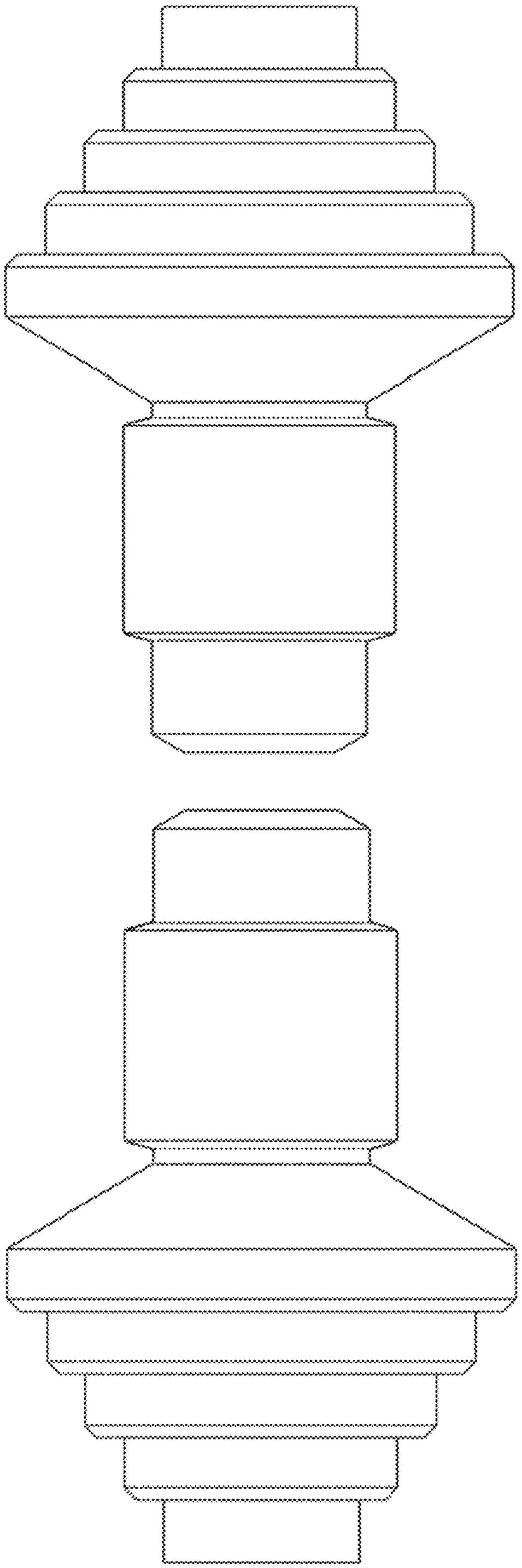
Figure 125:
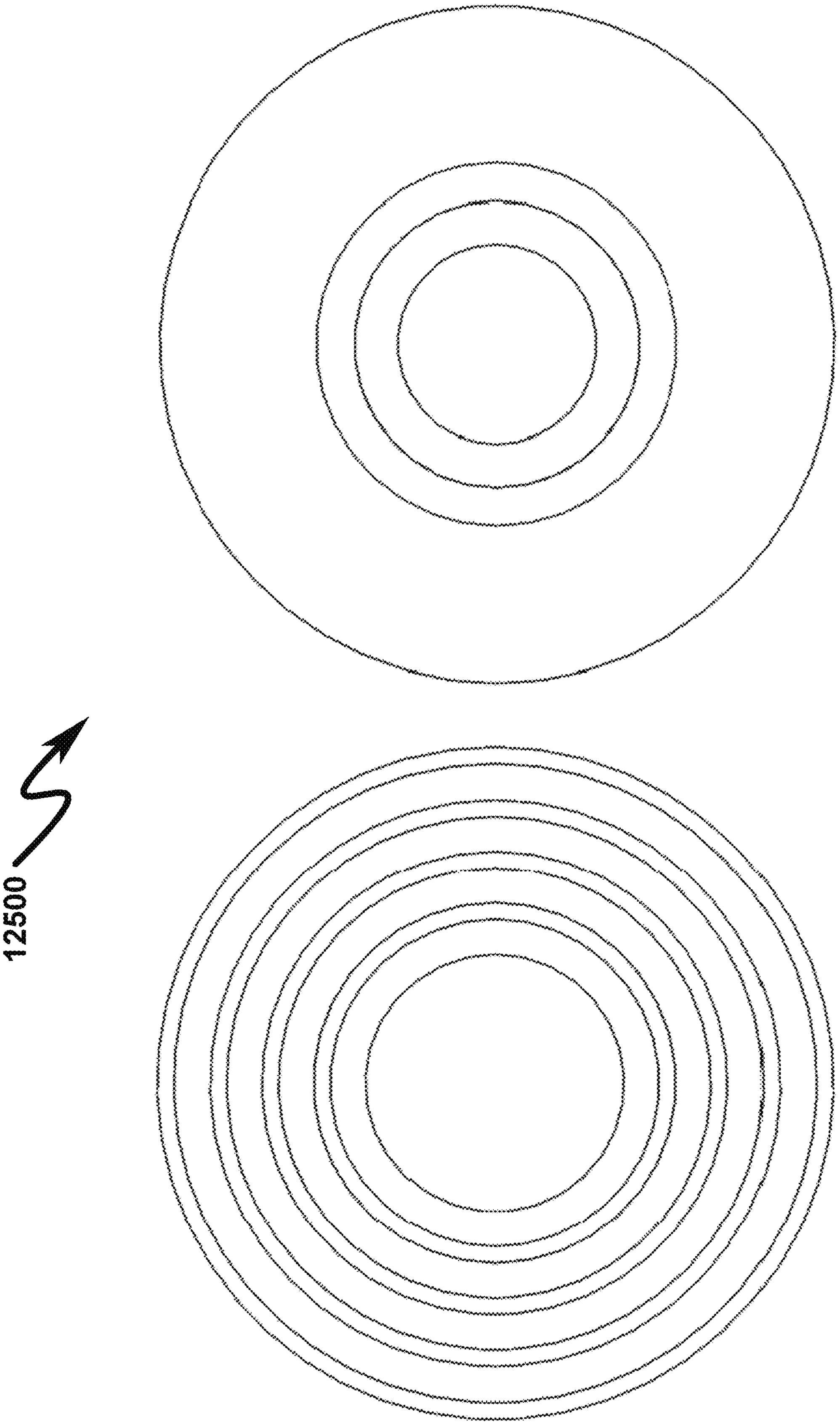
Figure 126:
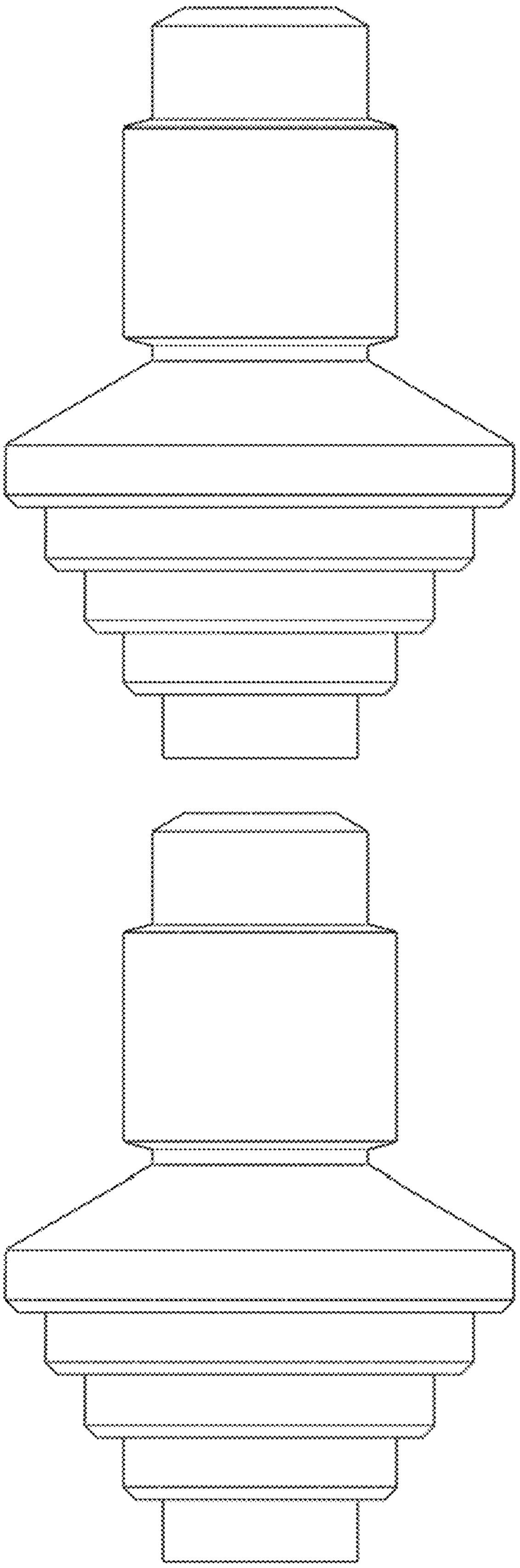

This Schrader tube plug (STP) does not have a core; it is simply a plug to seal one side of the evaporator coil or multiple sides of the copper line sets. This is generally depicted in FIG. 121 (12100)-FIG. 128 (12800).

Segmented Refrigerant Leak Isolation System Overview (0900)

Figure 9:
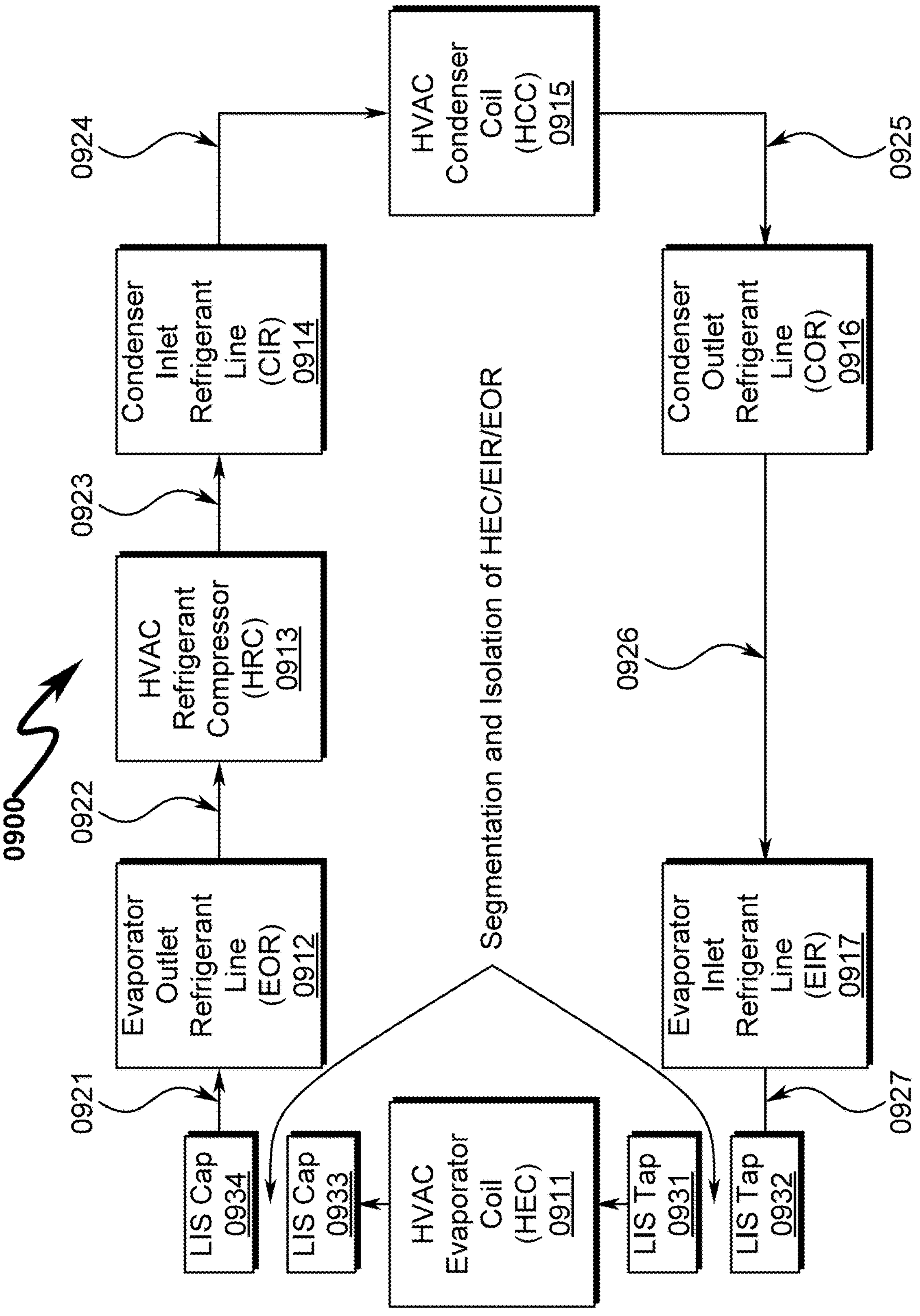
FIG. 9 illustrates an exemplary invention application segmentation operation in which a HVAC evaporator is isolated from the remainder of the HVAC system for leak testing.

The present invention Segmented Refrigerant Leak Isolation system (LIS) in its simplest form is generally depicted in FIG. 9 (0900) as applied to a HVAC system that comprises evaporator elements (0911), compressor elements (0913), and condenser elements (0915), and related refrigerant plumbing (0921, 0922, 0923, 0924, 0925, 0926, 0927). Within this general system context, the present invention will discuss leak isolation with respect to the evaporator elements (0911), but this discussion applies to all of the HVAC components depicted in FIG. 1 (0100)-FIG. 8 (0800).

Here the HVAC system is augmented with a LIS TAP (0931, 0932) and LIS CAP (0933, 0934) that serve to isolate the evaporator elements (0911) from the remainder of the HVAC system refrigerant loop. The LIS TAP (0931, 0932) is configured to isolate the evaporator elements (0911) from the remainder of the HVAC system refrigerant loop and allow the evaporator elements (0911) to be independently pressurized and checked for leaks, while the LIS CAP (0933, 0934) terminates the output of the evaporator elements (0911) from the remainder of the downstream HVAC system refrigerant loop. In this manner both the evaporator elements (0911) and their associated refrigerant lines (RFL) (0912, 0917) can be independently checked for refrigerant leaks.

A significant advantage of this approach when applied to large complex HVAC systems is that the LIS CAP/TAP hardware be simultaneously may applied to multiple components within the HVAC system and each isolated segment pressurized with a dry nitrogen source (DNS) and the DNS moved from one to another until all segments under test are eventually pressurized. At this point pressure gauges that have been installed on each of the isolated segments may be monitored simultaneously to determine if there is a pressure drop that will indicate a failing segment component. This simultaneous pressure monitoring greatly reduces the overall time required to detect and isolate refrigerant leaks in the HVAC system. Rather than sequentially determining the health of a given HVAC system component, this health (pressure test) can be performed on all components at the same time. Furthermore, in many circumstances it may be useful to simultaneously test HVAC system components that are known to have a high probability of failure, thus (for example), testing all evaporator units simultaneously to determine which (if any) are leaking refrigerant.

Exemplary Component Under Test Leak Testing (1000)-(1300)

Figure 10:
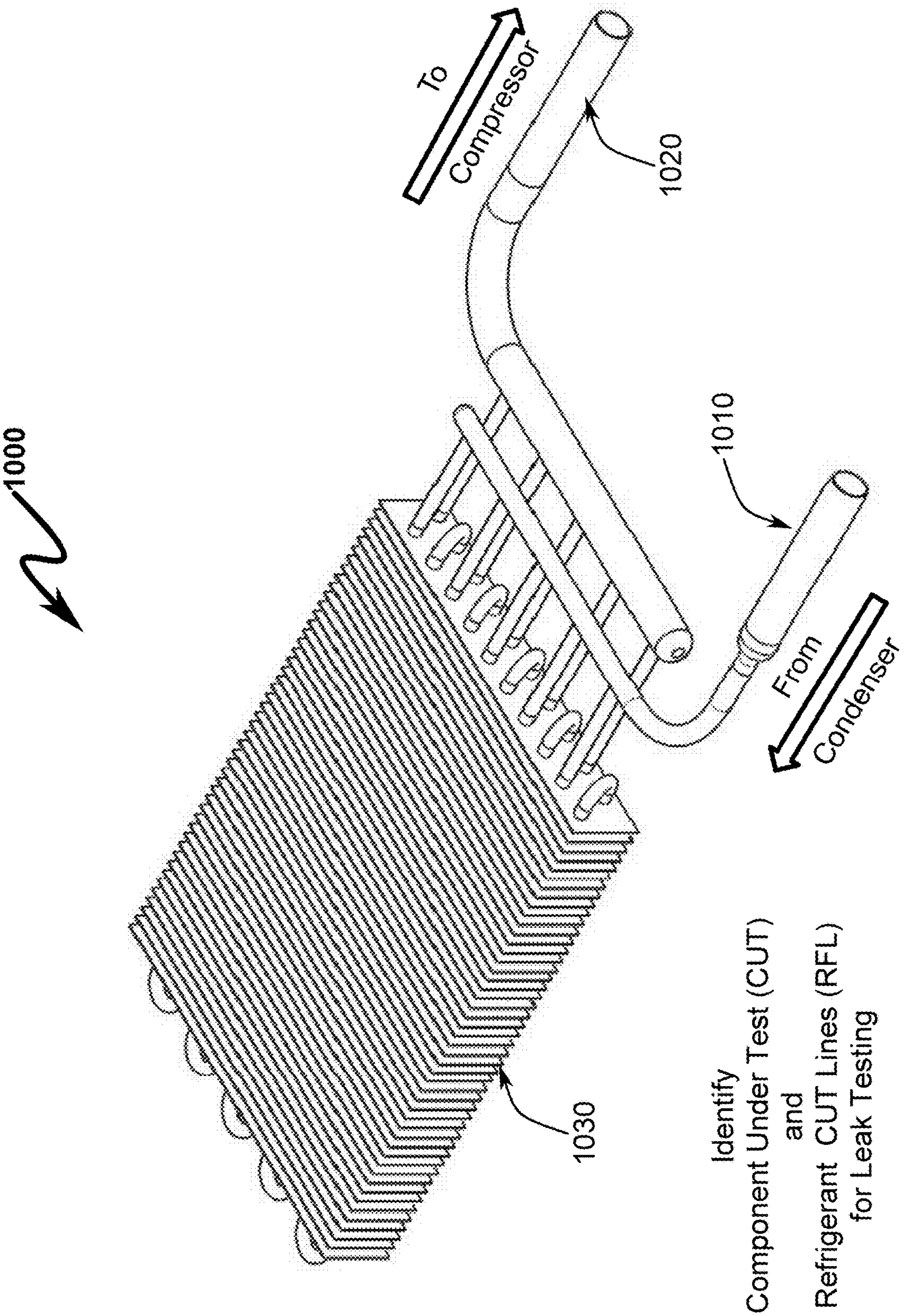
FIG. 10 illustrates a physical application of FIG. 9 depicting a HVAC evaporator coil component under test (CUT) prior to segmentation from the associated refrigerant lines (RFL)

A physical example of the leak testing procedure outlined in FIG. 9 (0900) above is generally depicted in the drawings of FIG. 10 (1000)-FIG. 13 (1300) and will now be discussed in detail. While this application example is directed at an evaporator component under test (CUT) and associated refrigerant lines (RFL), it may equally be applied to other elements in a HVAC system.

Referencing FIG. 10 (1000) as the initial HVAC state for leak detection and isolation, refrigerant flows thru a condenser refrigerant line (RFL) (1010) and a compressor refrigerant line (RFL) (1020) that supplies an evaporator component under test (CUT) (1030). In this depicted scenario, it is unknown whether the RFL or the CUT is encountering a leak condition.

Figure 11:
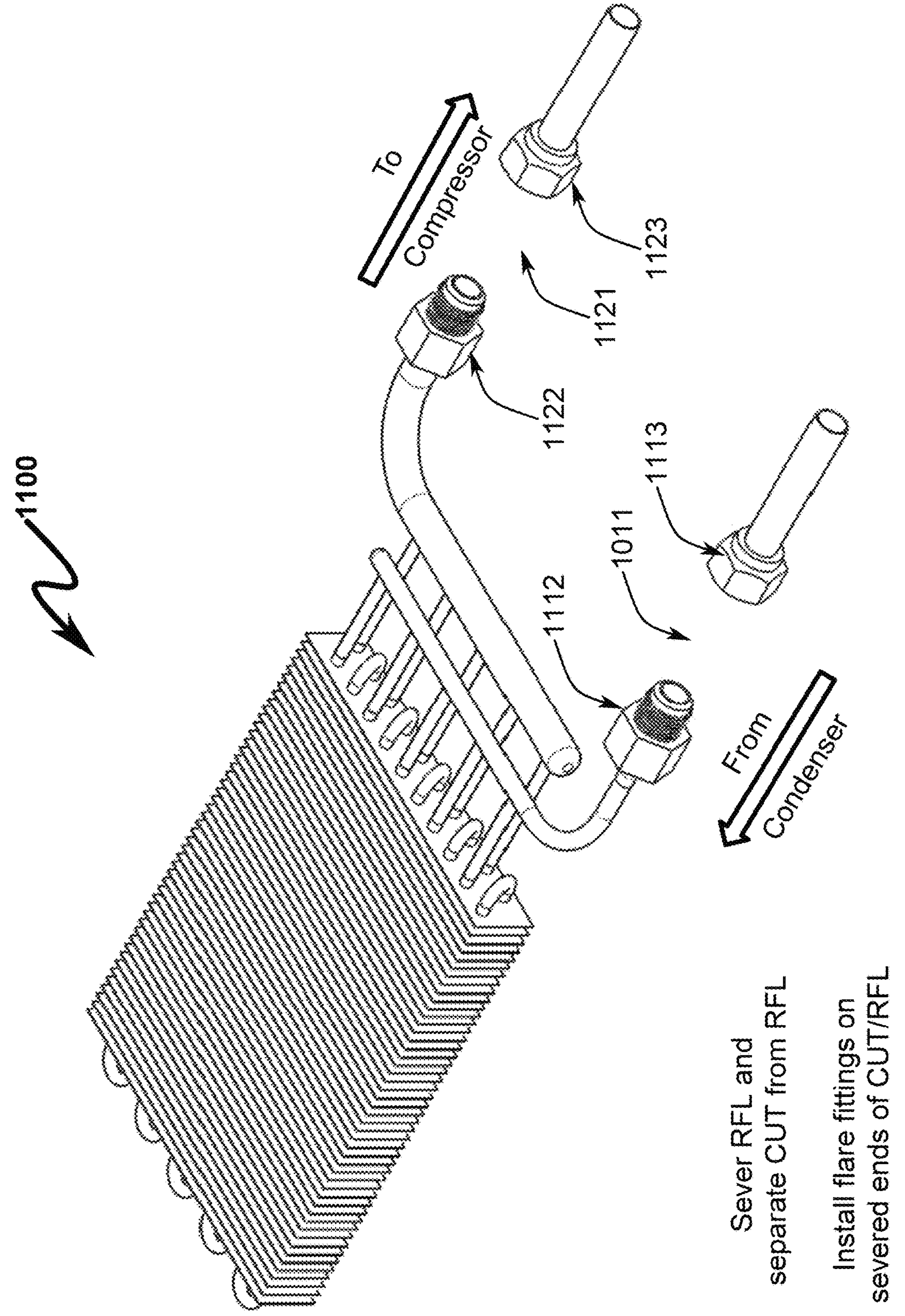
FIG. 11 illustrates a physical application of FIG. 9 depicting a HVAC evaporator coil component under test (CUT) separated from associated refrigerant lines (RFL) and depicting installation of flare fittings on the CUT and RFL.

Referencing FIG. 11 (1100), the CUT and RFL are then segmented (1111, 1121) by severing the RFL from the CUT and installing flare fittings (1112, 1113, 1122, 1123) at the CUT/RFL interface. In some circumstances where the CUT/RFL interface already contains male/female flare fittings, the addition of male/female flare fittings (1112, 1113, 1122, 1123) is not necessary and it is only necessary to separate (1111, 1121) the CUT/RFL interface comprising existing flare fittings.

Figure 12:
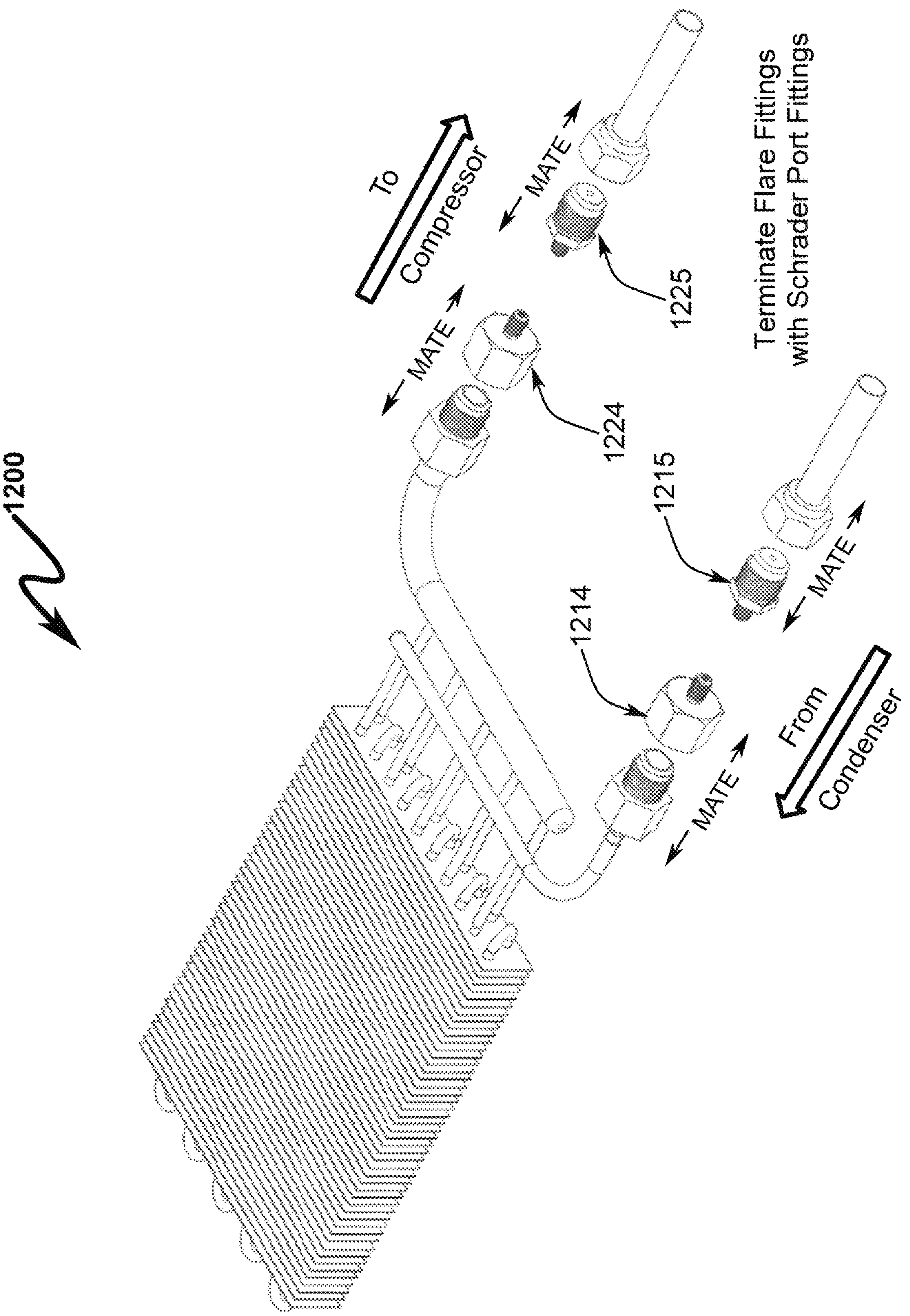
FIG. 12 illustrates a physical application of FIG. 9 depicting a HVAC evaporator coil component under test (CUT) separated from associated refrigerant lines (RFL) and depicting installation of flare fittings on the CUT and RFL with the flare fittings capped with male and female Schrader port fittings (SPF)

Referencing FIG. 12 (1200), the CUT/RFL male/female flare fittings are then mated with opposite-gender Schrader port fittings (SPF) (1214, 1215, 1224, 1225). The SPF (1214, 1215, 1224, 1225) serve to terminate the CUT and REL and provide a known leak-free interface that allows independent and simultaneous pressure testing of the CUT and RFL. The Schrader port valves (SPV) contained in the SPF (1214, 1215, 1224, 1225) permit attachment and detachment of refrigerant pressure gauges (RPG) and/or a dry nitrogen source (DNS) to the CUT and/or RFL.

Referencing FIG. 13 (1300), a typical leak testing scenario is depicted in which a primary set of Schrader ports (1316, 1317) is connected to refrigerant pressure gauges (RPG) (1318, 1319) while a secondary set of Schrader ports (1326, 1327) are connected to a dry nitrogen source (DNS) (1328) via flexible hoses (1329) having female Schrader port terminations. The CUT and RFL can then be independently pressurized to 600 PSI using the DNS (1328) and then the DNS (1328) disconnected from the secondary Schrader ports (1326, 1327). The RPG (1318, 1319) are then monitored for a drop in pressure over a predetermined time interval (typically in the range of 40 minutes, but in some extreme examples may be as long as 24 hours). If a drop in pressure is detected in the RPG (1318, 1319), the corresponding CUT and/or RFL is then known certain to be leaking and should be repaired or replaced as necessary.

It is significant to note that this technique independently determines leaks in the CUT and the RFL. In some circumstances leaks may be detected in BOTH systems. This is the difficulty in prior art leak detection systems as they are not able to isolate leaks to a particular portion of the HVAC system when in fact multiple leaks may be present. Here if the CUT is found to be leak-free but the RFL portion of the system indicates a leak, then leak correction need only be performed on the portion of the system known to be leaking, saving significant time and effort especially with large complex HVAC systems (see FIG. 5 (0500)-FIG. 8 (0800) as an example).

Single-Ended and Dual-Ended Leak Detection

The example provided in FIG. 10 (1000)-FIG. 13 (1300) is an example of what may be termed as "double-ended" leak detection (DED). In this scenario the two interfaces to the CUT and the two interfaces to the RFL are terminated Schrader with fittings port (SPF) and refrigerant pressure gauges (RPG) and dry nitrogen sources (DNS) are attached to the Schrader ports for each of the four SPF. This scenario is termed "double-ended" because each element being tested (CUT/RFL) termination ends connected to a Schrader port fitting (SPF).

In some circumstances the pressure/leak testing can be performed using a "single-ended" (SED) leak detection methodology. In the SED methodology one end of each of the CUT/RFL interfaces is capped either using an adapted flare fitting as described herein (Schrader adapter cap (SAC), Schrader insert cap (SIC), Schrader tube plug (STP), or other fitting described herein) or is clamped shut and brazed/soldered to seal and terminate the end interface. The other end of each of the CUT/RFL interfaces is provided with a Schrader port fitting (SPF) (of which various methodologies are described herein) and the Schrader port associated with the SPF is connected to a Schrader-Schrader-Schrader Tee (SSS) (1340) that allows simultaneous connection of a RPG and DNS to the Schrader port on the SPF. In this scenario the SSS (1340) contains a female Schrader port receptacle and two male Schrader ports than can connect to the RPG and DNS. The DNS as with the double-ended (DED) configuration is only connected to the Schrader port temporarily in order to pressurize the segment under test and then removed to possibly sequentially service other segments under test in the HVAC system.

Schrader Port/Valve Detail (1400)-(1600)

In many preferred invention embodiments described herein a Schrader port assembly (SPA) incorporating a Schrader valve assembly (SVA) is used to terminate refrigerant flow to a HVAC component under test (CUT) and/or refrigerant line (RFL) supplying refrigerant to the CUT. While many Scrader port/Schrader valve combinations are possible, the present invention prefers those depicted in FIG. 14 (1400)-FIG. 15 (1500) and believes these are the best mode for the present invention. FIG. 14 (1400) depicts a Schrader port assembly (SPA) useful in many invention embodiments that comprises a Schrader port fitting (SPF) (with conventional 7/16-20 threading) (1401), Schrader valve assembly (SVA) (1402), sealing O-ring (SOR) (1403), and Schrader port cap (SPC) (1404) (threaded 7/16-20 to mate to the SPF (1401)). The SPC may be configured in a variety of ways including alternate configurations (1405) that include a valve removal tool (VRT) (1406) as depicted in the inset drawing in FIG. 14 (1400).

FIG. 15 (1500) depicts detail of a preferred Schrader valve assembly (SVA) that is commonly used in the HVAC industry and preferred in providing pressure gauge and pressure testing access to the isolated HVAC system components when utilizing the teachings of the present invention. It should be noted that the Schrader valve depicted in FIG. 15 (1500) and incorporated in the Schrader port assembly (SPA) of FIG. 14 (1400) is not shown in the remainder of the drawings for clarity and implied by virtue of the Schrader ports being depicted. One skilled in the art will readily recognize where the addition of Schrader valve assemblies are required in the remainder of the drawings depicted herein.

Segmented Refrigerant Leak Isolation Method Overview (1600)

Figure 16:
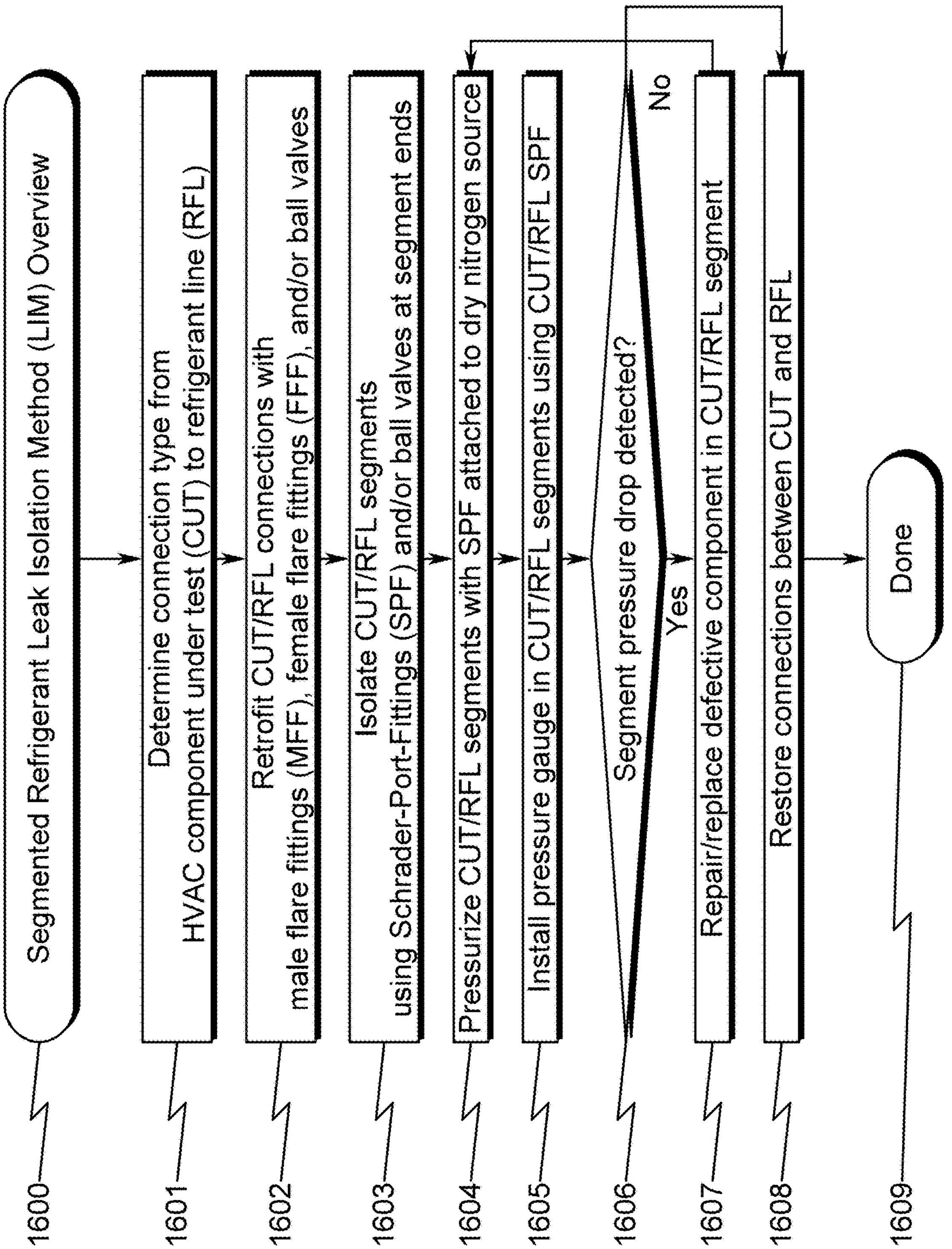
FIG. 16 illustrates a flowchart depicting a Segmented Refrigerant Leak Isolation Method (LIM) Overview.

The following provides a general discussion of a present invention preferred exemplary leak isolation technique. As generally depicted in FIG. 16 (1600), the present invention anticipates a Segmented Refrigerant Leak Isolation Method (LIM) comprising the following steps:

(1) Determining the connection type from a HVAC component under test (CUT) to refrigerant line (RFL) (1601);
(2) Retrofitting CUT/RFL connections with male flare fittings (MFF), female flare fittings (FFF), and/or ball valves (1602);
(3) Isolating CUT/RFL segments using Schrader-Port-Fittings (SPF) and/or ball valves at segment ends (1603);
(4) Pressurizing CUT/RFL segments with SPF attached to a dry nitrogen source (DNS) (1604);
(5) Installing pressure gauges in CUT/RFL segments using CUT/RFL SPF (1605);
(6) Determining if there is a segment pressure drop detected over a predetermined time interval, and if not, proceeding to step (8) (1606);
(7) Repairing/replacing defective HVAC components in CUT/RFL segments and proceeding to step (4) (1607);
(8) Restoring connections between CUT and RFL (1608); and
(9) Terminating the LIS leak detection method (1609).

This general method may be modified heavily depending on a number of factors, with rearrangement and/or addition/deletion of steps anticipated by the scope of the present invention without departing from the teachings of the present invention. Integration of this and other preferred exemplary embodiment methods in conjunction with a variety of preferred exemplary embodiment systems described herein is anticipated by the overall scope of the present invention.

Leak Isolation Method Detail (1700)-(2400)

Figure 17:
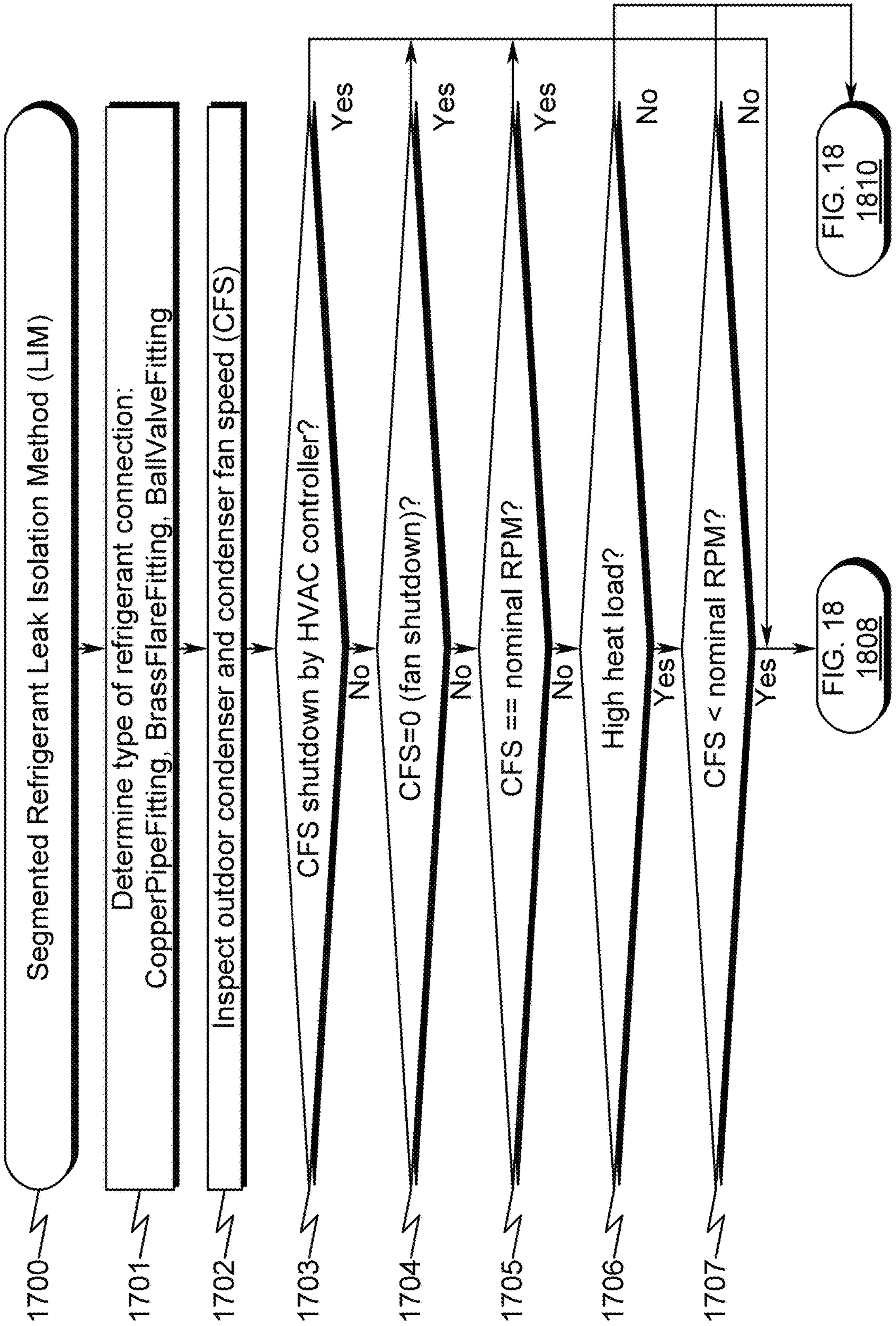
FIG. 17 illustrates a flowchart depicting a Segmented Refrigerant Leak Isolation Method (LIM) (1 of 2) useful in some preferred invention embodiments.
Figure 18:
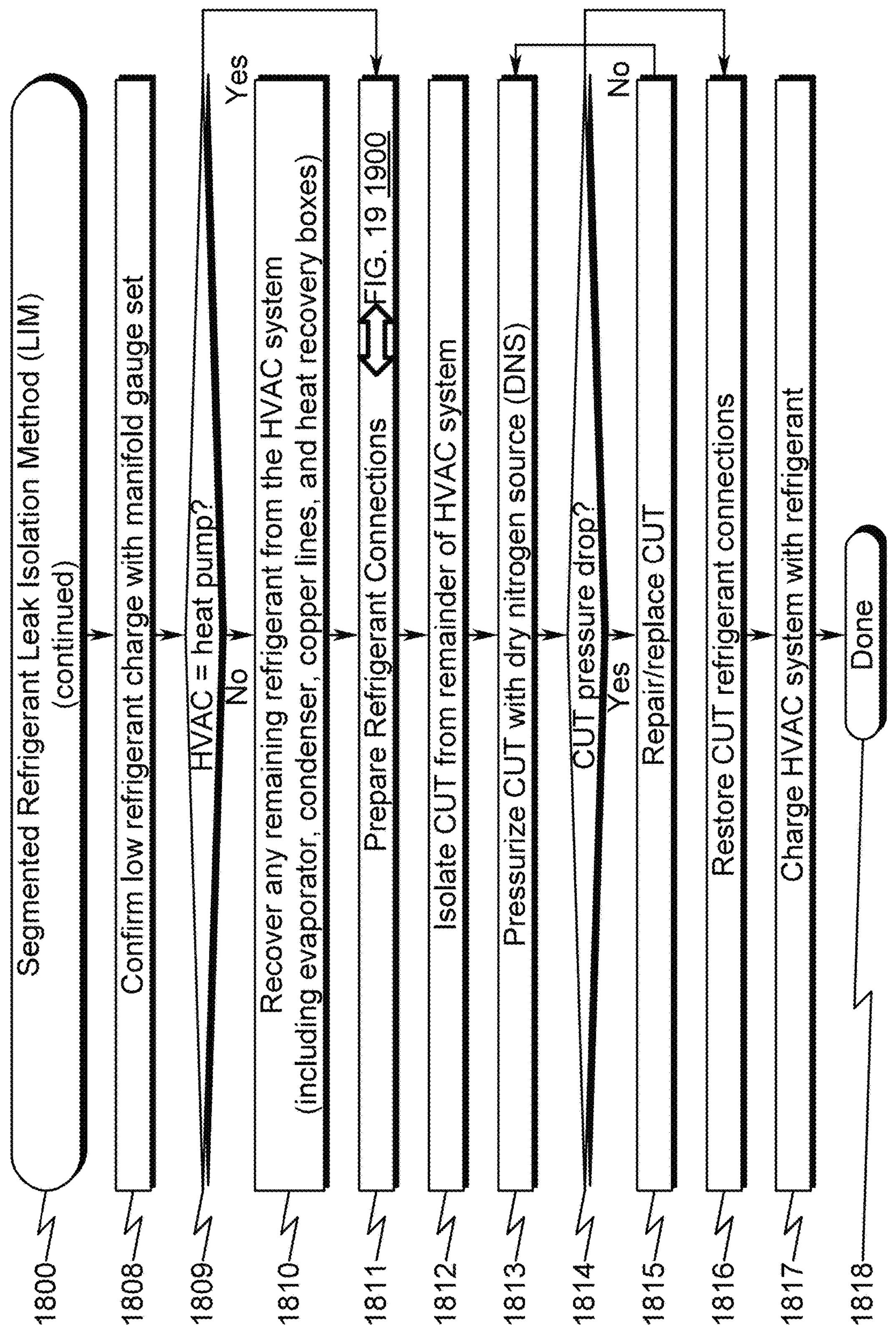
FIG. 18 illustrates a flowchart depicting a Segmented Refrigerant Leak Isolation Method (LIM) (2 of 2) useful in some preferred invention embodiments.
Figure 19:
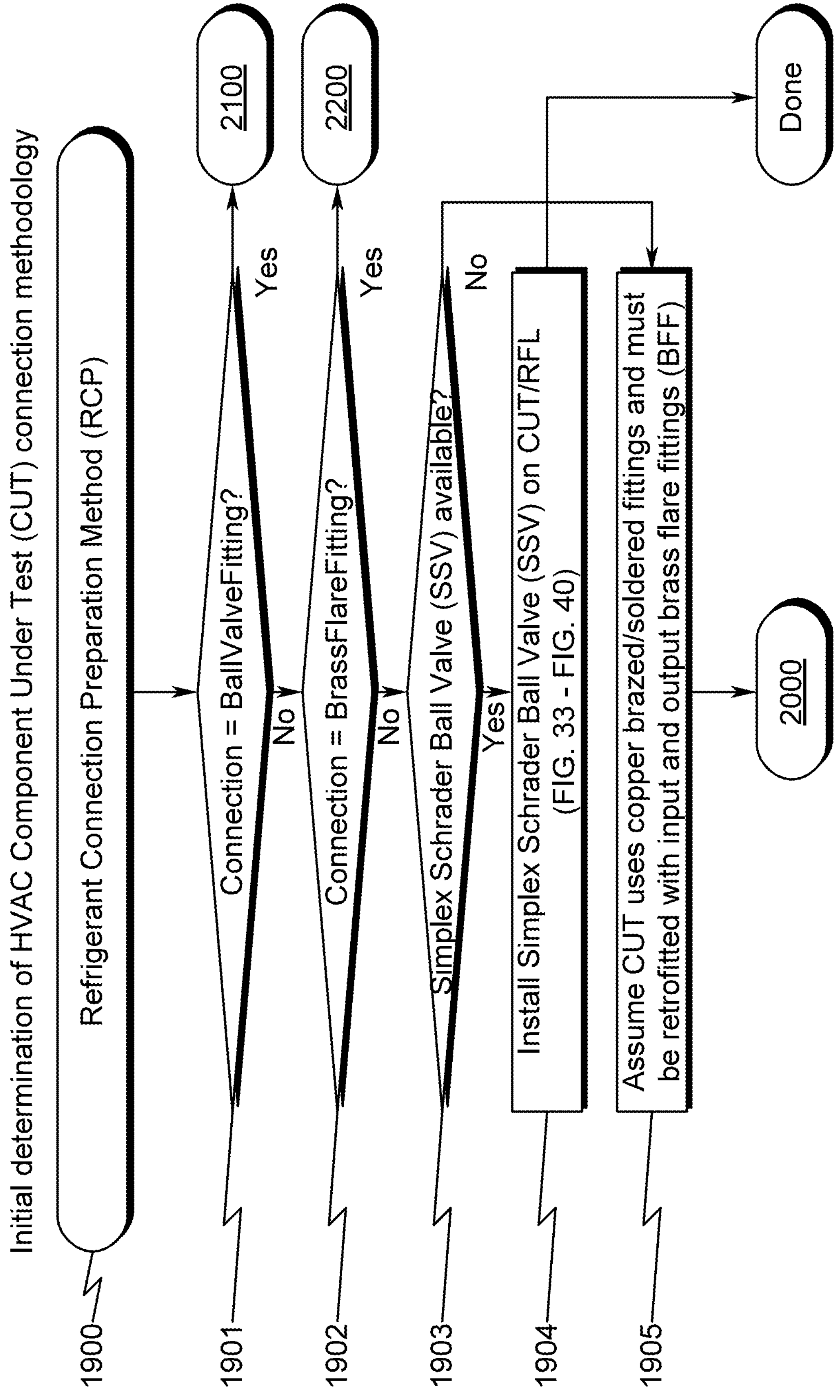
FIG. 19 illustrates a flowchart depicting a Refrigerant Connection Preparation Method (RCP) useful in some preferred invention embodiments.
Figure 20:
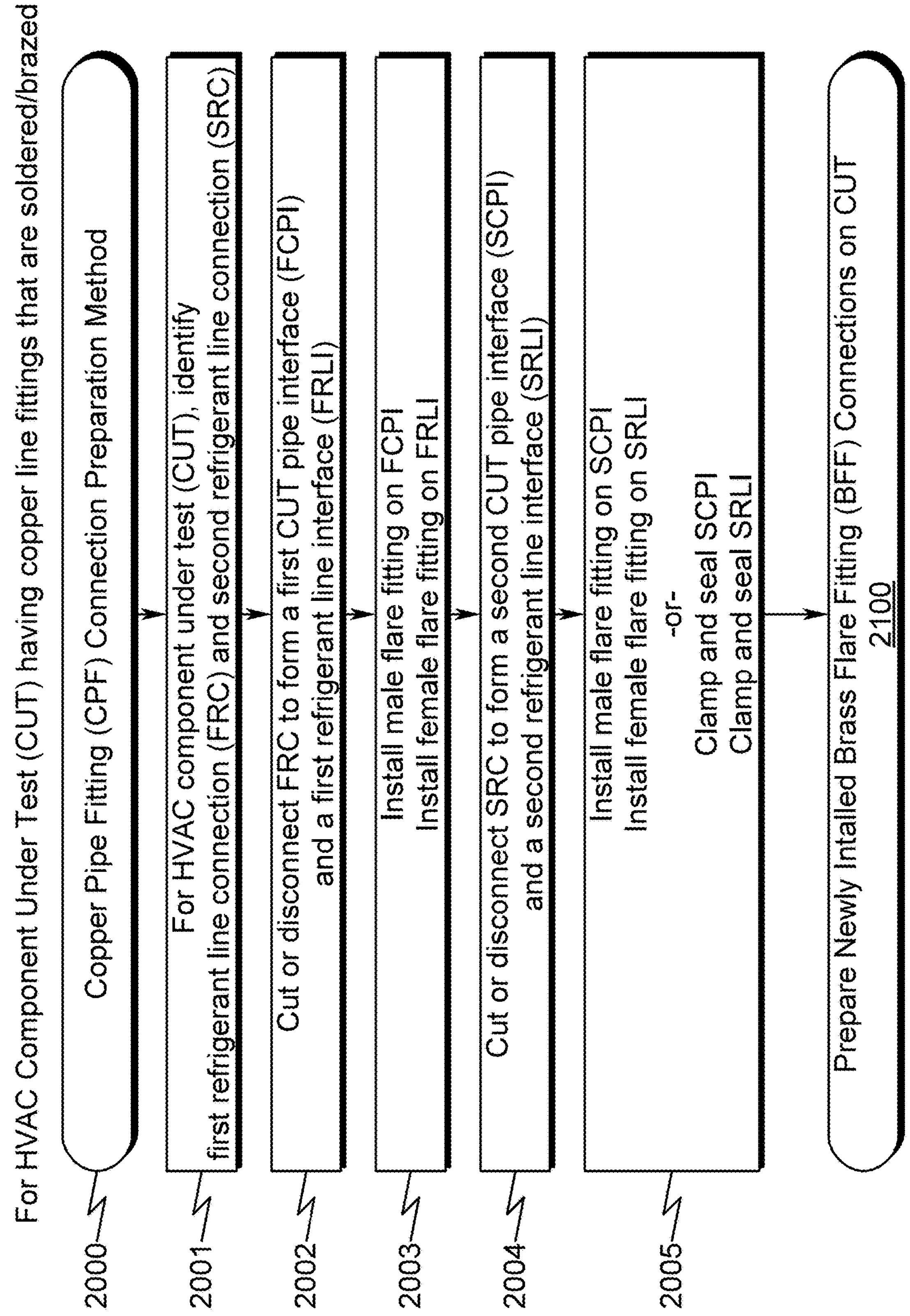
FIG. 20 illustrates a flowchart depicting a Copper Pipe Fitting (CPF) Connection Preparation Method useful in some preferred invention embodiments.
Figure 21:
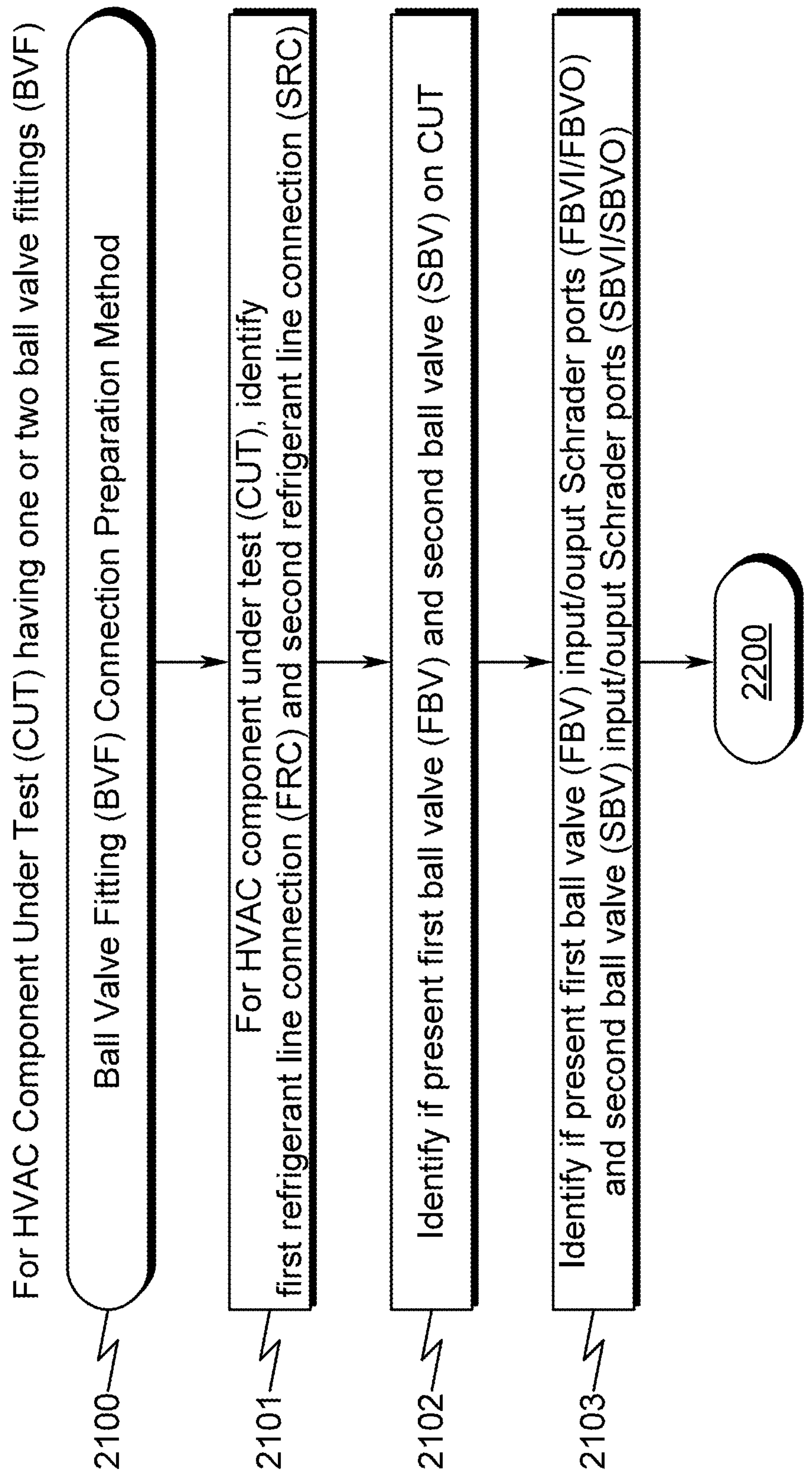
FIG. 21 illustrates a flowchart depicting a Ball Valve Fitting (BVF) Connection Preparation Method (1 of 3) useful in some preferred invention embodiments.
Figure 22:
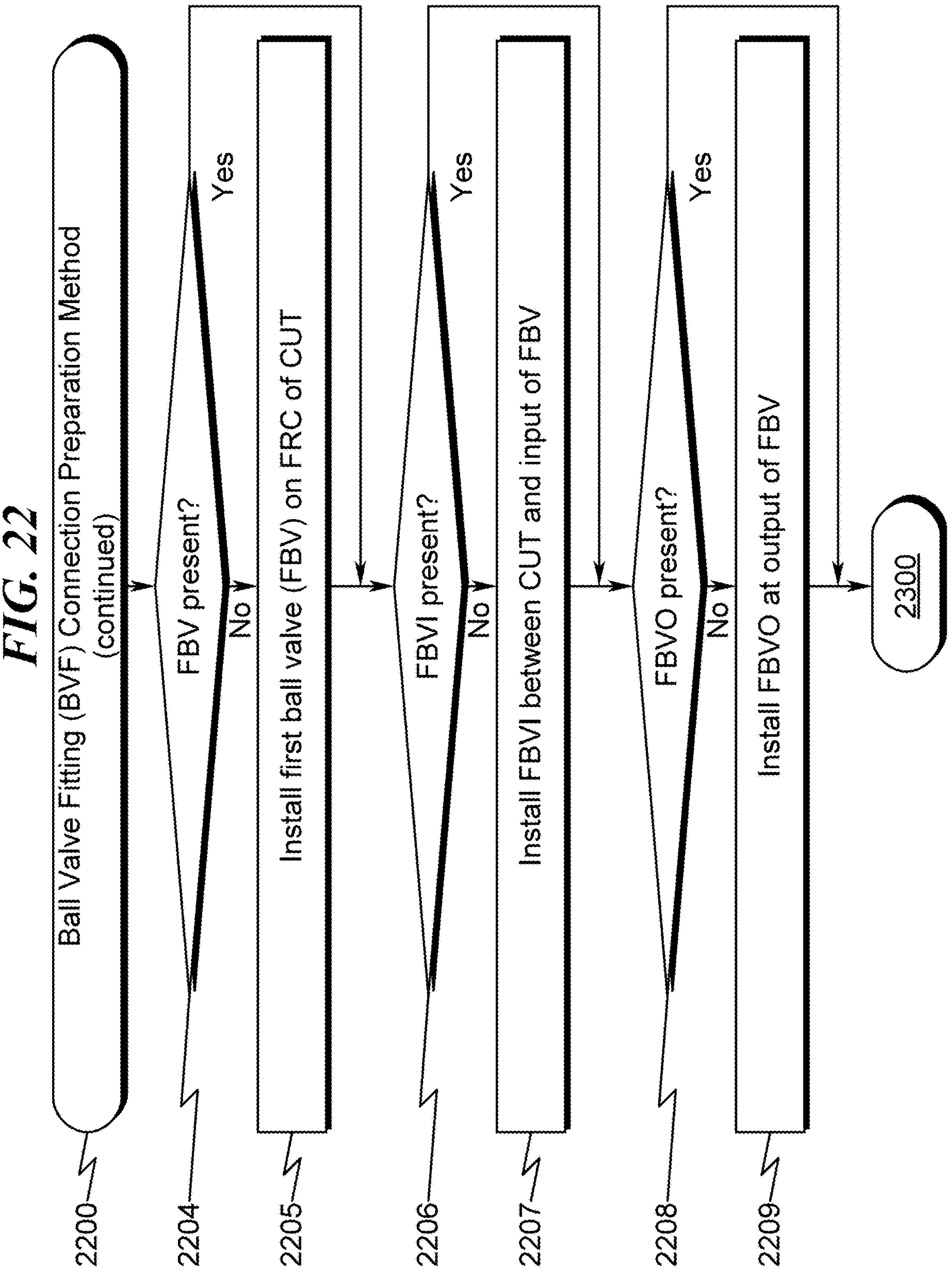
FIG. 22 illustrates a flowchart depicting a Ball Valve Fitting (BVF) Connection Preparation Method (2 of 3) useful in some preferred invention embodiments.
Figure 23:
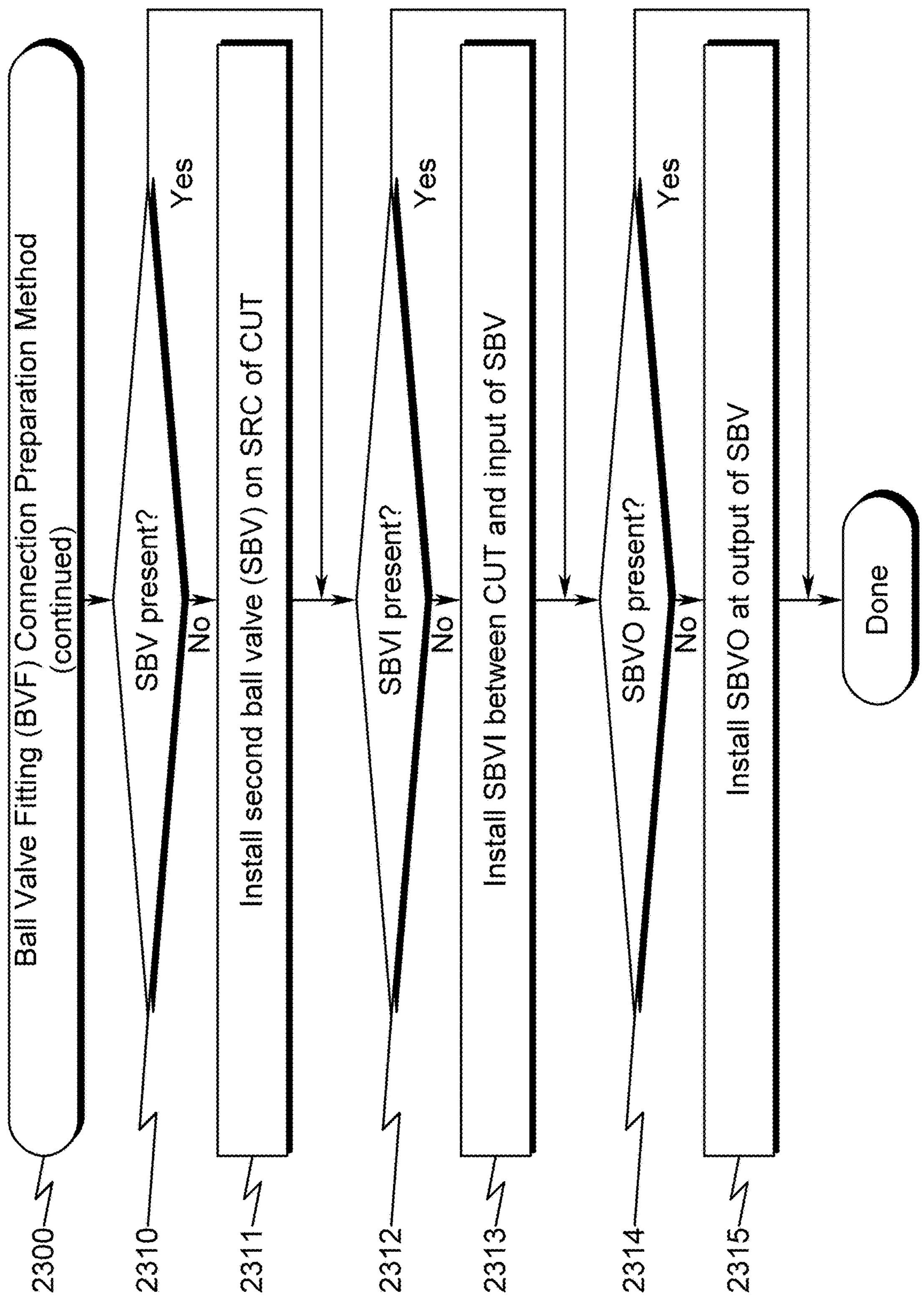
FIG. 23 illustrates a flowchart depicting a Ball Valve Fitting (BVF) Connection Preparation Method (3 of 3) useful in some preferred invention embodiments.
Figure 24:
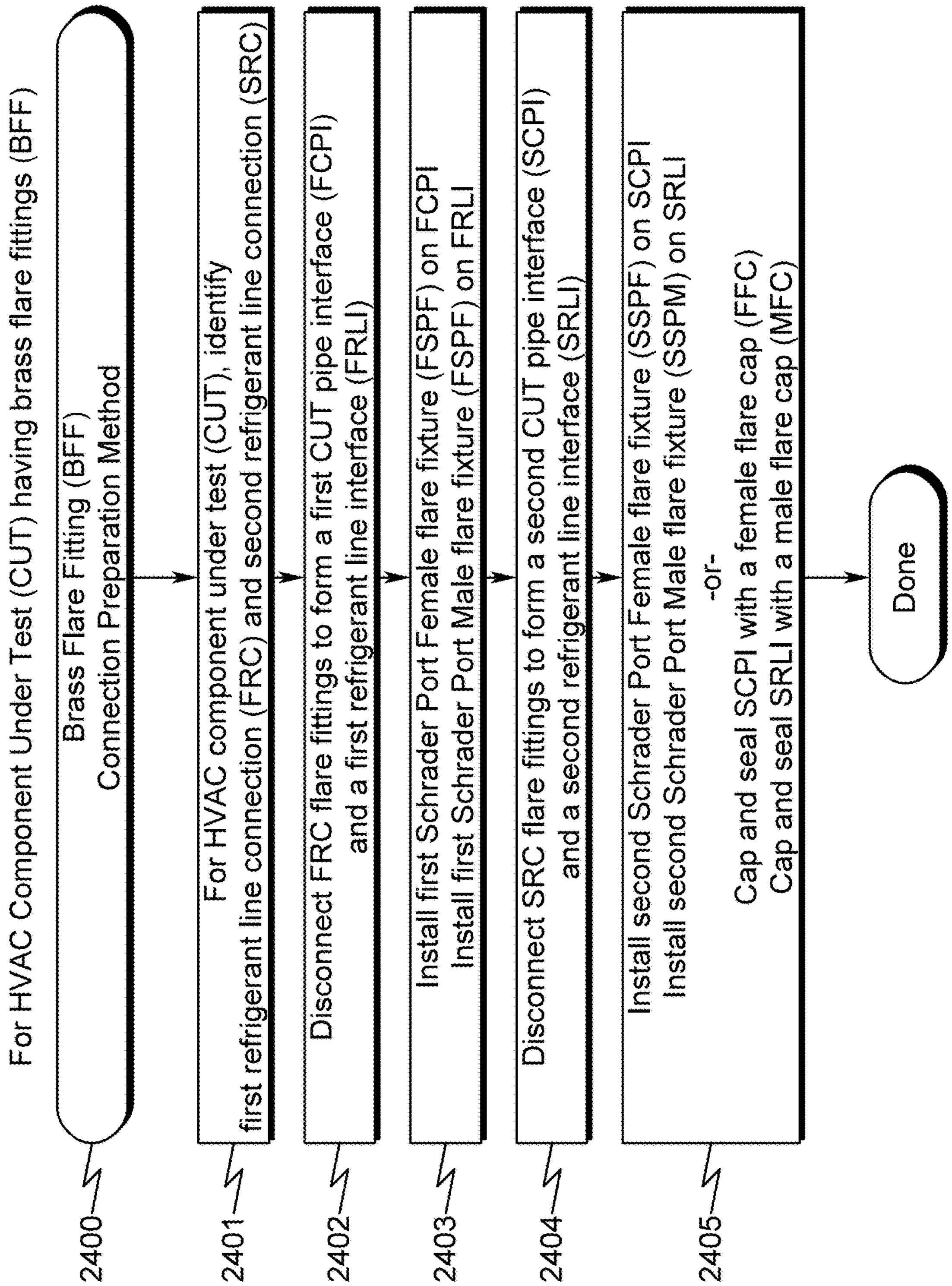
FIG. 24 illustrates a flowchart depicting a Brass Flare Fitting (BFF) Connection Preparation Method useful in some preferred invention embodiments.

The following discussion provides detail of a present invention preferred exemplary leak isolation technique and follows the flowcharts depicted in FIG. 17 (1700)-FIG. 24 (2400).

Upon arriving at the job site, the contractor should assess whether the VRF system has sweated copper lines, ball valves, flare nuts. Approaching the outdoor condenser, the operation of the outdoor fans are observed and a visual inspection of the condenser fans is performed. On hot days, these fans should be running at high RPMs, particularly with a high heat load in the building. If the refrigerant charge is low, the fans will rotate slowly as the system struggles to push refrigerant to each zone for cooling. Eventually, the HVAC system software will shut down the condenser, showing an error code for low refrigerant charge or high discharge temperature, indicating insufficient refrigerant in the system. The contractor should then confirm the low charge with a manifold gauge set.

Next, any remaining refrigerant from the host system is recovered, including the condenser, copper lines, indoor air handlers, and heat recovery boxes if applicable. For heat pump systems, the recovered refrigerant is not reused, as it is often gas rather than liquid. Dry nitrogen gas in 255 cubic foot tanks is used to pressure test the system at 500 to 600 PSI to locate leaks.

The present invention anticipates that the best mode for all HVAC systems should have ball valves at the air handlers instead of at the branch boxes. While there are differing opinions from design engineers in the industry, the present invention anticipates that this approach is more effective than that currently used in the prior art and within the HVAC industry in general.

If the HVAC copper pipes are sweated, this is the least cost-effective installation and design, and this HVAC system configuration is the hardest to test with increased labor costs associated with finding a refrigerant leak in the HVAC system. After recovering the refrigerant, the service valves on the outdoor condenser (which may have two or three service valves depending on the system) are front seated. The copper lines at the air handlers are cut/severed and Schrader port assemblies are installed on one side of the evaporator coils while soldering the other side shut (or alternatively affixing a Schrader plug/cap). This allows pressurizing the evaporator coil up to 600 PSI. A high-pressure gauge is installed on that copper line to monitor the pressure on the air handler, accounting for any loss when removing the manifold gauge line. This procedure is performed on every air handler.

The next step is to pinch off and solder (or otherwise terminate using techniques taught herein) the other side of the copper line to the evaporator coil. For the copper lines transitioning to a roof HVAC CUT, if possible, a dry nitrogen tank is placed on the roof structure and the lines from the roof are pressure tested through the Schrader ports on the condenser service valves. If roof access is difficult or not possible, a Schrader valve port is installed on one of the copper line sets on the floor where the CUT is located. This allows testing the copper piping to determine if there is a leak in the pipe or evaporator coil, with 95% to 98% of leaks typically found in the evaporator coil. During this stage, all copper lines are isolated from the air handlers and under pressure, allowing a nominal time of approximately 40 minutes to inspect for leaks. This leak inspection time may vary based on HVAC application context up to approximately 24 hours.

Once the refrigerant leak is located, ball valves are installed on the evaporator coil. This enables isolation of the leaking indoor coil, time to order a new evaporator from the manufacturer, the ability to restore the remainder of the VRF system to proper operation. In these situations the indoor air handler for a specific location in the building structure will be inoperative, but the remainder of the structure serviced by the VRV system will be fully operational. It is far more preferable to have the HVAC system inoperative for one room in a large building structure than the entire HVAC system the entire structure. After receiving the new coil, it is installed to replace the old coil, and the new coil is evacuated along with a few feet of copper line sets. The ball valves are then opened and HVAC operation to the previously isolated room is fully restored. The segmentation and isolation methodology taught above is particularly useful in large commercial HVAC installations that typically service hotels and like building structures.

The present invention advocates installing ball valves on the system for all air handlers. This modification allows easy reconnection of the copper line sets to the air handlers and pressure testing the VRF system whenever another leak occurs.

The procedure above is slightly modified if the HVAC system already incorporates ball valves within the refrigerant loop. The present invention anticipates that this is an optimal HVAC VRF system design. The initial site visit and procedures remain the same. High-pressure gauges are first installed on all ball valves connected to the air handlers. When the VRF systems have ball valves, a pressure test is performed on the entire system without cutting any copper. The whole VRF system is then pressurized, including the condenser, to 500 to 600 PSI, monitoring pressure via installed high-pressure gauges on both the condensers and air handlers while shutting off the ball valve.

At this point, high pressure gauges are installed on the condenser up stream of the service ports, the manifold gauges on the service ports and high-pressure gauges on all air handlers are installed, and then the ball valves are turned off to isolate the various HVAC CUT/RFL segments.

At this point the individual manifold gauges can be monitored to determine if there is a pressure drop in any of the isolated segments. If a pressure drop is detected, is leaking, and the particular CUT/RFL then that segment can be replaced or repaired as needed. Once this replacement/repair is complete, the ball valves are opened and the system repressurized. The ball valves are then closed and pressure monitoring continues until all isolated segments show no pressure drop over a predetermined period of time. Any drop in pressure indicates a CUT/RFL leak and is addressed individually. Once all leaks are found the ball valves are opened, the system evacuated and recharged with refrigerant, and the HVAC system restored to normal operation.

Single-Port Schrader-Ball-Valve (2500)-(2600)

Figure 25:
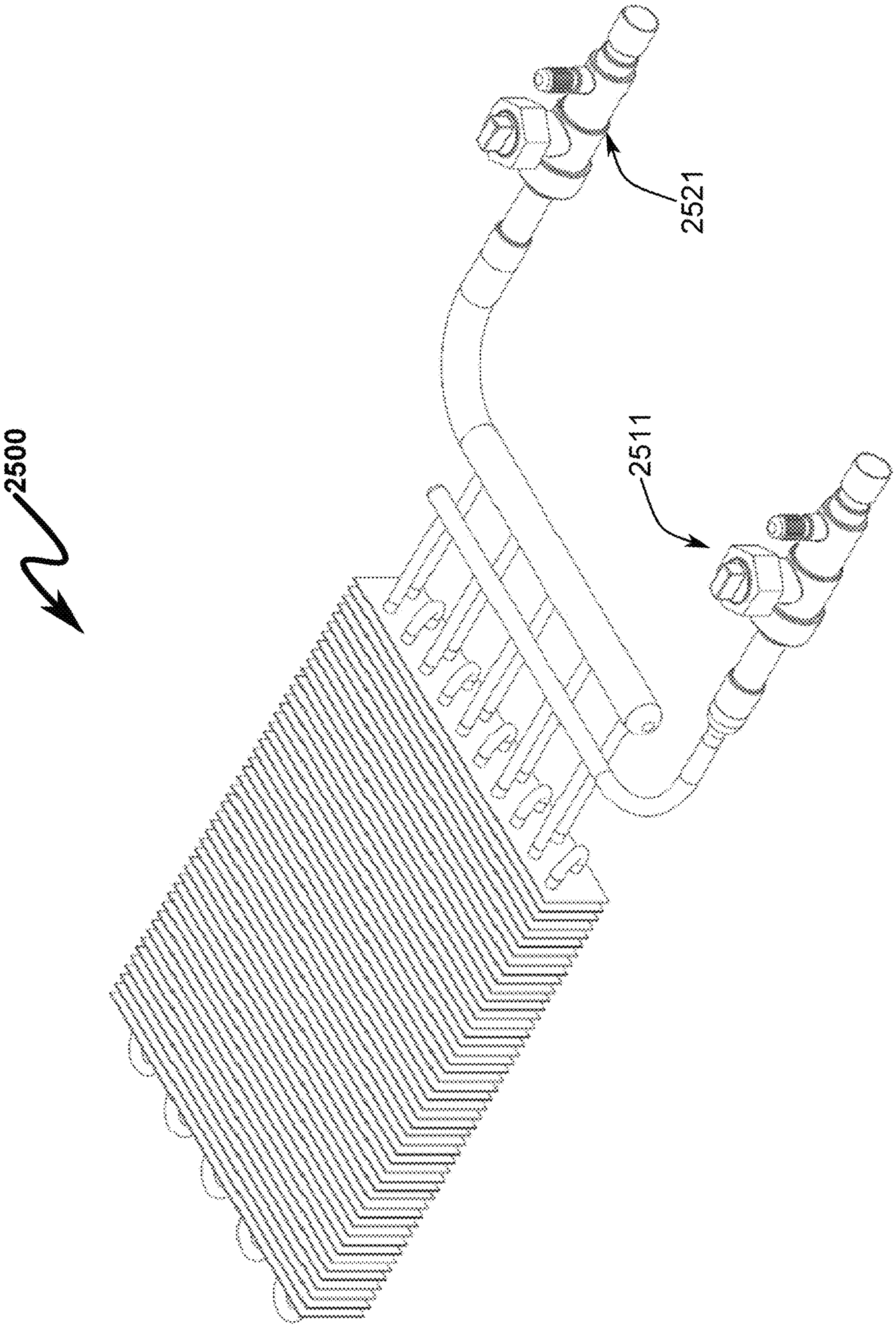
FIG. 25 illustrates a conventional HVAC evaporator coil component under test (CUT) fitted with ball valve fittings incorporating a single Schrader port.

In some HVAC configurations some of the HVAC components may be configured with ball valves to allow the refrigerant to be isolated from a particular HVAC component or set of refrigerant lines. A subset of these configurations may incorporate a Schrader port on one side of the ball valve as generally illustrated in FIG. 25 (2500). Unfortunately, these configurations do not permit pressure testing of the individual HVAC component under test (CUT) as well as the associated refrigerant lines (RFL) that service the CUT thru the ball valve.

In situations where the ball valve is configured with a Schrader port, it is not possible to pressure test the CUT or RFL on the OTHER side of the ball valve opposite the Schrader port. Oftentimes ball valves having a Schrader port are installed such that the Schrader port is not useable to isolate an individual CUT in the HVAC system. In these situations, the prior art provides no solution to address these deficiencies in leak testing methodology.

The present invention provides one methodology to address this by either replacing the existing ball valve with a newly constructed ball valve having two Schrader ports (noting that these are not commercially available in the prior art and only single Schrader port ball valves are currently manufactured), or augmenting a current Schrader port ball valve having a single Schrader port with an additional Schrader port on the opposite side of the existing Schrader port on the ball valve.

Figure 26:
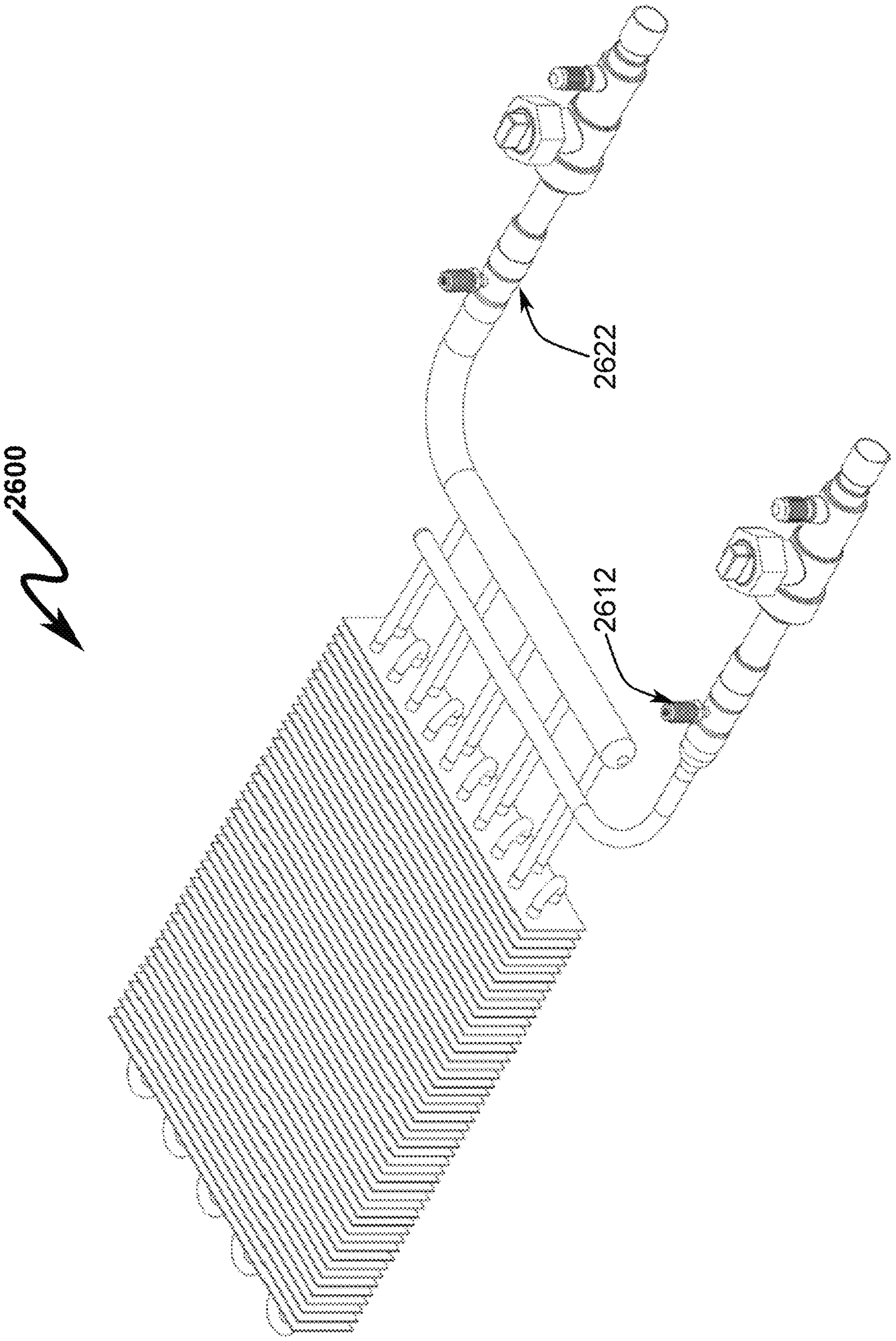
FIG. 26 illustrates a conventional HVAC evaporator coil component under test (CUT) fitted with ball valve fittings incorporating a single Schrader port that has been augmented with a Schrader-Copper-Tee to allow pressure testing of the CUT.

Reference FIG. 26 (2600) that depicts an exemplary single-port Schrader ball valve with Schrader-copper-T augmentation (2612, 2622) that overcomes the isolation issues associated depicted in FIG. 25 (2500). As shown, the segmentation and isolation of the CUT and RFL depicted in FIG. 25 (2500) may be accomplished by a variety of means detailed in this document, including the addition of a Schrader-Copper-T (FIG. 41 (4100)-FIG. 48 (4800)), Schrader Saddle Tap (FIG. 49 (4900)-FIG. 56 (5600)), or Schrader Viper Tap (FIG. 57 (5700)-FIG. 64 (6400)). One skilled in the art will quickly recognize that a variety of novel techniques taught by the present invention may be used to overcome the segmentation/isolation issued present in FIG. 25 (2500) and similarly-constructed HVAC system components.

By implementing the segmentation as generally depicted in FIG. 26 (2600), the testing procedures depicted in FIG. 9 (0900)-FIG. 13 (1300) may be readily implemented to locate and isolate a leaking HVAC CUT or RFL.

Dual-Port Schrader-Ball-Valve (2700)

Figure 27:
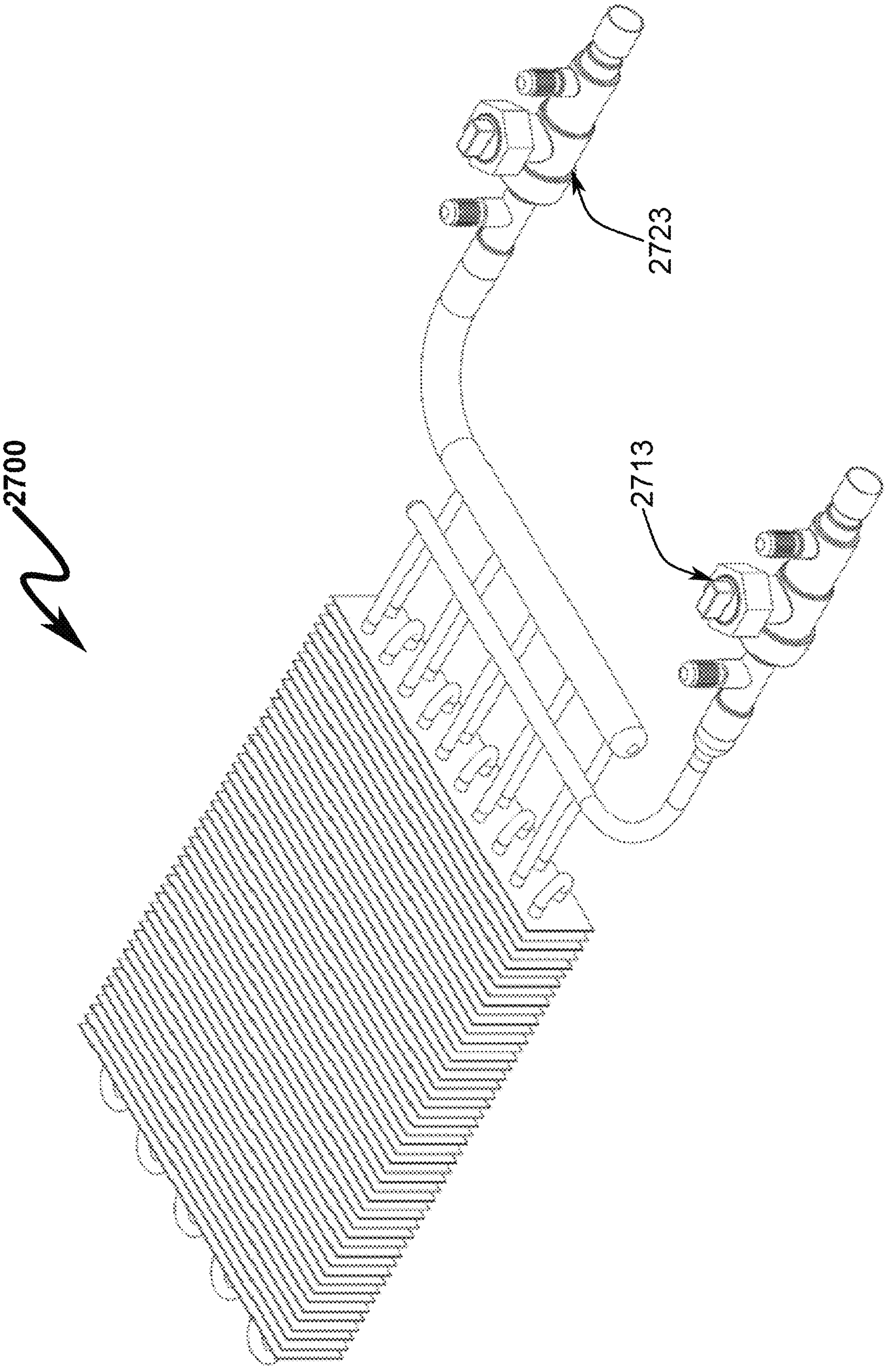
FIG. 27 illustrates a conventional HVAC evaporator coil component under test (CUT) that has been retrofitted with ball valve fittings incorporating dual Schrader ports.

As an alternative to augmenting the single-port Schrader ball valve as generally depicted in FIG. 26 (2600), the original single-port Schrader ball valve can be replaced as generally depicted in FIG. 27 (2700) with ball valves (2713, 2723) having two Schrader ports termed a dual-port Schrader ball valve. These valves are not commercially available, but one skilled in the art would be able to construct such a device given the diagrams provided herein.

The advantage of this approach is that once installed, the dual-port Schrader ball valve allows both the CUT and RFL to be independently tested in the future without any need of additional plumbing reconfiguration in the HVAC system. If the dual-port Schrader ball valves are configured with flare fittings then this permits the CUT and/or RFL to be disconnected from the system if a leak is detected without the need for brazing/soldering after the failing component is removed from the HVAC system.

Simplex Schrader Ball Valve (2800)-(4000)

Figure 28:
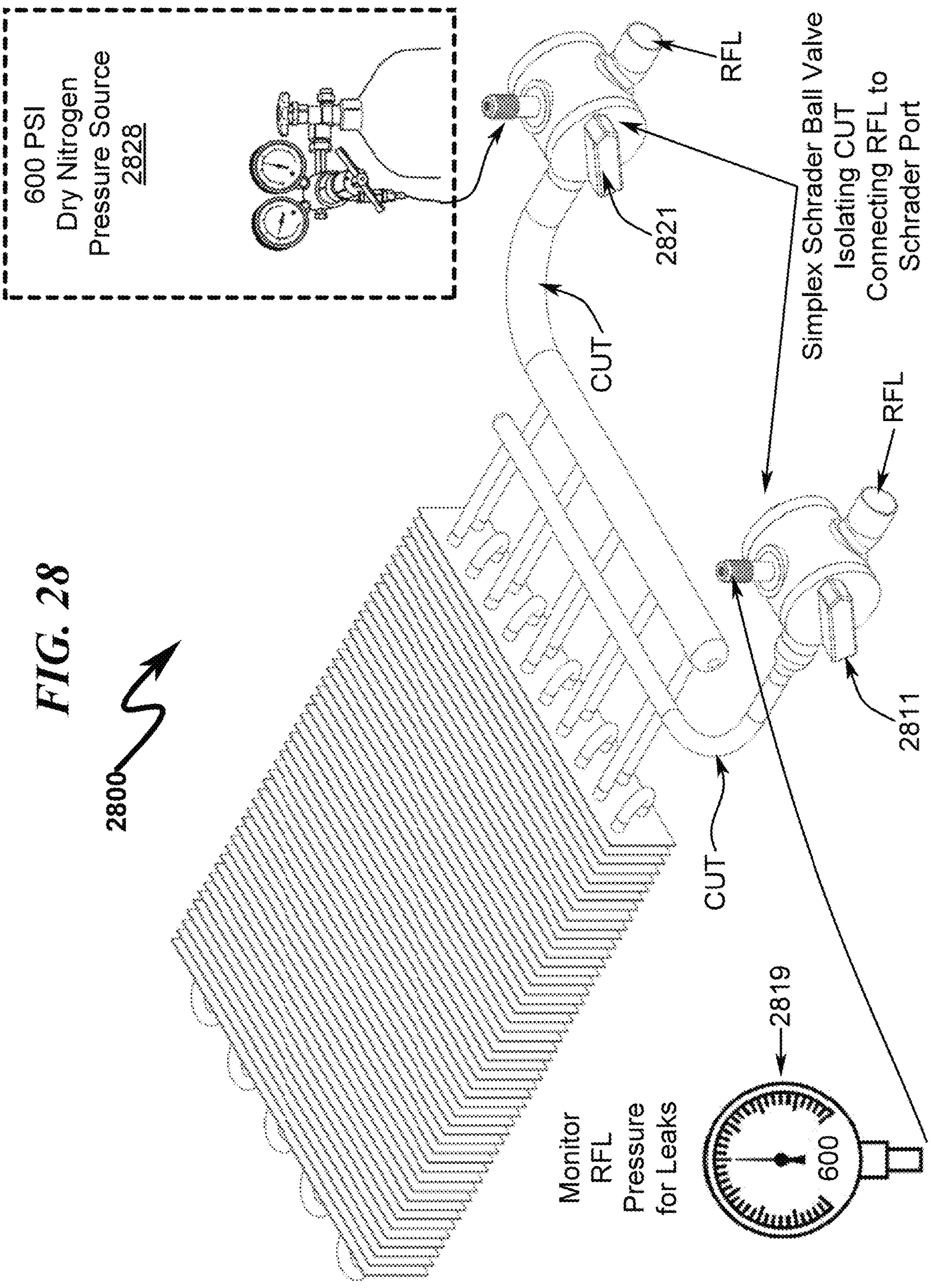
FIG. 28 illustrates a conventional HVAC evaporator coil component under test (CUT) and associated refrigerant lines (RFL) that have been retrofitted with simplex Schrader ball valve (SSV) assemblies with the SSV ball valves positioned to allow gas flow from the Schrader valve assemblies on each SSV to the respective RFL connections.

In many circumstances the HVAC configuration comprises CUT/RFL configurations that are spatially compact, making retrofitting of these systems with flare fittings, ball valves, and other fittings necessary to implement refrigerant leak testing difficult. In these scenarios, the present invention teaches the use of a simplex Schrader ball valve (SSV) as generally depicted in FIG. 28 (2800) FIG. 40 (4000). This specially constructed ball valve is compact and incorporates an input port, output port, and Schrader port. The ball valve is constructed to have operational modes that permit the Schrader port to be linked to the input port or the output port as well as providing a pass-thru mode in which the input and output ports are connected to allow refrigerant flow between them.

Figure 40:
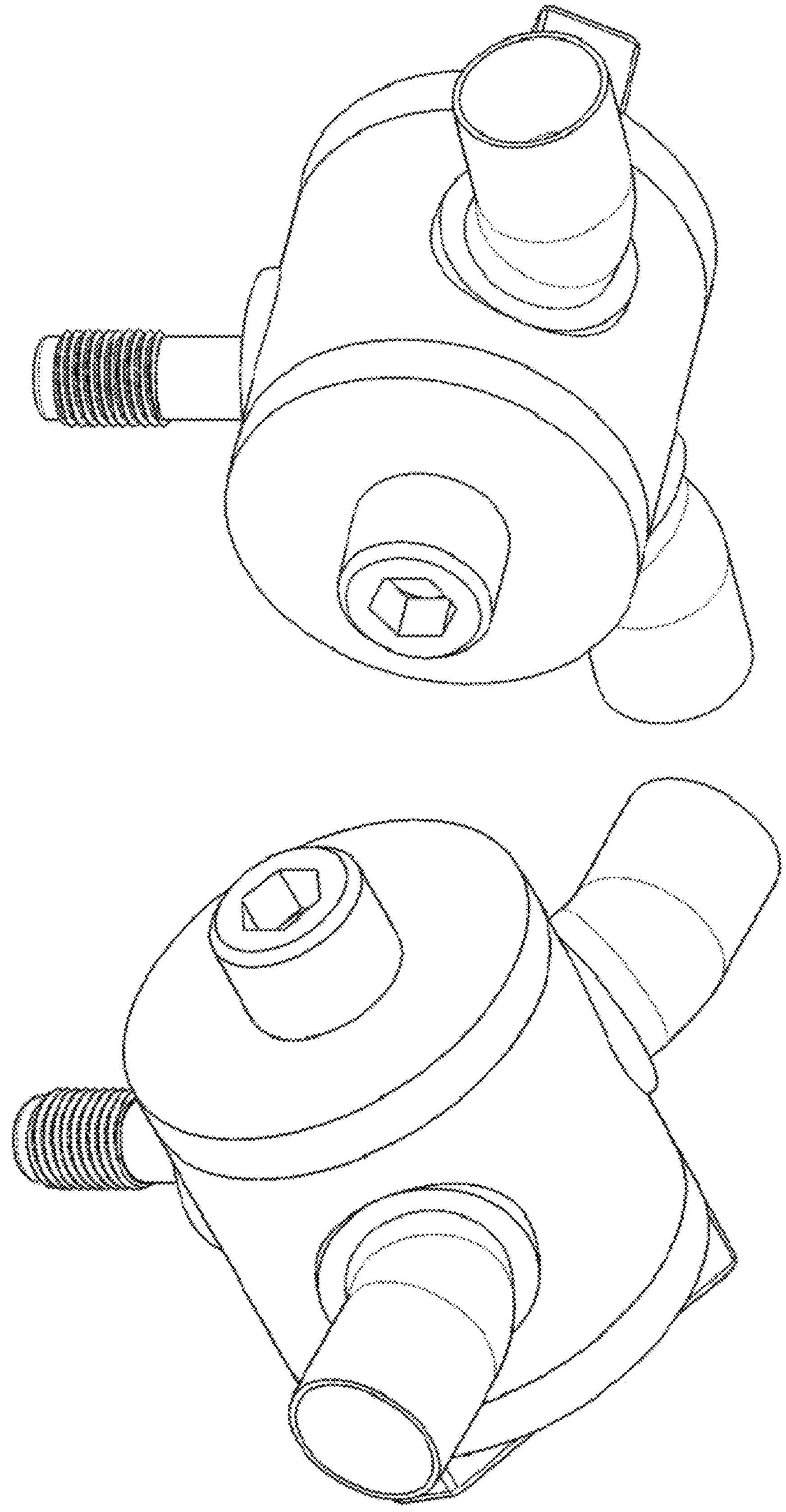
FIG. 40 illustrates left bottom side and right bottom side perspective views of a preferred exemplary embodiment of a simplex Schrader ball valve (SSV) assembly useful in some preferred invention embodiments.

While many methods of implementing the LIS TAP (0931, 0932) and LIS CAP (0933, 0934) are possible, one preferred embodiment thought to be best mode is generally illustrated in FIG. 28 (2800)-FIG. 40 (4000). In this preferred exemplary embodiment, the functionality of the LIS TAP and LIS CAP are combined in a specially configured unitized refrigerant diversion valve (RDV) identified as a simplex Schrader ball valve (SSV). This SSV is configured with a first refrigerant port (FRP), a second refrigerant port (SRP), and a Schrader valve port (SVP) and may have up to five operational modes:

[1] A first operational mode in which flow is allowed only between the first refrigerant port (FRP) and the Schrader valve port (SVP).

[2] A second operational mode in which flow is allowed only between the second refrigerant port (SRP) and the Schrader valve port (SVP).

[3] A third operational mode in which flow is allowed only between the first refrigerant port (FRP) and the second refrigerant port (SRP).

[4] A fourth operational mode in which flow is allowed between the first refrigerant port (FRP), the second refrigerant port (SRP), and the Schrader valve port (SVP). This mode may not be present in some preferred embodiments.

[5] A fifth operational mode in which flow is inhibited between the first refrigerant port (FRP), the second refrigerant port (SRP), and the Schrader valve port (SVP). This mode may not be present in some preferred embodiments.

The SSV operates differently than conventional prior art tri-port ball valves in that the conventional tri-port ball valves having a L-diversion configuration only support modes [1] and [2] above and T-diversion configurations only support modes [1], [2], and [4]. This corollary between the modes listed above and a conventional prior art tri-port valve is only by illustration, as no commercially available tri-port valve is configured with the diversion port configured as a Schrader valve port.

In some preferred embodiments the SSV may be configured to operate only in modes [1], [2], and [3], thus preventing any leakage from the Schrader valve port (SVP) when the SSV is configured for normal HVAC operation in a non-leak-testing refrigerant pass-thru mode. Thus, this specific construction and associated operational modes enables the Schrader valve port (SVP) to be positively sealed by the BVA during pass-thru mode [3], thus preventing any inadvertent refrigerant leakage from the Schrader valve contained within the SVP.

It should be noted that SSV as described above is not available in the commercial marketplace. However, one skilled in the mechanical arts given the description above will be able to construct such a device.

Referencing FIG. 28 (2800), the SSV depicted (2811, 2812) are configured with the three-way ball valve oriented as shown to allow mode [1] gas flow only between the Schrader port assemblies depicted and the RFL depicted. This permits the DNS source (2828) to be applied to the RFL only and the pressure gauge (2819) to monitor only RFL pressure. The CUT is isolated in this configuration. This permits both isolation of the CUT as well as independent testing of the RFL for leaks.

Figure 29:
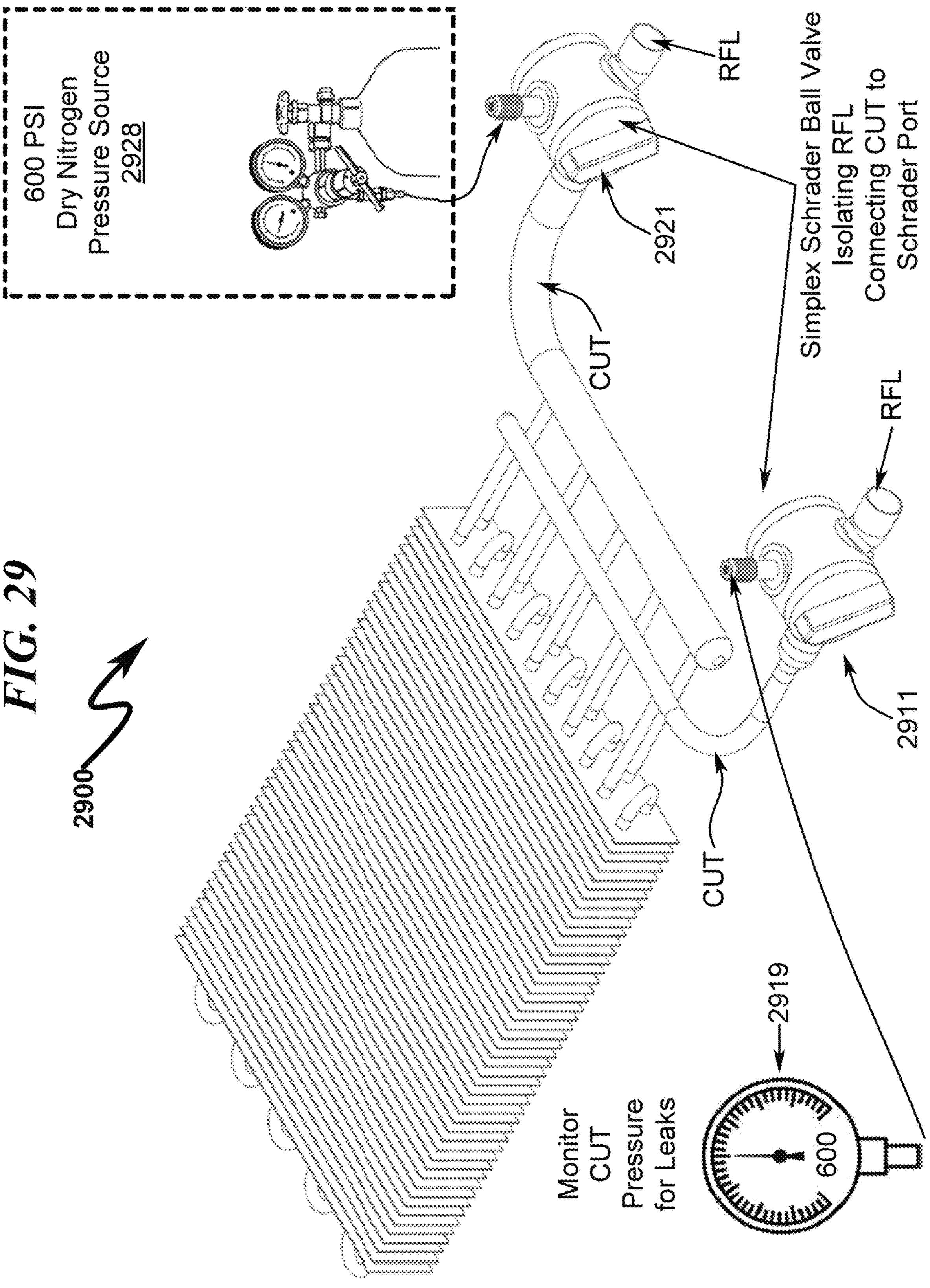
FIG. 29 illustrates a conventional HVAC evaporator coil component under test (CUT) and associated refrigerant lines (RFL) that have been retrofitted with simplex Schrader ball valve (SSV) assemblies with the SSV ball valves positioned to allow gas flow from the Schrader valve assemblies on each SSV to the respective CUT connections.

Referencing FIG. 29 (2900), the SSV depicted (2911, 2912) are configured with the three-way ball valve oriented as shown to allow mode [2] gas flow only between the Schrader port assemblies depicted and the CUT depicted. This permits the DNS source (2928) to be applied to the CUT only and the pressure gauge (2919) to monitor only CUT pressure. The RFL is isolated in this configuration. This permits both isolation of the RFL as well as independent testing of the CUT for leaks.

Figure 30:
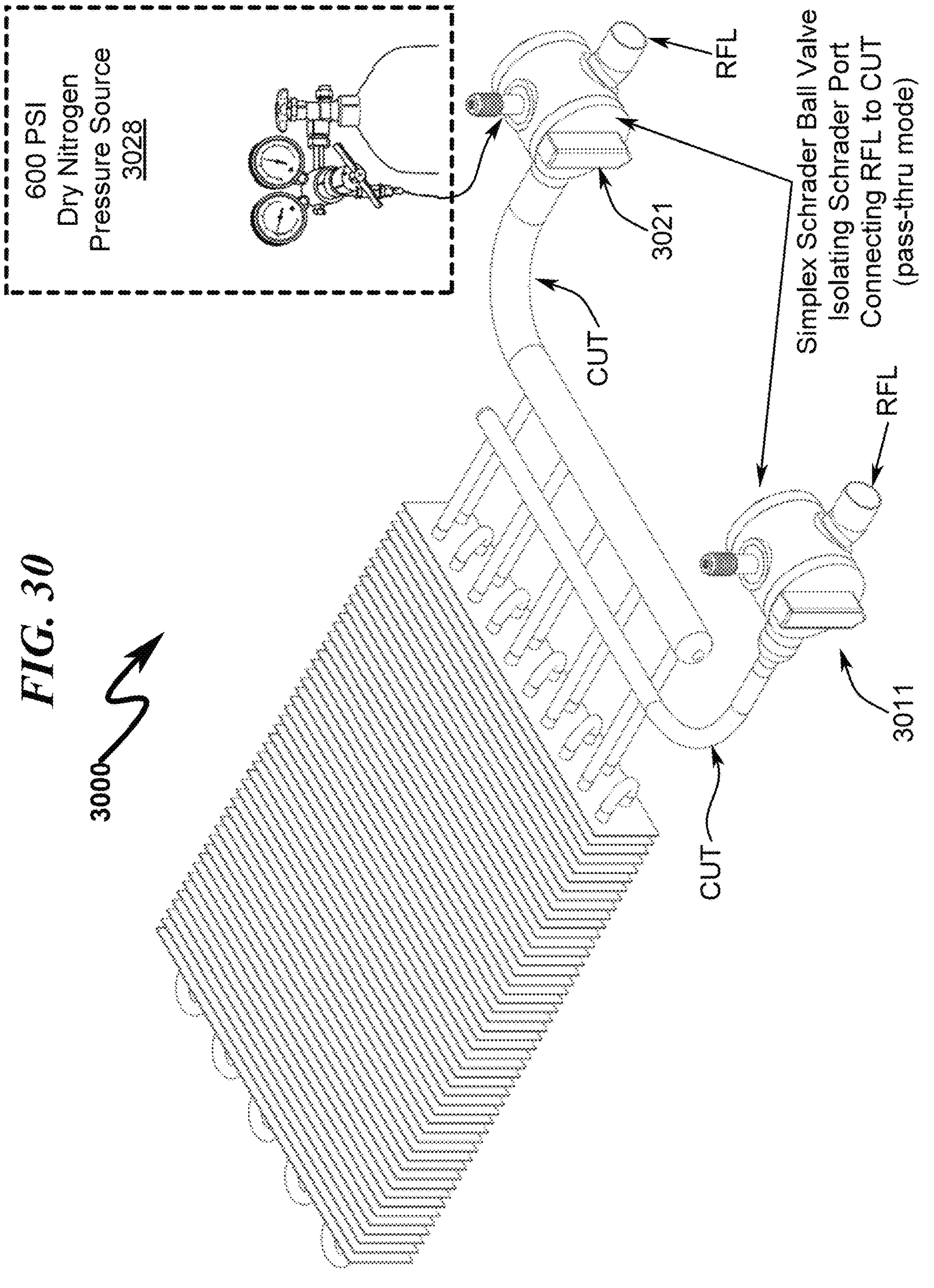
FIG. 30 illustrates a conventional HVAC evaporator coil component under test (CUT) and associated refrigerant lines (RFL) that have been retrofitted with simplex Schrader ball valve (SSV) assemblies with the SSV ball valves positioned to allow gas flow from the Schrader valve assemblies on each SSV to the respective CUT connections.

Referencing FIG. 30 (3000), the SSV depicted (3011, 3012) are configured with the three-way ball valve oriented as shown to allow mode [3] gas flow only between the RFL depicted and the CUT depicted. This mode isolates the Schrader port assembly and seals this port for normal HVAC operation. Note that this configuration ensures that even if the Schrader valve assembly is leaking that the Schrader port will not leak refrigerant once the pass-thru mode is configured. The addition of a Schrader port cap (as detailed in FIG. 14 (1400, 1404, 1405) provides additional protection against Schrader port leakage.

It should be noted that mode [5] may be invoked as a variant of that depicted in FIG. 30 (3000) where the ball valve indicator is rotated 180 degrees with the valve pointe up. In this mode all ports are isolated.

The SSV as depicted herein has a number of significant advantages over other alternatives present in the prior art as well as the novel approaches presented elsewhere in this document. Firstly, the SSV is compact and can be installed in situations where refrigerant line clearances are limited. Secondly, it reduces the number of connections in the system and thus the potential for refrigerant leaks. Third, it more cost effective both in terms of material and labor than individual plumbing parts to achieve the same result. Lastly, the isolation functionality possible with the SSV is not available in any of the prior art ball valve configurations.

It should be noted that the exemplary construction of the SSV may be adapted to a variety of application contexts and thus the exact construction may vary somewhat. Specifically, while the design shown incorporates a cylindrical valve assembly, the use of a conventional ball valve that has been tri-ported is also anticipated. Additionally, the design may incorporate internal seals within the valve mechanism to ensure a leak-proof design. For clarity of depiction in the drawings, these seals are not depicted in the drawings.

Figure 31:
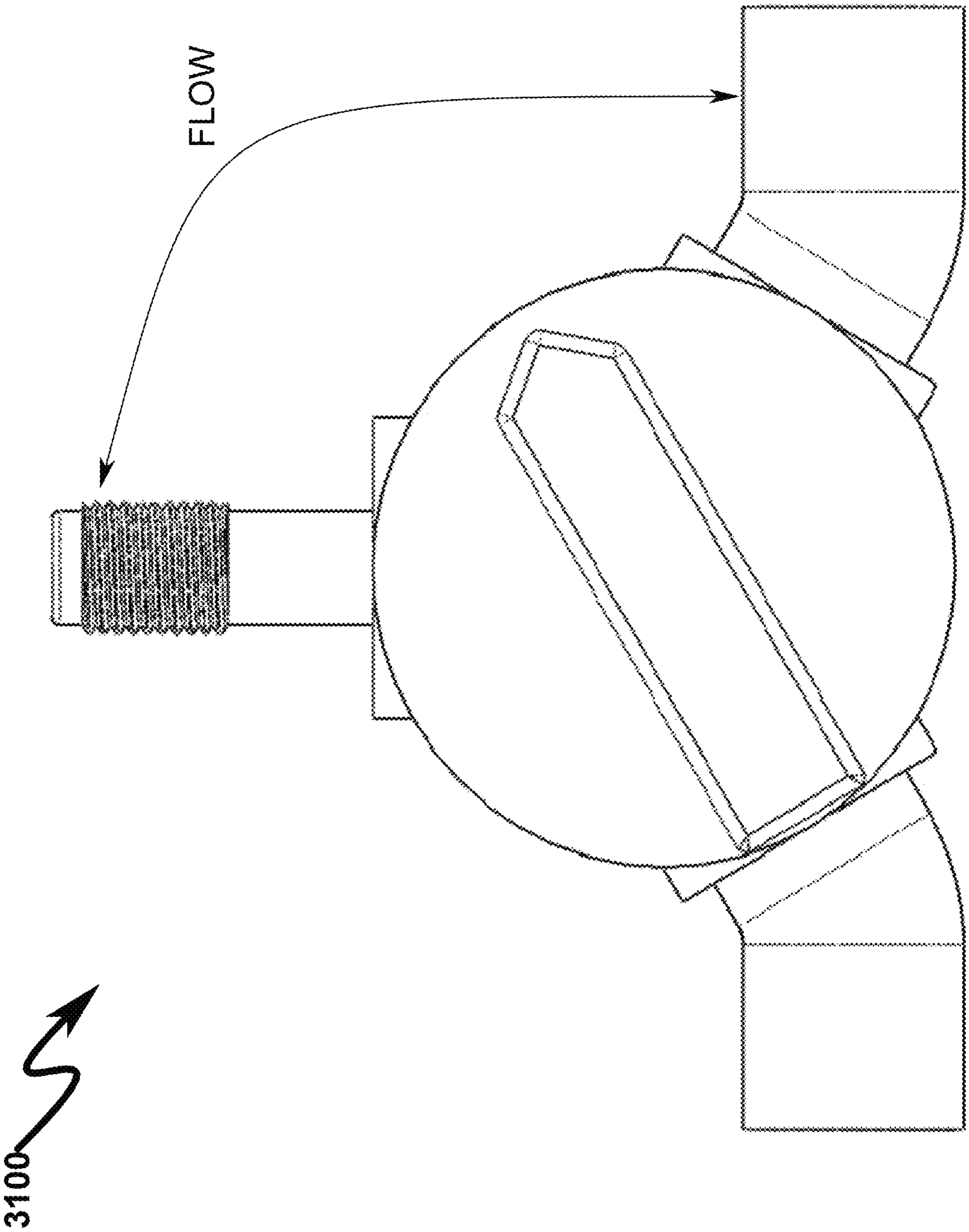
FIG. 31 illustrates a simplex Schrader ball valve (SSV) assembly configured for mode [1] operation.
Figure 32:
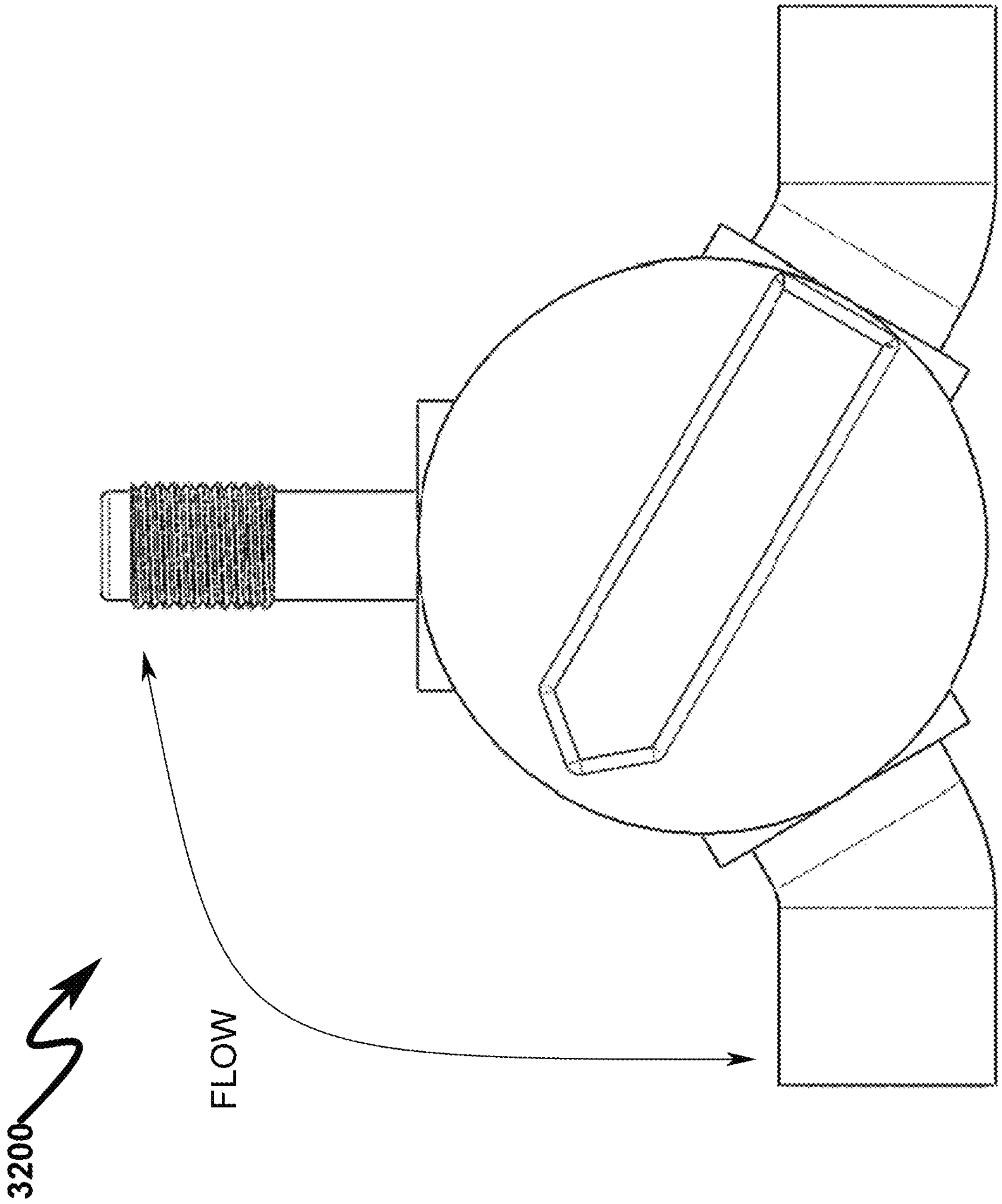
FIG. 32 illustrates a simplex Schrader ball valve (SSV) assembly configured for mode [2] operation.
Figure 33:
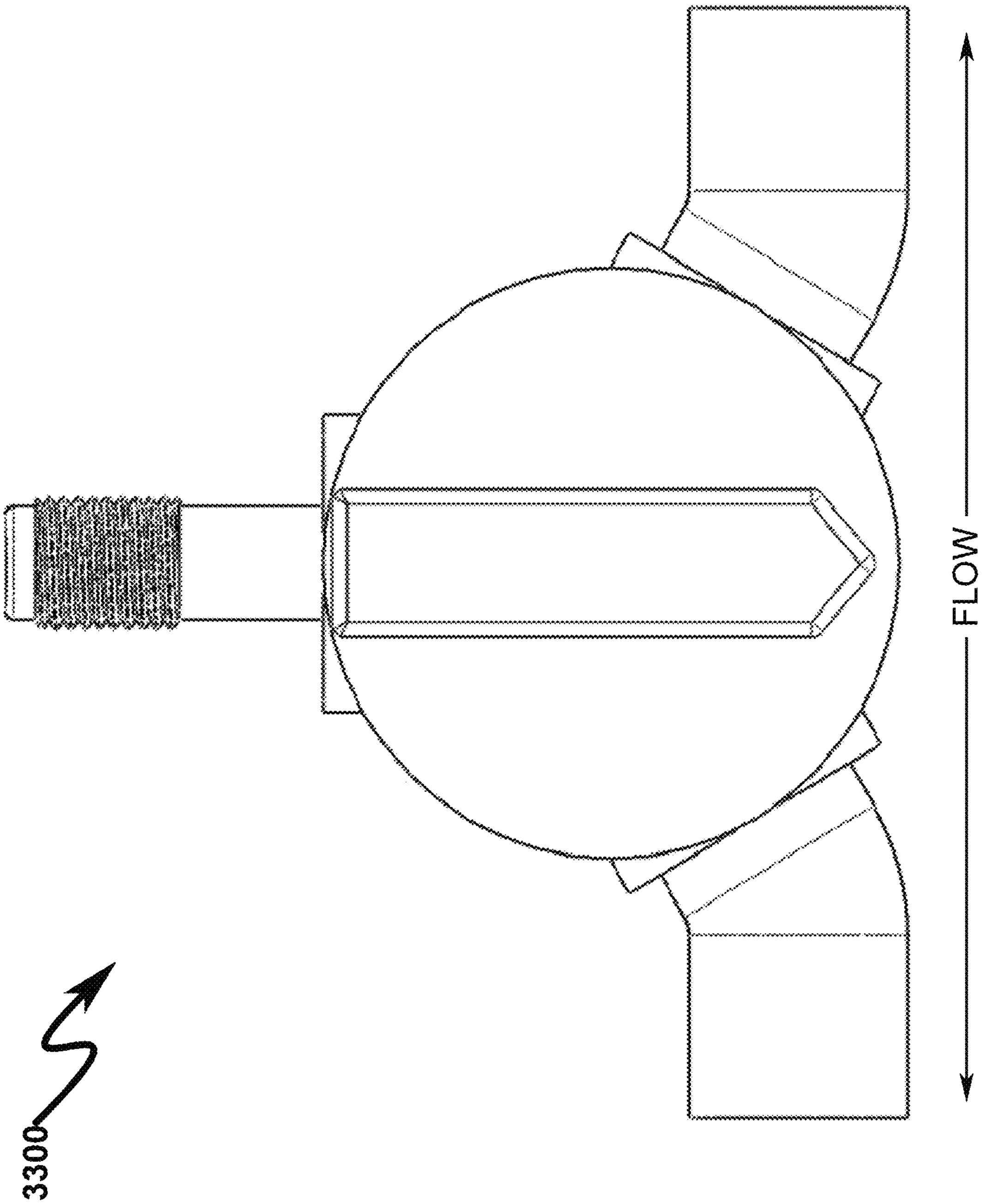
FIG. 33 illustrates a simplex Schrader ball valve (SSV) assembly configured for mode [3] operation.
Figure 34:
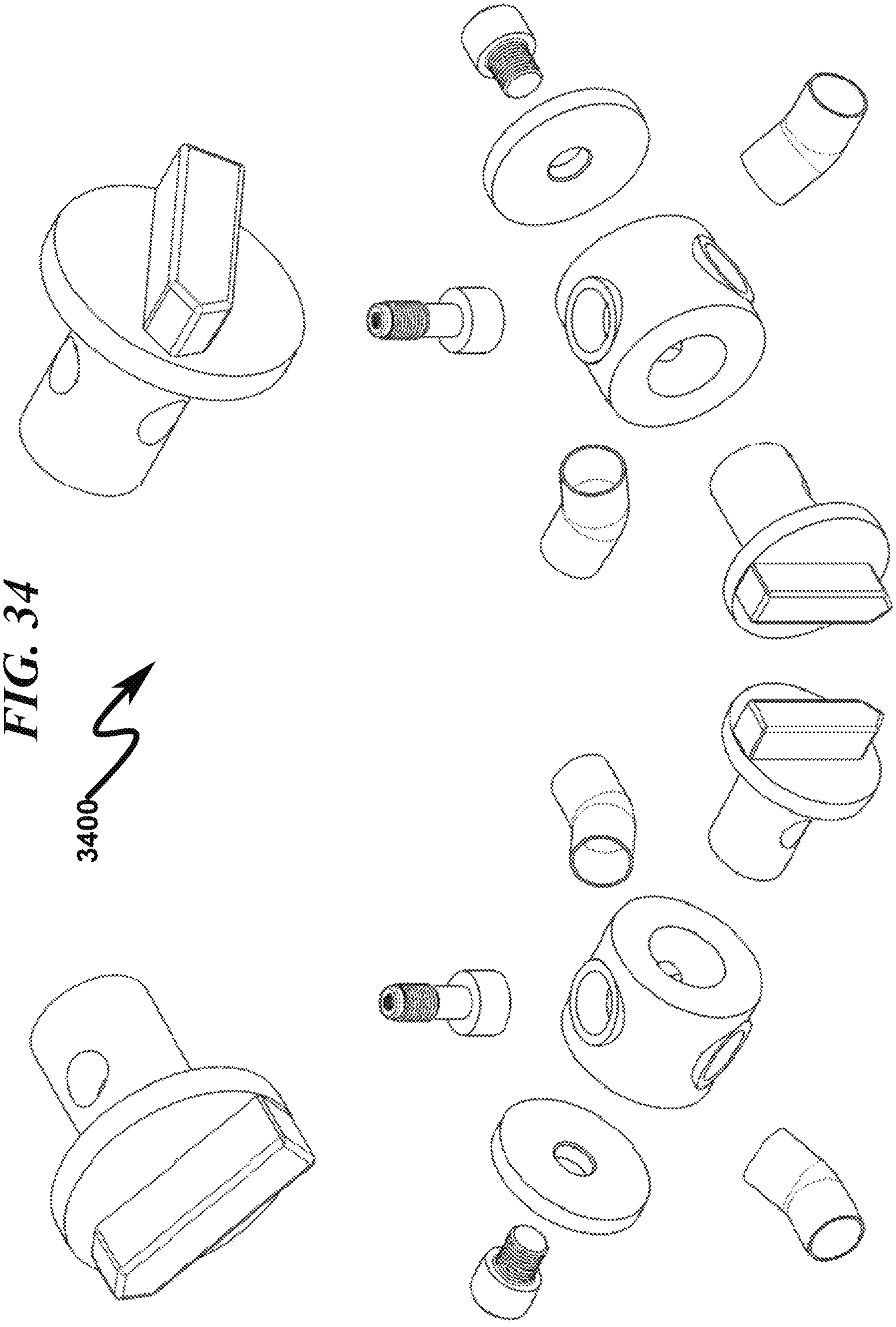
FIG. 34 illustrates perspective assembly views of a preferred exemplary simplex Schrader ball valve (SSV) assembly.
Figure 35:
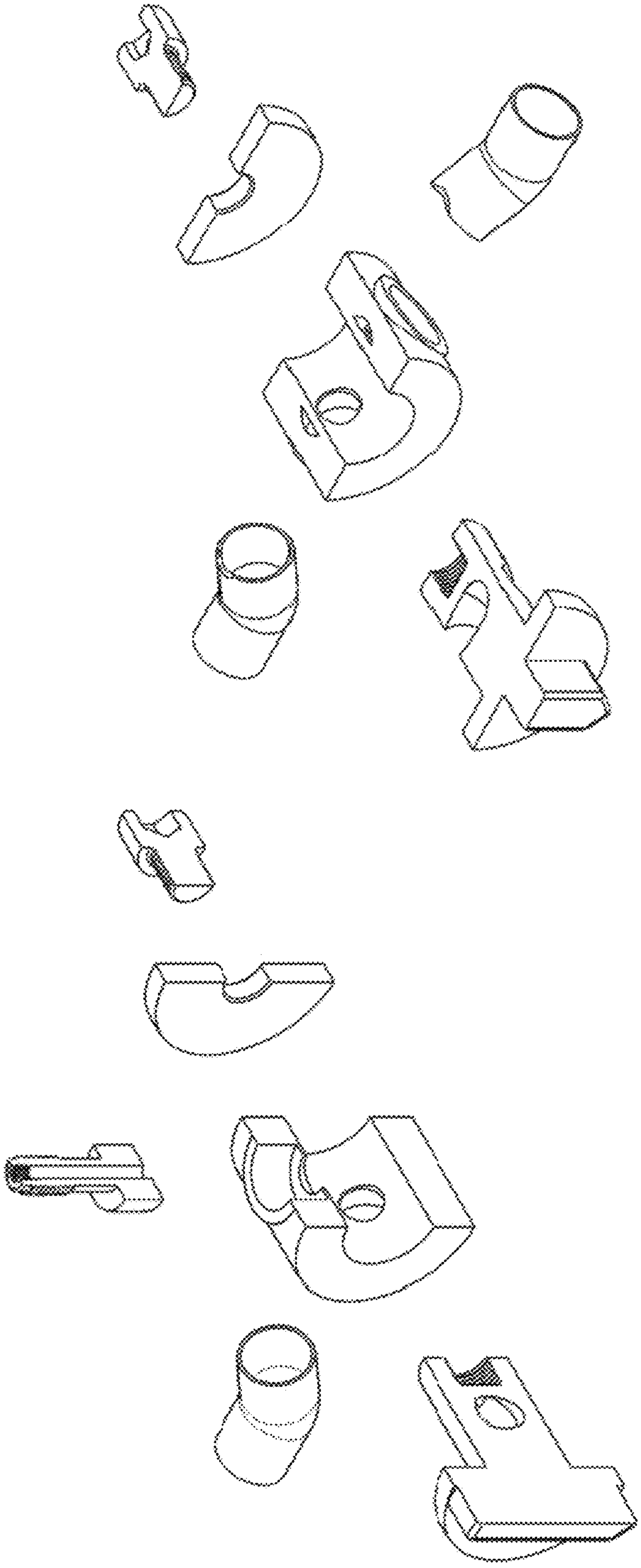
FIG. 35 illustrates perspective assembly section views of a preferred exemplary simplex Schrader ball valve (SSV) assembly.
Figure 36:
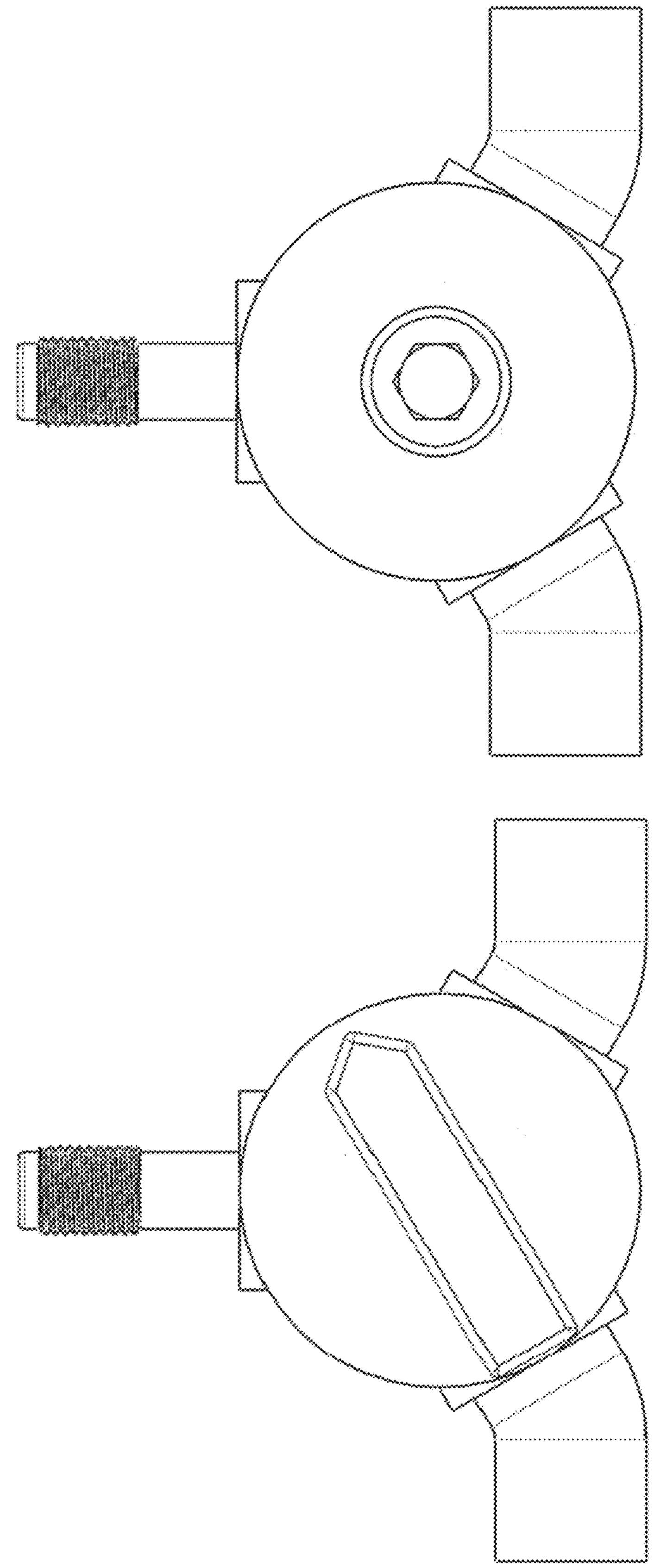
FIG. 36 illustrates front and rear views of preferred exemplary embodiment of a simplex Schrader ball valve (SSV) assembly useful in some preferred invention embodiments.
Figure 37:
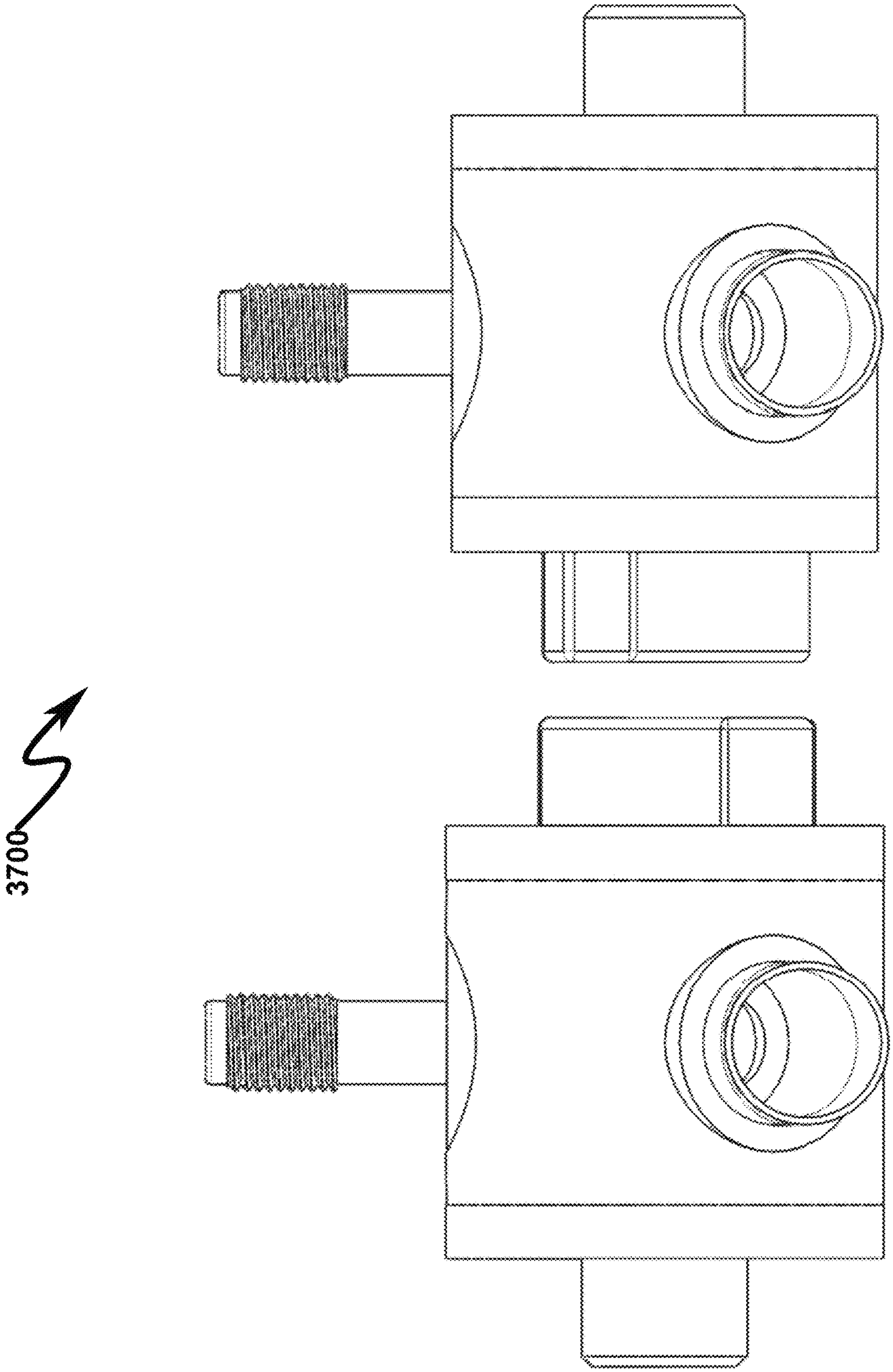
FIG. 37 illustrates left-side and right-side views of a preferred exemplary embodiment of a simplex Schrader ball valve (SSV) assembly useful in some preferred invention embodiments.
Figure 38:
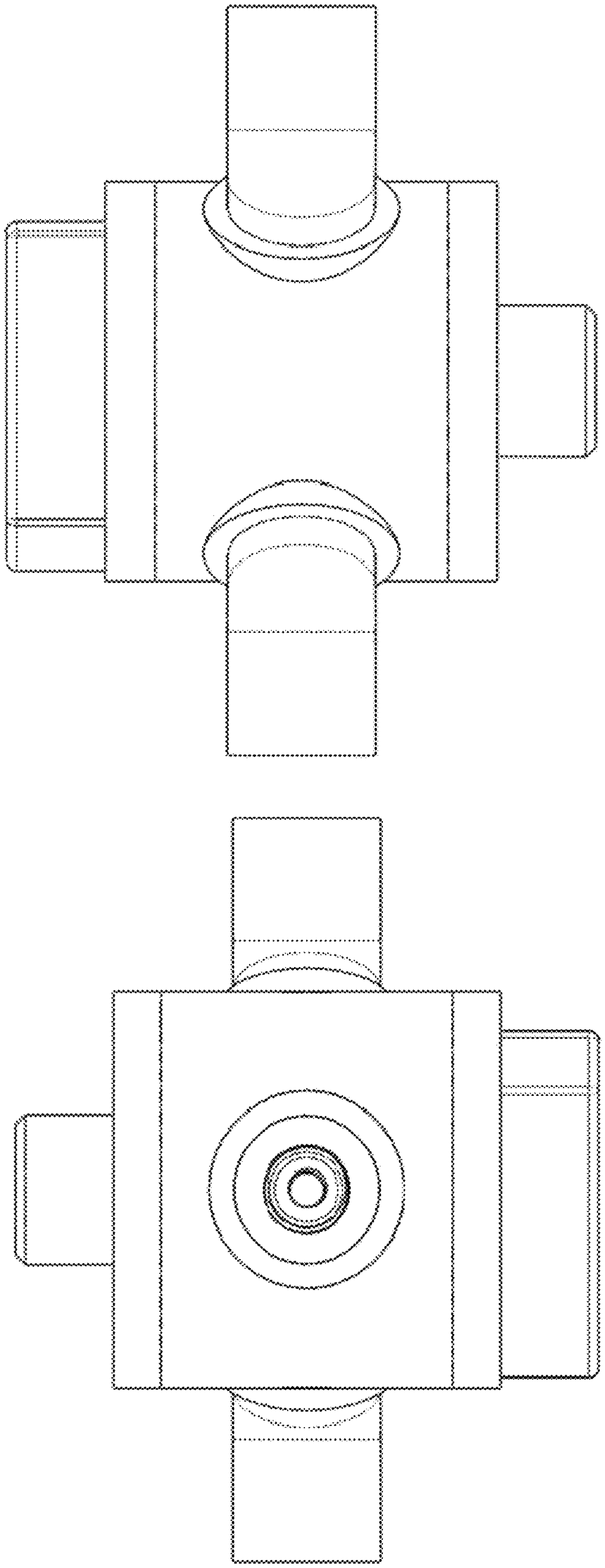
FIG. 38 illustrates top and bottom views of a preferred exemplary embodiment of a simplex Schrader ball valve (SSV) assembly useful in some preferred invention embodiments.
Figure 39:
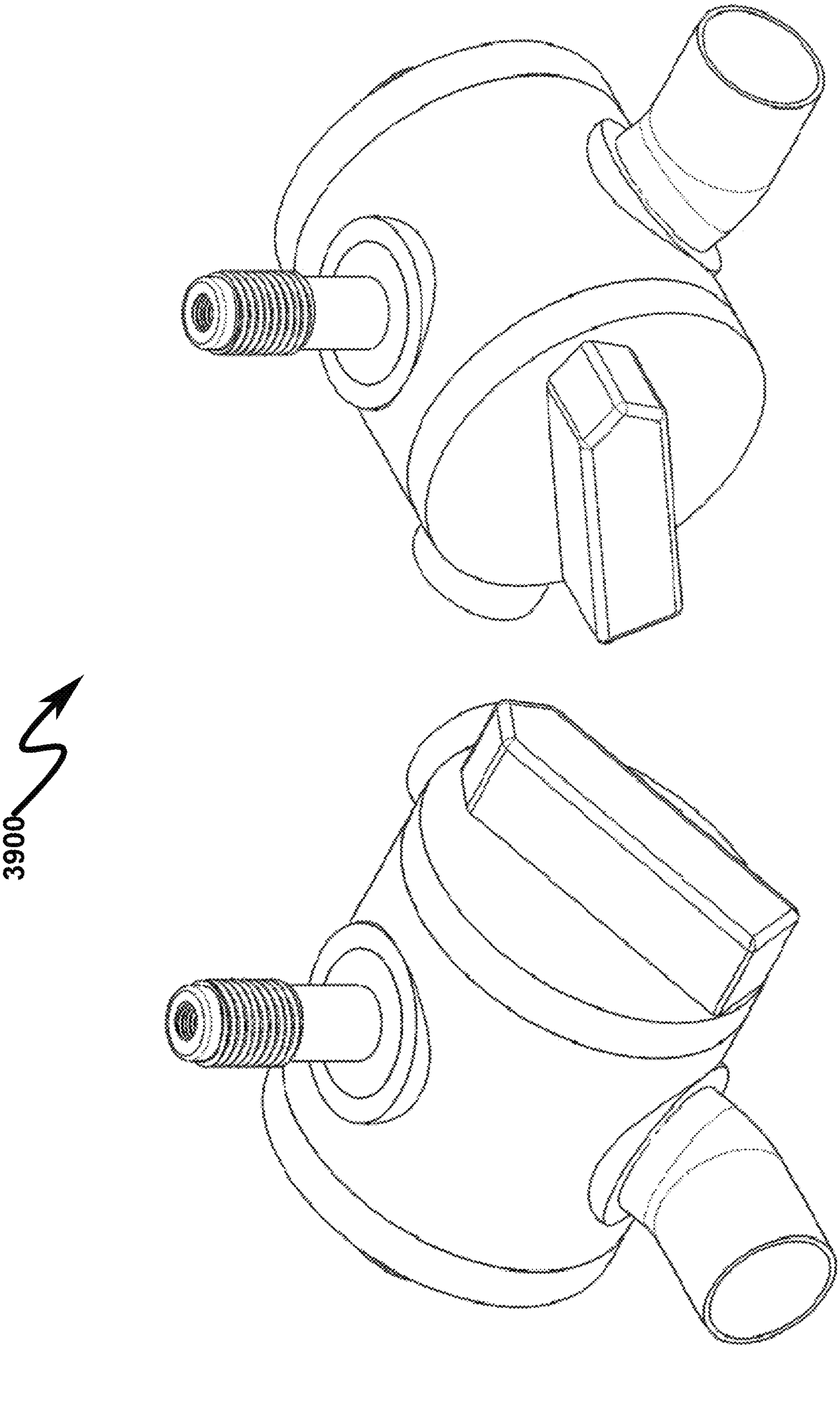
FIG. 39 illustrates left top side and right top side perspective views of a preferred exemplary embodiment of a simplex Schrader ball valve (SSV) assembly useful in some preferred invention embodiments.

FIG. 31 (3100) details the SSV when the ball valve is oriented for mode [1] operation. FIG. 32 (3200) details the SSV when the ball valve is oriented for mode [2] operation. FIG. 33 (3300) details the SSV when the ball valve is oriented for mode [3] operation. FIG. 34 (3400)-FIG. 40 (4000) provide assembly views and mechanical details of the SSV that one skilled in the art will find useful in constructing this device.

Schrader-Copper-T (SCT) (4100)-(4800)

Figure 41:
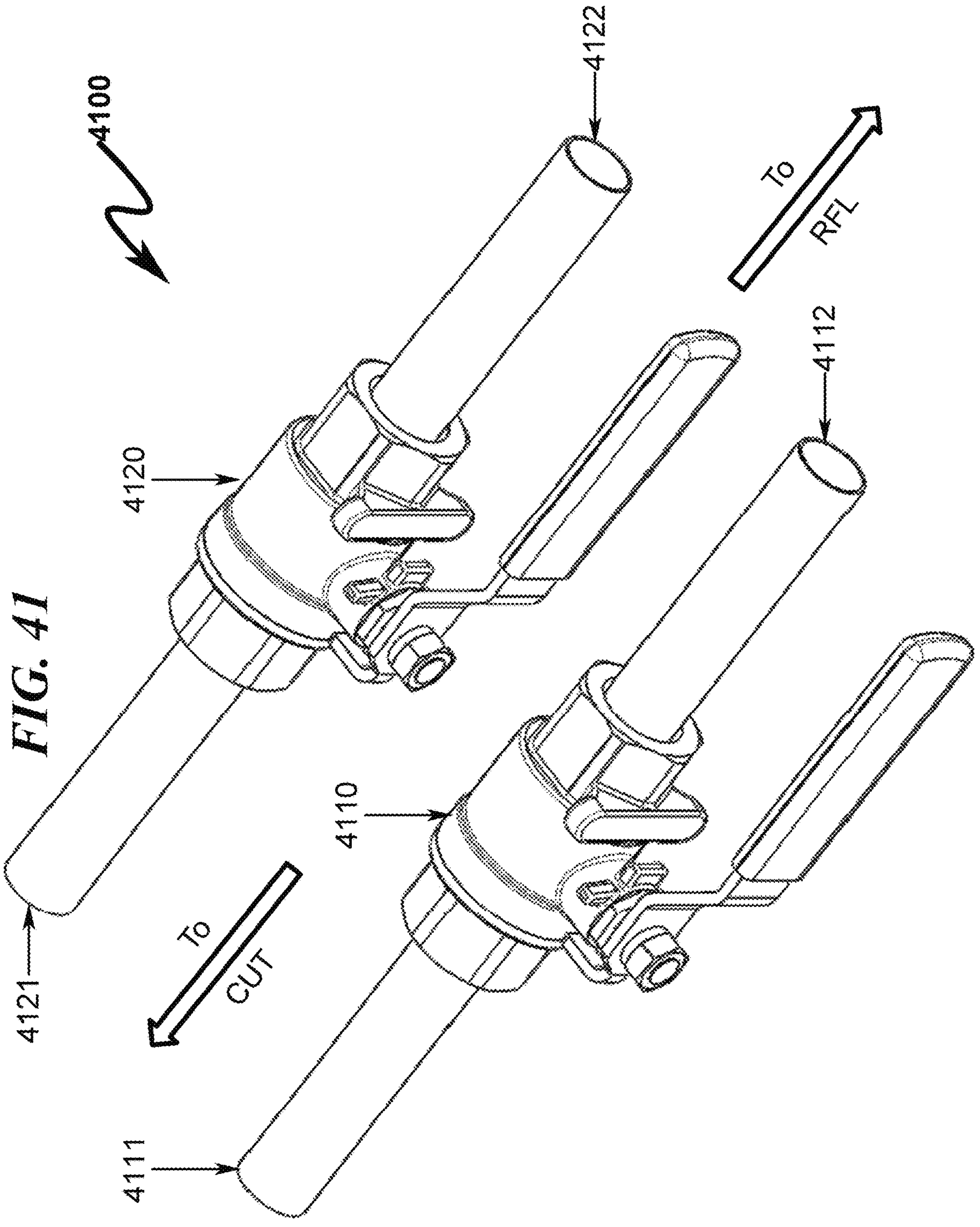
FIG. 41 illustrates an exemplary refrigerant ball valve assembly (BVA) pair that couples a HVAC component under test (CUT) and refrigerant line (RFL) interface prior to Schrader-Copper-T (SCT) installation.
Figure 48:
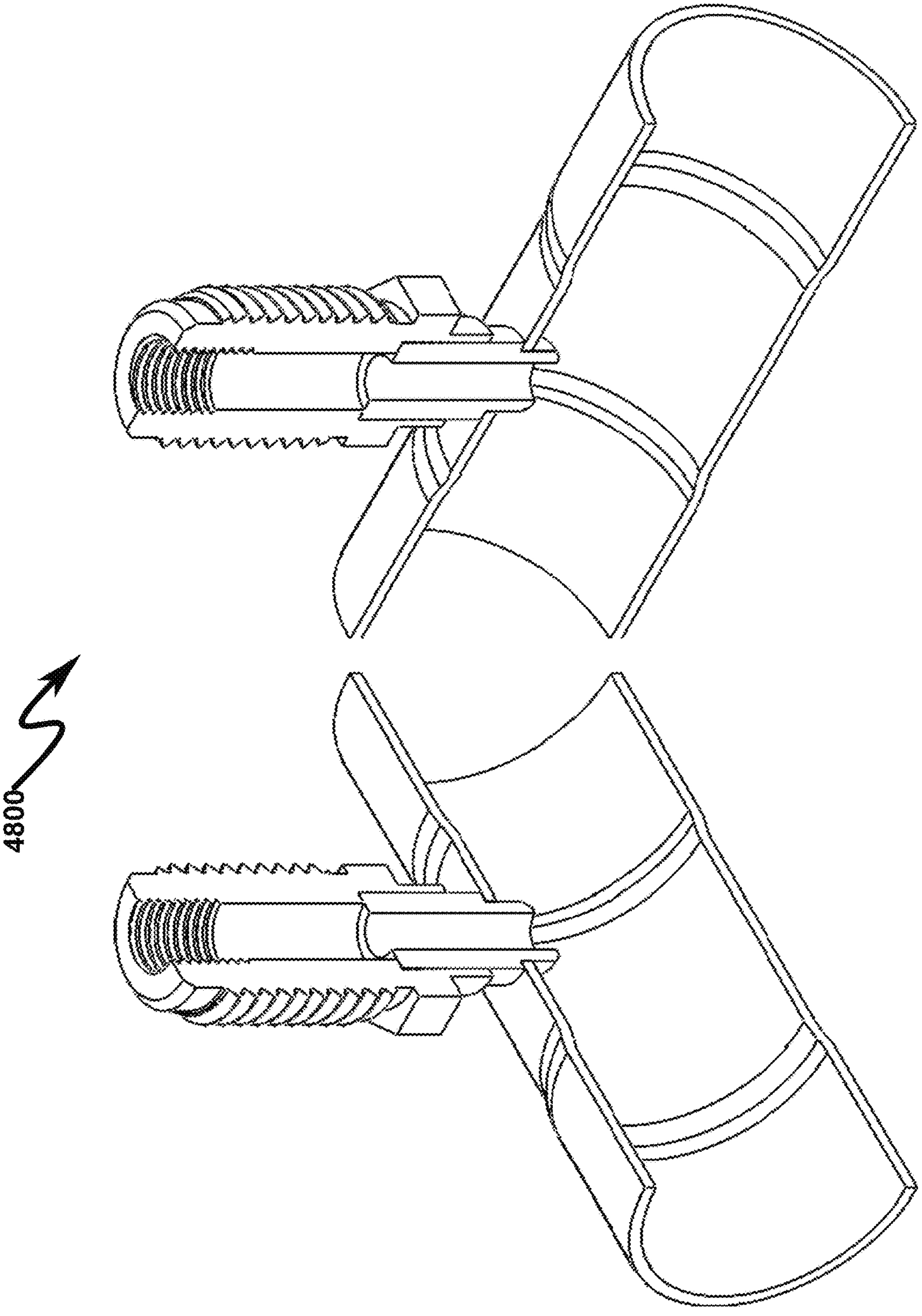
FIG. 48 illustrates front top left-side perspective section and front top right-side perspective section views of a preferred exemplary Schrader-Flare-Male (SEM) fitting useful in some preferred invention embodiments.

As generally detailed in FIG. 41 (4100)-FIG. 48 (4800), the present invention anticipates that the sealing and pressure testing functions described herein may be accomplished by use of a conventional Schrader port copper T (SCT). The SCT operates to provide a Schrader port on a refrigerant copper line (RCL) that has been severed into two pieces. It achieves this by sliding a Schrader-copper-T having swaged ends onto the severed ends of the RCL. Attachment of the SCT to the RCL ends is accomplished via brazing/soldering.

As generally depicted in FIG. 41 (4100), in some instances a HVAC system will incorporate ball valve assemblies (BVA) (4110, 4120) that isolate component under test (CUT) connections (4111, 4121) from corresponding refrigerant line (RFL) connections (4112, 4122) that service the CUT with refrigerant. In many of these circumstances there are no Schrader ports installed in the system as shown and as such the pressure/leak testing and CUT/RFL isolation techniques taught herein cannot be employed using hardware that is present in the HVAC system.

Figure 42:
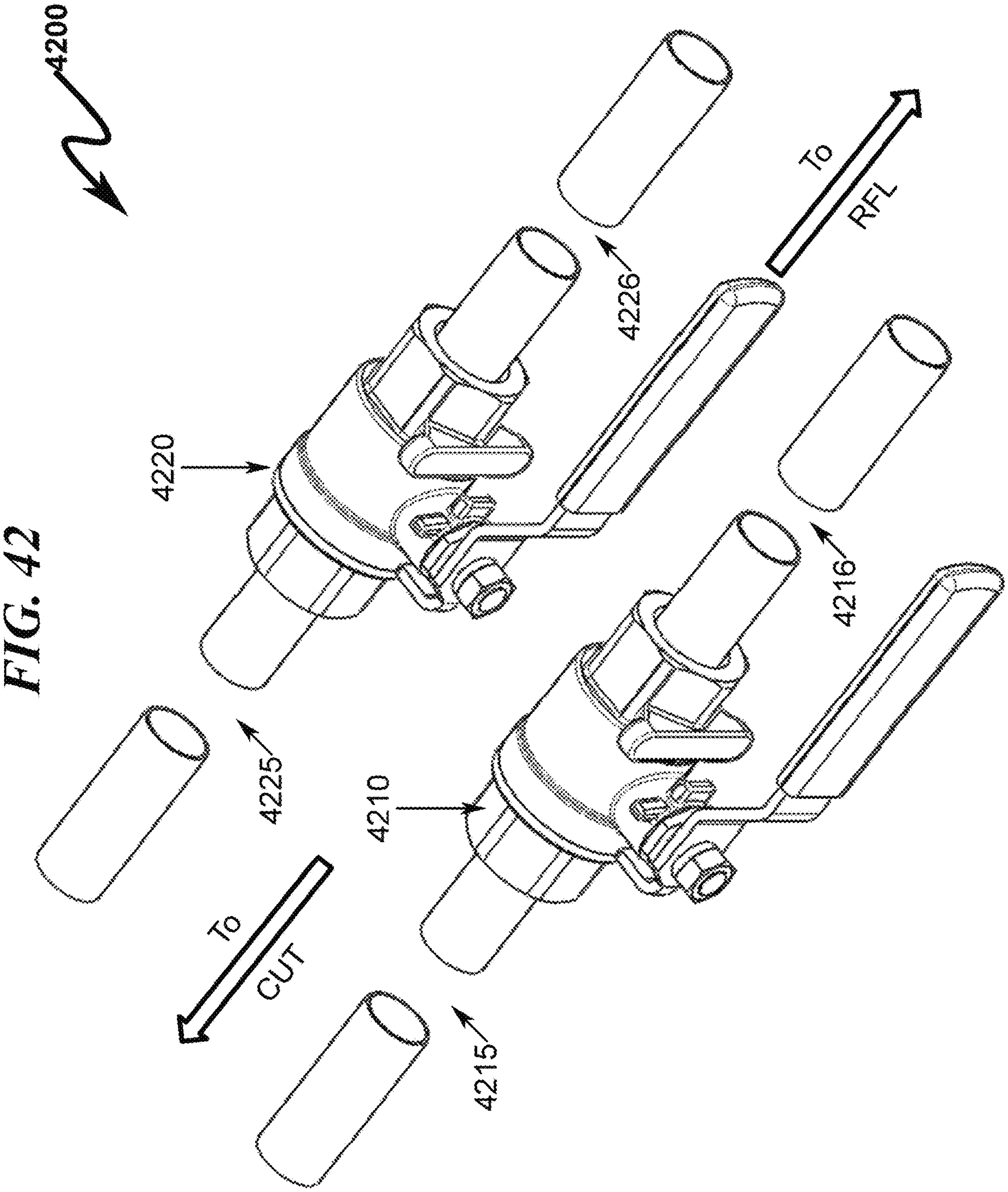
FIG. 42 illustrates an exemplary refrigerant ball valve assembly (BVA) pair that couples a HVAC component under test (CUT) and refrigerant line (RFL) interface that have been severed and separated prior to Schrader-Copper-T (SCT) installation.
Figure 43:
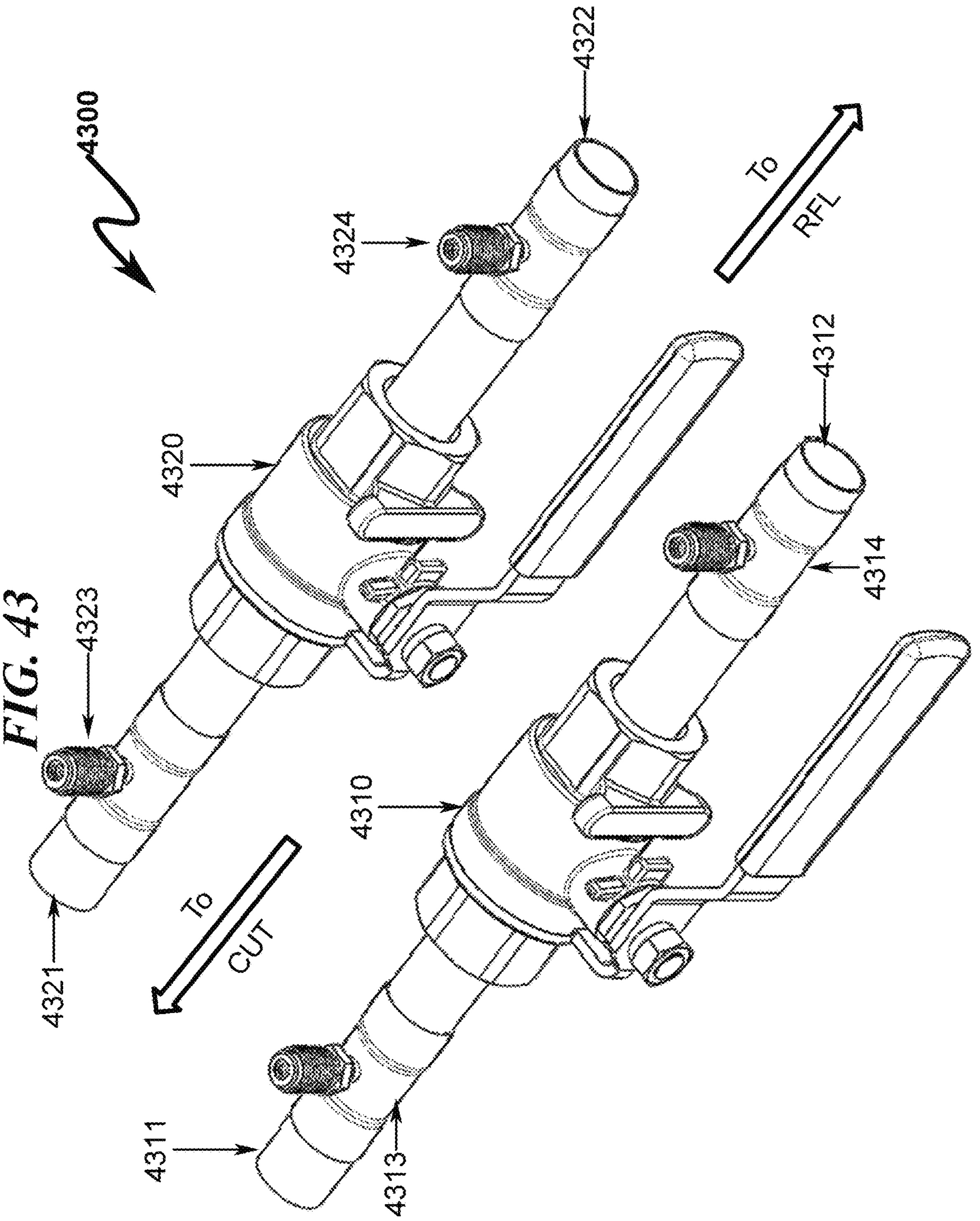
FIG. 43 illustrates an exemplary refrigerant ball valve assembly (BVA) pair that couples a HVAC component under test (CUT) and refrigerant line (RFL) interface that have been augmented with Schrader-Copper-T (SCT) Schrader ports.

As generally depicted in FIG. 42 (4200)-FIG. 43 (4300), the present invention in one preferred embodiment utilizes one or more Schrader copper-T (SCT) (4313, 4314, 4323, 4324) to augment the existing copper lines (4311, 4312, 4321, 4322) with a Schrader-copper-T that can be used to pressurize the CUT and/or RFL as well as provide a port for monitoring the pressure within the CUT and/or RFL. The SCTs are installed by first severing (4215, 4216, 4225, 4226) the CUT/RFL RCL lines as shown with a pipe cutter or other severing means and then sliding the SCTs over the exposed RCL ends and then brazing/soldering the SCT into place.

Figure 44:
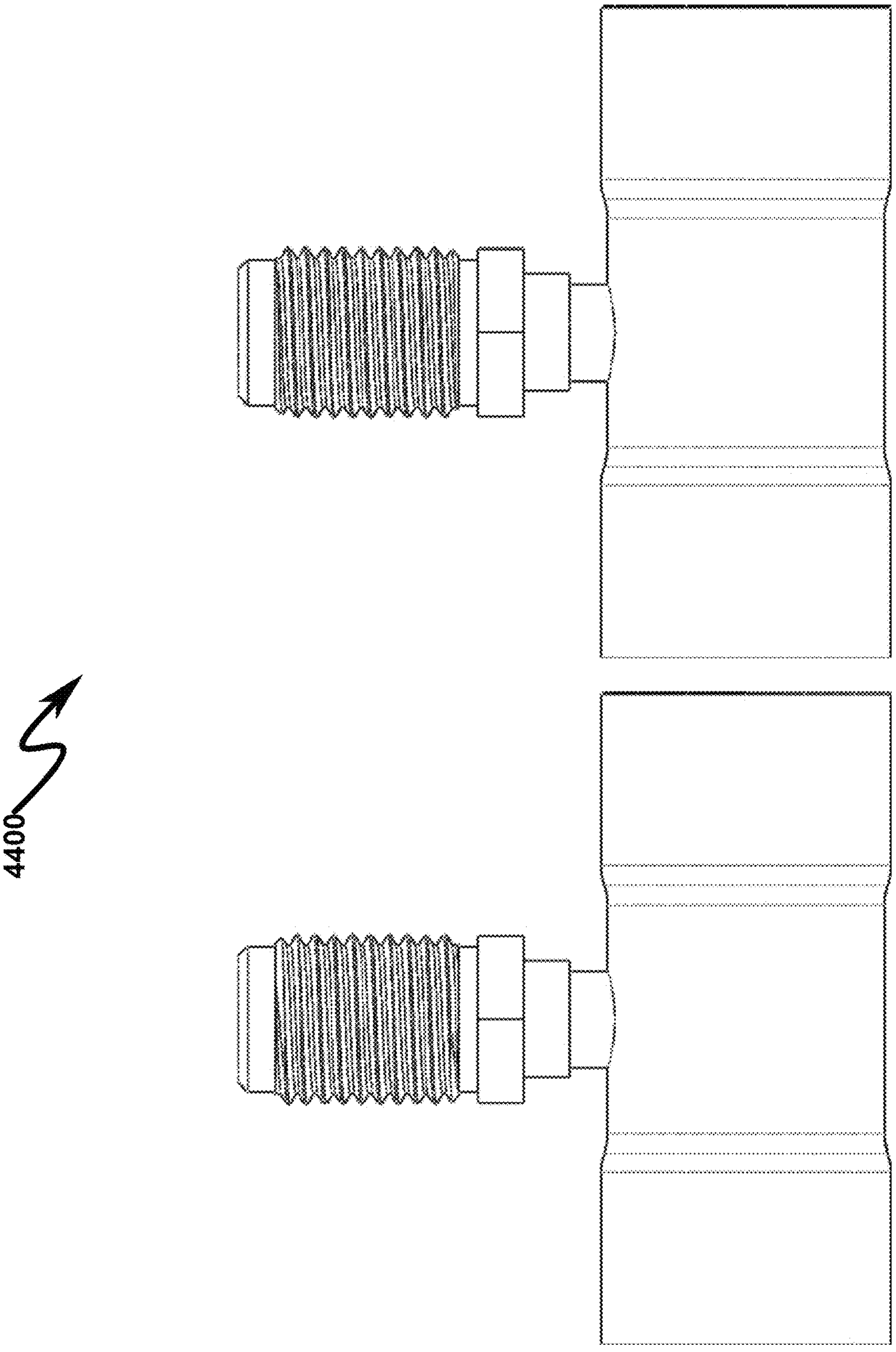
FIG. 44 illustrates front and rear views of a preferred exemplary Schrader-Copper-T (SCT) fitting useful in some preferred invention embodiments.
Figure 45:
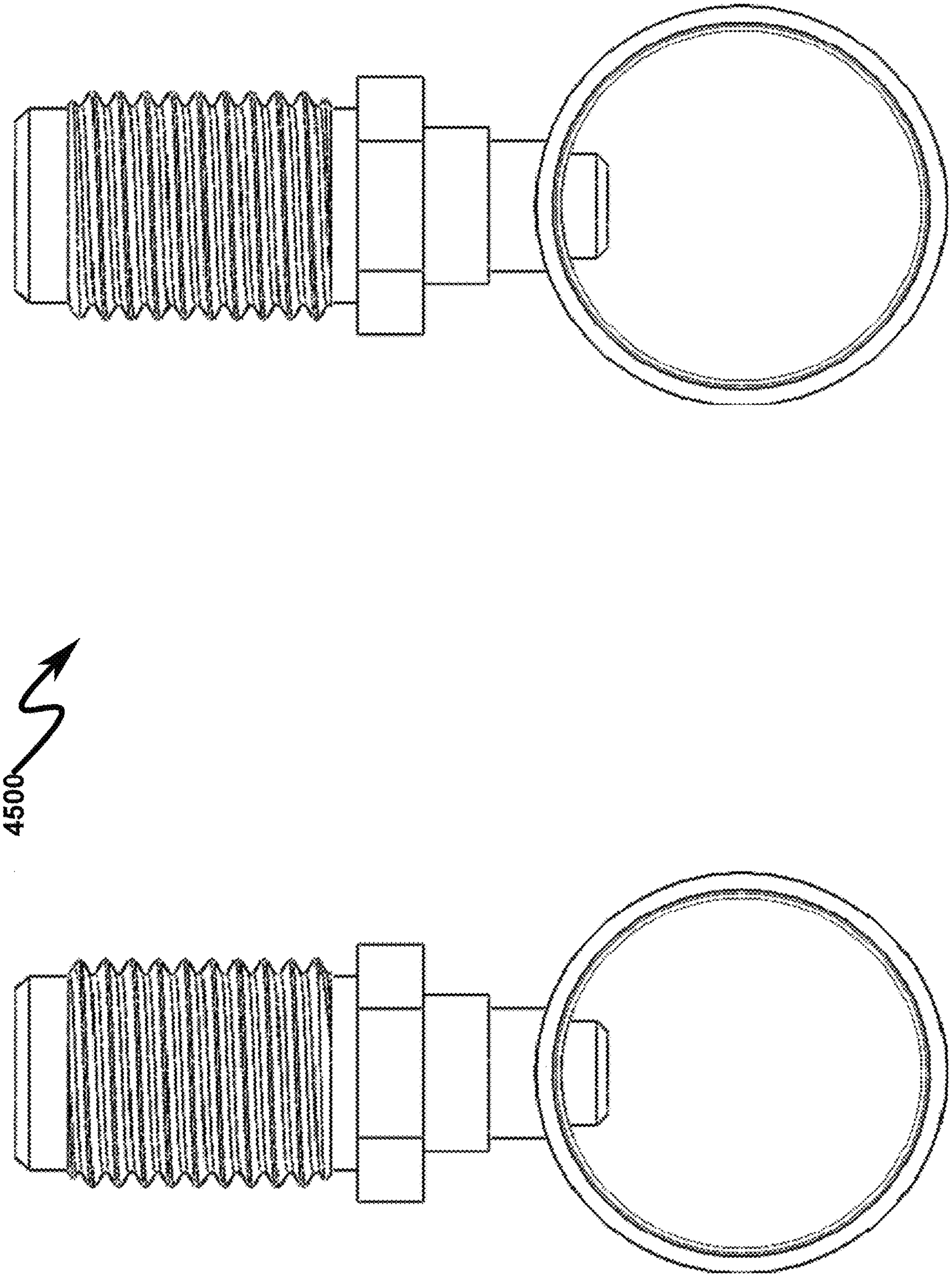
FIG. 45 illustrates left-side and right-side views of a preferred exemplary Schrader-Copper-T (SCT) fitting useful in some preferred invention embodiments.
Figure 47:
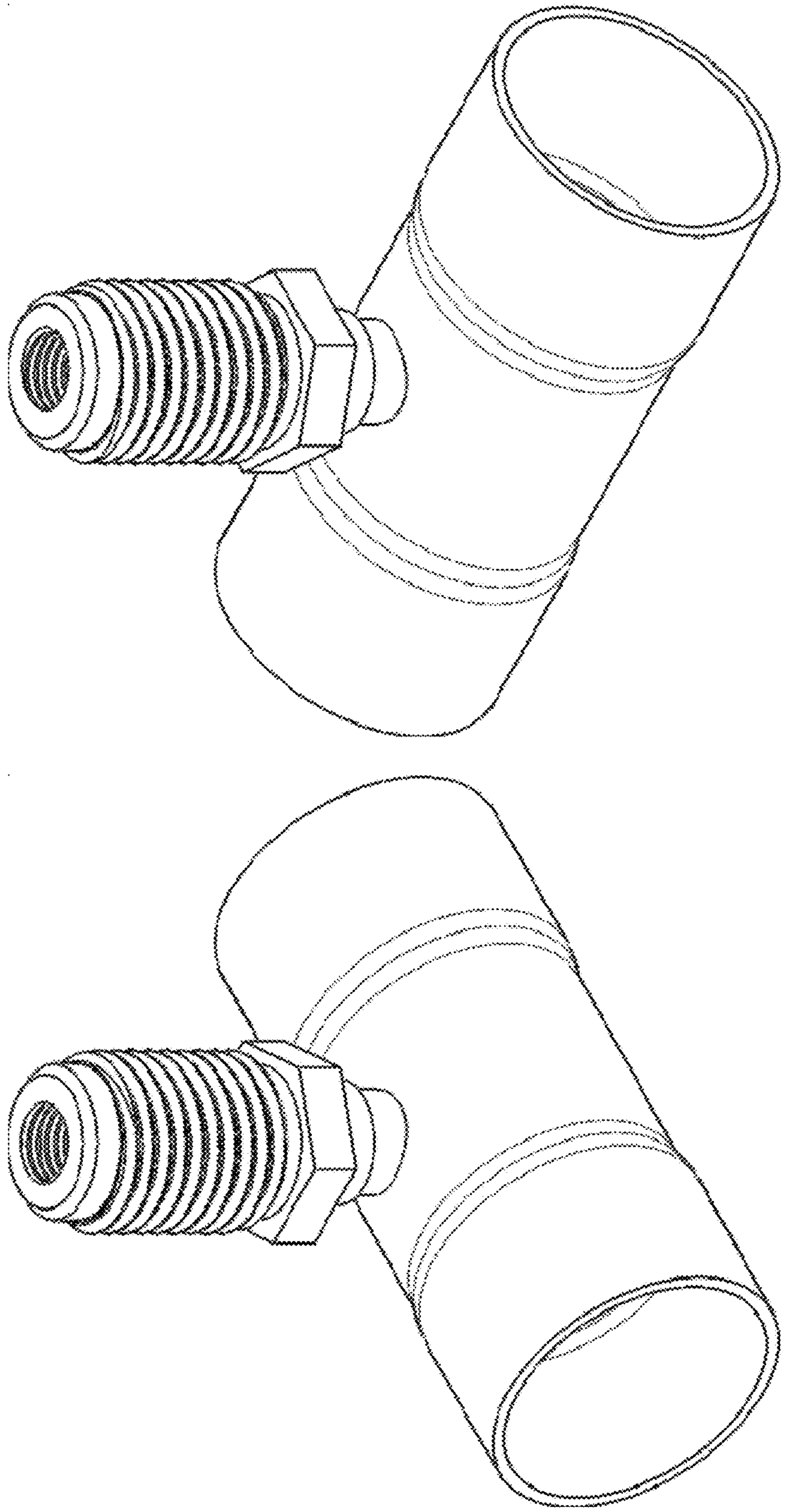
FIG. 47 illustrates front top left-side perspective and front top right-side perspective views of a preferred exemplary Schrader-Copper-T (SCT) fitting useful in some preferred invention embodiments.

Mechanical details of a typical Schrader copper T (SCT) are depicted in FIG. 44 (4400)-FIG. 48 (4800). While this methodology of providing a Schrader port on a CUT/RFL may be useful in some circumstances to allow for pressure testing of the CUT/RFL, it is not a preferred methodology within the present invention because of the space required for the SCT installation onto the RCL lines associated with the CUT/RFL. In many situations there is not sufficient room to install the SCT to augment the HVAC system with a Schrader port.

Schrader Port Saddle Tap (SST) (4900)-(5600)

Figure 49:
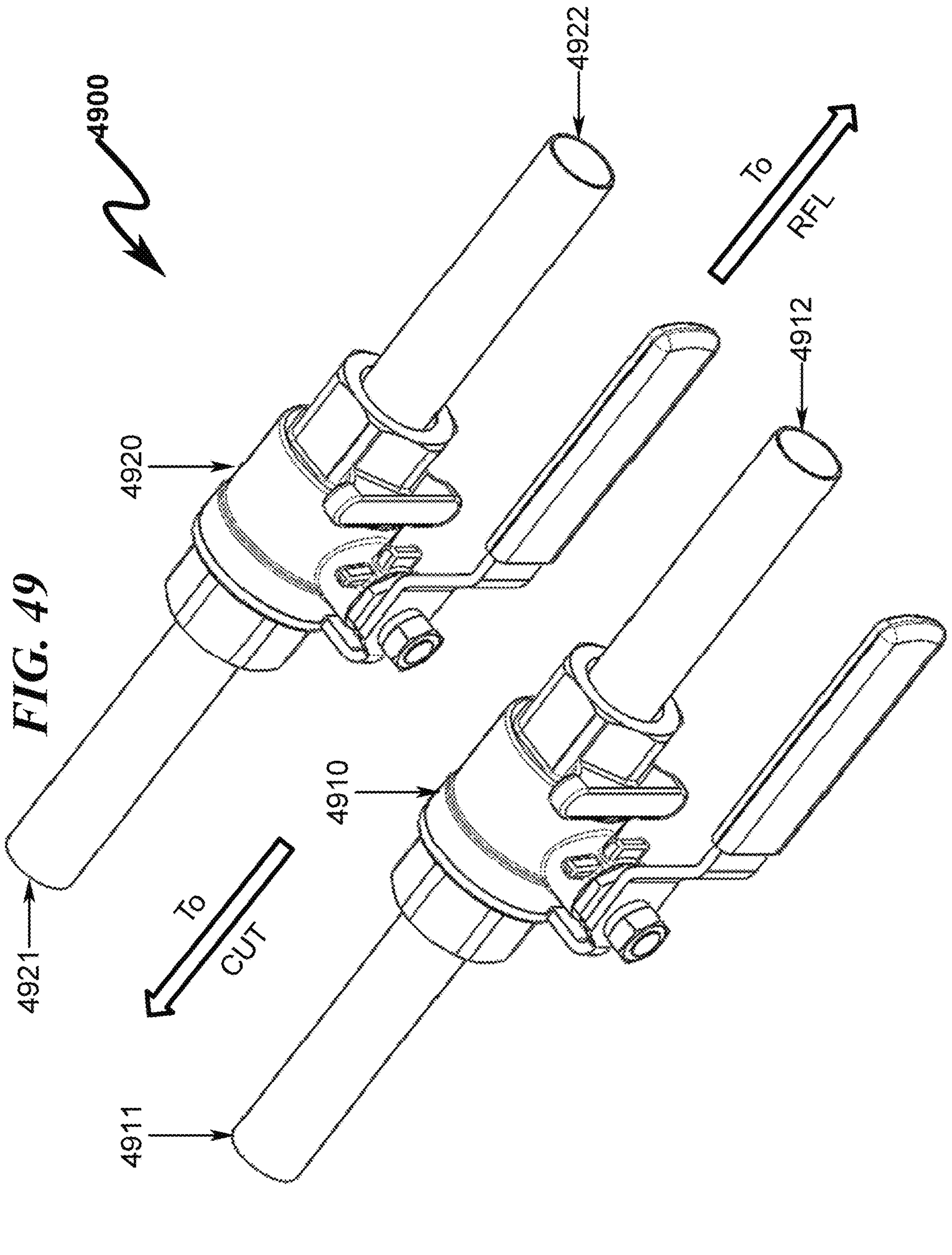
FIG. 49 illustrates an exemplary refrigerant ball valve assembly (BVA) pair that couples a HVAC component under test (CUT) and refrigerant line (RFL) interface prior to Schrader-Saddle-Tap (SST) installation.
Figure 56:
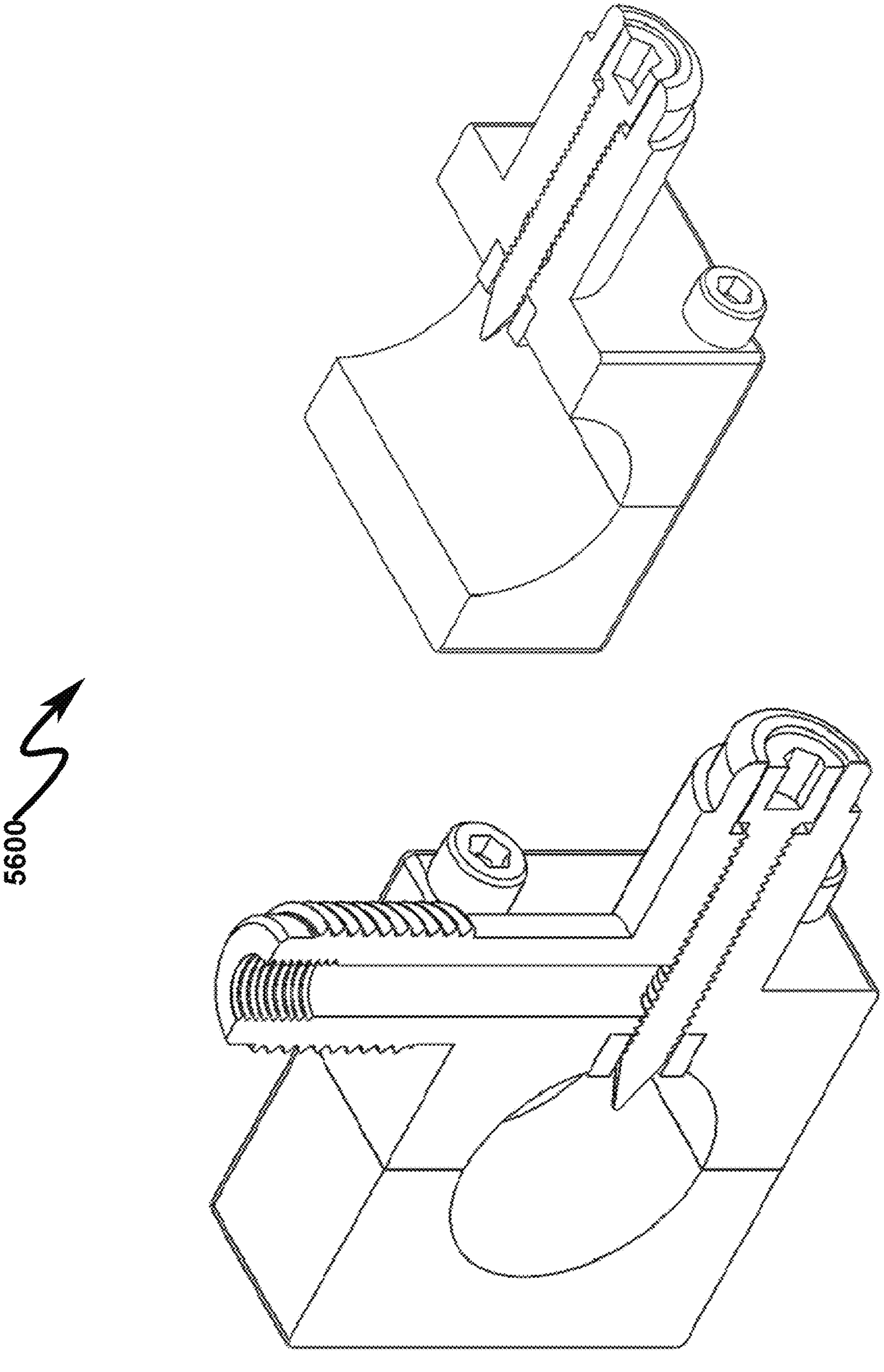
FIG. 56 illustrates front top left-side and front top right-side perspective section views of a preferred exemplary Schrader-Saddle-Tap (SST) fitting useful in some preferred invention embodiments.

As generally detailed in FIG. 49 (4900)-FIG. 56 (5600), the present invention anticipates that the sealing and pressure testing functions described herein may be accomplished by use of a conventional Schrader port saddle tap (SST). The SST operates to provide a temporary Schrader port on a refrigerant copper line (RCL). It achieves this by clamping two semi-circular shells onto the RCL and operating a puncture tapping screw (PTS) that punctures the RCL and permits refrigerant to flow between a Schrader port and the RCL.

As generally depicted (4900), in some instances a HVAC system will incorporate ball valve assemblies (BVA) (4910, 4920) that isolate component under test (CUT) connections (4911, 4921) from corresponding refrigerant line (RFL) connections (4912, 4922) that service the CUT with refrigerant. In many of these circumstances there are no Schrader ports installed in the system as shown and as such the pressure/leak testing and CUT/RFL isolation techniques taught herein cannot be employed using hardware that is present in the HVAC system.

Figure 50:
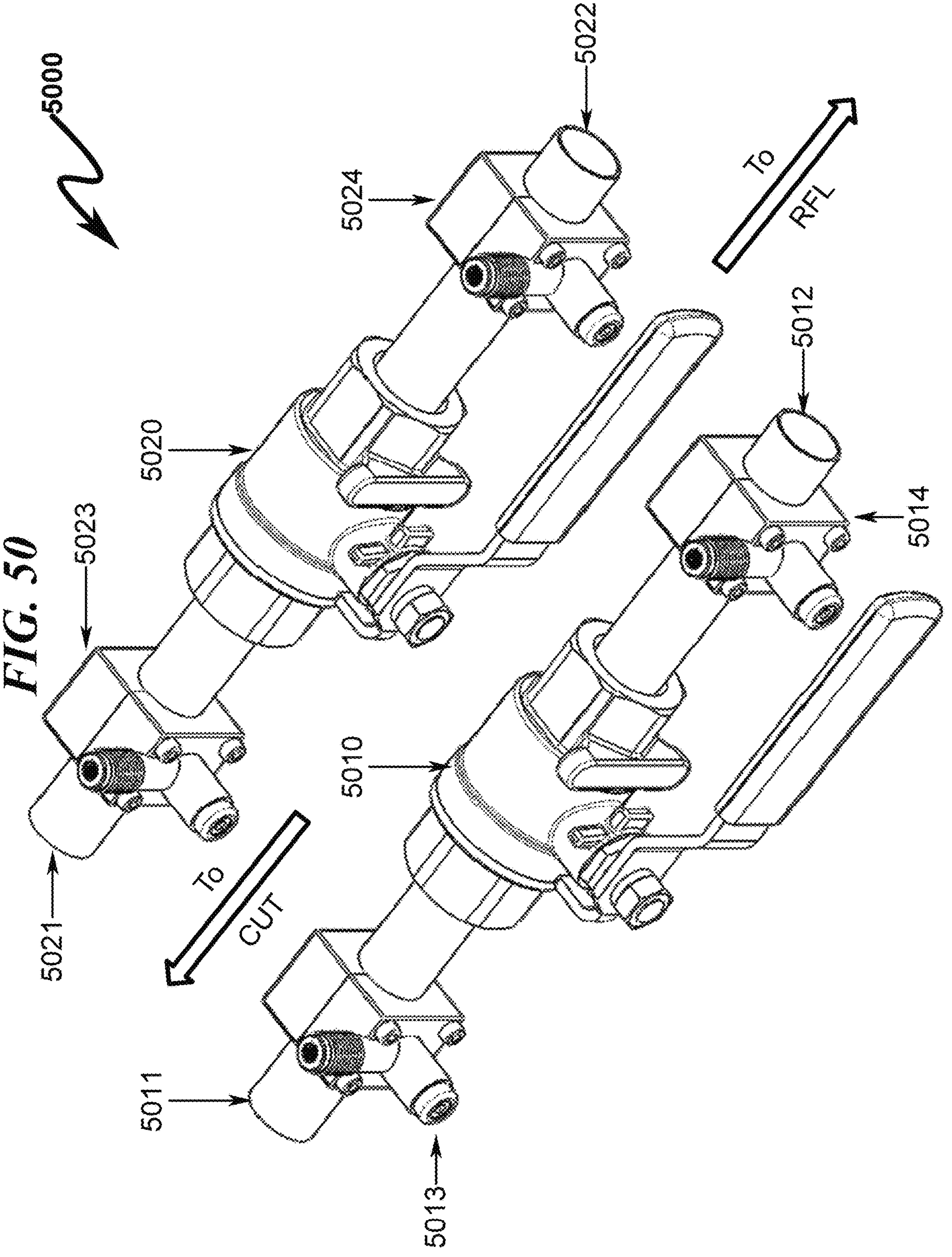
FIG. 50 illustrates an exemplary refrigerant ball valve assembly (BVA) pair that couples a HVAC component under test (CUT) and refrigerant line (RFL) interface augmented with Schrader-Saddle-Tap (SST) Schrader ports.

As generally depicted in FIG. 50 (5000), the present invention in one preferred embodiment utilizes one or more Schrader saddle taps (SST) (5013, 5014, 5023, 5024) to augment the existing copper lines (5011, 5012, 5021, 5022) with a Schrader port that can be used to pressurize the CUT and/or RFL as well as provide a port for monitoring the pressure within the CUT and/or RFL.

Figure 51:
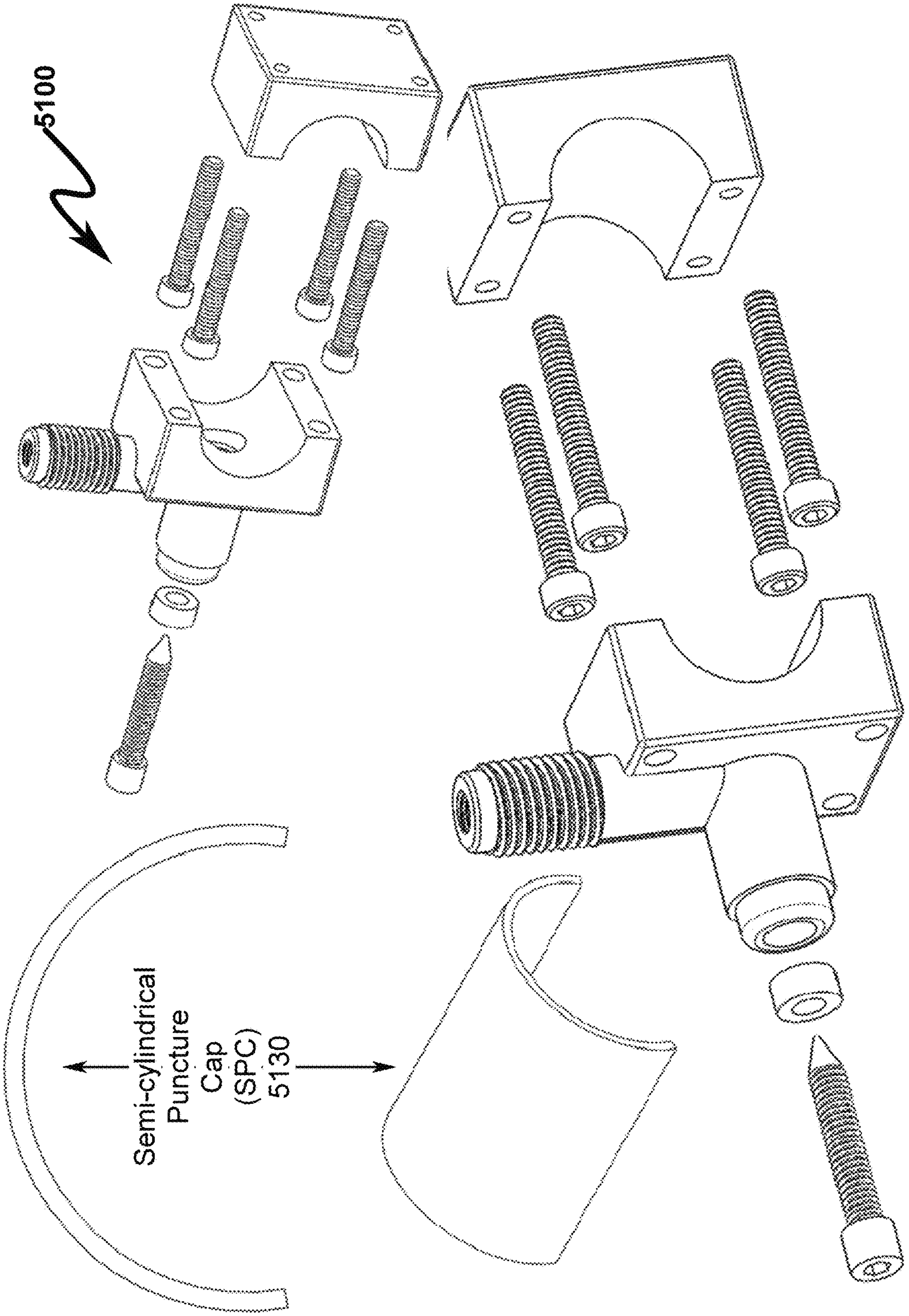
FIG. 51 illustrates an assembly view of a Schrader-Saddle-Tap (SST) and a Semi-cylindrical Puncture Cap (SPC) used to plug (via brazing/soldering) a RCL that has been tapped using a Schrader-Saddle-Tap (SST)
Figure 52:
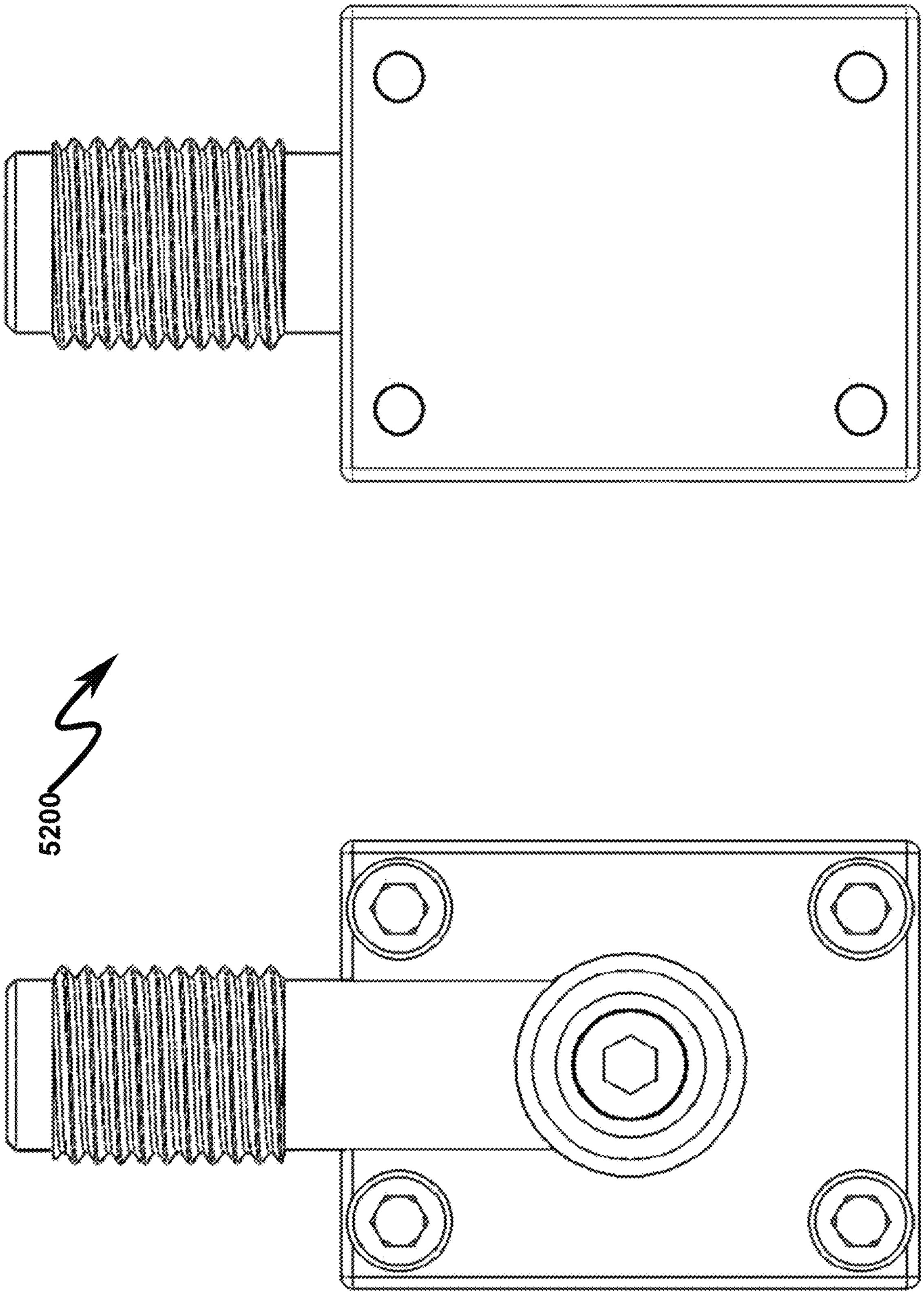
FIG. 52 illustrates front and rear views of a preferred exemplary Schrader-Saddle-Tap (SST)
Figure 53:
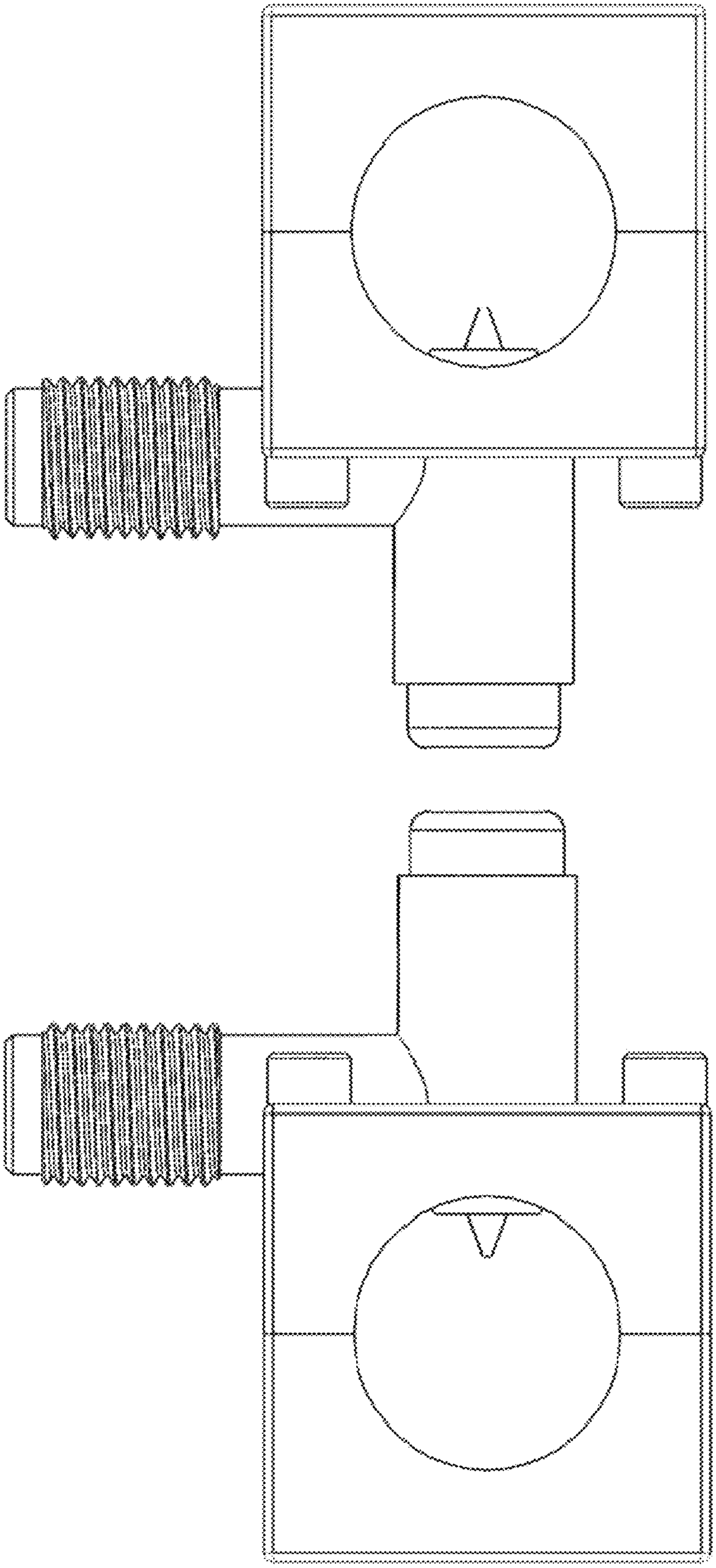
FIG. 53 illustrates left-side and right-side views of a preferred exemplary Schrader-Saddle-Tap (SST)
Figure 54:
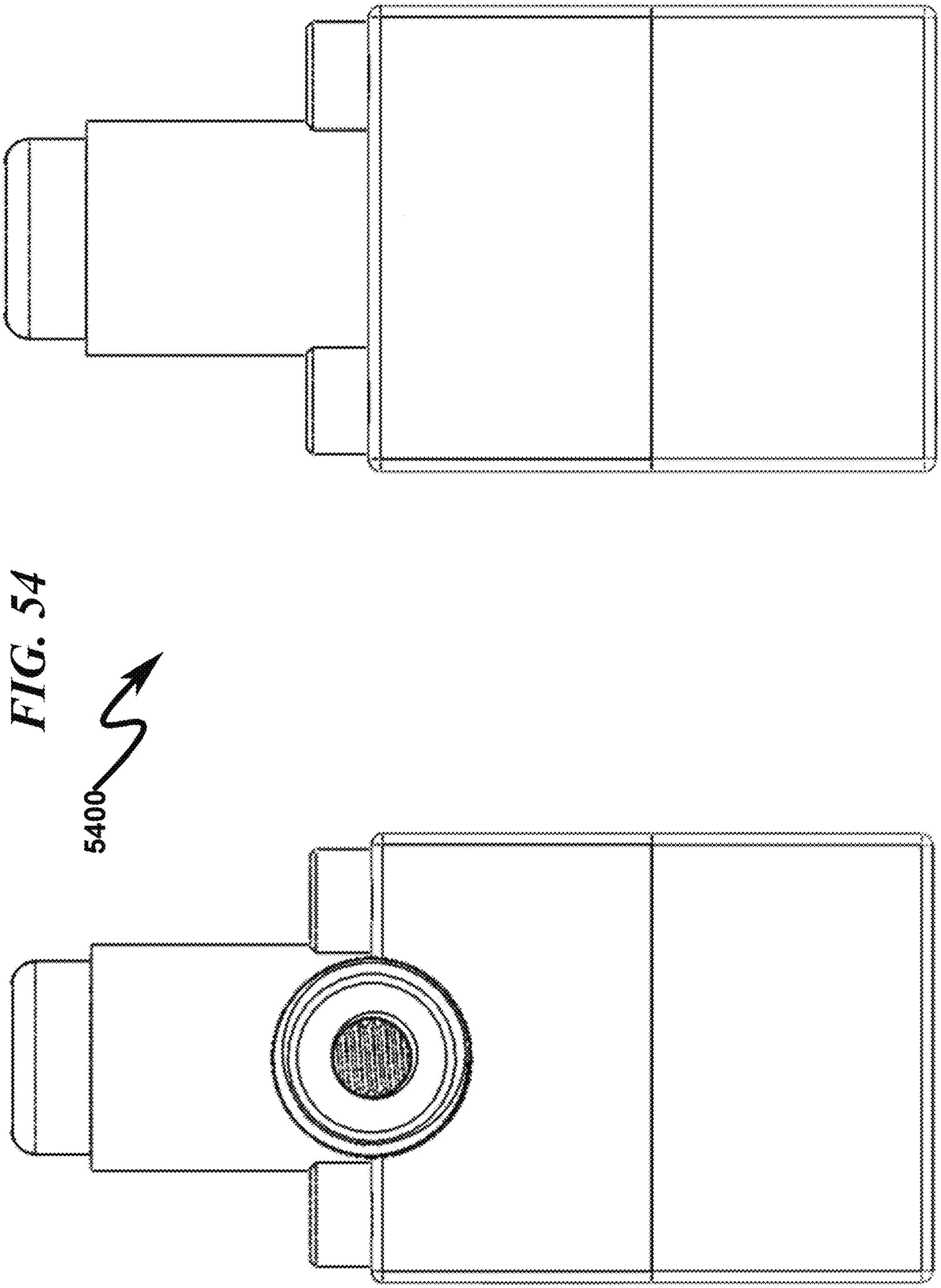
FIG. 54 illustrates top and bottom views of a preferred exemplary Schrader-Saddle-Tap (SST)
Figure 55:
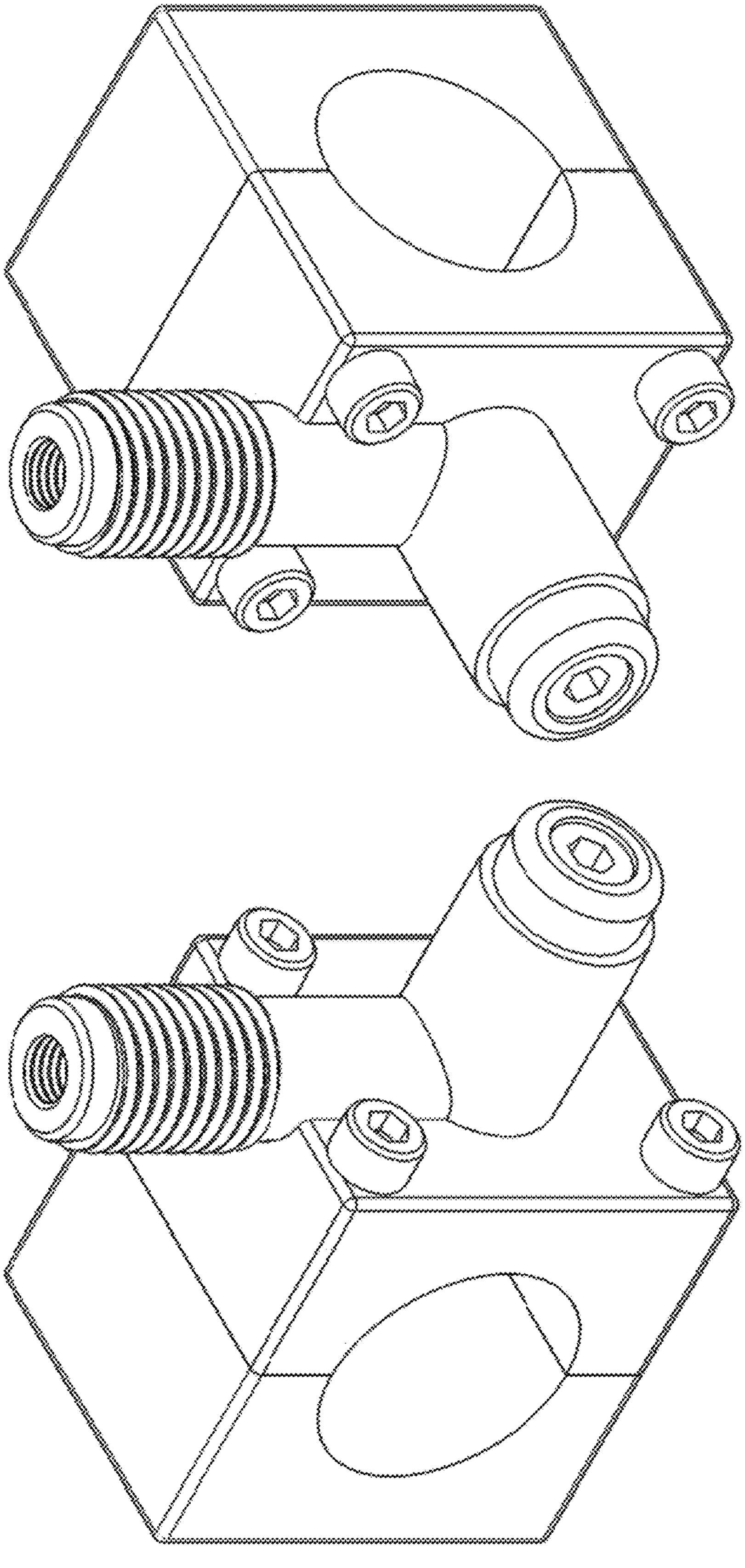
FIG. 55 illustrates front top left-side and front top right-side perspective views of a preferred exemplary Schrader-Saddle-Tap (SST) fitting useful in some preferred invention embodiments.

Mechanical details of a typical Schrader saddle tap (SST) are depicted in FIG. 51 (5100)-FIG. 56 (5600). While this methodology of providing a temporary Schrader port on a CUT/RFL may be useful in some circumstances to allow for pressure testing of the CUT/RFL, it is not a preferred methodology within the present invention because of the propensity for such SSTs to leak refrigerant over time and thus defeat the purpose of segmented leak testing. Instead, this technique may be used in circumstances where the pressure testing is to be performed and then the SST removed and the puncture tap within the CUT/RFL lines plugged with a copper sleeve or semi-cylindrical puncture cap (SPC) (5130) that is brazed/soldered over the tube puncture generated by the SST during pressure testing.

Schrader Port Viper Tap (SVT) (5700)-(6400)

Figure 57:
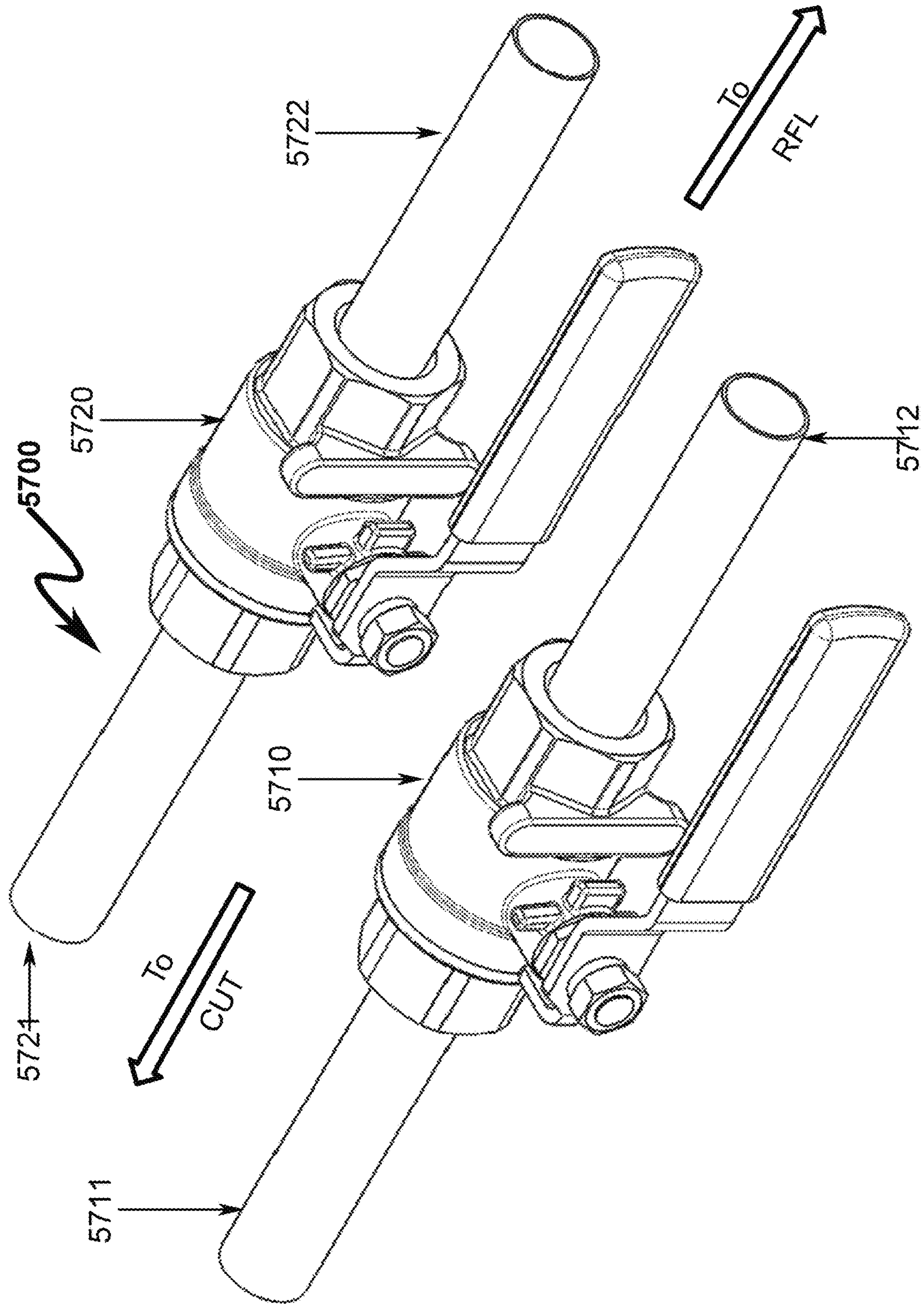
FIG. 57 illustrates an exemplary refrigerant ball valve assembly (BVA) pair that couples a HVAC component under test (CUT) and refrigerant line (RFL) interface prior to Schrader-Viper-Tap (SVT) installation.
Figure 64:
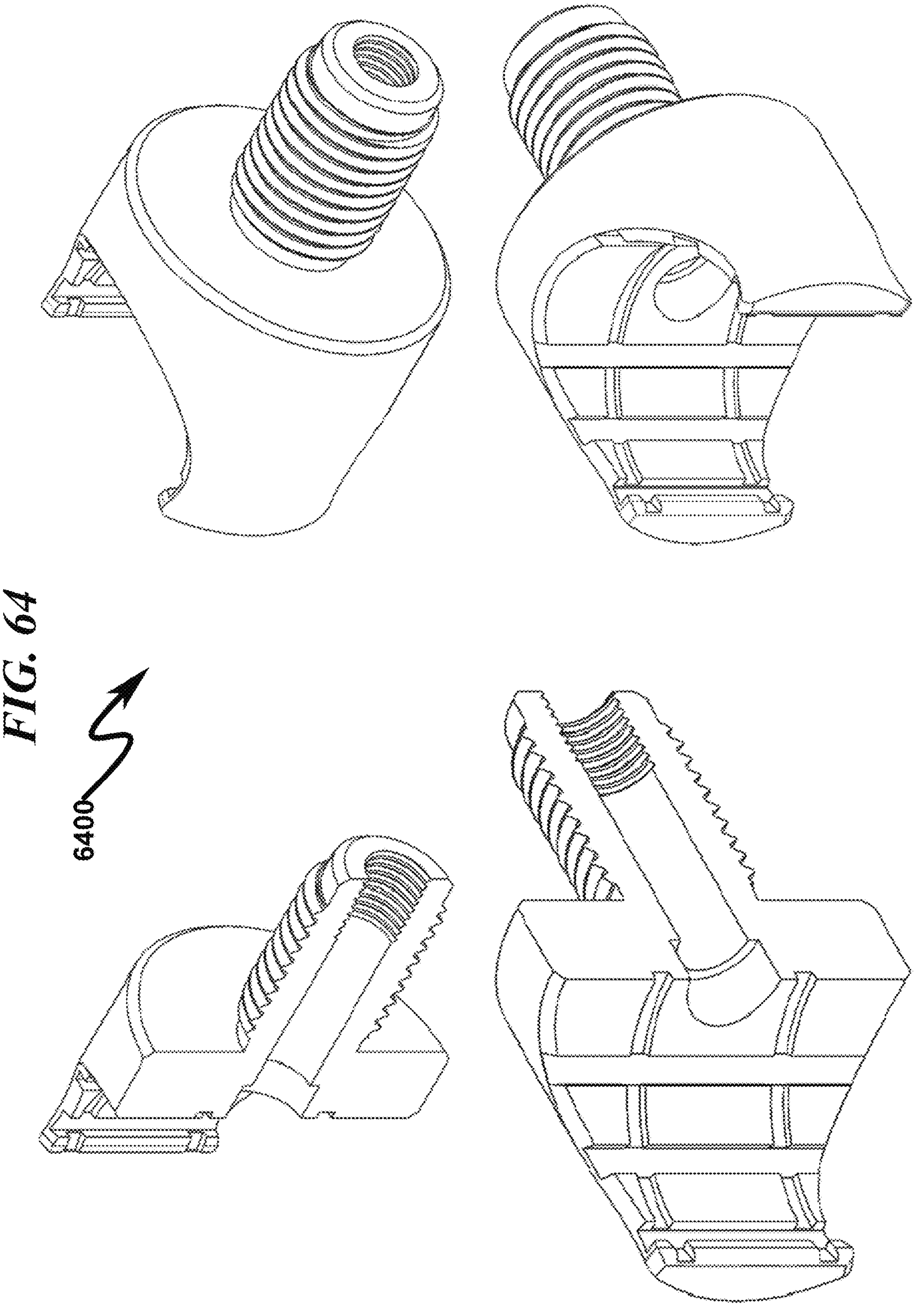
FIG. 64 illustrates perspective and perspective section views of a preferred exemplary Schrader-Viper-Tap (SVT) fitting useful in some preferred invention embodiments.

As generally detailed in FIG. 57 (5700)-FIG. 64 (6400), the present invention anticipates that the sealing and pressure testing functions described herein may be accomplished by use of custom-machined Schrader port viper tap (SVT). As generally depicted in FIG. 57 (5700), in some instances a HVAC system will incorporate ball valve assemblies (BVA) (5710, 5720) that isolate component under test (CUT) connections (5711, 5721) from corresponding refrigerant line (RFL) connections (5712, 5722) that service the CUT with refrigerant. In many of these circumstances there are no Schrader ports installed in the system as shown and as such the pressure/leak testing and CUT/RFL isolation techniques taught herein cannot be employed using hardware that is present in the HVAC system.

Figure 58:
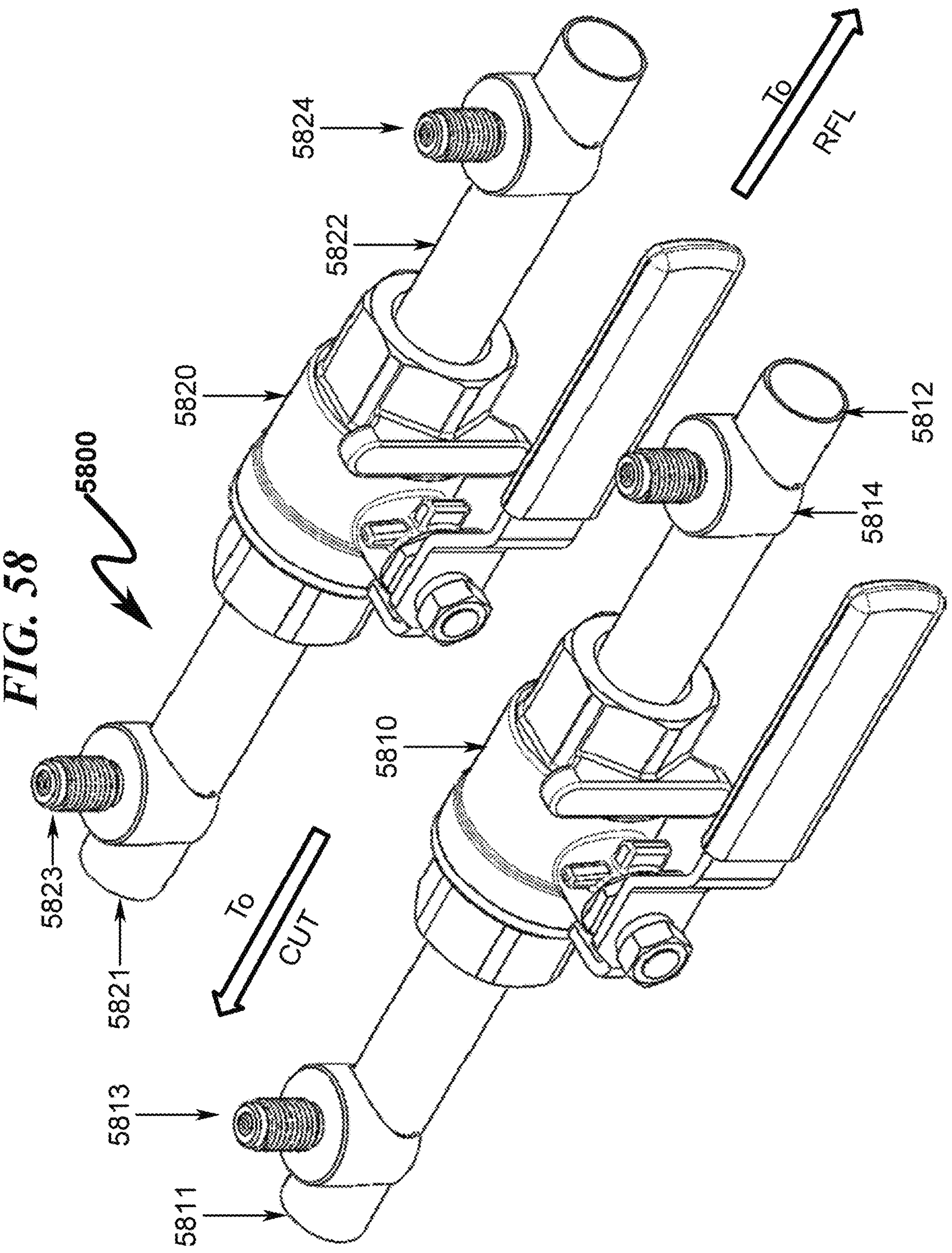
FIG. 58 illustrates an exemplary refrigerant ball valve assembly (BVA) pair that couples a HVAC component under test (CUT) and refrigerant line (RFL) interface augmented with Schrader-Viper-Tap (SVT) Schrader ports.

As generally depicted in FIG. 58 (5800), the present invention in one preferred embodiment utilizes one or more Schrader viper taps (SVT) (5813, 5814, 5823, 5824) to augment the existing copper lines (5811, 5812, 5821, 5822) with an air-tight Schrader port that can be used to pressurize the CUT and/or RFL as well as provide a port for monitoring the pressure within the CUT and/or RFL.

While the function of the SVT (5813, 5814, 5823, 5824) is identical to that of the SST described previously, it is structurally different in that it is designed to be a permanent addition to the HVAC system as it is brazed/soldered to the existing copper lines (5811, 5812, 5821, 5822). Furthermore, it is designed to be leak-proof as the brazing/soldering material used to join the SVT (5813, 5814, 5823, 5824) to the existing copper lines 5811, 5812, 5821, 5822) guarantees a leak-free bond between these items.

Figure 59:
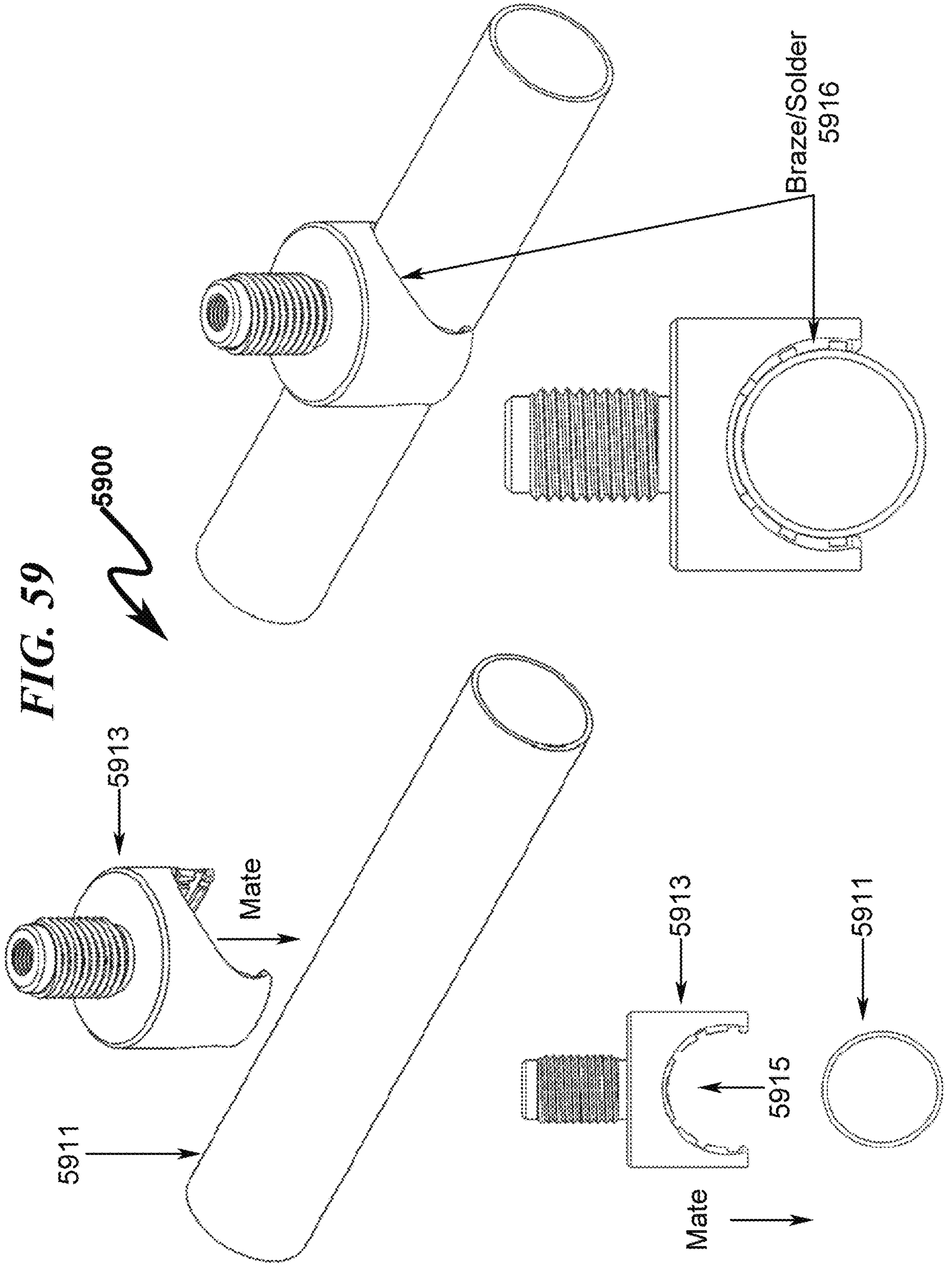
FIG. 59 illustrates an assembly view of a Schrader-Viper-Tap (SVT) on a refrigerant copper line (RCL) depicting mating of the SVT to the RCL and brazing/soldering the SVT to the RCL.
Figure 62:
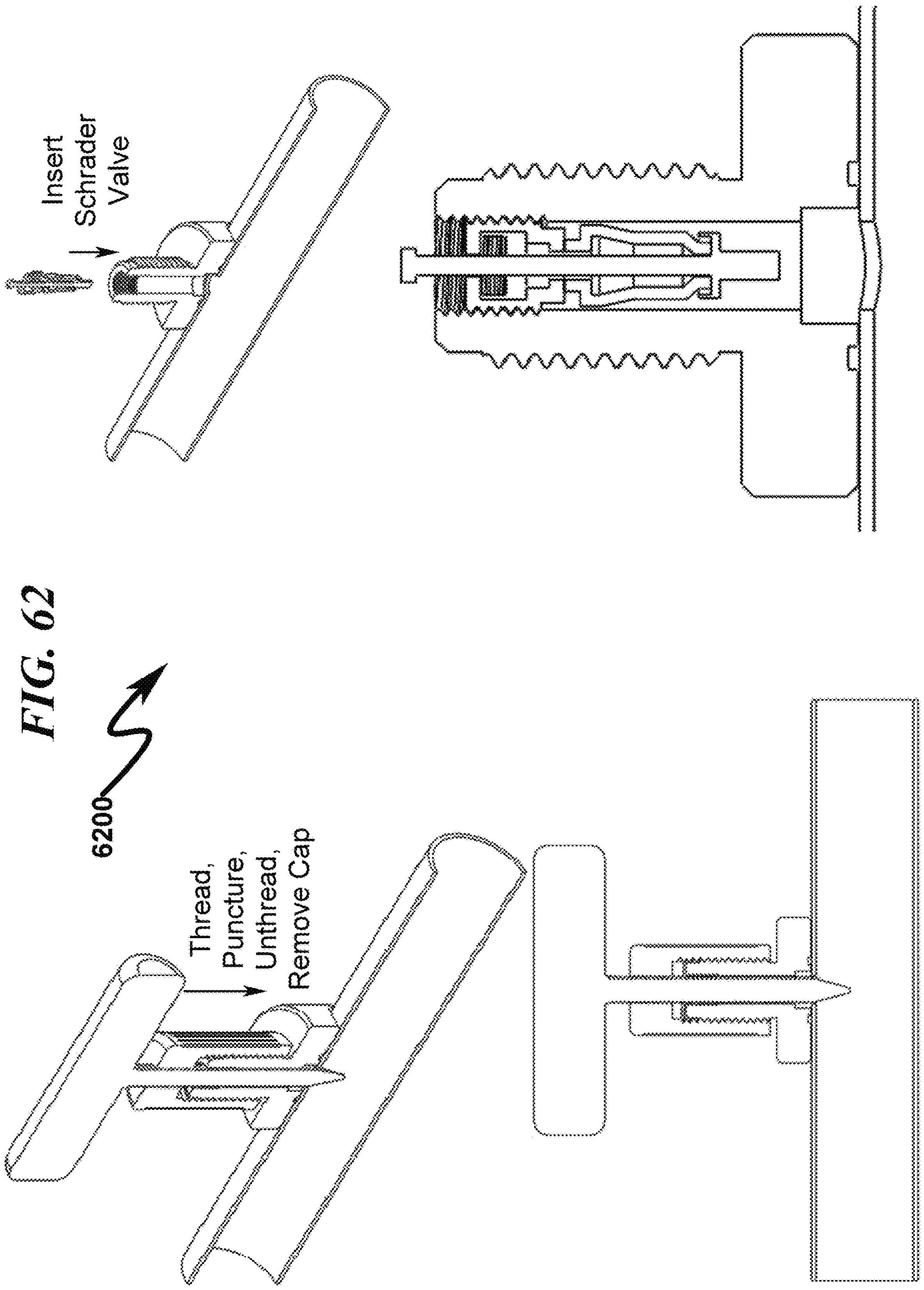
FIG. 62 illustrates an assembly view of a VPC puncturing the RCL to which the VTC/SVT combination is attached, removal of the VPC from the VTC/SVC combination, and insertion of a Schrader valve assembly (SVA) into the SVC Schrader port.

Installation of the SVT onto existing copper lines is generally depicted in FIG. 59 (5900)-FIG. 62 (6200). As generally depicted in FIG. 59 (5900), the SVT (5913) is first mated to a RCL (5911) via the SVT (5913) pipe opening (5915) and then brazed/soldered (5916) in place. The mating the SVT (5913) and RCL (5911) is optimally configured that the SVT (5913) and RCL (5911) are maintained in a fixed rotational position once the mating occurs. The brazing/soldering (5916) occurs around the peripheral edges of the pipe opening (5915) and may be advanced by enhanced capillary action that occurs as a result of chamfers and/or fillets at the peripheral edges of the SVT pipe opening (5915) as shown in the drawings. This enhanced capillary action may also be enhanced by grooves on the SVT inner pipe retention wall of the pipe opening (5915) as shown in the drawings. It should be noted that chamfers and/or fillets on the distal ends of the SVT also support the "snap-on" insertion of the SVT (5913) over the RCL (5911) during the mating process depicted in FIG. 59 (5900).

Figure 60:
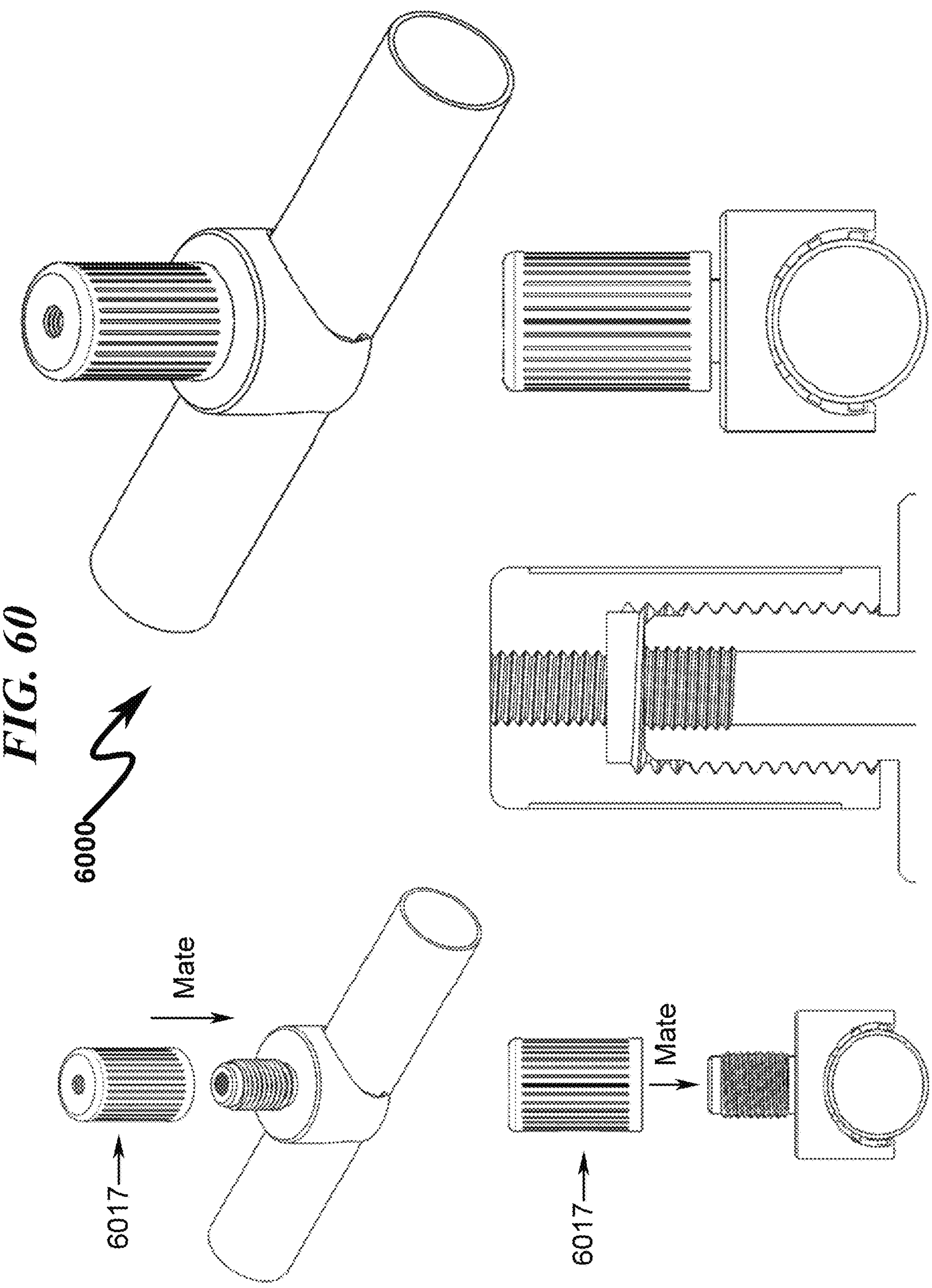
FIG. 60 illustrates an assembly view of a viper tap cap (VTC) on a SVT in preparation for puncturing the RCL and a cross-section view of the SVT/VTC assembly.
Figure 61:
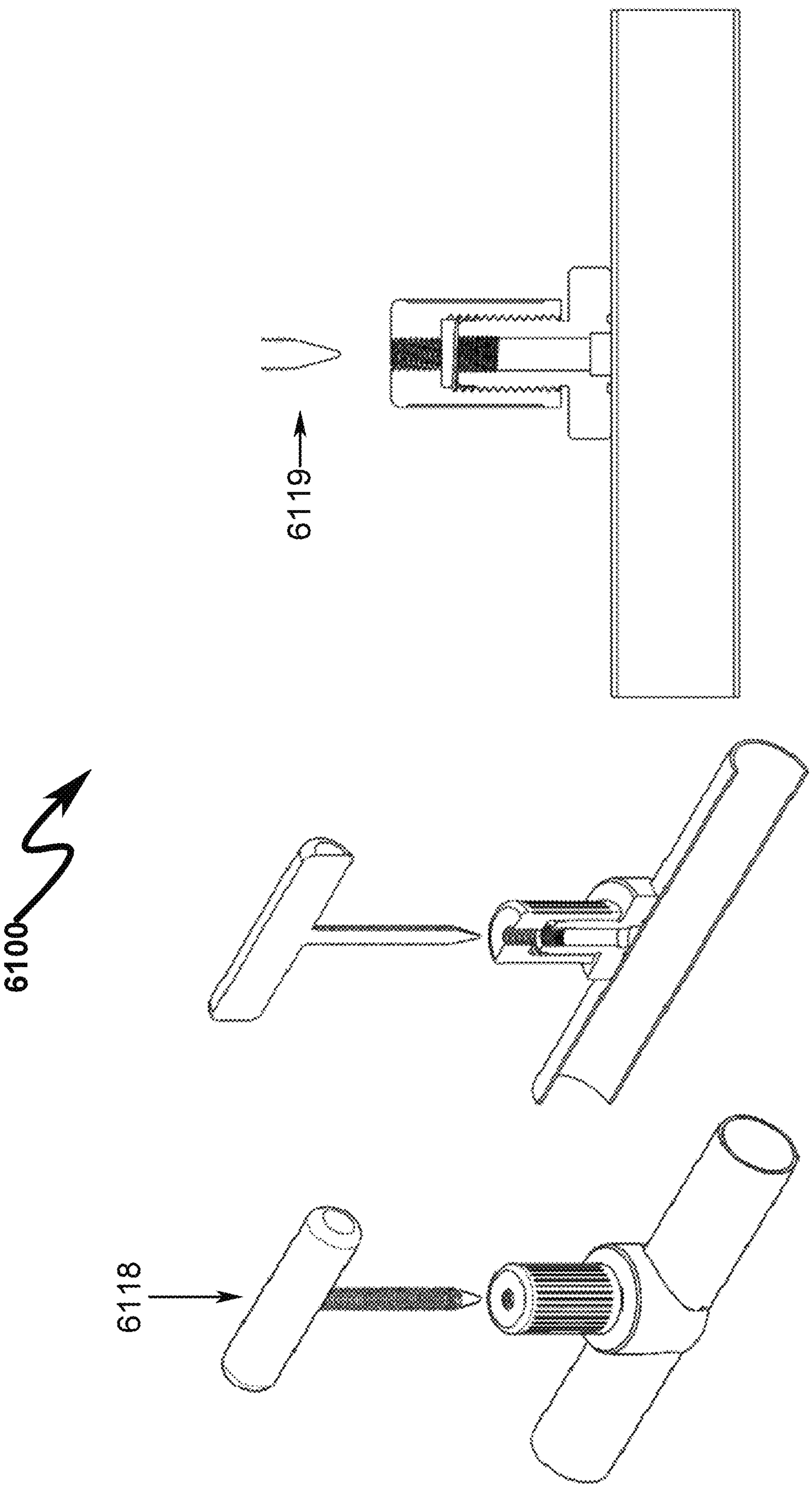
FIG. 61 illustrates an assembly view of a viper puncture tap (VPC) threaded onto a VTC/SVT combination and the RCL to which the SVT is attached.

As generally depicted in FIG. 60 (6000), once the SVT (6013) and RCL (6011) are mated and brazed, a viper tap cap (VTC) (6017) is mated by screw threads onto the SVT Schrader port. As generally depicted in FIG. 61 (6100), the VTC (6117) provides a platform from which a viper puncture tap (VPC) (6118) may be threaded and used to puncture the RCL via the use of a viper tap tip (VTT) (6119). This sequence is then followed by removal of the VPC and installation of a Schrader valve as depicted in the sequence of FIG. 62 (6200).

It should be noted that the use of the VTC (6017) is found to be optimal as any use of the threads associated with the Schrader valve to accomplish the puncture of the RCL may damage the Schrader valve female threads in the Schrader port and thus result in unwanted refrigerant leaks. One skilled in the art will recognize that the form factor for the VTC (6017), VPC (6118), and VTT (6119) may vary based on application context and the depictions in the drawings are only exemplary in nature and may have wide variations.

Figure 63:
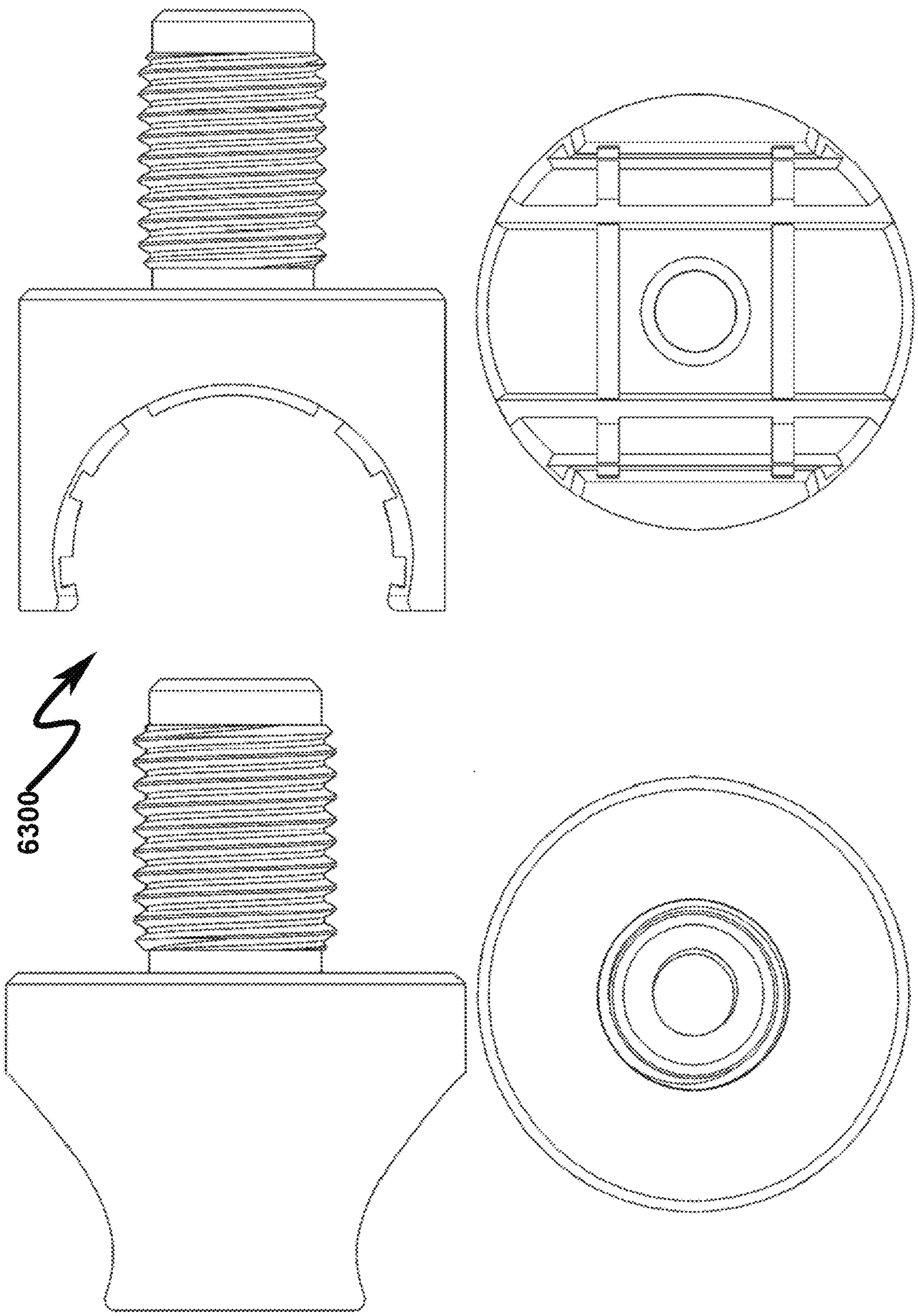
FIG. 63 illustrates front, top, left-side and right-side views of a preferred exemplary Schrader-Viper-Tap (SVT) fitting useful in some preferred invention embodiments.

Mechanical detail of the SVT construction is generally depicted in FIG. 63 (6300)-FIG. 64 (6400). Here it can be seen that the SVT may incorporate a semi-circular pipe void that may range from less than 180 degrees to over 180 degrees such that it may be "snapped" onto the existing refrigerant copper line (RCL). Implementations using a semi-circular pipe void less than or equal to 180 degrees requires that contact between the SVT and RCL be maintained during the brazing process while implementations using a semi-circular pipe void greater than 180 degrees are self-clamping and will maintain SVT/RCL contact during the brazing/soldering process. This "snap-on" feature allows the SVT Schrader port to be properly aligned onto the RCL at a desired angle with respect to the longitudinal axis of the RCL. Once this is accomplished, the SVT is held by this "snap-on" action so that it may be brazed/soldered to the RCL without fear of it rotating during the brazing/soldering operation.

Of note with respect to the construction of the SVT are the peripheral edges of the SVT that envelop the RCL that may incorporate chamfers and/or fillets to allow the brazing/soldering material to easily wick between the SVT and the RCL by virtue of capillary action when the brazing/soldering material becomes liquid. Furthermore, the SVT may be scored with one or more grooves that mate with the RCL to allow capillary action to wick brazing/soldering material between the SVT and the RCL. Finally, a port detent indentation may be present under the Schrader port to isolate an area under the Schrader port valve from wicking by the brazing/soldering material.

It should be noted that previous discussions of the Schrader port saddle tap (SST) indicate that the SST is not a preferred method of incorporating a Schrader port in an existing HVAC refrigerant line as this technique is prone However, it should be noted that the to leaks over time. SVT as described herein can be used to replace an existing SST and provide a leak-proof replacement for testing methods that use the SST on a temporary basis. Therefore, it is possible to perform leak testing using SSTs to quickly identify and isolate a leaking HVAC component or refrigerant line, then remove the SSTs and replace them with SVTs that are brazed/soldered into place to ensure a leak-free HVAC system once repairs are made. In this scenario, once the SST is removed, the SVT can be snapped into place and rotated until the existing puncture in the RCL aligns with the VTT of the VPC. Once this alignment is achieved, the VPC can be removed and the SVT brazed/soldered in place to achieve an air-tight Schrader port fitting.

Schrader Flare Adapter (SFA)

The present invention anticipates the utilization of Schrader valve ports (SVP) incorporating Schrader valve assemblies (SVA) to provide pressure monitoring and/or pressure testing of isolated segments within a HVAC system. However, a significant issue regarding this methodology is that most, if not all, HVAC systems lack SVP hardware at positions within the HVAC refrigerant loop to enable segmented testing of the HVAC system. Furthermore, the HVAC industry does not teach the use of any flare-to-Schrader adapters to enable HVAC systems incorporating flare fittings to join HVAC system refrigerant line components.

In order to address this deficiency, the present invention anticipates the use of Schrader Flare Adapters (SFA) that provide a transition between HVAC flare fittings and a Schrader port. Using this newly developed SFA allows a flare coupling within the HVAC system to be uncoupled and both ends of the open coupling to be terminated with a Schrader valve port (SVP), thus enabling pressure monitoring and/or pressure testing of each end of the open coupling via use of two SVP that terminate each open coupling end.

The SFA as taught by the present invention may take many forms, but two are preferred. In the first preferred embodiment, the SFA comprises a male or female flare port fitting (FPF) and a Schrader valve port (SVP) that are machined from a single billet of metal that is preferably a brass or brass alloy. In the second preferred embodiment, the SFA comprises a male or female flare port fitting (FPF) and a Schrader port adapter (SPA) that are machined from two billets of metal that are preferably a brass or brass alloy and then brazed or soldered together to form a single unitary structure.

The advantage of the FPF/SVP configuration is that it is less prone to leakage but has the disadvantage of manufacturing cost. The advantage of the FPF/SFA configuration is that it is less expensive to manufacture and can take advantage of the wide availability of FPF flare-to-tube/pipe fittings that are standard within the HVAC industry, while having the disadvantage of requiring soldering/brazing SFA to form the unitized SFA.

The present invention anticipates that some FPF/SVP embodiments may incorporate a cylindrical indentation in the PIP and/or TIP that is configured to accept soldering and/or brazing material to affect the mechanical coupling between the PIP and TIP. During the soldering/brazing process, the soldering/brazing material will wick into one or more of these cylindrical indentations in the PIP and/or TIP and thus provide a secure interface between the PIP/TIP to prevent shearing of the soldering/brazing interface between the two components.

Schrader Port Fem ale Fittings (SFF/SMF) (6500)-(8000)

Figure 65:
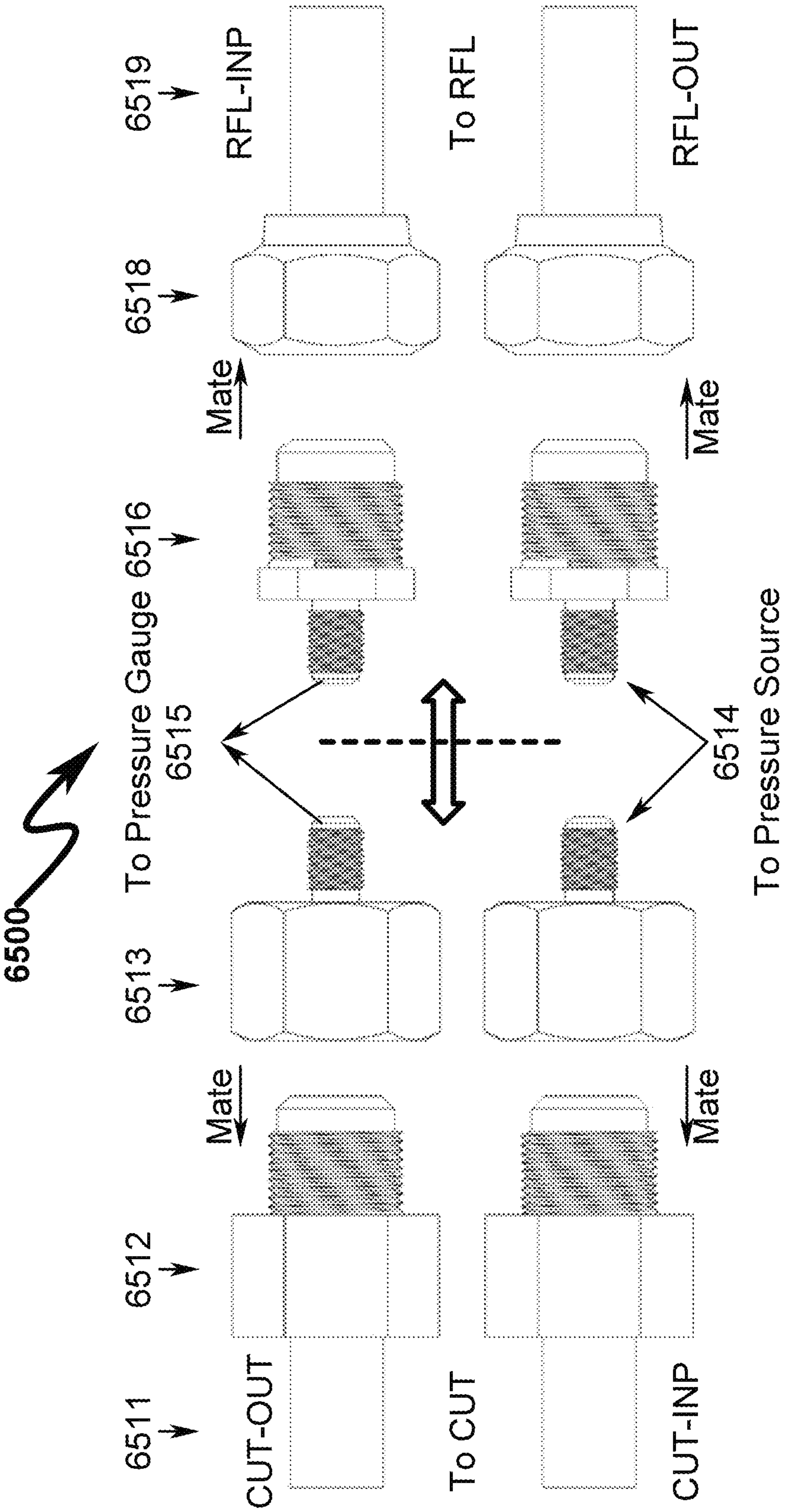
FIG. 65 illustrates an assembly view of a typical HVAC component under test (CUT) and refrigerant line (RFL) segmentation testing configuration utilizing a preferred exemplary Schrader-Flare-Male (SEM) fitting and Schrader-Flare-Female (SFF) fitting.
Figure 72:
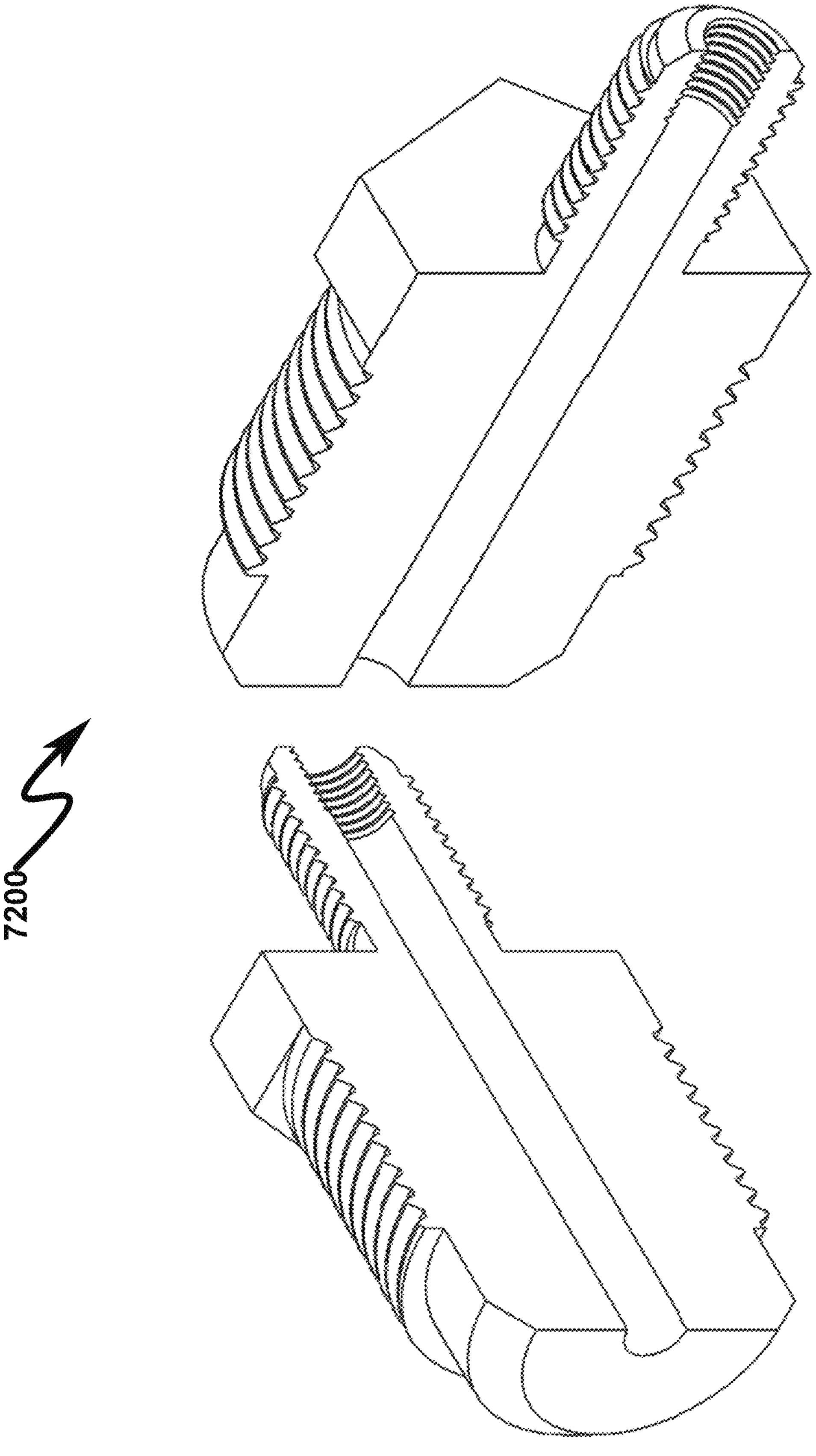
FIG. 72 illustrates front top left-side perspective section and front top right-side perspective section views of a preferred exemplary Schrader-Flare-Male (SEM) fitting useful in some preferred invention embodiments.
Figure 73:
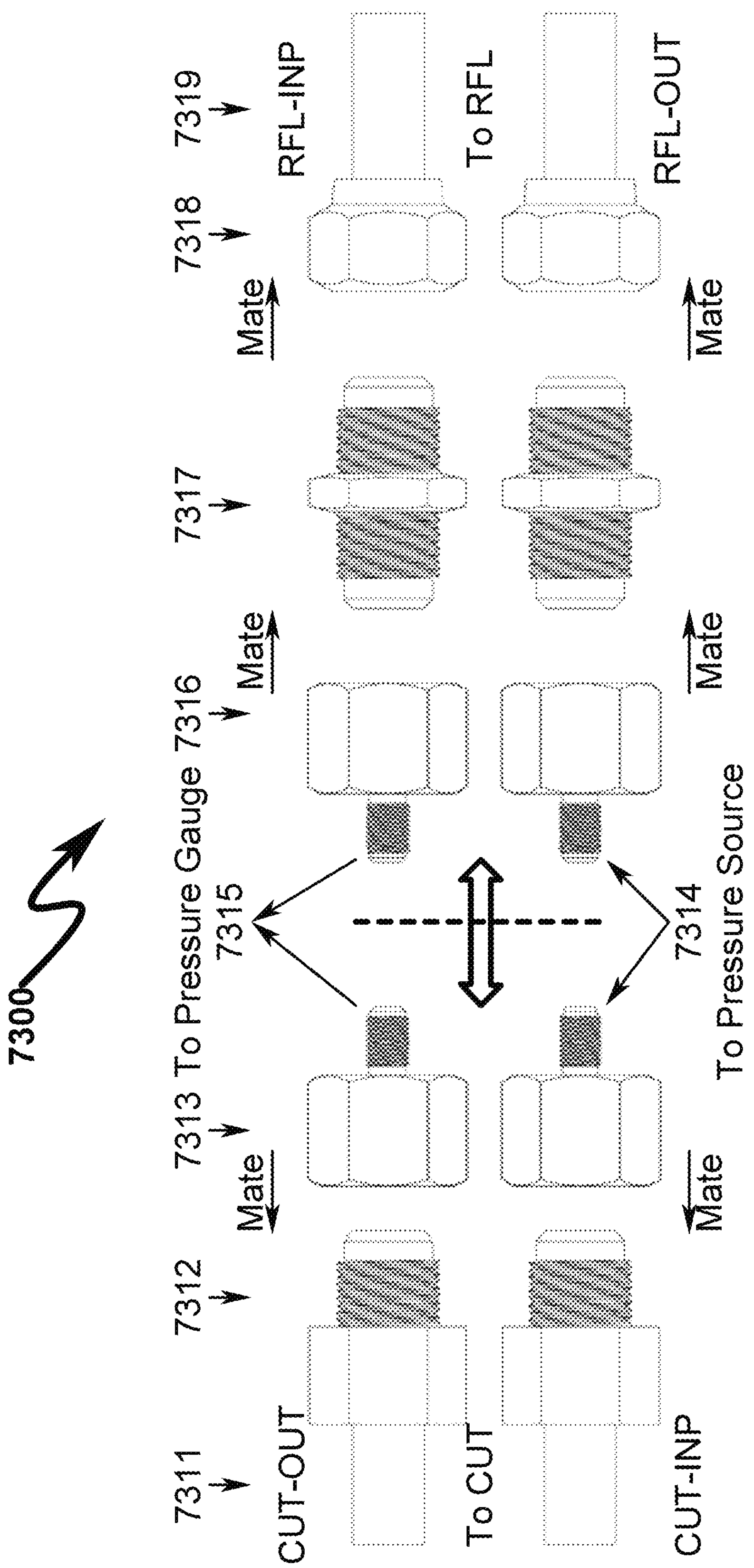
FIG. 73 illustrates an assembly view of a typical HVAC component under test (CUT) and refrigerant line (RFL) segmentation testing configuration utilizing a preferred exemplary Schrader-Flare-Female (SFF) fitting and male-to-male flare fitting (MMF)
Figure 80:
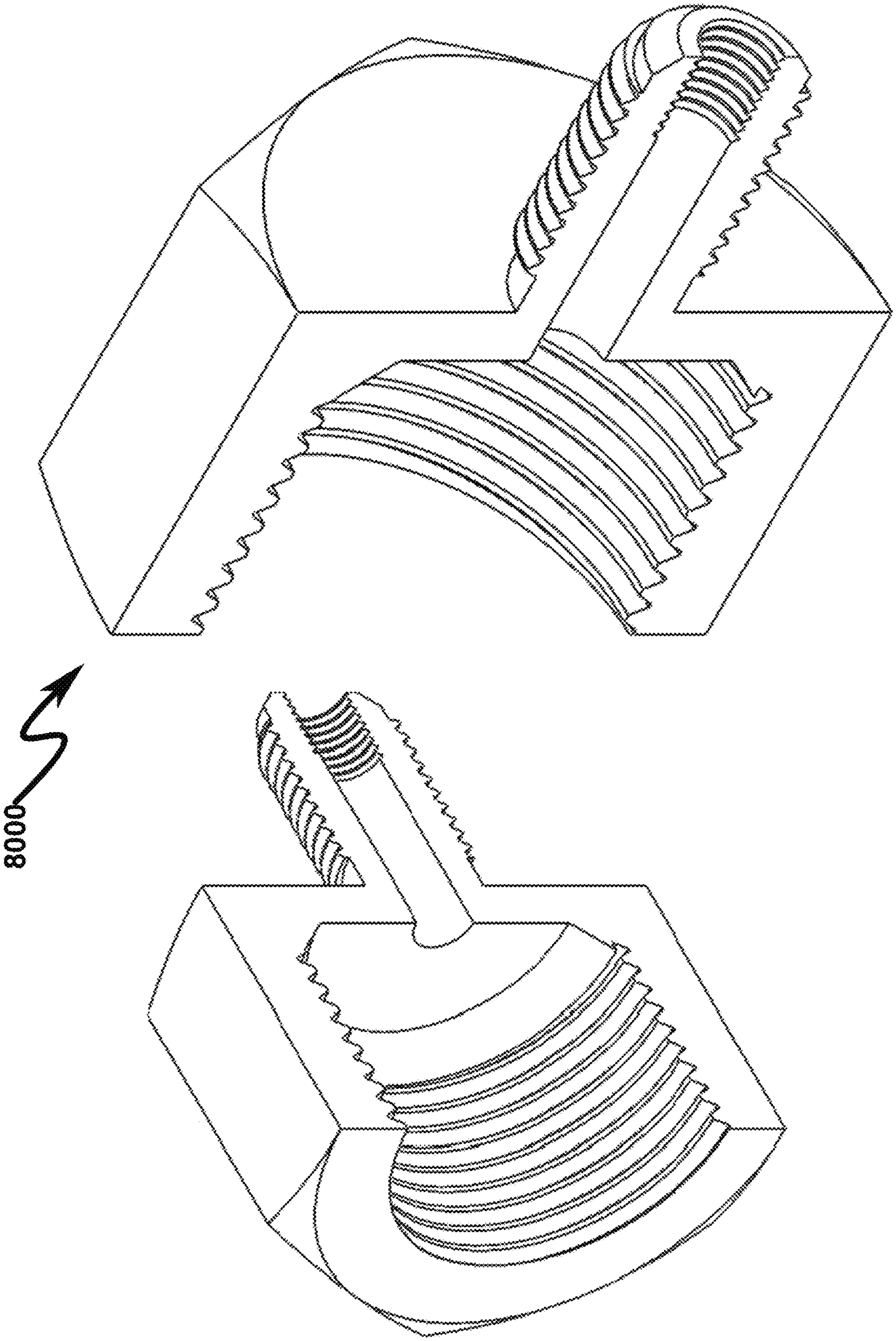
FIG. 80 illustrates front top left-side perspective section and front top right-side perspective section views of a preferred exemplary Schrader-Flare-Female (SFF) fitting useful in some preferred invention embodiments.

As generally detailed in FIG. 65 (6500)-FIG. 72 (7200) and FIG. 73 (7300)-FIG. 80 (8000), the present invention anticipates that the sealing and pressure testing functions described herein may be accomplished by use of custom-machined Schrader port male flare fittings (SMF) and/or Schrader port female flare fittings (SFF). These devices are not known in the prior art.

Figure 66:
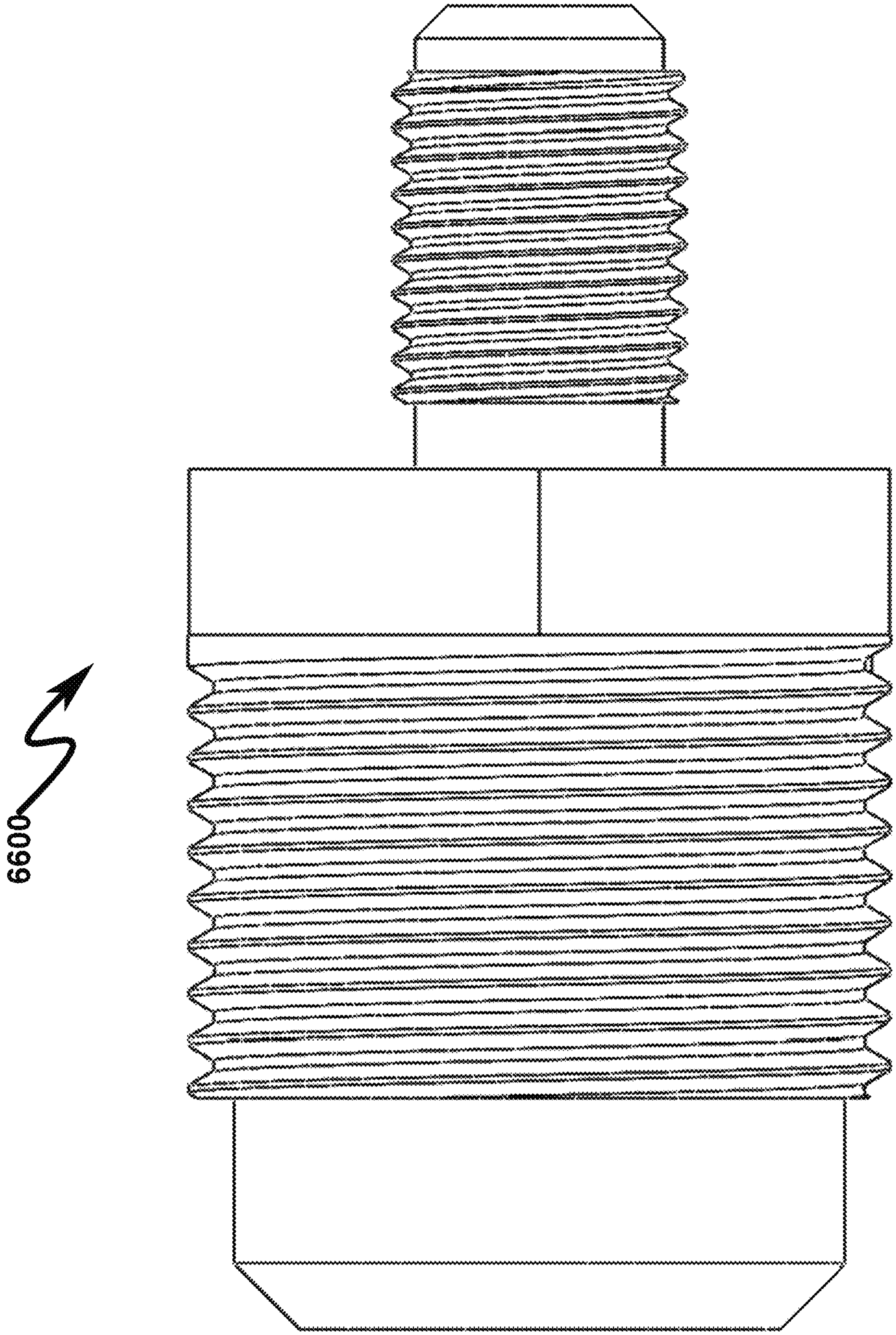
FIG. 66 illustrates a detailed front view of an exemplary Schrader-Flare-Male (SEM) fitting.
Figure 67:
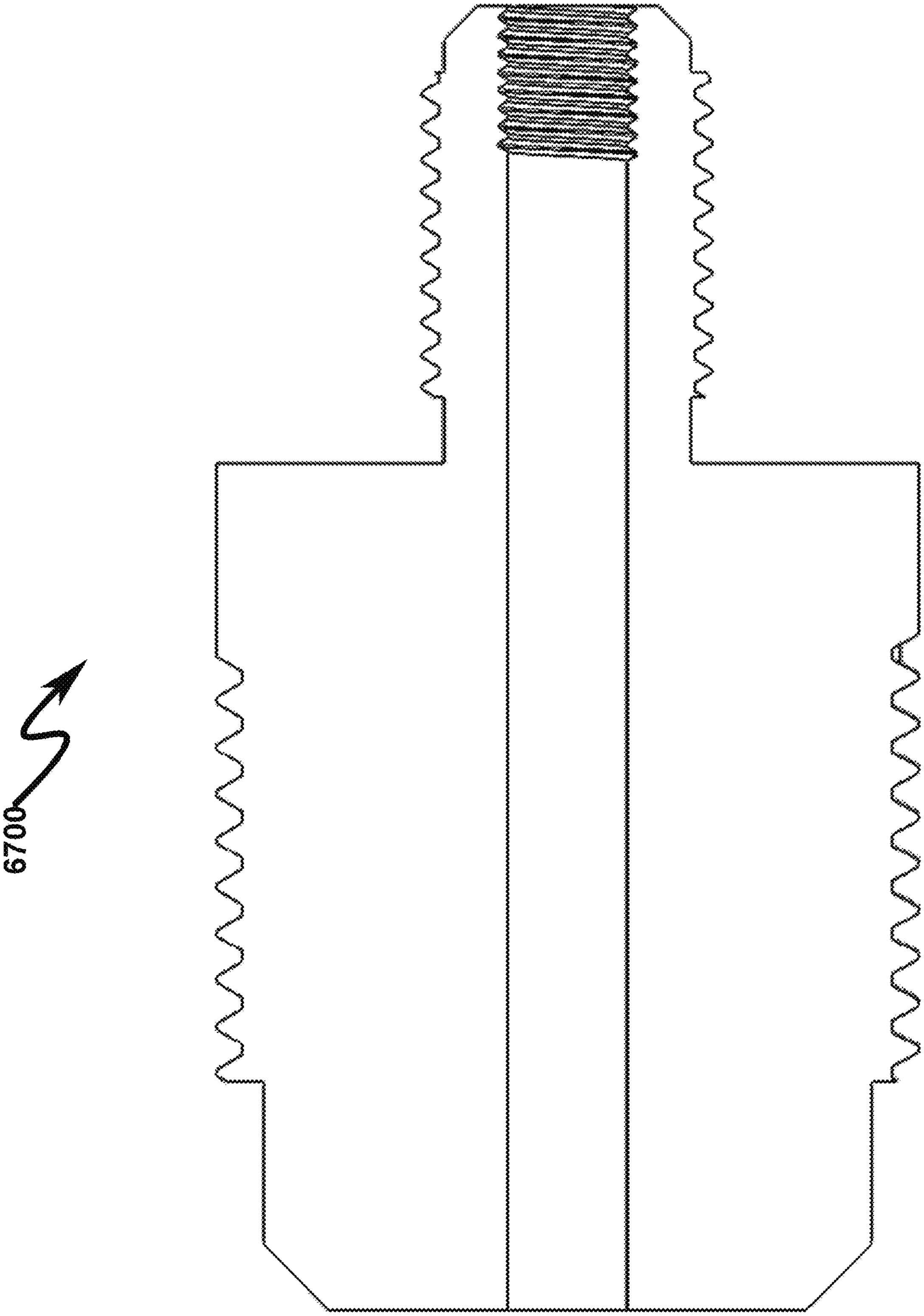
FIG. 67 illustrates a detailed front section view of an exemplary Schrader-Flare-Male (SEM) fitting.
Figure 68:
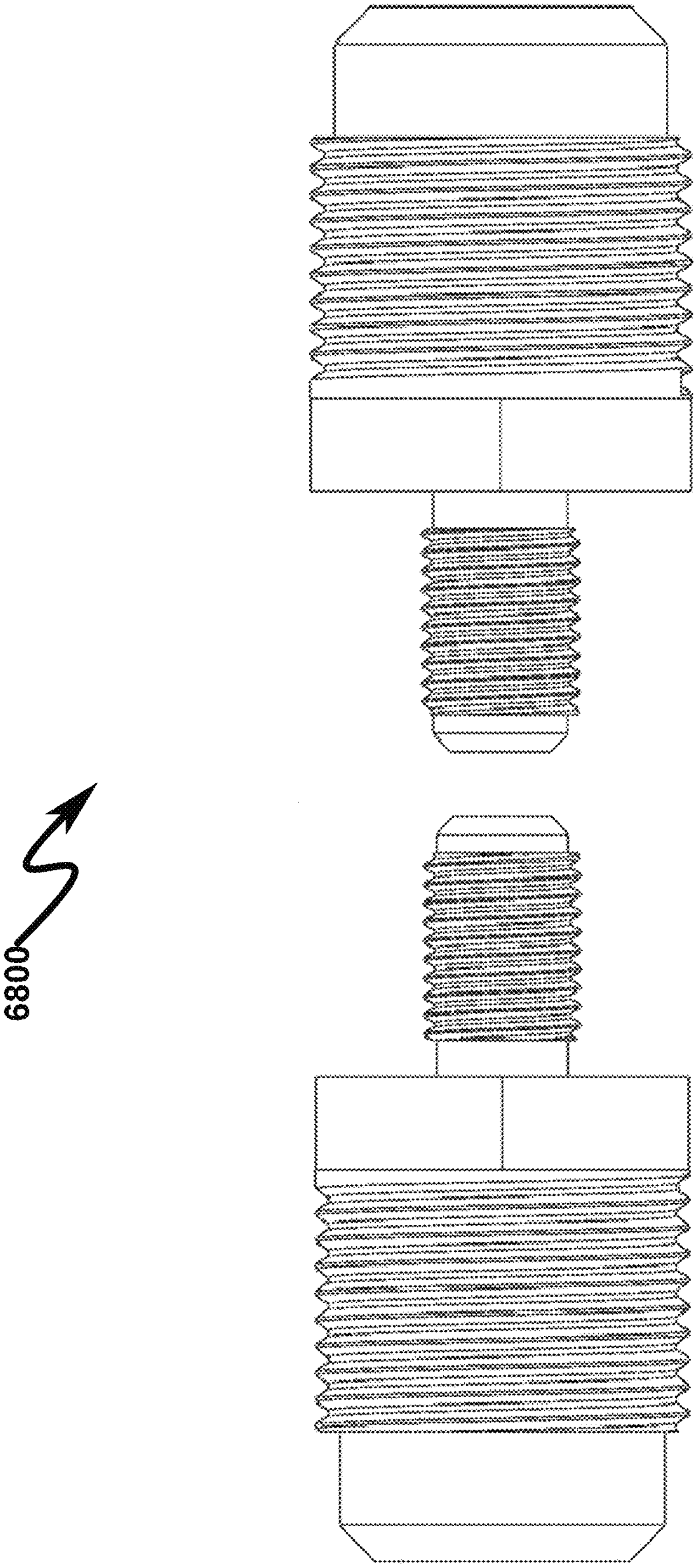
FIG. 68 illustrates front and rear views of a preferred exemplary Schrader-Flare-Male (SEM) fitting useful in some preferred invention embodiments.
Figure 69:
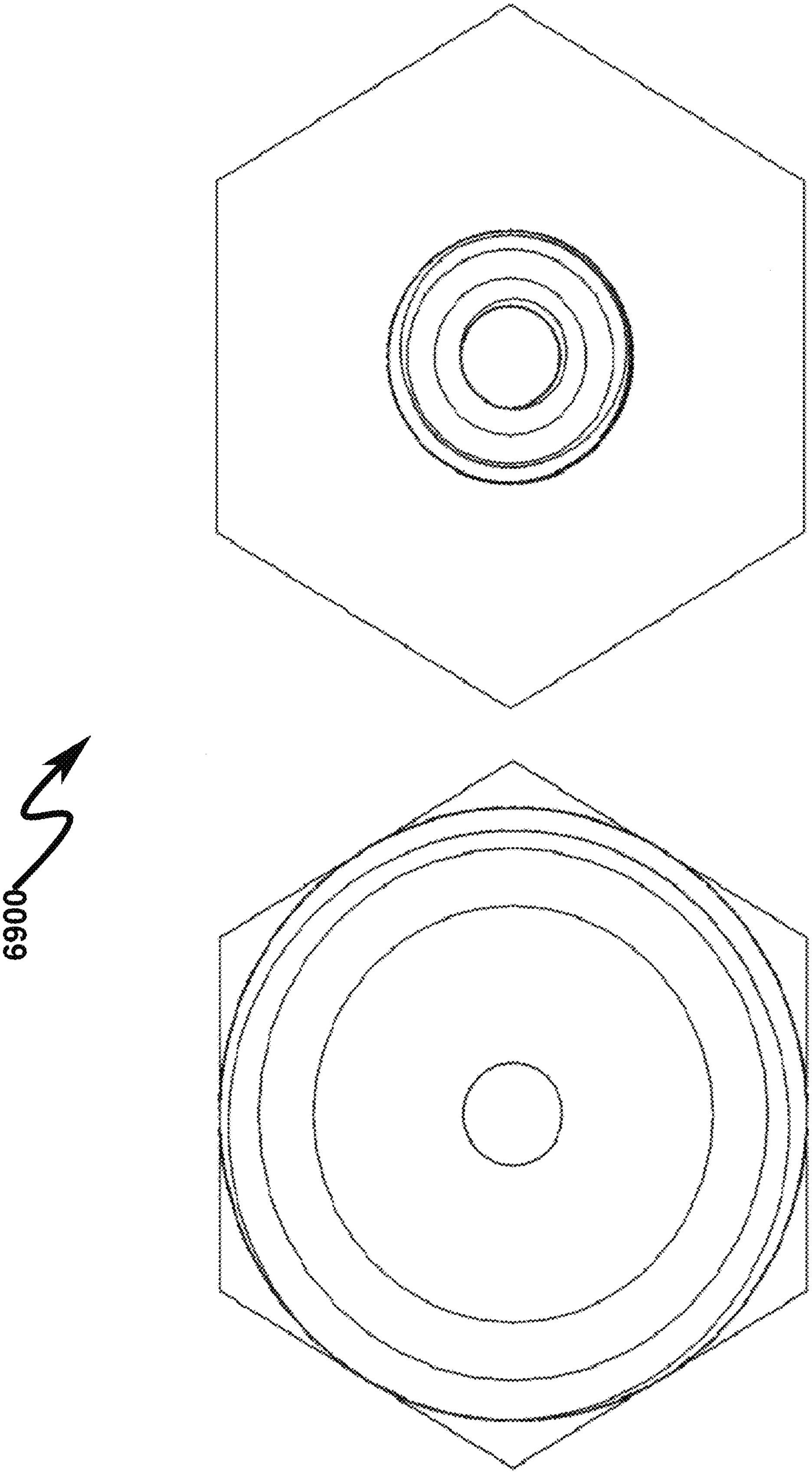
FIG. 69 illustrates left-side and right-side views of a preferred exemplary Schrader-Flare-Male (SEM) fitting useful in some preferred invention embodiments.
Figure 70:
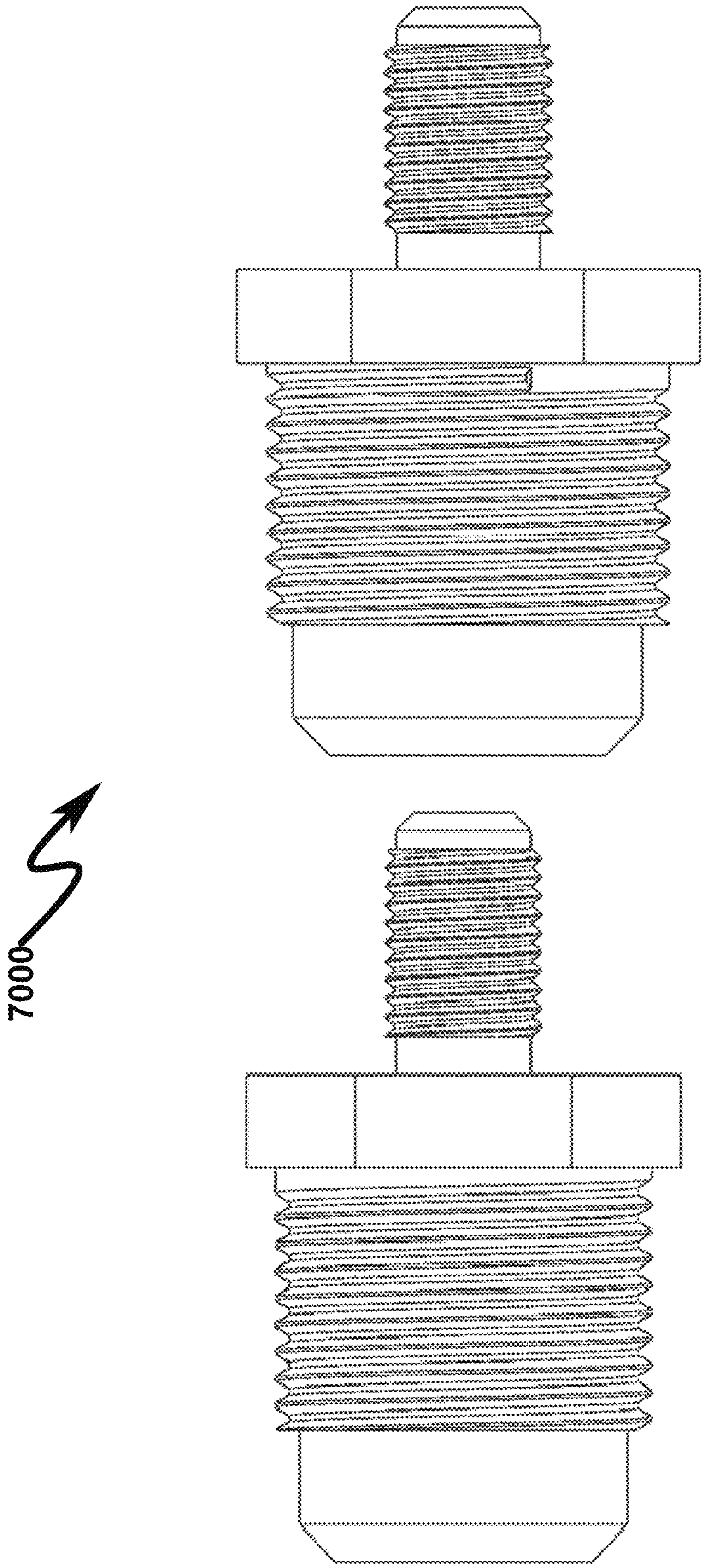
FIG. 70 illustrates top and bottom views of a preferred exemplary Schrader-Flare-Male (SEM) fitting useful in some preferred invention embodiments.
Figure 71:
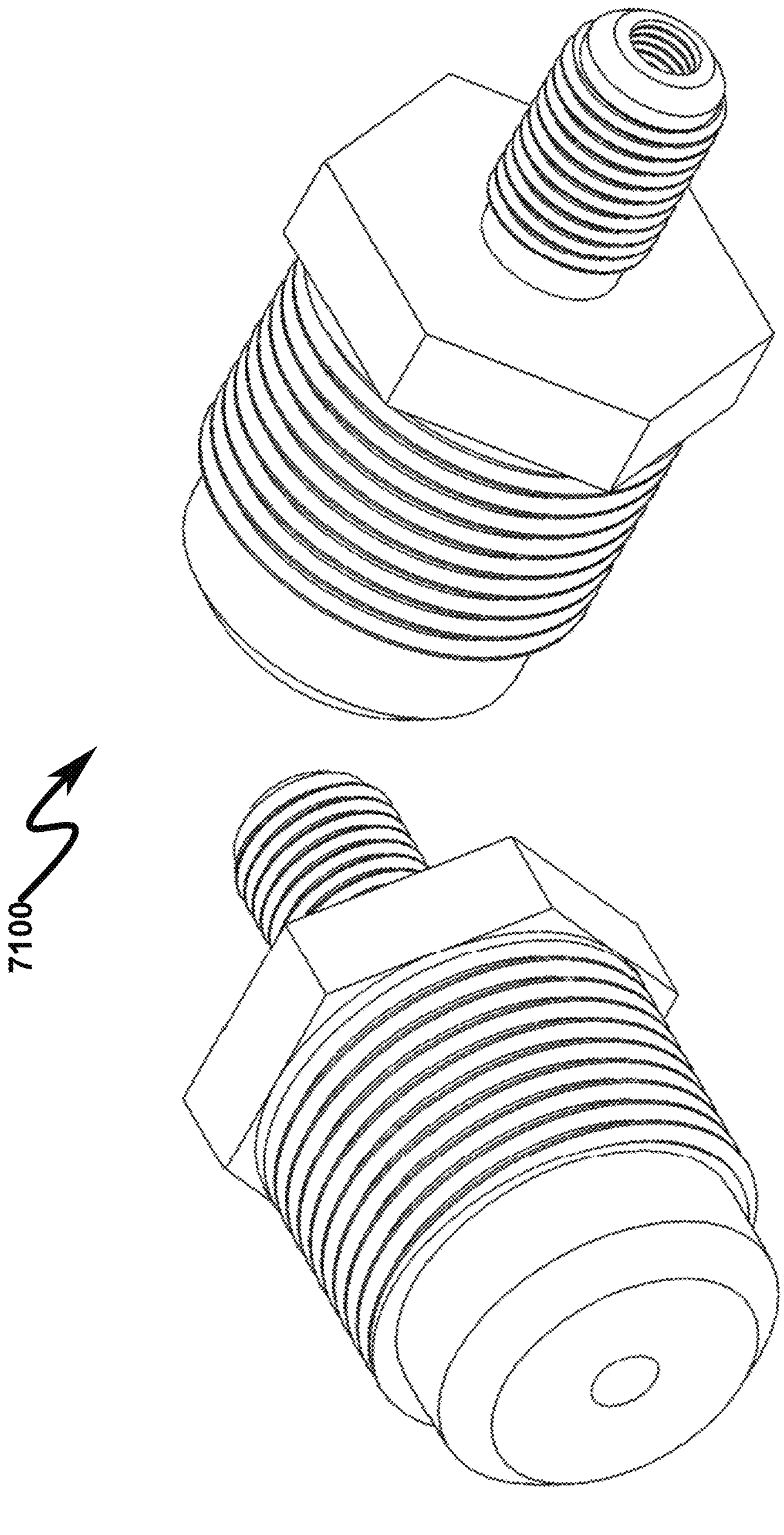
FIG. 71 illustrates front top left-side perspective and front top right-side perspective views of a preferred exemplary Schrader-Flare-Male (SEM) fitting useful in some preferred invention embodiments.
Figure 74:
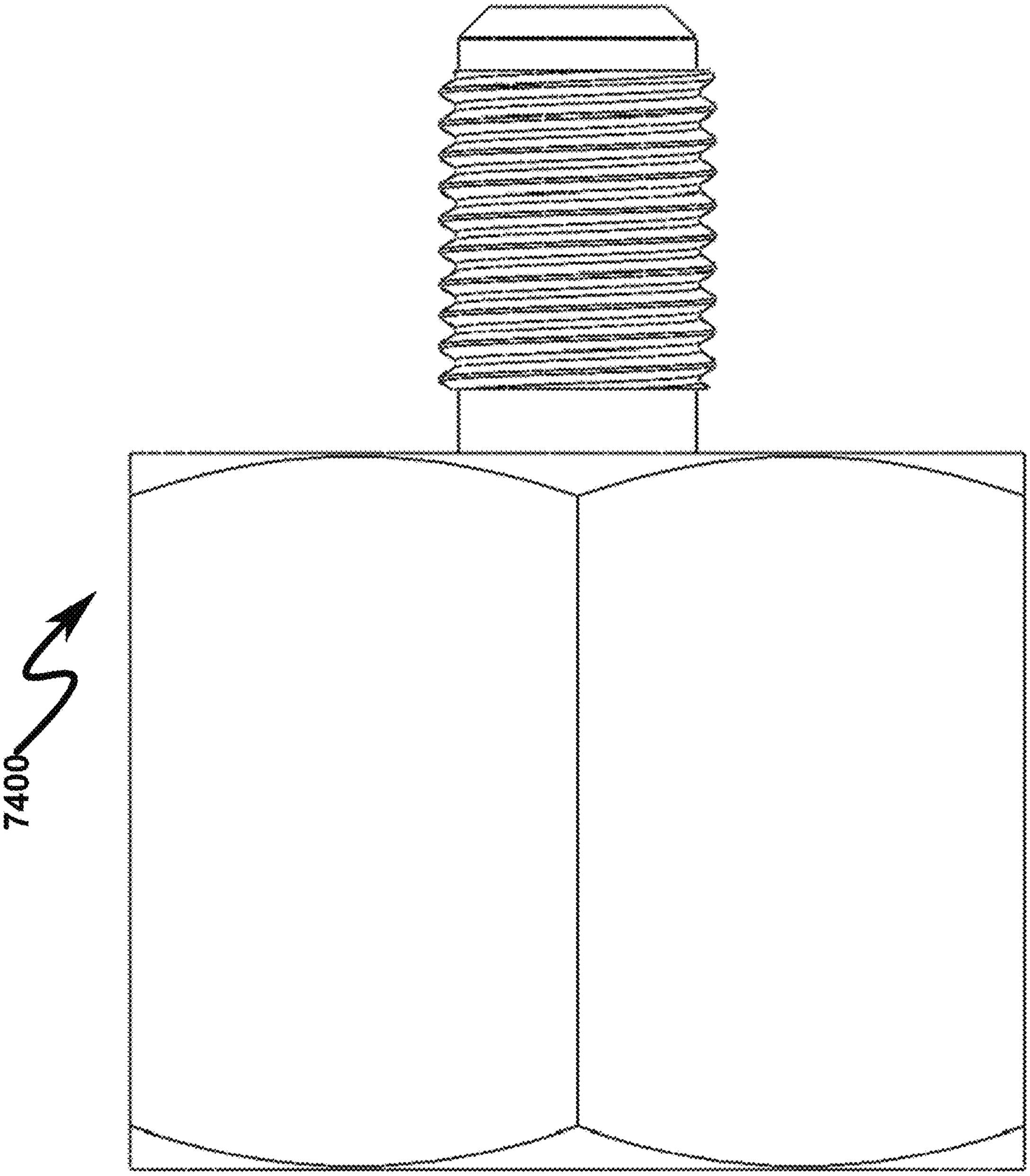
FIG. 74 illustrates a detailed front view of an exemplary Schrader-Flare-Female (SFF) fitting.
Figure 75:
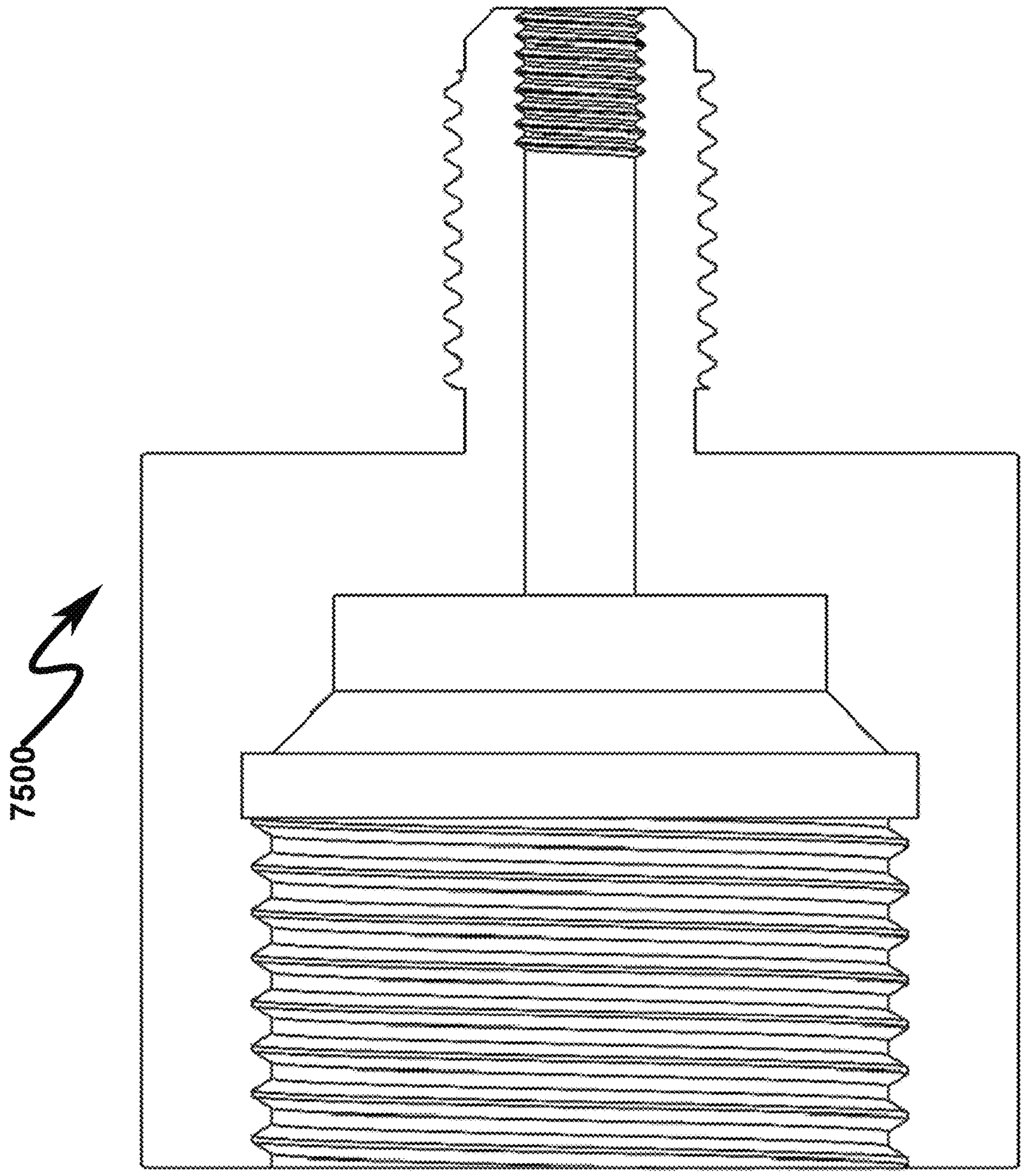
FIG. 75 illustrates a detailed front section view of an exemplary Schrader-Flare-Female (SFF) fitting.
Figure 76:
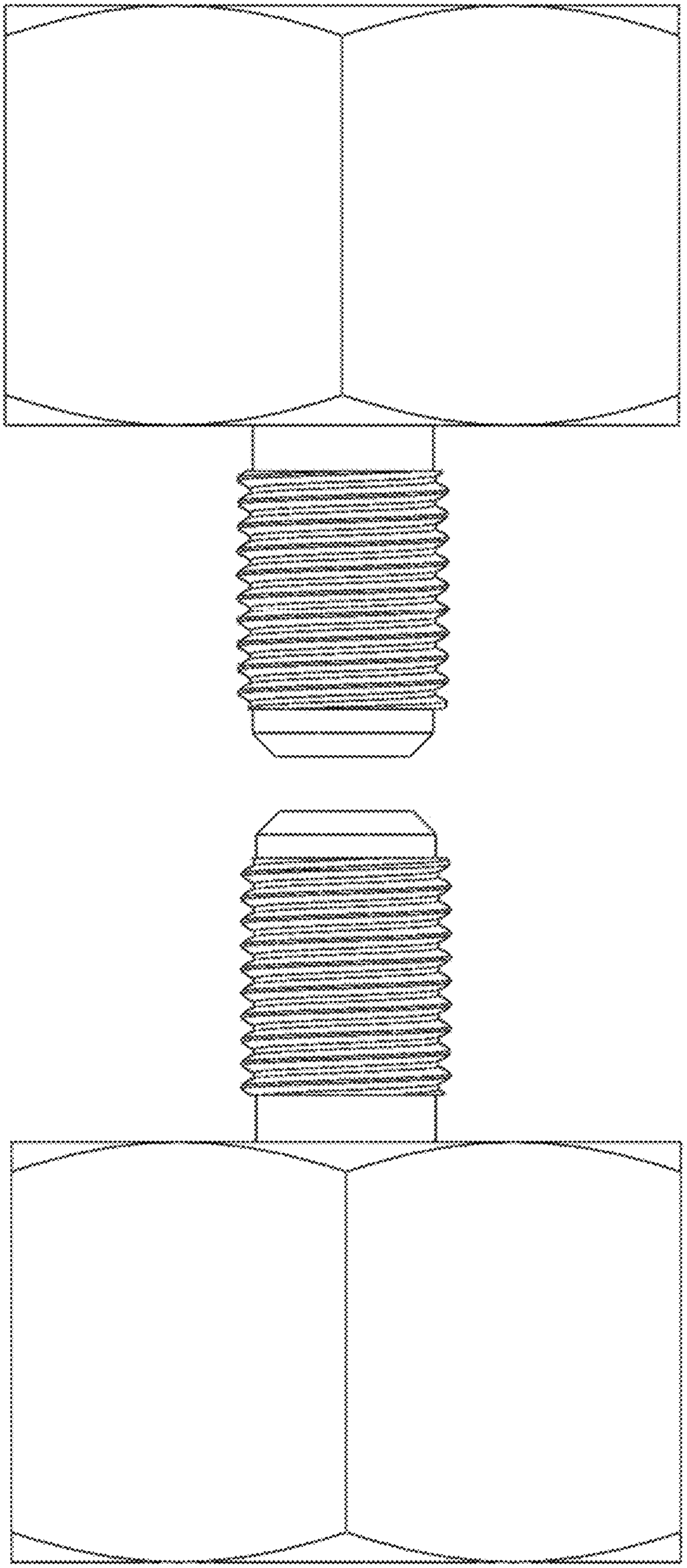
FIG. 76 illustrates front and rear views of a preferred exemplary Schrader-Flare-Female (SFF) fitting useful in some preferred invention embodiments.
Figure 77:
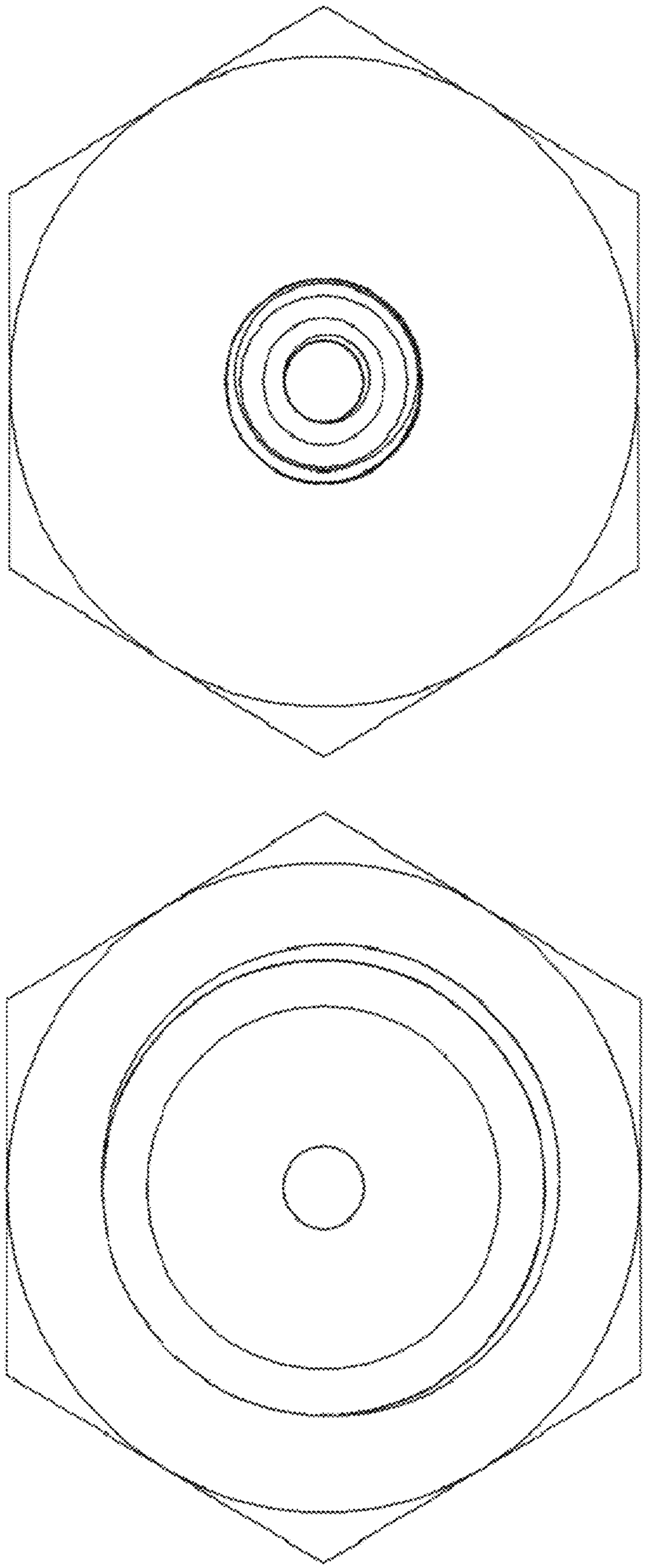
FIG. 77 illustrates left-side and right-side views of a preferred exemplary Schrader-Flare-Female (SFF) fitting useful in some preferred invention embodiments.
Figure 78:
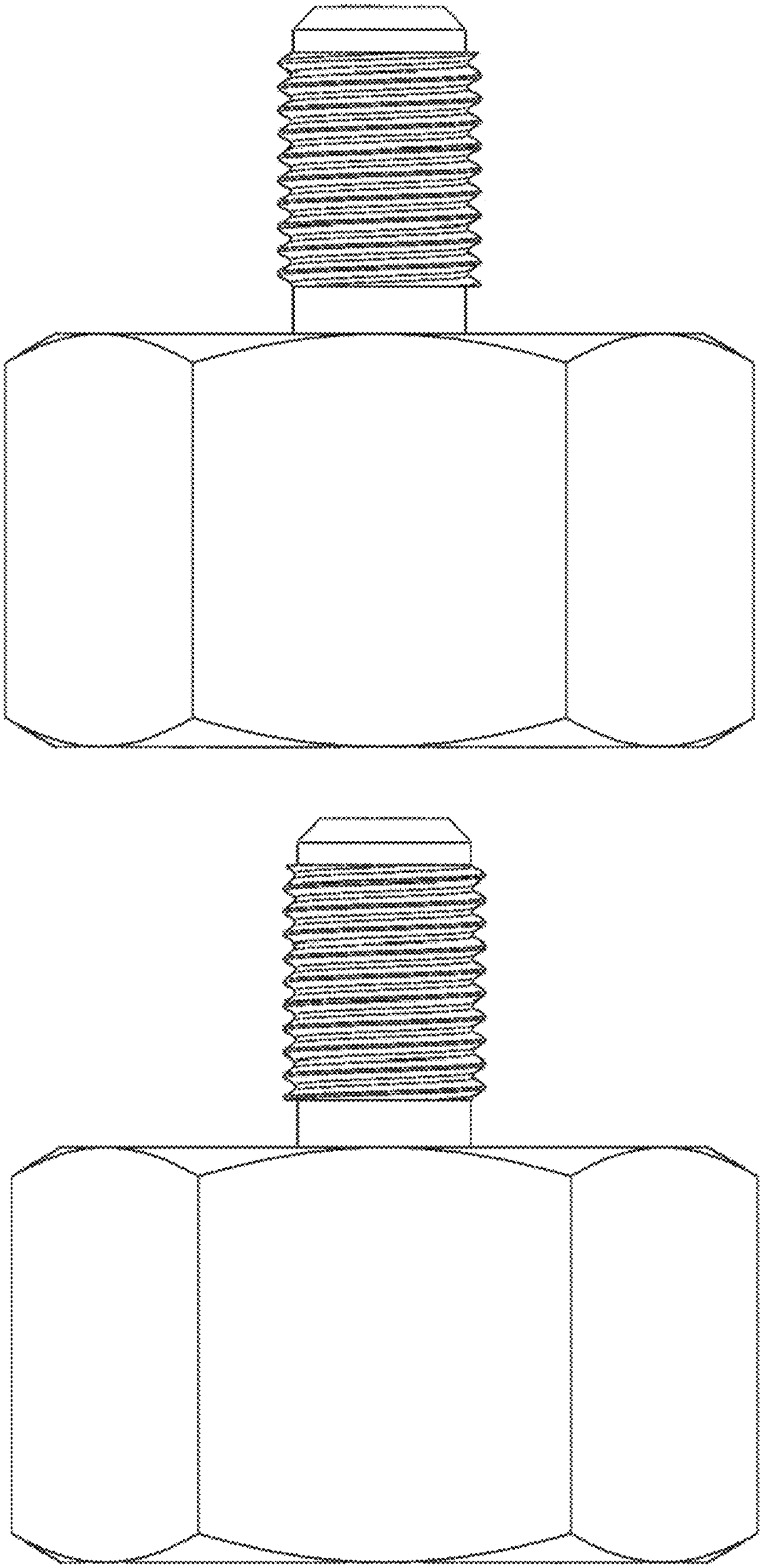
FIG. 78 illustrates top and bottom views of a preferred exemplary Schrader-Flare-Female (SFF) fitting useful in some preferred invention embodiments.
Figure 79:
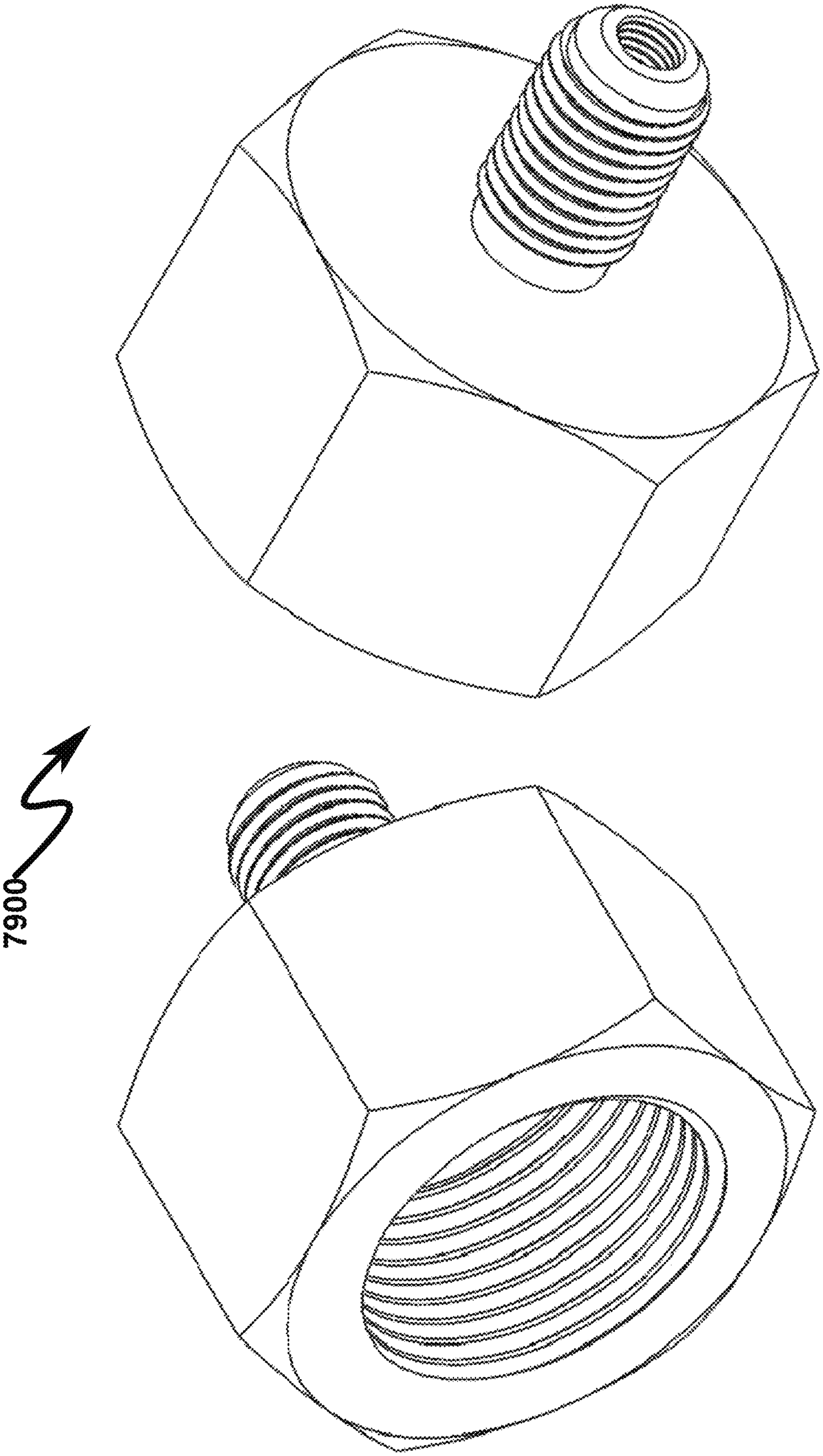
FIG. 79 illustrates front top left-side perspective and front top right-side perspective views of a preferred exemplary Schrader-Flare-Female (SFF) fitting useful in some preferred invention embodiments.

FIG. 65 (6500) illustrates the use of Schrader port male flare fittings (SMF) (FIG. 66 (6600)-FIG. 72 (7200)) in combination with Schrader port female flare fittings (SFF) (FIG. 74 (7400)-FIG. 80 (8000)) to separately isolate and test a HVAC component under test (CUT) from its corresponding refrigerant lines (RFL). Here the CUT male flare fittings (6512) are mated with a SFF (6513) and the RFL female flare fittings (6518) are mated with a SMF (6516). Pressure sources (6514) and pressure gauges (6515) are then attached to the SFF (6513)/SMF (6516) to pressure test the isolated CUT and RFL HVAC segments.

FIG. 73 (7300) illustrates the use of Schrader port female flare fittings (SFF) (FIG. 74 (7400)-FIG. 80 (8000)) in combination with standard male-to-male flare (MMF) fittings to separately isolate and test a HVAC component under test (CUT) from its corresponding refrigerant lines (RFL). Here the CUT male flare fittings (7312) are mated with a SFF (7313) and the RFL female flare fittings (7318) are mated with a MFF (7317) that is coupled to a SFF (7316). Pressure sources (7314) and pressure gauges (7315) are then attached to the SFF (7313)/SFF (7316) to pressure test the isolated CUT and RFL HVAC segments.

There are benefits and drawbacks to both leak testing scenarios depicted in FIG. 65 (6500) and FIG. 73 (7300). The scenario in FIG. 65 (6500) has the advantage of fewer components to perform the leak testing while incurring additional cost for the requirement of a separate SMF for use in the testing process. The scenario in FIG. 73 (7300) has the advantage of fewer custom components (only the SFF need be machined as compared to both the SFF and SMF for the FIG. 65 (6500) scenario), but may incur leaks with the use of the MFF. At present, the best preferred mode is thought to be the FIG. 65 (6500) scenario given the fact that when troubleshooting a HVAC system there is typically no prior knowledge of what types of flare fittings (male or female) are present in the system and as such a refrigerant leak repair kit (RLK) may need to be stocked with a variety of adapters in order to address an individual HVAC system configuration for leak testing.

Schrader Port Adapter (SPA) (8100)-(8800)

Figure 88:
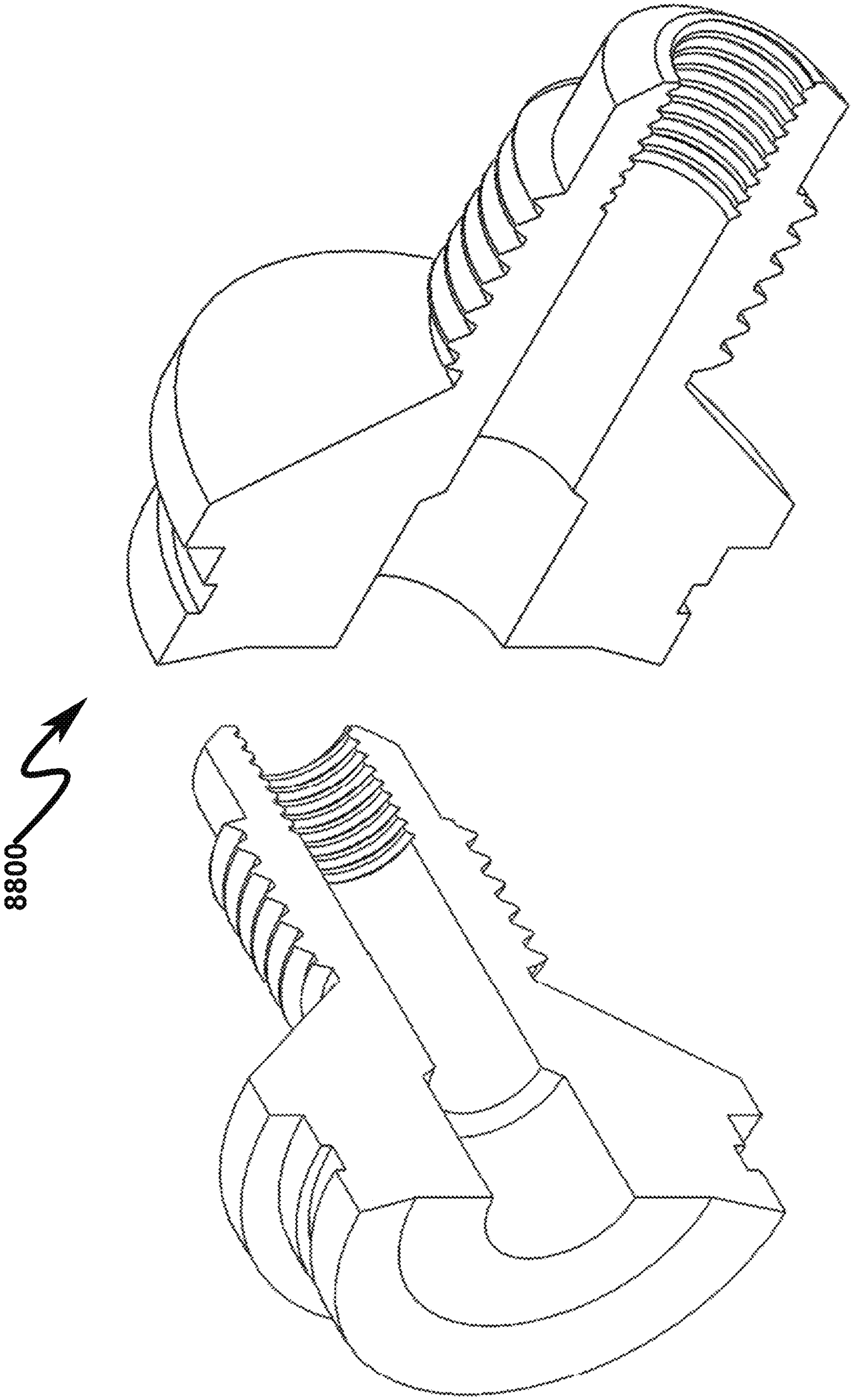
FIG. 88 illustrates front top left-side perspective section and front top right-side perspective section views of a preferred exemplary Schrader-Port-Adapter (SPA) fitting useful in some preferred invention embodiments.

As generally detailed in FIG. 81 (8100)-FIG. 88 (8800), the present invention anticipates that the sealing and pressure testing functions described herein may be accomplished by augmentation of existing female flare nut fittings and/or existing male flare tube fittings with a Schrader port adapter (SPA). The SPA is not known in the prior art.

Figure 82:
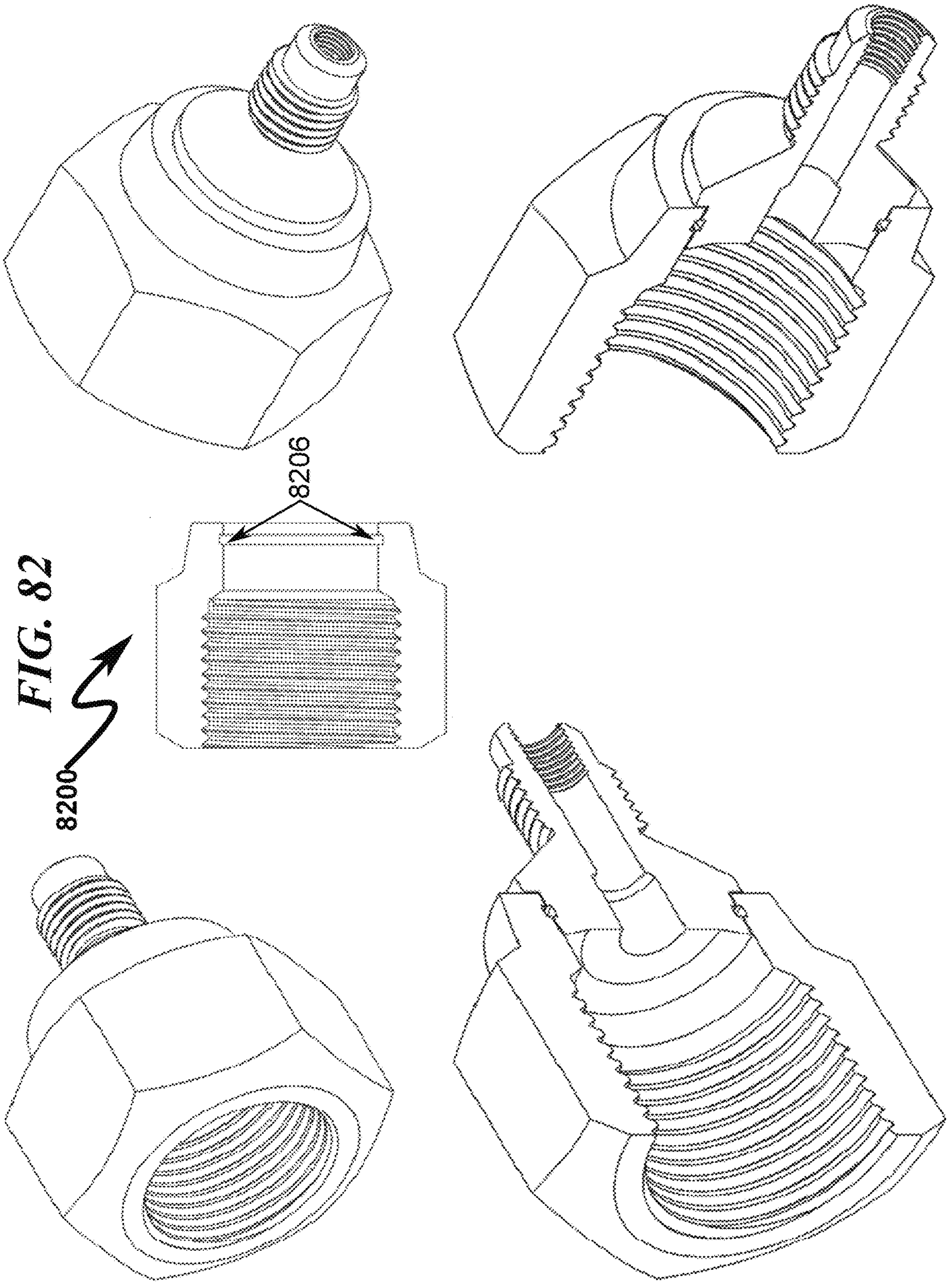
FIG. 82 illustrates perspective and section views of a preferred exemplary Schrader-Port-Adapter (SPA) and female flare nut (FFN) assembly useful in some invention embodiments.
Figure 83:
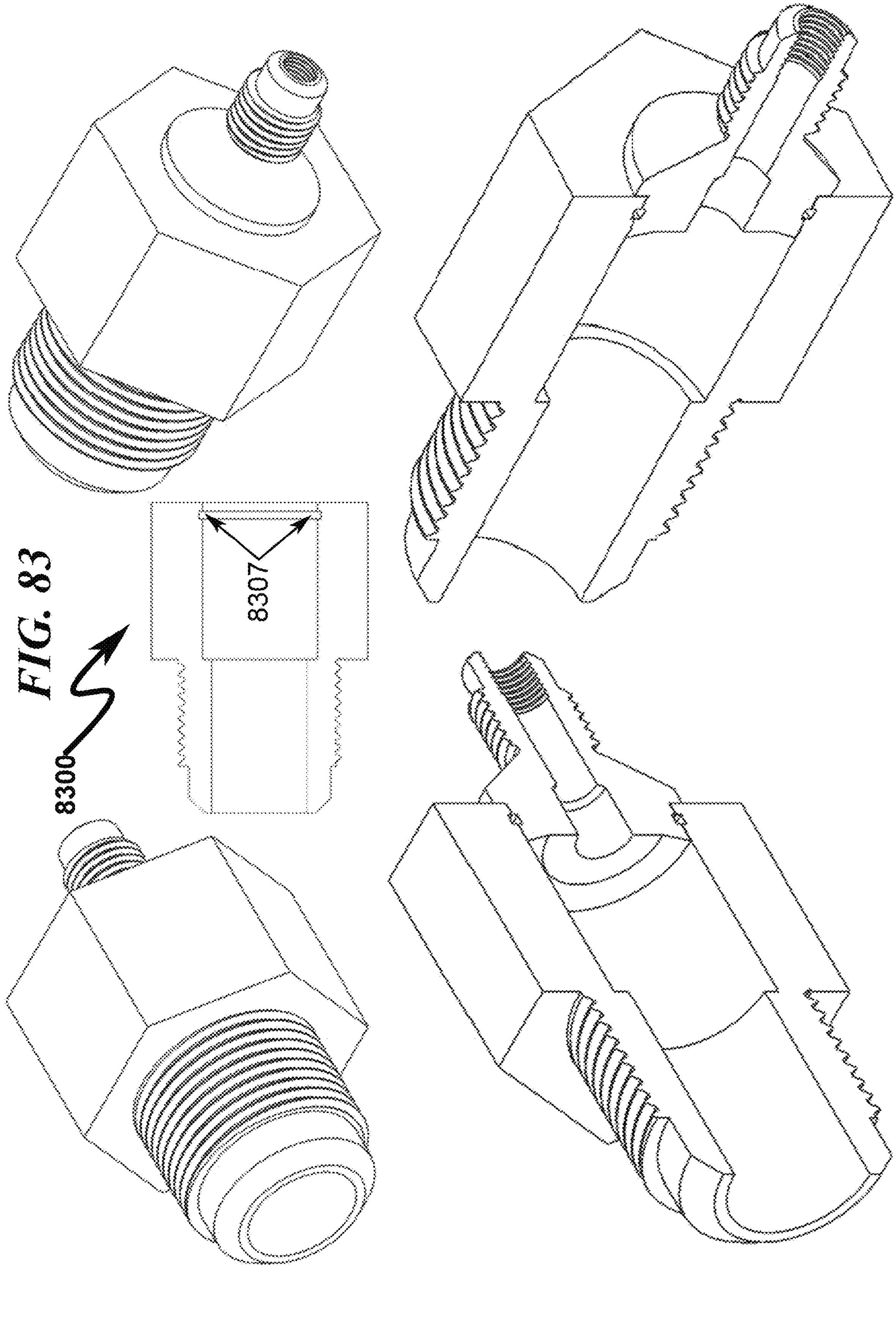
FIG. 83 illustrates perspective and section views of a preferred exemplary Schrader-Port-Adapter (SPA) and male flare fitting (MFF) assembly useful in some invention embodiments.

The SPA is configured to incorporate a Schrader Port that mates with a female flare nut (FFN) (FIG. 82 (8200)) or male flare fitting (MFF) (FIG. 83 (8300)) by means of brazing or soldering. As shown in the figures presented, this brazing/soldering attachment between the SPA and FFN/MFF may be augmented with a solder-lock-inset (SLI) present on the SPA (8105), FEN (8206), and/or MFF (8307), that allows brazing/soldering material to fill voids between the SFA/FFN and/or SFA/MFF and present an anti-shearing interface between the two items that resists separation of the two items when the SPA/FEN or SPA/MFF assemblies are pressurized. FIG. 84 (8400) depicts the SPA with and without a SLI and contrasts the differences (8408, 8409) between the two construction techniques.

As depicted in FIG. 82 (8200), the SPA may be configured as a female flare adapter by use of a female flare nut (FFN) mated to the SPA, or a male-to-male flare adapter (MFA) may be inserted into the FFN/SPA combination to provide for a male flare fitting (MFF) useful in terminating and pressurizing a corresponding female flare nut (FFN) present in a HVAC system CUT. The SPA may also be mated with a MFF as generally depicted in FIG. 83 (8300) to provide for a male flare fitting as needed to terminate the RFL or CUT.

The advantage of using the SPA in this configuration is that the brazing/soldering of the SPA to the FFN/MFF provides for a guaranteed leakless interface between the SPA and the corresponding male/female flare fittings. Additionally, since the FFN/MFF components are readily available in the industry, this SPA configuration allows the use of low-cost FFN/MFF to configure a Schrader port flare fitting with minimal material and machining costs.

The SPA is generally applicable to pipe sizes of ¼-inch or larger.

Schrader Adapter Cap (SAC) (8900)-(9600)

Figure 96:
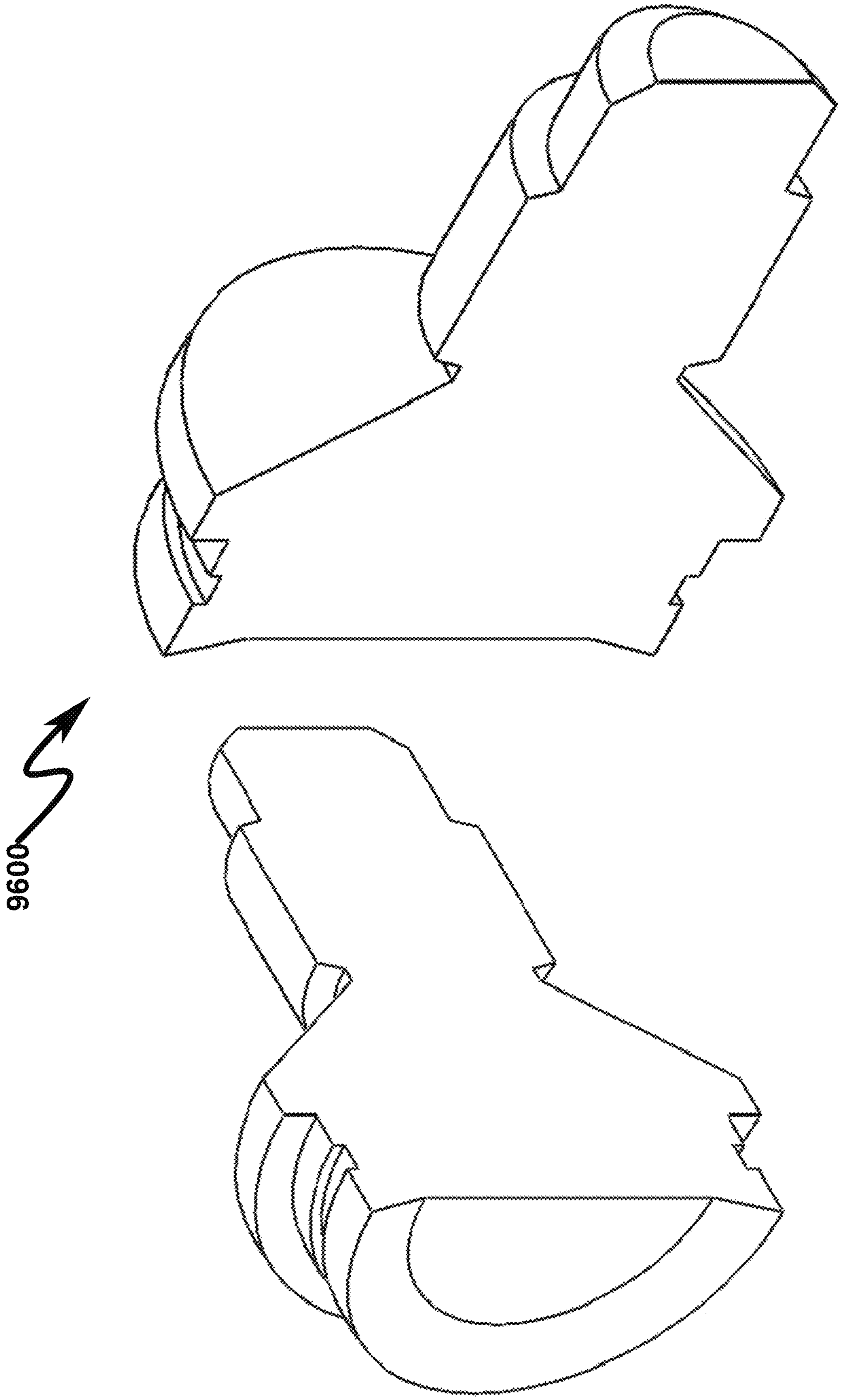
FIG. 96 illustrates front top left-side perspective section and front top right-side perspective section views of a preferred exemplary Schrader-Adapter-Cap (SAC) fitting useful in some preferred invention embodiments.

As generally detailed in FIG. 89 (8900)-FIG. 96 (9600), the present invention anticipates that the sealing and pressure testing functions described herein may be accomplished by augmentation of existing female flare nut fittings and/or existing male flare tube fittings with a Schrader adapter cap (SAC). The SAC is not known in the prior art.

The SAC is configured to cap a CUT/RFL flare fitting to allow pressure testing of the CUT/RFL. It should be noted that the SAC in combination with the depicted female flare nut (FFN) provides a more robust flare connector than conventional female possible using flare caps (FFC) commonly used in the industry. Additionally, the thicker walls of the SAC/FFN combination provides for a heavier duty connection that is capable of multiple connections without deforming as would a normal FFC. The thicker walls of the SAC/FFN combination also supports higher pressure testing for the purposes of leak detection than would be possible using a conventional FFC.

Figure 92:
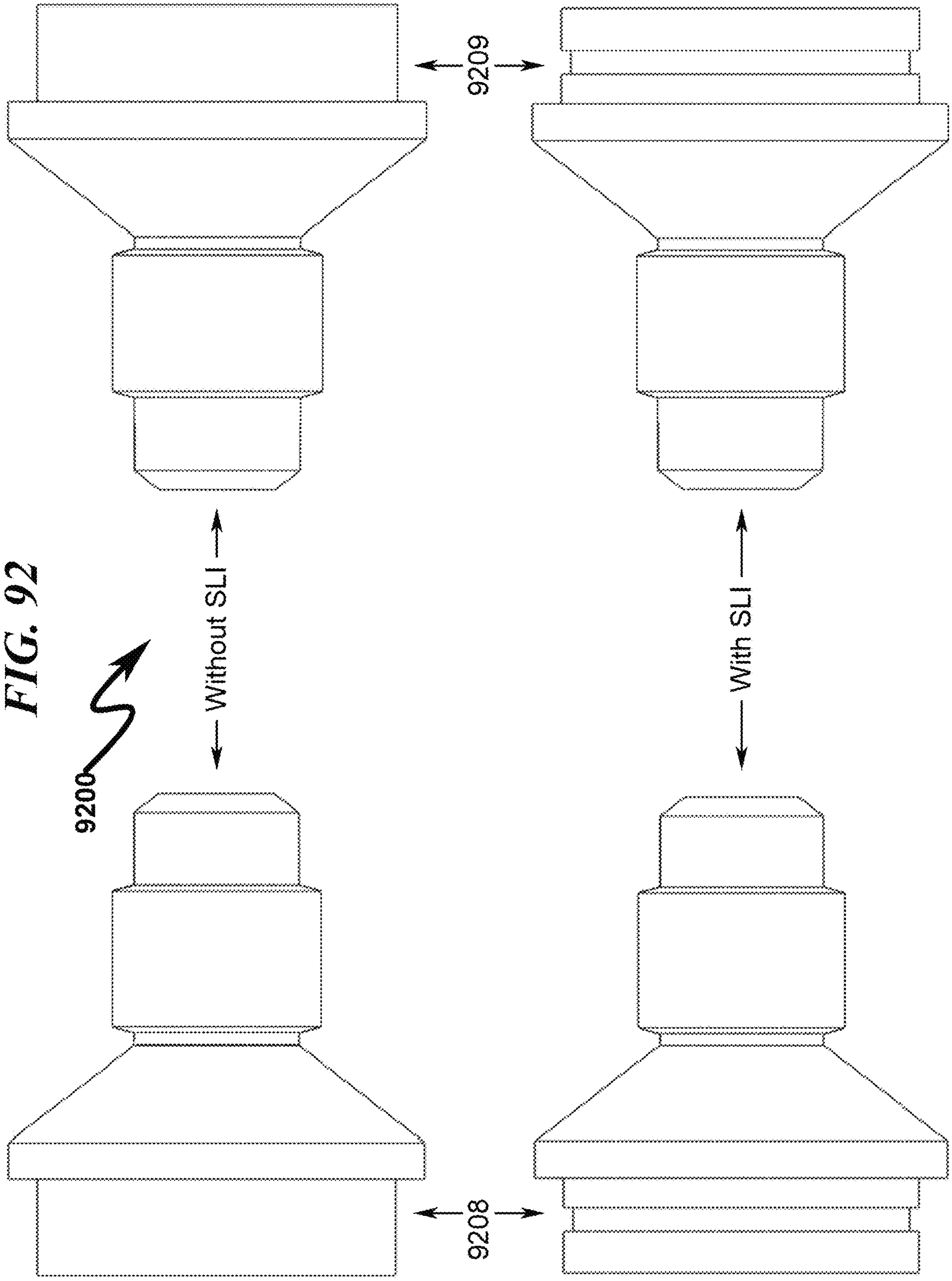
FIG. 92 illustrates front and rear views of preferred exemplary Schrader-Adapter-Cap (SAC) fitting with and without a solder-lock-inset (SLI) that is useful in some preferred invention embodiments.
Figure 93:
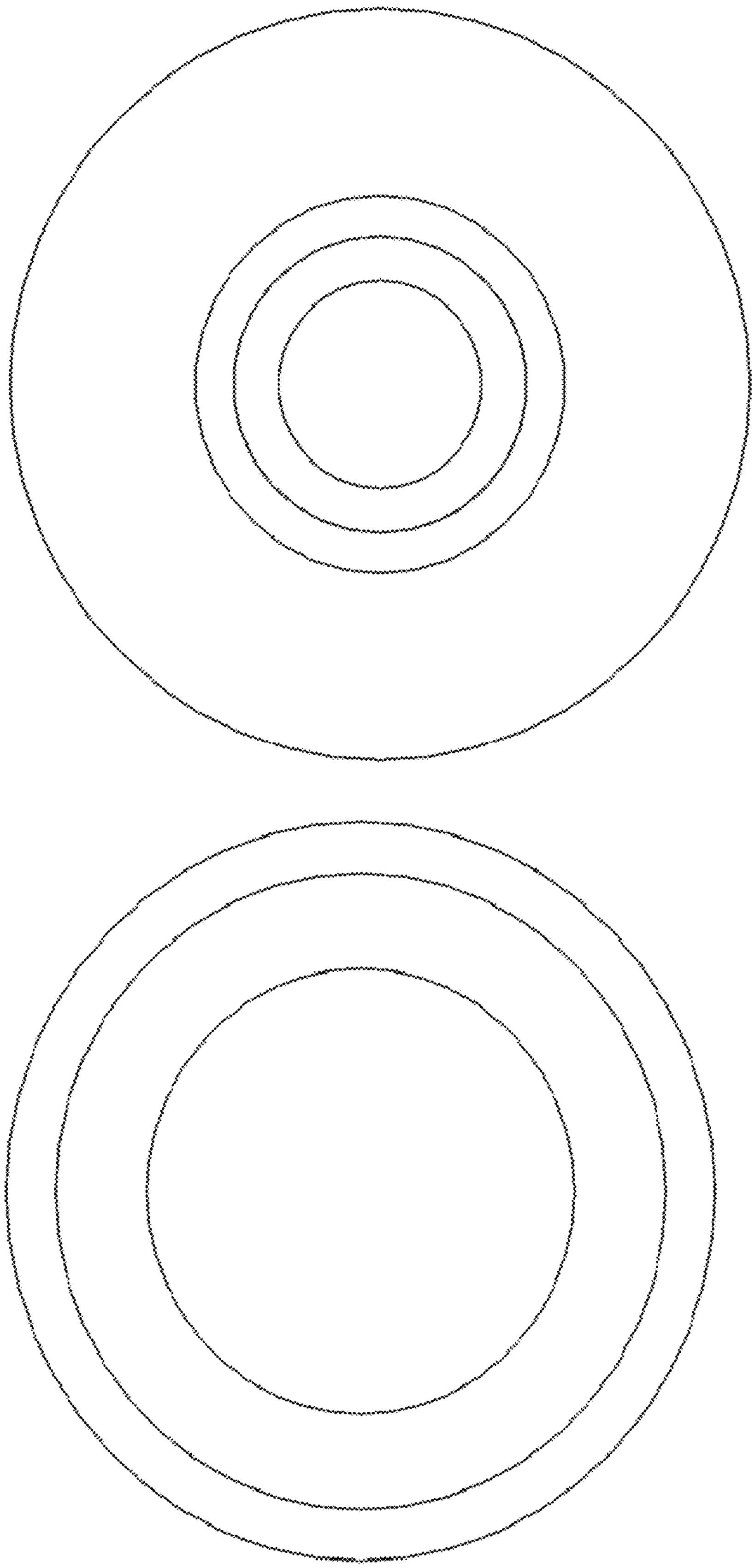
FIG. 93 illustrates left-side and right-side views of a preferred exemplary Schrader-Adapter-Cap (SAC) fitting useful in some preferred invention embodiments.
Figure 94:
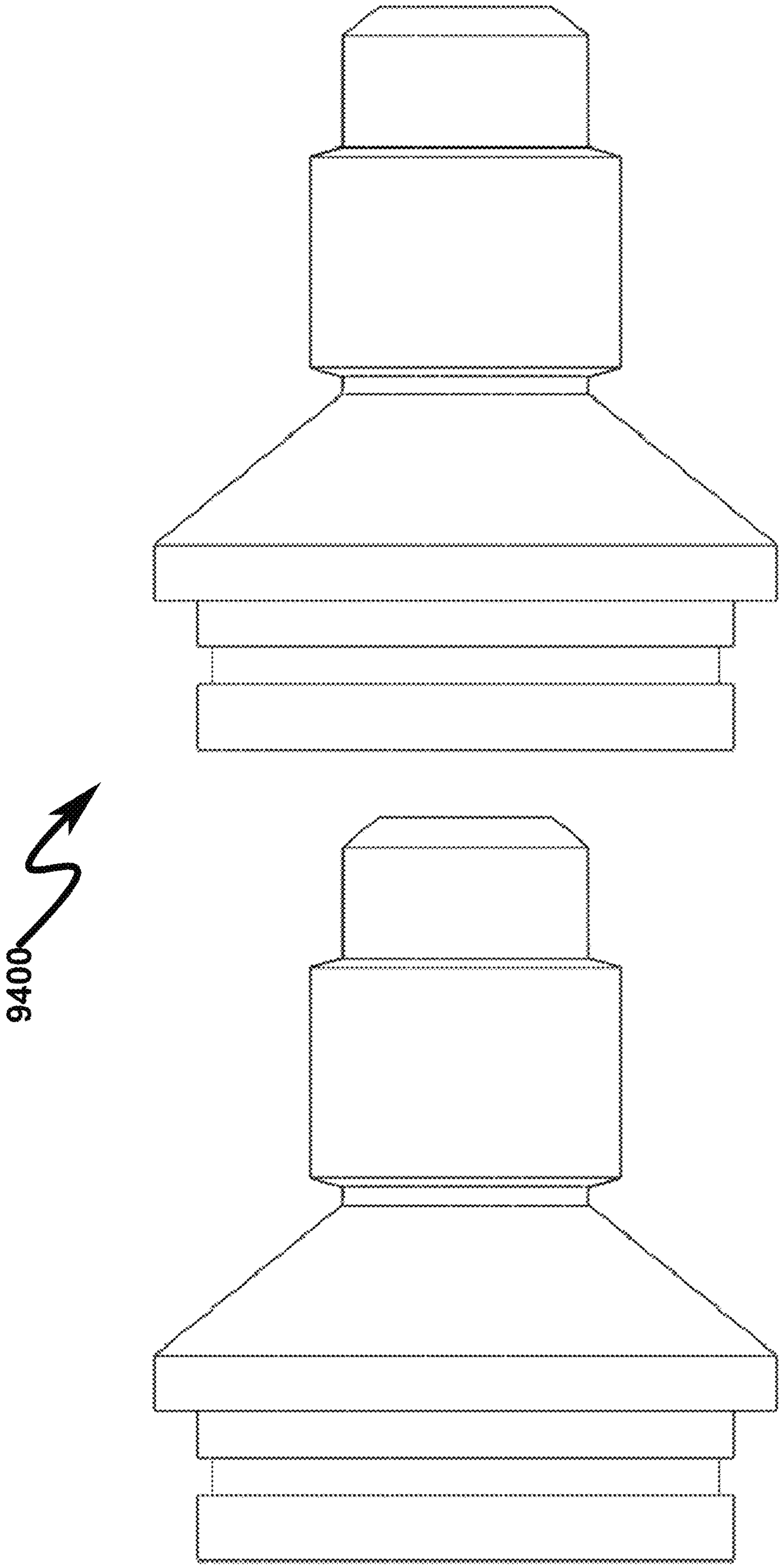
FIG. 94 illustrates top and bottom views of a preferred exemplary Schrader-Adapter-Cap (SAC) fitting useful in some preferred invention embodiments.
Figure 95:
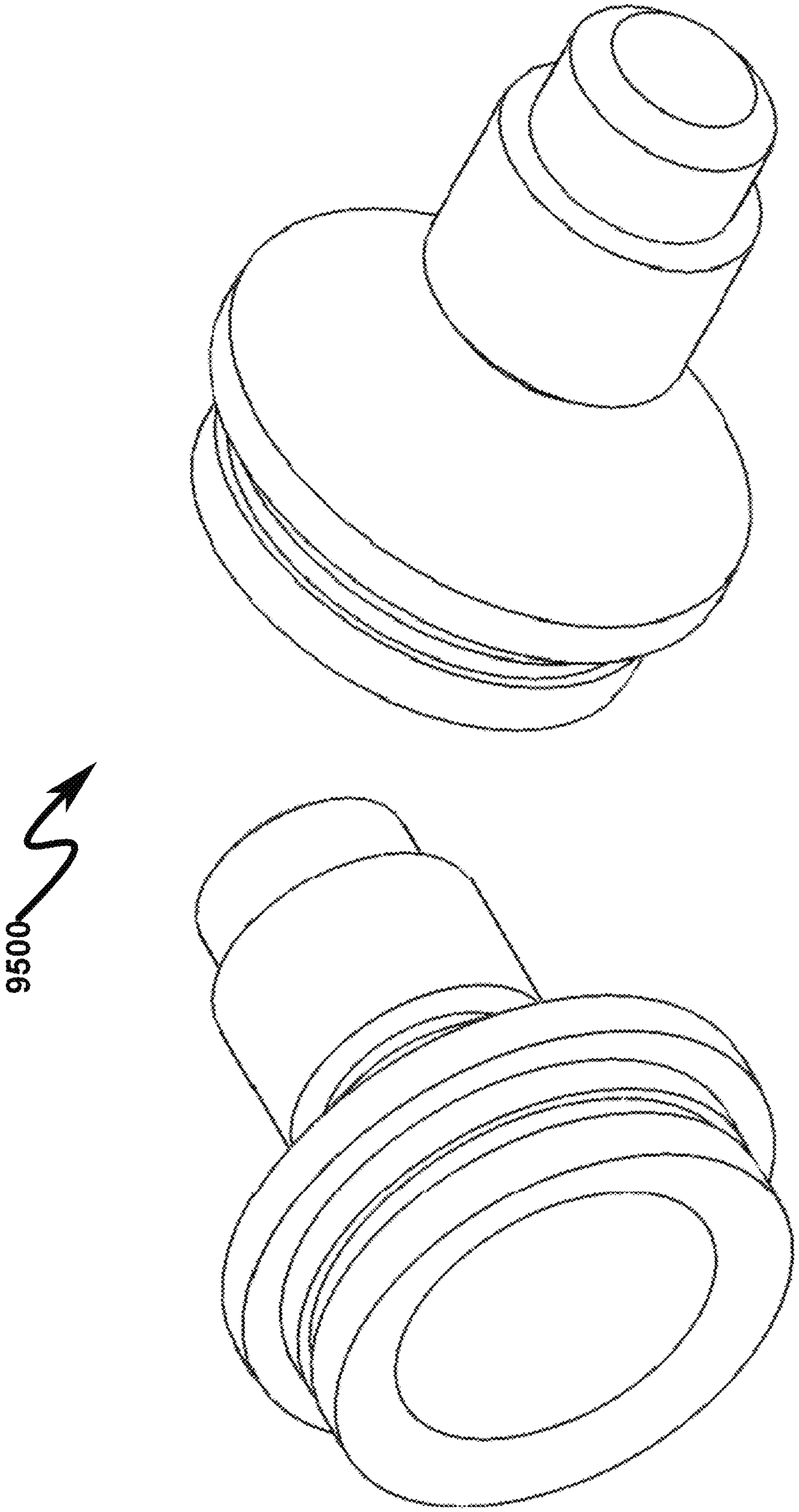
FIG. 95 illustrates front top left-side perspective and front top right-side perspective views of a preferred exemplary Schrader-Adapter-Cap (SAC) fitting useful in some preferred invention embodiments.

FIG. 92 (9200) depicts the SAC with and without a SLI and contrasts the differences (9208, 9209) between the two construction techniques.

As mentioned previously in the discussion of the SPA, the SAC is generally applicable to pipe sizes of ¼-inch or larger.

Schrader Port Insert (SPI) (9700)-(10400)

Figure 104:
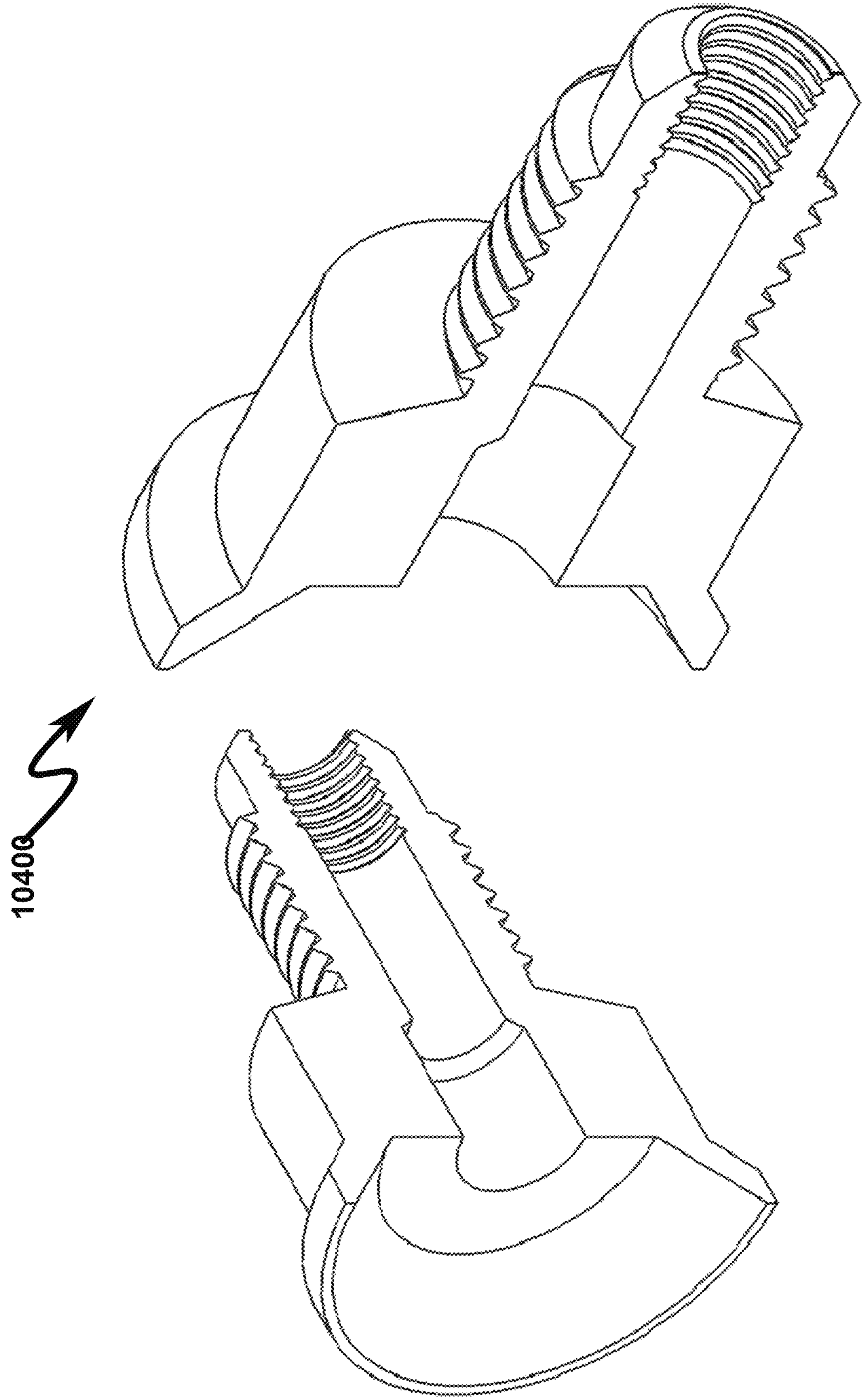
FIG. 104 illustrates front top left-side perspective section and front top right-side perspective section views of a preferred exemplary Schrader-Port-Insert (SPI) fitting useful in some preferred invention embodiments.

As generally detailed in FIG. 97 (9700)-FIG. 104 (10400), the present invention anticipates that the sealing and pressure testing functions described herein may be accomplished by augmentation of existing female flare nut fittings and/or existing male flare tube fittings with a Schrader port insert (SPI) (9701). The SPI is not known in the prior art.

The SPI in this configuration is inserted within a female flare nut (FFN) (9702) and replaces the sealing seat of the FFN with a Schrader fitting seal (SFS) that is coupled to a Schrader port incorporating a Schrader valve. The SFS mates to a male flare fitting (MFF) (9712) on a HVAC system component (CUT) (9711) to be tested and the FEN mates with the male threads on the MFF to force the SFS to mate and seal to the male seal region (MSR) of the MFF. Once the FFN (9702) is threaded and tightened onto the MFF, the SFS and MSR are mated in an air-tight configuration, allowing the SPI to be mechanically coupled to a pressure gauge or source of gas pressurization.

To provide for a male flare fitting of comparable construction requires only that a male-to-male flare (MTM) fitting adapter (9717) be inserted in the FFF (9718). The remaining male fitting on the MTM fitting adapter is then available as a male flare fitting to mate to a female flare fitting (FFF) (9716) on SPI, a HVAC CUT, or HVAC refrigerant line (RFL) (9719).

The SPI/FFN combination has all of the benefits of the SPA mentioned above with the additional benefit of no need to braze/solder the two components together as the SPI is configured with a nominal 45-degree female flare seat at one distal end that mates with a corresponding male flare seat in a male flare fitting. In this configuration the FEN only serves to provide pressure to seat the SPI with a corresponding MFF, as the SPI replaces the flare seat normally utilized in the FFN.

It should be noted that the SPI as depicted can be implemented to support female flare fittings from ½-inch (0.500) and above as a standard ¼-inch Schrader port incorporates outer threads that are typically 7/16-inch (0.4375) in diameter, allowing FFN fittings supporting pipe dimensions of ½-inch and above to be utilized. The SPI is thought to be the best mode for pipe sizes of ½-inch or larger. For pipe sizes less than ½-inch (such as the commonly used ¼-inch pipe and ⅜-inch pipe flare fittings), male or female Schrader flare fittings (SFF) as generally depicted in FIG. 65 (6500)-FIG. 72 (7200) and FIG. 73 (7300)-FIG. 80 (8000) respectively are thought to be the best mode for incorporating a Schrader port to seal a CUT or refrigerant line equipped with a flare fitting. An alternative best mode to the use of the SFF would be the use of SFA for pipe sizes less than ½-inch in size as generally depicted in FIG. 81 (8100)-FIG. 88 (8800).

The SPI is generally applicable to pipe sizes of ½-inch or larger.

Schrader Insert Cap (SIC) (10500)-(11200)

Figure 112:
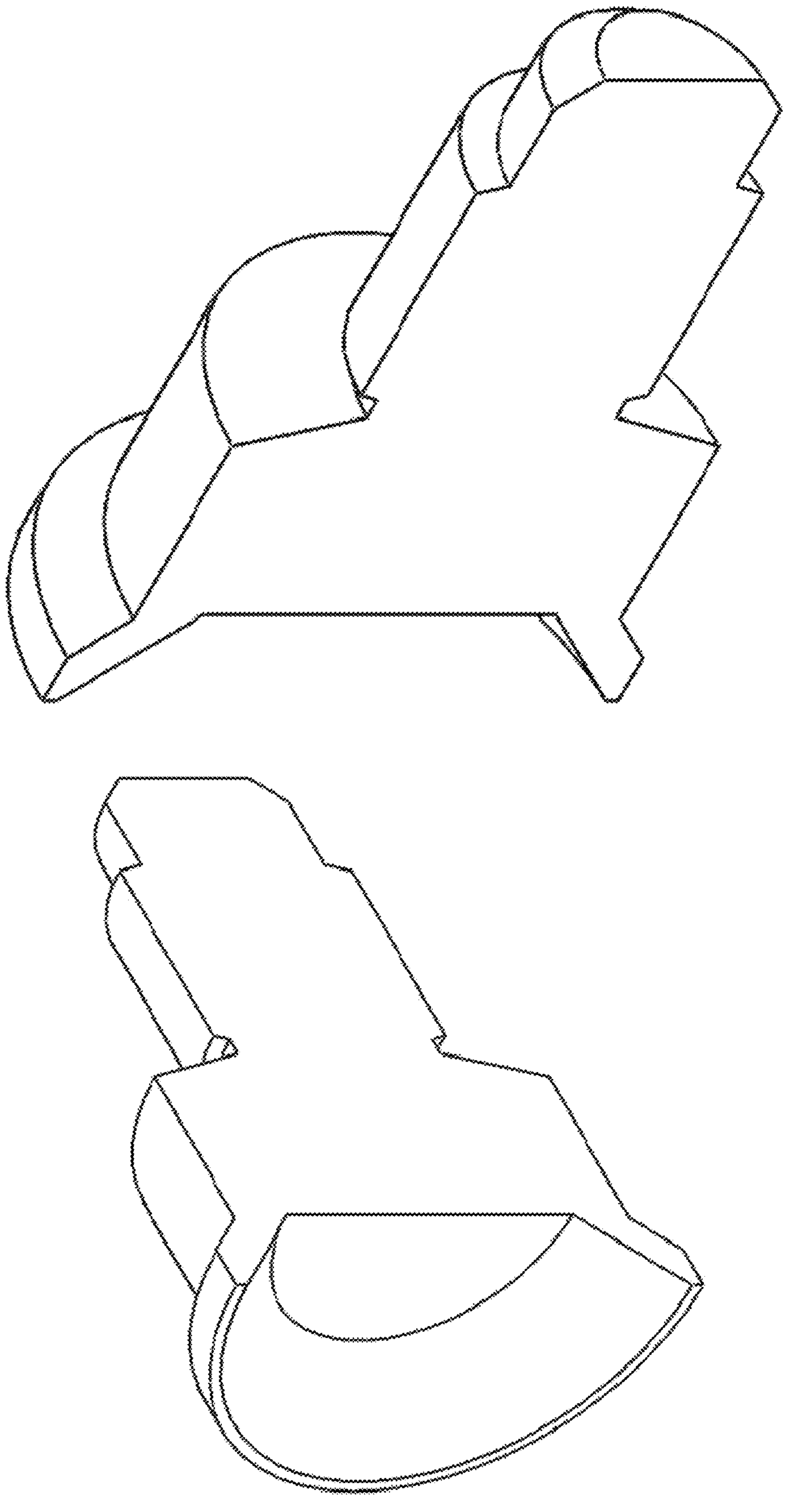
FIG. 112 illustrates front top left-side perspective section and front top right-side perspective section views of a preferred exemplary Schrader-Insert-Cap (SIC) fitting useful in some preferred invention embodiments.

As generally detailed in FIG. 105 (10500)-FIG. 112 (11200), the present invention anticipates that the sealing and pressure testing functions described herein may be accomplished by augmentation of existing female flare nut fittings and/or existing male flare tube fittings with a Schrader insert cap (SIC). The SIC is not known in the prior art.

The SIC is configured to cap a CUT/RFL flare fitting to allow pressure testing of the CUT/RFL. It should be noted that the SIC in combination with the depicted female flare nut (FFN) provides a more robust flare connector than possible using conventional female flare caps (FFC) commonly used in the industry. Additionally, the thicker walls of the SIC/FFN combination provides for a heavier duty connection that is capable of multiple connections without deforming as would a normal FFC. The thicker walls of the SIC/FFN combination also supports higher pressure testing for the purposes of leak detection than would be possible using a conventional FFC.

As mentioned previously in the discussion of the SPI, the SIC is generally applicable to pipe sizes of ½-inch or larger.

Schrader-Tube-End (STE) (11300)-(12000)

Figure 120:
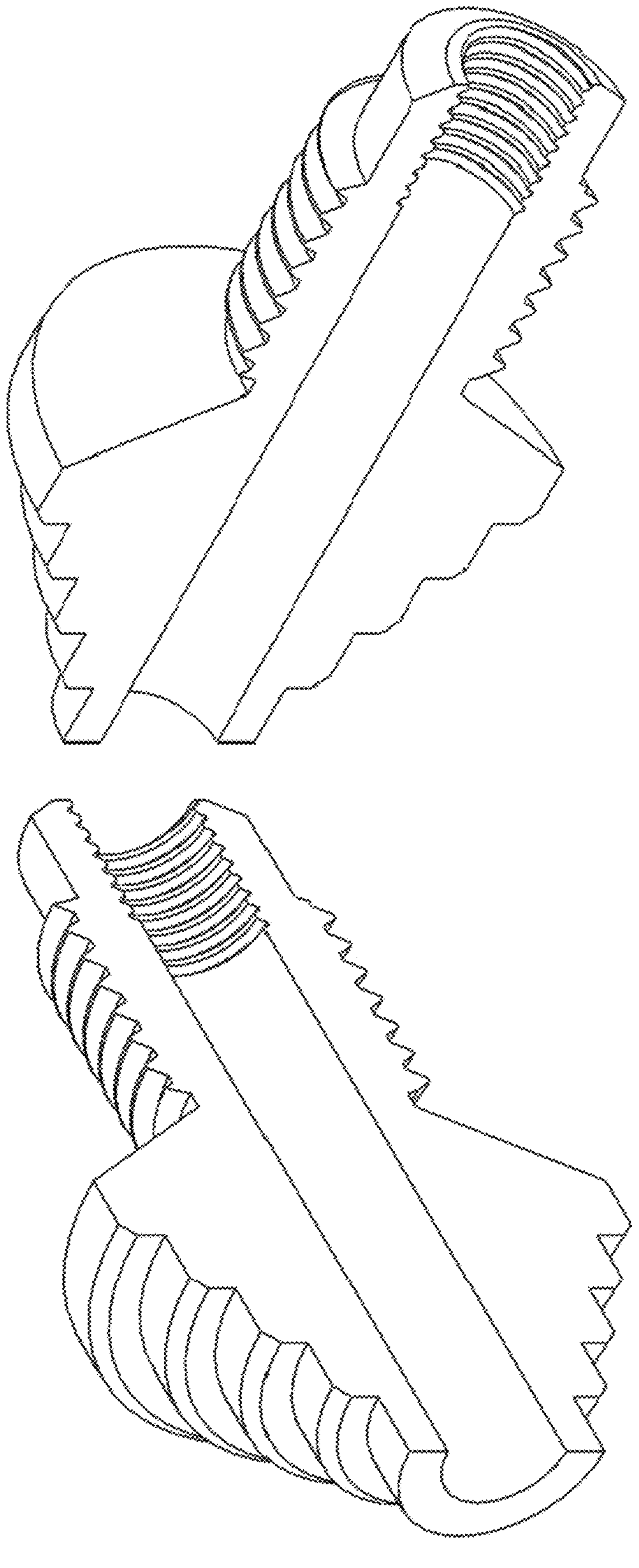

As generally detailed in FIG. 113 (11300)-FIG. 120 (12000), the present invention anticipates that the sealing and pressure testing functions described herein may be accomplished by use of a Schrader-Tube-End (STE). It is believed that the STE is not known in the prior art.

The STE is configured to cap a CUT/RFL refrigerant copper line (RCL) to allow pressure testing of the CUT/RFL. As depicted in the drawings, the STE incorporates a Schrader port fitting (SPF) mated to a stair-stepped end (SSE) that allows inserting of the SSE into the open end of a RCL. Once this insertion/mating is accomplished, the SSE is brazed/soldered to the RCL, allowing the SPF to permit pressure testing of the CUT/RCL interface.

As depicted in the drawings, the SSE may incorporate fillets and/or chamfers on the SSE peripheral edges to enhance capillary action of the brazing/soldering material between the SSE and the RCL. The drawings depict these fillets/chamfers on half of the SSE peripheral edges. Additional fillets and/or chamfers (not shown) may be incorporated on the remaining peripheral edges of the SSE to enhance mating of the SSE and the inner surface of the RCL during the mating process prior to brazing/soldering.

It should be noted that this form of CUT/RFL termination for pressure testing is extremely robust with respect to leak prevention due to the brazing/soldering operation that is superior to the seal formed by a conventional flare fitting. As such, while this CUT/RFL termination method is only temporary and must be removed once the pressure testing is completed, it is useful in situations where no Schrader port is available and the CUT/RFL must be cut and separated in order to isolate the CUT from the RFL. Here a Schrader port fitting (SPF) may be temporarily added to either side of the CUT/RFL interface, the isolated segment pressure tested, and the STE terminations removed from the CUT/RFL interface by unbrazing/unsoldering. This only leaves generally brazing/soldering material at the very distal end of the CUT/RFL interface which is easily removed and the CUT/RFL interface reconnected using a swaged copper tube splice or other conventional copper tube patching methodology.

The distal end of the STE opposite the SSE may be used to grasp the STE to facilitate heating of the STP during the brazing/soldering operation as well as the unbrazing/unsoldering operations described above. In this manner the heat-affected-zone associated with the brazing/soldering and unbrazing/unsoldering operations can be localized to the STE. This also permits the use of inductive heating methods to implement the brazing/soldering and unbrazing/unsoldering operations, a useful feature in situations where the CUT/RFL spacing to implement the STE insertion is limited.

Schrader-Tube-Plug (STP) (12100)-(12800)

As generally detailed in FIG. 121 (12100)-FIG. 128 (12800), the present invention anticipates that the sealing and pressure testing functions described herein may be accomplished by use of a Schrader-Tube-Plug (STP). It is believed that the STP is not known in the prior art.

The STP is configured to cap a CUT/RFL refrigerant copper line (RCL) to allow pressure testing of the CUT/RFL. As depicted in the drawings, the STP incorporates a Schrader port plug (SPP) mated to a stair-stepped end (SSE) that allows inserting of the SSE into the open end of a RCL. Once this insertion/mating is accomplished, the SSE is brazed/soldered to the RCL, allowing the SPF to permit pressure testing of the CUT/RCL interface.

As depicted in the drawings, the SSE may incorporate fillets and/or chamfers on the SSE peripheral edges to enhance capillary action of the brazing/soldering material between the SSE and the RCL. The drawings depict these fillets/chamfers on of the SSE peripheral edges. Additional fillets and/or chamfers (not shown) may be incorporated on the remaining peripheral edges of the SSE to enhance mating of the SSE and the inner surface of the RCL during the mating process prior to brazing/soldering.

It should be noted that this form of CUT/RFL termination for pressure testing is extremely robust with respect to leak prevention due to the brazing/soldering operation that is superior to the seal formed by a conventional flare fitting. As such, while this CUT/RFL termination method is only temporary and must be removed once the pressure testing is completed, it is useful in situations where no Schrader port is available and the CUT/RFL must be cut and separated in order to isolate the CUT from the RFL. Here a Schrader port plug (SPP) may be temporarily added to either side of the CUT/RFL interface, the isolated segment pressure tested, and the STE terminations removed from the CUT/RFL interface by unbrazing/unsoldering. This generally only leaves brazing/soldering material at the very distal end of the CUT/RFL interface which is easily removed and the CUT/RFL interface reconnected using a swaged copper tube splice or other conventional copper tube patching methodology.

The distal end of the STP opposite the SSE may be used to grasp the STP to facilitate heating of the STP during the brazing/soldering operation as well as the unbrazing/unsoldering operations described above. In this manner the heat-affected-zone associated with the brazing/soldering and unbrazing/unsoldering operations can be localized to the STP. This also permits the use of inductive heating methods to implement the brazing/soldering and unbrazing/unsoldering operations, a useful feature in situations where the CUT/RFL spacing to implement the STP insertion is limited.

CUT/RFL Segment Isolation Testing Considerations

The testing scenario depicted in FIG. 65 (6500), FIG. 73 (7300), FIG. 81 (8100), FIG. 89 (8900), FIG. 97 (9700), FIG. 105 (10500), illustrate how a HVAC component under test (CUT) and associated refrigerant line (RFL) may be separated and segmented to allow pressurization (6514, 7314, 8114, 8914, 9714, 10514) of both sides of the separation to occur while simultaneously allowing pressure gauge testing (6515, 7315, 8115, 8915, 9715, 10515) of both sides of the CUT/RFL separation. In this manner, the interfaces between various HVAC system CUT/RFL interfaces may be separately tested SIMULTENEOUSLY within the entire HVAC system. This allows, for example, a HVAC system to be segmented into manageable segments with each segment pressurized and monitored with pressure gauges to determine which CUT/RFL segments are leaking.

Note that it is possible for more than one segment to be leaking in the HVAC system. As such, the ability to SIMULTANEOUSLY check for leaks in each major section of the HVAC system is significant in that this approach can reduce the overall testing and leak remediation time by a factor of N, where N is the number of segments isolated within the HVAC system.

Segmented Pressurization Test Timing

In cases of very large refrigerant leaks, a typical operation may involve pressurizing multiple isolated HVAC segments and placing pressure test gauges at the Schrader valve port (SVP) on each isolated segment and waiting for 40-60 minutes to determine if the pressure test gauges indicate a loss of pressure in an individual isolated segment. This allows the entire HVAC system to be monitored for leaks in each segment SIMULTANEOUSLY, reducing the overall test and remediation time for leak detection.

However, it should be noted that in some circumstances very small refrigerant leaks may require that the wait time for leak detection be extended well beyond a 60-minute window to 24 hours or more in time. In these stubborn leak detection scenarios, it is imperative that SIMULTANEOUS leak detection occur within each segment as any day-long testing procedure would require N days for a HVAC system having N segments if they were sequentially tested.

Furthermore, it should be noted that in some circumstances it is possible to pressurize the HVAC system using the Schrader valve ports (SVP) that are described herein and then use existing ball valves within the HVAC system to isolate various segments of the HVAC system from each other. In this manner, if the system is pressurized and the ball valves are closed, if a pressure gauge on one side of a ball valve has maintained steady pressure during the testing period, this segment can be considered non-leaking. However, if this condition is met and the ball valve is then opened and the pressure gauge on the "good" segment drops in pressure, this is an indication of a leak on the OTHER side of the ball valve. This methodology can be utilized to minimize the number of pressure gauges that are required to monitor pressure within the individual isolated segments.

Refrigerant Leak Isolation Kit (LIK)

The present invention anticipates that a refrigerant leak isolation kit (LIK) may be assembled in order to address refrigerant leaks in the context of a generic HVAC system maintenance/repair operation. This kit may include the following components:

- Dry nitrogen source/tank (optionally provided by end user);
- Dry nitrogen tank pressure gauge regulator (4000 PSI input to 600 PSI rated output) (optionally provided by end user);
- Dry nitrogen supply hose (600 PSI rated) with Schrader port female adapter;
- Pressure/vacuum gauge (1200 PSI) with Schrader port female adapter;
- Vacuum pump (not shown) to evacuate the segmented HVAC CUT/RFL and detect leaks using a vacuum test;
- Schrader port male terminations (SMT) (male Schrader port fittings; Schrader port adapters (SPA), female flare nuts (FFN), and male-to-male flare fittings (MMF); or Schrader port inserts, female flare nuts (FFN), and male-to-male flare fittings (MMF));
- Schrader port female terminations (SFT) (female Schrader port fittings (SFF); Schrader port adapters (SPA) and female flare nuts (FFN); or Schrader port inserts and female flare nuts (FFN));
- Male pipe flare fittings;
- Female pipe flare fittings;
- Flare caps (male/female) of various sizes (¼, 5/16, ⅜, ½, ⅝, ¾, ⅞);
- Flare-to-Schrader adapters of various sizes (¼, 5/16, ⅜, ½, ⅝, ¾, ⅞, male/female flare);
- Schrader to ¼ air fitting (for pressure testing) with isolation valve;
- Schrader port copper T-adapters (SPT);
- Schrader port saddle T-adapters (SPS);
- Schrader port saddle T-adapter puncture repair fittings (PRF);
- Refrigerant-rated Ball valves (RBV).

One skilled in the art will recognize that the components of this kit will necessarily vary based on HVAC application context and range of applicable HVAC system repairs.

SPI System Summary

One present invention system embodiment may be broadly generalized as a Schrader port insert (SPI) segmented refrigerant leak isolation system (LIS) for use in heating, ventilation, and air conditioning (HVAC) systems, said LIS comprising:

(a) Schrader port insert (SPI) (9701);
(b) Schrader port valve (SPV) (1402); and
(c) female flare nut (FFN) (9702);

wherein:

- the SPI comprises a first distal end (FDE) and a second distal end (SDE);
- the SPI comprises Schrader port external threading (SPT) on the FDE;
- the comprises internal threads configured to SPI support insertion and mating of the SPV;
- the SPI comprises a Schrader internal void (SIV) from the FDE to the SDE;
- the SPI comprises a Schrader fitting seal (SFS) on the SDE;
- the SPI comprises a Schrader nut seal (SNS) on the outer periphery of the SPI between the FDE and the SDE;
- the FEN comprises a first flare end (FFE) and a second flare end (SFE);
- the FEN comprises a flare internal void (FIV) from the FFE to the SFE;
- the FFN comprises a female threaded end (FTE) at the FFE;
- the FFN comprises a female flare seat (FFS) within the FIV;
- the SFS conforms to the angle and size of the FFS;
- the SPI FDE is inserted into the FIV and mated with the FFN such that the FFS touches the SNS; and
- the FTE is coupled to a male flare fitting (MFF) in the HVAC system to allow the SPT to apply pressurized gas to the HVAC system or monitor pressure within the HVAC system.

This general system summary may be augmented by the various elements described herein to produce a wide variety of invention embodiments consistent with this overall design description.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:

- An embodiment further comprising a male-to-male flare fitting that is mated to the FTE to provide a male flare fitting port to allow the SPT to apply pressurized gas or monitor pressure via a female flare fitting on the HVAC system.
- An embodiment wherein the SPT comprises a thread fitting selected from a group consisting of: ¼ SAE thread; 7/16-20 ACME; and G¼-inch thread.
- An embodiment wherein the SFS comprises a flare fitting size selected from a group consisting of: ¼-inch; ⅜-inch; ½-inch; ⅝-inch; ¾-inch, ⅞-inch, and 1-inch.
- An embodiment wherein the FFN comprises a flare fitting selected from a group consisting of: ¼-inch; ⅜-inch; ½-inch; ⅝-inch; ¾-inch, ⅞-inch, and 1-inch.
- An embodiment further comprising a Shrader port cap (SPC) configured to mate to the SPT and provide a pressure seal to the LIS.
- An embodiment further comprising a gas pressure gauge capable of measuring gas pressures in the range of 500 PSI-600 PSI and comprising a Schrader port fitting (SPF) configured to mate to the SPT.
- An embodiment further comprising a dry nitrogen source (DNS) capable of producing 500 PSI-600 PSI gas pressure and comprising a Schrader port fitting (SPF) configured to mate to the SPT.
- An embodiment further comprising a vacuum evacuation pump (VEP) comprising a Schrader port fitting (SPF) configured to mate to the SPT.
- An embodiment wherein the SPI comprises a metal selected from a group consisting of: brass; 350 brass; aluminum; and 6061 aluminum.

One skilled in the art will recognize that other embodiments are possible based on combinations of elements taught within the above invention description.

CONCLUSION

A segmented refrigerant leak isolation system/method for use in heating, ventilation, and air conditioning (HVAC)

systems has been disclosed that allows accurate isolation of a HVAC component exhibiting a refrigerant leak, including but not limited to evaporator coils, condenser coils, and/or refrigerant lines in the HVAC system. The system uses a set of modified refrigerant line flare fittings (RFF) incorporating refrigerant Schrader valves (RSV) to isolate a HVAC component under test (CUT) from the remainder of the HVAC system and individually pressurize the CUT to detect a potential leak in the CUT. The system/method provides for retrofit of existing HVAC components with male/female flare fittings (MFF/FFF) and/or refrigerant shutoff valves (RSV) in situations where the existing HVAC system does not incorporate refrigerant line fittings (RLF).

Claims Interpretation

The following rules apply when interpreting the CLAIMS of the present invention:

The CLAIM PREAMBLE should be considered as limiting the scope of the claimed invention.

"WHEREIN" clauses should be considered as limiting the scope of the claimed invention.

"WHEREBY" clauses should be considered as limiting the scope of the claimed invention.

"ADAPTED TO" clauses should be considered as limiting the scope of the claimed invention.

"ADAPTED FOR" clauses should be considered as limiting the scope of the claimed invention.

The term "MEANS" specifically invokes the means-plus-function claims limitation recited in 35 U.S.C. § 112(f) and such claim shall be construed to cover the corresponding structure, material, or acts described in the specification and equivalents thereof.

The phrase "MEANS FOR" specifically invokes the means-plus-function claims limitation recited in 35 U.S.C. § 112(f) and such claim shall be construed to cover the corresponding structure, material, or acts described in the specification and equivalents thereof.

The phrase "STEP FOR" specifically invokes the step-plus-function claims limitation recited in 35 U.S.C. § 112(f) and such claim shall be construed to cover the corresponding structure, material, or acts described in the specification and equivalents thereof.

The step-plus-function claims limitation recited in 35 U.S.C. § 112(f) shall be construed to cover the corresponding structure, material, or acts described in the specification and equivalents thereof ONLY for such claims including the phrases "MEANS FOR", "MEANS", or "STEP FOR".

The phrase "AND/OR" in the context of an expression "X and/or Y" should be interpreted to define the set of "(X and Y)" in union with the set "(X or Y)" as interpreted by Ex Parte Gross (USPTO Patent Trial and Appeal Board, Appeal 2011-004811, S/N Ser. No. 11/565,411, ("'and/or' covers embodiments having element A alone, B alone, or elements A and B taken together").

The claims presented herein are to be interpreted in light of the specification and drawings presented herein with sufficiently narrow scope such as to not preempt any abstract idea.

The claims presented herein are to be interpreted in light of the specification and drawings presented herein with sufficiently narrow scope such as to not preclude every application of any idea.

The claims presented herein are to be interpreted in light of the specification and drawings presented herein with sufficiently narrow scope such as to preclude any basic mental process that could be performed entirely in the human mind.

The claims presented herein are to be interpreted in light of the specification and drawings presented herein with sufficiently narrow such as to preclude any process that could be performed entirely by human manual effort.

What is claimed is:

1. A Schrader port insert (SPI) segmented refrigerant leak isolation system (LIS) for use in heating, ventilation, and air conditioning (HVAC) systems, said LIS comprising:

(a) Schrader port insert (SPI) (9701);

(b) Schrader port valve (SPV) (1402); and (c) female flare nut (FFN) (9702);

wherein:

said SPI comprises a first distal end (EDE) and a second distal end (SDE);

said SPI comprises Schrader port external threading (SPT) on said FDE;

said SPI comprises internal threads configured to support insertion and mating of said SPV;

said SPI comprises a Schrader internal void (SIV) from said FDE to said SDE;

said SPI comprises a Schrader fitting seal (SFS) on said SDE;

said SPI comprises a Schrader nut seal (SNS) on an outer periphery of said SPI between said FDE and said SDE;

said FEN comprises a first flare end (FFE) and a second flare end (SFE);

said FFN comprises a flare internal void (FIV) from said FEE to said SFE;

said FFN comprises a female threaded end (FTE) at said FFE;

said FFN comprises a female flare seat (FFS) (within said FIV;

said SFS conforms to the angle and size of said FFS;

said SPI FDE is inserted into said FIV and mated with said FEN such that said FES touches said SNS; and said FTE is coupled to a male flare fitting (MFF) in said HVAC system to allow said SPT to apply pressurized gas to said HVAC system or monitor pressure within said HVAC system.

2. The segmented refrigerant leak isolation system (LIS) of claim 1 wherein further comprising a male-to-male flare fitting that is mated to said FTE to provide a male flare fitting port to allow said SPT to apply pressurized gas or monitor pressure via a female flare fitting on said HVAC system.

3. The segmented refrigerant leak isolation system (LIS) of claim 1 wherein said SPT comprises a thread fitting selected from a group consisting of: ¼ SAE thread; 7/16-20 ACME; and G¼-inch thread.

4. The segmented refrigerant leak isolation system (LIS) of claim 1 wherein said SFS comprises a flare fitting size selected from a group consisting of: ¼-inch; ⅜-inch; ½-inch; ⅝-inch; ¾-inch, ⅞-inch, and 1-inch.

5. The segmented refrigerant leak isolation system (LIS) of claim 1 wherein said FFN comprises a flare fitting selected from a group consisting of: ¼-inch; ⅜-inch; ½-inch; ⅝-inch; ¾-inch, ⅞-inch, and 1-inch.

6. The segmented refrigerant leak isolation system (LIS) of claim 1 further comprising a Shrader port cap (SPC) configured to mate to said SPT and provide a pressure seal to said LIS.

7. The segmented refrigerant leak isolation system (LIS) of claim 1 further comprising a gas pressure gauge capable of measuring gas pressures in the range of 500 PSI-600 PSI and comprising a Schrader port fitting (SPF) configured to mate to said SPT.

8. The segmented refrigerant leak isolation system (LIS) of claim 1 further comprising a dry nitrogen source (DNS) capable of producing 500 PSI-600 PSI gas pressure and comprising a Schrader port fitting (SPF) configured to mate to said SPT.

9. The segmented refrigerant leak isolation system (LIS) of claim 1 further comprising a vacuum evacuation pump (VEP) comprising a separate Schrader port fitting (SPF) configured to mate to said SPT.

10. The segmented refrigerant leak isolation system (LIS) of claim 1 wherein said SPI comprises a metal selected from a group consisting of: brass; and aluminum.

11. A segmented refrigerant leak isolation method (LIM) for use in a heating, ventilation, and air conditioning (HVAC) system, said method comprising the steps of:

(1) identifying the connections and determining connection types from a HVAC component under test (CUT) to a refrigerant line (RFL) (1601);

(2) retrofitting said CUT/RFL connections with male flare fittings (MEF), female flare fittings (FFF), and/or ball valves based on said connection types to form segment pairs of said CUT/RFL (1602);

(3) isolating said CUT/REL segments using Schrader-Port-Fittings (SPF) and/or said ball valves at segment ends (1603);

(4) pressurizing said GUT/RFL segments with said SPF attached to a dry nitrogen source (DNS) (1604);

(5) installing pressure gauges in said CUT/RFL segments using said CUT/RFL SPF (1605);

(6) determining if there is a pressure drop detected in said segments over a predetermined time interval, and if not, proceeding to step (8) (1606);

(7) repairing/replacing defective HVAC components in said CUT/REL segments and proceeding to step (4) (1607);

(8) restoring connections between said CUT and said REL (1608); and (9) terminating the leak detection method (LIM) (1609);

wherein:

said SPF comprises:

(a) Schrader port insert (SPI) (9701);

(b) Schrader port valve (SPV) (1402); and (c) female flare nut (FFN) (9702);

said SPI comprises a first distal end (FDE) and a second distal end (SDE);

said SPI comprises Schrader port external threading (SPT) on said FDE;

said SPI comprises internal threads configured to support insertion and mating of said SPV;

said SPI comprises a Schrader internal void (SIV) from said FDE to said SDE;

said SPI comprises a Schrader fitting seal (SFS) on said SDE;

said SPI comprises a Schrader nut seal (SNS) on an outer periphery of said SPI between said FDE and said SDE;

said FFN comprises a first flare end (FFE) and a second flare end (SEE);

said FFN comprises a flare internal void (FIV) from said FFE to said SFE;

said FFN comprises a female threaded end (FTE) at said FFE;

said FFN comprises a female flare seat (FFS) within said FIV;

said SFS conforms to the angle and size of said FFS;

said SPI FDE is inserted into said FIV and mated with said FFN such that said FFS touches said SNS; and said FTE is coupled to a male flare fitting (MFF) in said HVAC system to allow said SPT to apply pressurized gas to said HVAC system or monitor pressure within said HVAC system.

12. The segmented refrigerant leak isolation method (LIM) of claim 11 wherein further comprising a male-to-male flare fitting that is mated to said FTE to provide a male flare fitting port to allow said SPT to apply pressurized gas or monitor pressure via a female flare fitting on said HVAC system.

13. The segmented refrigerant leak isolation method (LIM) of claim 11 wherein said SPT comprises a thread fitting selected from a group consisting of: ¼ SAB thread; 7/16-20 ACME; and G¼-inch thread.

14. The segmented refrigerant leak isolation method (LIM) of claim 11 wherein said SES comprises a flare fitting size selected from a group consisting of: ¼-inch; ⅜-inch; ½-inch; ⅝-inch; ¾-inch, ⅞-inch, and 1-inch.

15. The segmented refrigerant leak isolation method (LIM) of claim 11 wherein said FEN comprises a flare fitting selected from a group consisting of: ¼-inch; ⅜-inch; ½-inch; ⅝-inch; ¾-inch, ⅞-inch, and 1-inch.

16. The segmented refrigerant leak isolation method (LIM) of claim 11 further comprising a Shrader port cap (SPC) configured to mate to said SPT and provide a pressure seal to said LIS.

17. The segmented refrigerant leak isolation method (LIM) of claim 11 wherein said pressure gauge is capable of measuring gas pressures in the range of 500 PSI-600 PSI and comprising a separate Schrader port fitting (SPF) configured to mate to said SPT.

18. The segmented refrigerant leak isolation method (LIM) of claim 11 wherein said dry nitrogen source (DNS) is capable of producing 500 PSI-600 PSI gas pressure and comprising a separate Schrader port fitting (SPF) configured to mate to said SPT.

19. The segmented refrigerant leak isolation method (LIM) of claim 11 further comprising a vacuum evacuation pump (VEP) comprising a separate Schrader port fitting (SPF) configured to mate to said SPT.

20. The segmented refrigerant leak isolation method (LIM) of claim 11 wherein said SPI comprises a metal selected from a group consisting of: brass; and aluminum.

* * * * *